(12) United States Patent
Maekawa et al.

(10) Patent No.: US 10,829,838 B2
(45) Date of Patent: *Nov. 10, 2020

(54) SOLID METAL ALLOY

(71) Applicant: M. TECHNIQUE CO., LTD., Izumi-shi, Osaka (JP)

(72) Inventors: Masaki Maekawa, Izumi (JP); Daisuke Honda, Izumi (JP); Masakazu Enomura, Izumi (JP); Kazuya Araki, Izumi (JP)

(73) Assignee: M. TECHNIQUE CO., LTD., Izumi-Shi, Osaka (JP)

(*) Notice: Subject to any disclaimer, the term of this patent is extended or adjusted under 35 U.S.C. 154(b) by 410 days.

This patent is subject to a terminal disclaimer.

(21) Appl. No.: 15/648,275

(22) Filed: Jul. 12, 2017

(65) Prior Publication Data

US 2017/0369969 A1 Dec. 28, 2017

Related U.S. Application Data

(62) Division of application No. 14/358,689, filed as application No. PCT/JP2012/079871 on Nov. 16, 2012, now Pat. No. 9,732,401.

(30) Foreign Application Priority Data

Nov. 16, 2011 (JP) .................................. 2011-251047
Dec. 28, 2011 (WO) .................. PCT/JP2011/080524
(Continued)

(51) Int. Cl.
*C22C 19/03* (2006.01)
*B82Y 30/00* (2011.01)
(Continued)

(52) U.S. Cl.
CPC ............. *C22C 19/03* (2013.01); *B22F 1/0018* (2013.01); *B22F 9/24* (2013.01); *B82Y 30/00* (2013.01);
(Continued)

(58) Field of Classification Search
CPC ................................. B22F 1/0018; B22F 9/24
(Continued)

(56) References Cited

U.S. PATENT DOCUMENTS

2004/0123920 A1  7/2004  Thomas et al.
2006/0032330 A1  2/2006  Sato
(Continued)

FOREIGN PATENT DOCUMENTS

CN   1704191 A   12/2005
CN   1777703 A    5/2006
(Continued)

OTHER PUBLICATIONS

Hassam et al., "Phase diagram of the Ag—Bi—Sb ternary system", Journal of Alloys and Compounds 315 (2001), pp. 211-217.
(Continued)

*Primary Examiner* — Colleen P Dunn
*Assistant Examiner* — Nicholas A Wang
(74) *Attorney, Agent, or Firm* — Birch, Stewart, Kolasch & Birch, LLP

(57) ABSTRACT

The present invention addresses the problem of providing a novel, sold metal alloy. Provided is a metal alloy containing two or more types of metal, wherein an equilibrium diagram of the metal alloy shows the two or more types of metal in a finely mixed state at the nanolevel in a specific region where the two types of metal are unevenly distributed. This metal alloy has a substitutional solid solution of the two or more types of metal as the principal constituent thereof. This metal alloy is preferably one obtained by precipitation after
(Continued)

(A)

(B)

(C)

Figure 1:
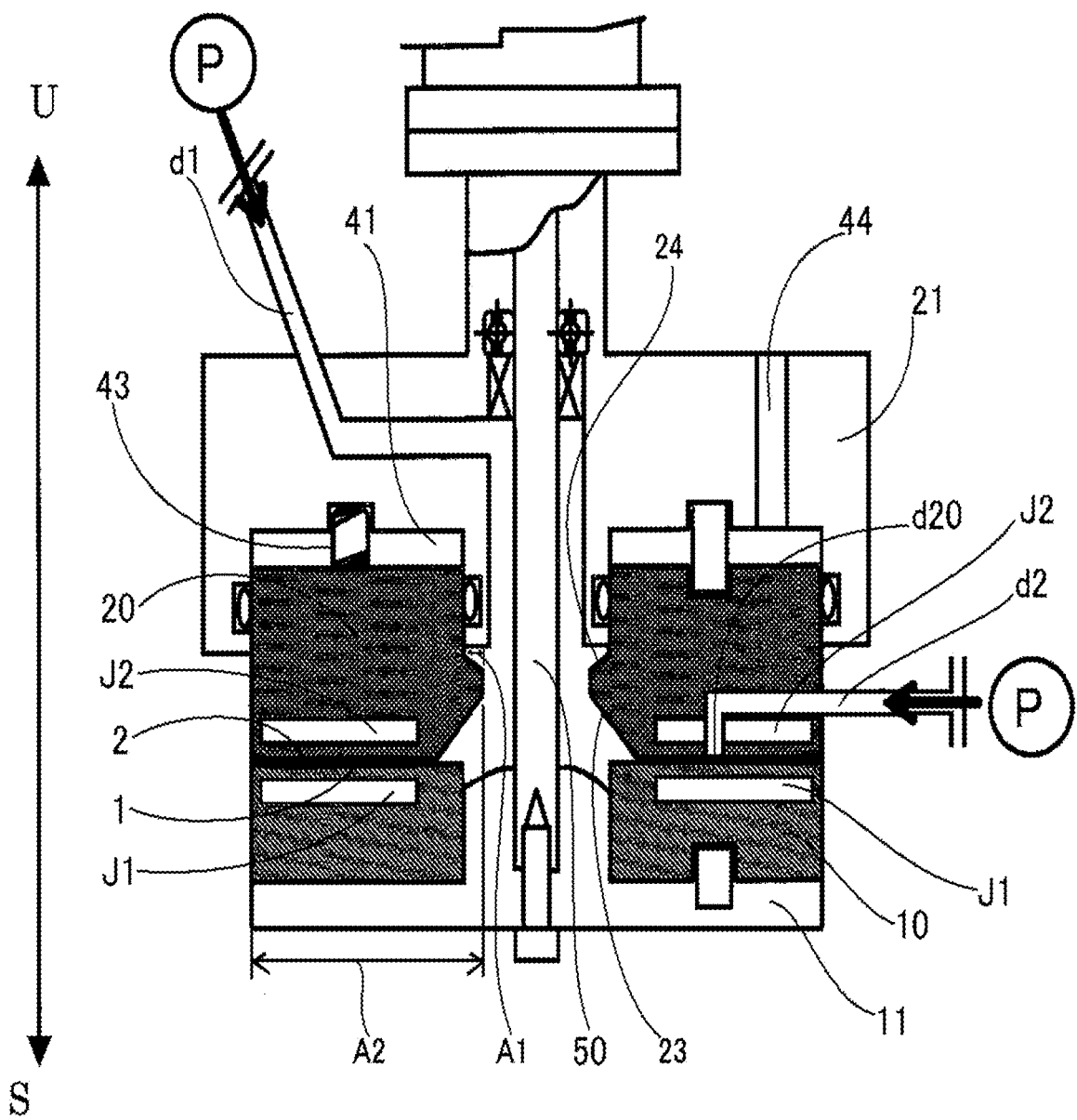

mixing ions of two or more types of metal and a reducing agent in a thin-film fluid formed between processing surfaces, at least one of which rotates relative to the other, which are arranged so as to face one another and are capable of approaching and separating from one another.

20 Claims, 75 Drawing Sheets

(30) Foreign Application Priority Data

| | | |
|---|---|---|
| Feb. 14, 2012 | (JP) | 2012-030007 |
| Mar. 16, 2012 | (JP) | 2012-061022 |
| Aug. 16, 2012 | (WO) | PCT/JP2012/070853 |
| Oct. 15, 2012 | (JP) | 2012-227931 |

(51) Int. Cl.

| | |
|---|---|
| *B22F 9/24* | (2006.01) |
| *C22C 5/08* | (2006.01) |
| *C22C 9/00* | (2006.01) |
| *B22F 1/00* | (2006.01) |
| *C22C 5/02* | (2006.01) |
| *C22C 5/06* | (2006.01) |
| *C22C 12/00* | (2006.01) |
| *C22C 13/00* | (2006.01) |

(52) U.S. Cl.
CPC .................. *C22C 5/02* (2013.01); *C22C 5/06* (2013.01); *C22C 5/08* (2013.01); *C22C 9/00* (2013.01); *C22C 12/00* (2013.01); *C22C 13/00* (2013.01)

(58) Field of Classification Search
USPC ........................................................ 420/456
See application file for complete search history.

(56) References Cited

U.S. PATENT DOCUMENTS

| | | |
|---|---|---|
| 2009/0151512 A1 | 6/2009 | Nakatani |
| 2010/0155310 A1 | 6/2010 | Enomura |
| 2010/0196788 A1 | 8/2010 | Enomura |
| 2010/0280296 A1 | 11/2010 | Bisson et al. |
| 2010/0327236 A1* | 12/2010 | Enomura ............. B01J 13/0043 252/512 |
| 2011/0147220 A1 | 6/2011 | Zhang-Beglinger et al. |
| 2012/0094140 A1 | 4/2012 | Kitagawa et al. |

FOREIGN PATENT DOCUMENTS

| | | |
|---|---|---|
| CN | 101784338 A | 7/2010 |
| JP | 2000-144203 A | 5/2000 |
| JP | 2002-226926 A | 8/2002 |
| JP | 2004-84048 A | 3/2004 |
| JP | 2005-272970 A | 10/2005 |
| JP | 2006-63347 A | 3/2006 |
| JP | 2006-183110 A | 7/2006 |
| JP | 2007-132654 A | 5/2007 |
| JP | 2007-291443 A | 11/2007 |
| JP | 2008-49336 A | 3/2008 |
| JP | 2008-57044 A | 3/2008 |
| JP | 4257981 B2 | 4/2009 |
| JP | 2009-144250 A | 7/2009 |
| JP | 2009-197325 A | 9/2009 |
| JP | 2009-289587 A | 12/2009 |
| JP | WO2009008390 * | 9/2010 |
| JP | 2010-232161 A | 10/2010 |
| JP | 2011-68936 A | 4/2011 |
| JP | 2011-122236 A | 6/2011 |
| KR | 10-2010-0022093 A | 2/2010 |
| WO | WO 2009/008390 A1 | 1/2009 |
| WO | WO 2010/122811 A1 | 10/2010 |

OTHER PUBLICATIONS

Jakobi et al., "Stoichiometry of alloy nanoparticles from laser ablation of PtIr in acetone and their electrophoretic deposition on PtIr electrodes," Nanotechnology, vol. 22, No. 145601, 2011, pp. 1-7.

Tran et al., "TEM characterization of chemically synthesized copper-gold nanoparticles," J Nanopart Res, vol. 13, 2011 (Published online Apr. 8, 2011), pp. 4229-4237.

* cited by examiner (A)

(B)

(A)

(B)

(A)  (B)  (C)

(A)

(B)

(A)  (B)  (C)

SOLID METAL ALLOY

This application is a Divisional of copending application Ser. No. 14/358,689, filed on May 15, 2014, which was filed as PCT International Application No. PCT/JP2012/079871 on Nov. 16, 2012, which claims priority under 35 U.S.C. § 119(a) to Patent Application No. 2011-251047, filed in Japan on Nov. 16, 2011, International Application No. PCT/JP2011/080524, filed with the International Bureau on Dec. 28, 2011, Patent Application No. 2012-030007, filed in Japan on Feb. 14, 2012, Patent Application No. 2012-061022, filed in Japan on Mar. 16, 2012, International Application No. PCT/JP2012/070853, filed with the International Bureau on Aug. 16, 2012, and Patent Application No. 2012-227931, filed in Japan on Oct. 15, 2012, all of which are hereby expressly incorporated by reference into the present application.

TECHNICAL FIELD

The present invention relates to a novel solid metal alloy.

BACKGROUND ART

In recent years, an alloy, especially an alloy which contains a precious metal such as gold and silver, is drawing an attention as a material which can be used in various applications in the technical fields in which a high technology and a nanotechnology can be applied.

For example, an alloy particle comprising silver and copper is drawing an attention as a material used in an electrically conductive paste, an electrically conductive ink, an electrically conductive fine wiring, and the like; or as a material for a reducing catalyst of carbon monoxide and nitrogen oxides (NOx) as well as for a lead-free soldering and so forth. There is a possibility of controlling characteristics thereof by the ratio of silver to copper in a silver-copper alloy particle; and for example, a silver-copper alloy particle mainly comprising silver, wherein the said particle comprises silver which has superior specific resistance and oxidation resistance and copper which can suppress migration of silver, and a silver-copper alloy particle mainly comprising copper useful as the material for wiring such as a magnet wire are drawing attention. Furthermore, antimicrobial properties of each of silver and copper are drawing attention, and in addition, many applications thereof including use in jewelry are expected; and thus, the silver-copper alloy is a widely wanted material in the industrial world. Migration occurs in many metals, and it is known that silver migrates faster; and it is said that migration thereof can be made slower by alloying it with other metals such as copper. However, silver and copper do not mix homogeneously together, so that in many cases the afore-mentioned characteristics expected as the silver-copper alloy are not fully realized in suppressing the oxidation susceptibility possessed by copper, in suppressing migration of silver, and the like.

Similarly, an alloy particle of silver and nickel is also drawing an attention as a material used in an electrically conductive paste, an electrically conductive ink, an electrically conductive fine wiring, a contact material, an electrode material, a fuse, a catalyst, and the like. There is a possibility of controlling characteristics thereof by the ratio of silver to nickel in the silver-nickel alloy particle; and for example, it is known that even a silver-nickel alloy in the state wherein silver and nickel are not homogeneously mixed particle not only can express higher corrosion resistance to arc discharge but also can be improved in its heat resistance, abrasion resistance, fusion resistance, catalysis performance, durability as an ignition plug, and so forth, as compared with the silver single body. Therefore, the silver-nickel alloy is a widely wanted material in the industrial world. However, silver and nickel do not mix homogeneously together, so that in many cases the afore-mentioned characteristics expected as the silver-nickel alloy are not fully realized.

Similarly, an alloy particle of gold and nickel is also drawing an attention as a material used in a magnetic sensor, an electrode material, a capacitor, a catalyst, a contact material, and the like. There is a possibility of controlling characteristics thereof by the ratio of gold to nickel in a gold-nickel alloy particle; and for example, it is known that even a gold-nickel alloy in the state wherein gold and nickel are not homogeneously mixed not only can express better performance as a high-reliable electric contact material of electronic parts such as a connector, a small relay, and a printed wire board, but also can be improved in its heat resistance, abrasion resistance, catalysis performance, and so forth, as compared with the gold single body. Therefore, the gold-nickel alloy is a widely wanted material in the industrial world. However, similarly to the silver-copper alloy, gold and nickel form a eutectic body, so that it is difficult to form a homogeneous solid solution. Accordingly, in many cases the afore-mentioned characteristics expected as the gold-nickel alloy are not fully realized.

Further, a silver-antimony alloy has been drawing attention for long as a material used in a recording medium, a low-temperature soldering material, a superconductive material, an electrode material, and the like. There is a possibility of controlling characteristics thereof by the ratio of silver (Ag) to antimony (Sb) in the silver-antimony alloy; and for example, it is known that even a silver-antimony alloy in the state wherein silver and antimony are not homogeneously mixed together can be improved in its abrasion resistance and so forth, as compared with the silver single body. Therefore, the silver-antimony alloy is a widely wanted material in the industrial world. However, silver and antimony form a eutectic body or an intermetallic compound in concentration above a certain level, so that they do not mix homogeneously together. Accordingly, in many cases the afore-mentioned characteristics expected as the silver-antimony alloy are not fully realized.

As discussed above, it is shown that in solid alloys comprising at least two kinds of metals, the two metals exist in various forms; and in an equilibrium diagram thereof, the said at least two metals do not mix together by taking a eutectic body structure or forming an intermetallic compound, whereby making a specific region in which a solid phase is eccentrically located. In such a specific region, the composition ratio of the two or more metals to constitute the alloy in the total alloy is significantly different from the composition ratio of the two metals within an extremely small area with the size in the level of nanometers whereby showing the state of eccentric localization; and as a result, in many cases the characteristics expected as the alloy are not fully realized.

Meanwhile, as to heretofore known production methods of an alloy particle, there are a powder metallurgy method, a liquid phase reduction method, an atomizing method, and the like; however, in fact, the situation today is that there has been no report yet with regard to the metal alloy whose problem of the afore-mentioned eccentric localization has been solved.

For example, as to the producing methods of the silver-copper alloy particle, there are such methods as a liquid-phase reduction method, an atomizing method, and so forth, as described in Patent Document 1, Patent Document 2, and Patent Document 3. However, the silver-copper alloy obtained by any of these methods is a core-shell type or contains a eutectic body; and therefore, there has been no disclosure as to the silver-copper alloy substantially not containing a eutectic body and the producing method thereof. In Patent Document 1, the silver-core and the silver-copper-shell nanoparticle is mentioned, wherein the silver-copper alloy to constitute the shell is described from the elemental analysis in combination of the electron microscopic observation and the energy dispersive X-ray fluorescence measurement. However, because mapping of each of silver and copper in the shell part is not disclosed, and also for other reasons, there still remains the question as to whether or not silver and copper form the solid solution. In Patent Document 4, it is described that silver-covered copper powder obtained by covering the copper particle surface with silver was heat-treated at 150 to 600° C. under the non-oxidative atmosphere thereby dispersing silver to the copper particle to obtain the silver-dispersed copper powder. However, because the silver-dispersed copper powder is produced by dispersing silver metal from the copper particle surface, it is difficult to disperse silver to the central part of the copper particle; and thus, not only it is difficult to have the state not containing the eutectic body in the entire particle thereof, but also the particle diameter thereof is too large to be used as a paste. Moreover, with regard to the analysis method of the silver-dispersed metal powder, there is a possibility that the copper single body might be present in the central part of the particle as it might also be the case that by heat treatment the metal silver that was present as the single body thereof on surface of the copper particle could not be confirmed merely by the surface observation (SEM observation). From these considerations, microscopically the above-mentioned silver-copper alloy cannot be regarded as the alloy, though macroscopically it may be regarded as the alloy.

In addition, there is a method such as for example in which a partial solid solution of the silver-copper alloy particle is obtained by rapidly cooling from the state that the metal silver and the metal copper are co-melted at high temperature; however, there has been no disclosure as to the silver-copper alloy having mainly the non-eutectic body structure such as the solid solution. On top of this, the production thereof requires high energy so that this method automatically leads to problems such as high production cost.

As to the tin-silver-copper alloy, only the eutectic body alloy thereof has been disclosed, as shown in Patent Document 6; and thus, there has been no disclosure as to the metal alloy mainly having the non-eutectic body structure substantially not containing the eutectic body.

As to the production method of an alloy particle of silver and nickel, a powder metallurgy method has been generally used from the past; however, there are such methods as a liquid phase reduction method as shown in Patent Document 7 and an atomizing method as shown in Patent Document 8. However, in the silver-nickel alloys obtained by any of these methods, silver and nickel are not mixed homogenously; and thus, the silver-nickel alloy particle not substantially containing the eutectic body and the production methods thereof has not been disclosed yet. Other than these methods, there is a method in which metal silver and metal nickel are rapidly cooled from the state of the solid solution thereof at high temperature thereby obtaining the solid solution of silver-nickel alloy particle; however, this method requires large energy so that there are problems of a natural tendency to a high production cost and so forth.

As to the production method of an alloy particle of gold and nickel, a powder metallurgy method has been generally used from the past; however, there are such methods as a liquid phase reduction method as shown in Patent Document 9 and an atomizing method as shown in Patent Document 10. However, the gold-nickel alloy in which gold and nickel are mixed homogenously together, especially the gold-nickel alloy particle and the production method thereof has not been disclosed yet. Other than these methods, there is a method in which metal gold and metal nickel are rapidly cooled from the state of the solid solution thereof at high temperature thereby obtaining the solid solution of gold-nickel alloy particle; however, this method tends to make the obtained gold-nickel alloy particle inhomogeneous, and in addition, this requires large energy, so that there are problems of a natural tendency to a high production cost and so forth.

As to the production method of an alloy of silver and antimony, an alloy plating method has been generally used from the past as shown in Patent Document 11. As the different production method from it, there is a method in which an alloy particle of silver and antimony is produced by using a mechanical alloying treatment as shown in Patent Document 12. However, the silver-antimony alloys obtained by these methods contain a eutectic body or an intermetallic compound, so that there has been no disclosure as to the silver-antimony alloy in which these metals are mixed homogenously together.

Besides, there may be such a method in which metal silver and metal antimony are cooled or rapidly cooled from the molten state at high temperature thereby obtaining the partial solid solution thereof; however, there has been no disclosure as to the silver-antimony alloy mainly having a non-eutectic body structure such as a solid solution. Moreover, this method may require large energy to melt them during the time of production thereof; and thus, there is such a problem that the field in which this can be used may not be wide because of a natural tendency to a high production cost and so forth.

In Patent Document 5, which is filed by the present applicant, the producing method of the silver-copper alloy particle is disclosed; however, analysis of the particle obtained by the producing method thereof shown by Example reveals, of the similar kind to later-mentioned comparative examples A1 to A3, that this particle is the silver-copper alloy particle formed of the eutectic body or mixture of single bodies of silver and copper. Accordingly, there has been no disclosure as to the silver-copper alloy substantially not containing the eutectic body, especially as to the solid solution type silver-copper alloy.

The apparatus shown in Patent Document 5 is the one in which fine particles are separated in a thin film fluid formed between at least two processing surfaces which are disposed in a position they are faced with each other so as to be able to approach to and separate from each other, at least one of which rotates relative to the other; and this apparatus is expected to be actively utilized in production of the particles especially with the size in the level of nanometers. Inventors of the present invention tried to produce various nanoparticles by using this apparatus; however, all the relationships between the separation and reaction conditions and the results thereof have not been clarified yet.

Figure 4A:
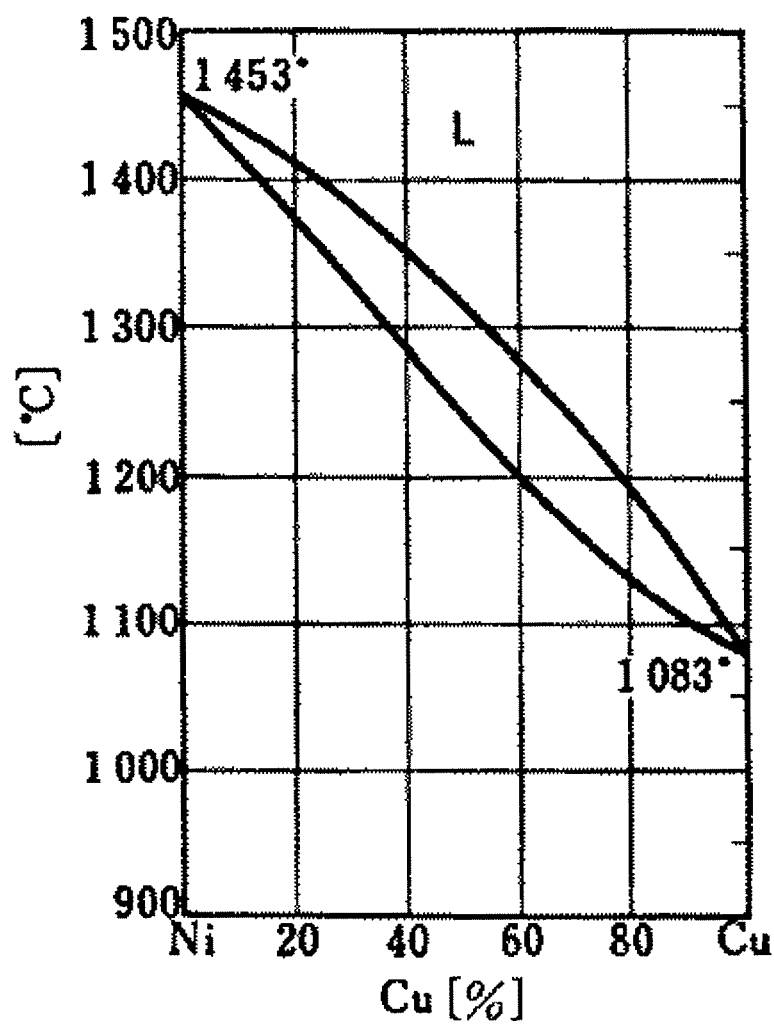

Specifically, in the solid metal alloy particles, too, it was confirmed that in the platinum-palladium alloy, the analysis result of the TEM-EDS of one point was almost identical to the ICP analysis result; however, the platinum-palladium alloy was the all proportional solid solution metal as shown in FIG. 4(A). On the other hand, as to the silver-copper alloy, only the silver-copper alloy particle in the state of the eutectic body or of the mixture of the silver single body and the copper single body could be obtained.

Figure 54:
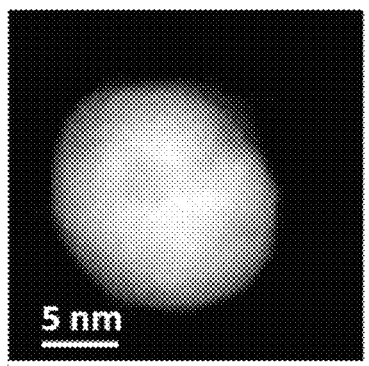
Figure 54:
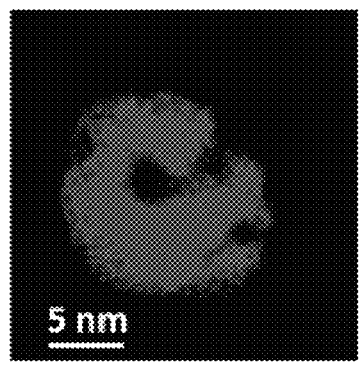
Figure 54:
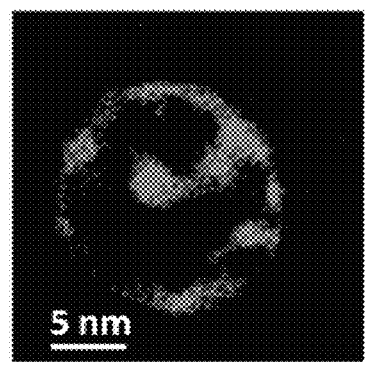
Figure 55:
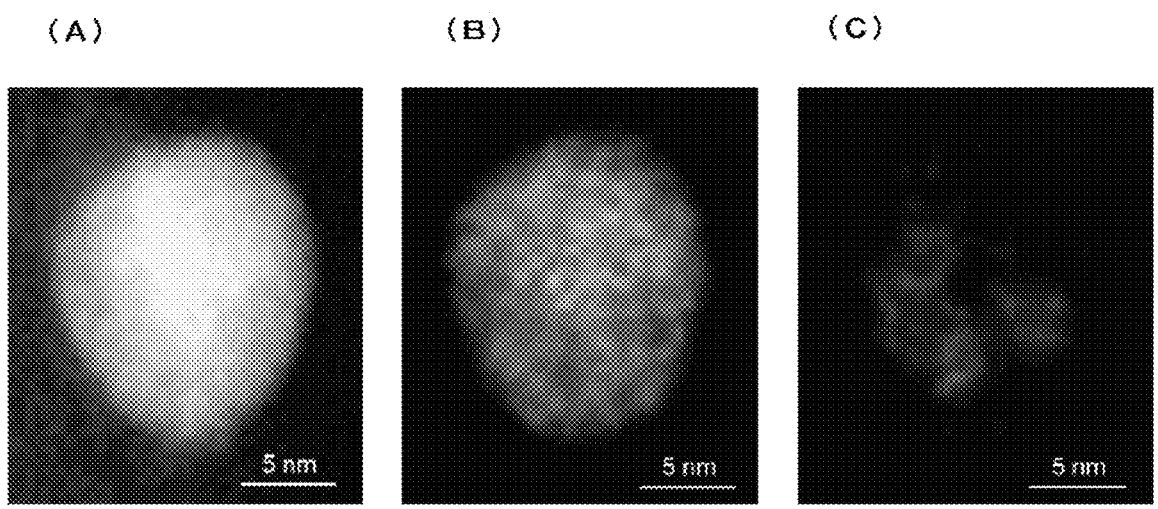
Figure 56:
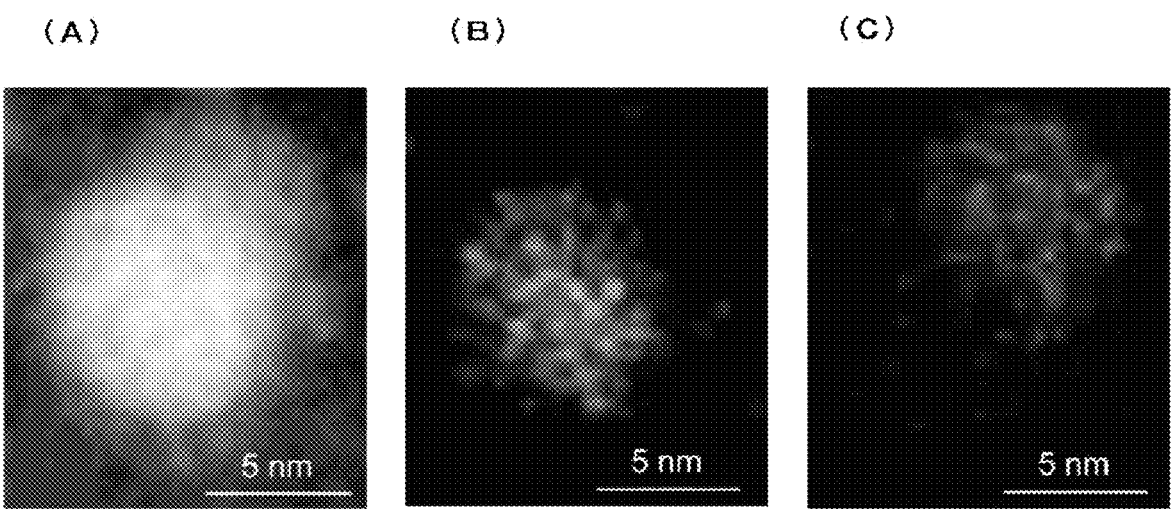

More specifically, obtained therein were the silver-copper alloy particles that are similar to those shown in FIG. 54 to FIG. 56. In FIG. 54(A) the STEM-HAADF picture thereof is shown; in FIG. 54(B) the EELS mapping result (Ag) thereof is shown; and in FIG. 54(C) the EELS mapping result (Cu) thereof is shown. Results of FIG. 54 were obtained by using the energy dispersive X-ray analyzer Centurio (manufactured by JEOL Ltd.) and by the atomic resolution analytical electron microscope JEM-ARM 200F (manufactured by JEOL Ltd.) with the acceleration voltage of 200.0 kV and the magnification of 6000000. In FIG. 55(A) the STEM-HAADF picture thereof is shown; in FIG. 55(B) the STEM mapping result (Ag) thereof is shown; and in FIG. 55(C) the STEM mapping result (Cu) thereof is shown. Results of FIG. 55 were obtained by using the Cs corrector-equipped super high resolution STEM analyzer HD-2700 (equipped with EDX) (manufactured by Hitachi High-Technologies Corp.) with the acceleration voltage of 200.0 kV and the magnification of 2200000. In FIG. 56(A) the STEM-HAADF picture thereof is shown; in FIG. 56(B) the STEM mapping result (Ag) thereof is shown; and in FIG. 56(C) the STEM mapping result (Cu) thereof is shown. Results of FIG. 56 were obtained by using the Cs corrector-equipped super high resolution STEM analyzer HD-2700 (equipped with EDX) (manufactured by Hitachi High-Technologies Corp.) with the acceleration voltage of 80.0 kV and the magnification of 2000000.

In the silver-copper alloy particle in FIG. 54, copper is present in center of the particle (core), silver is present around it (shell), and copper is present on surface of the silver-copper alloy particle (average particle diameter of about 20 nm). From FIGS. 54 (B) and (C), it can be seen that there are some places where silver or copper is not present, namely, there are some places where 100% of silver is present or 100% copper is present. The silver-copper alloy particle in FIG. 55 is the silver-copper alloy particle (average particle diameter of about 15 nm) in which silver and copper are eccentrically located in the same particle. Especially from (C), it can be seen that there is a place where copper is not present, that is, there is a place where 100% silver is present.

The silver-copper alloy particle in FIG. 56 is the silver-copper alloy particle (average particle diameter of about 15 nm) comprising silver in half of it, namely, 100% silver being present therein, and copper in the other half, namely, 100% copper being present therein in the same particle.

Figure 57:
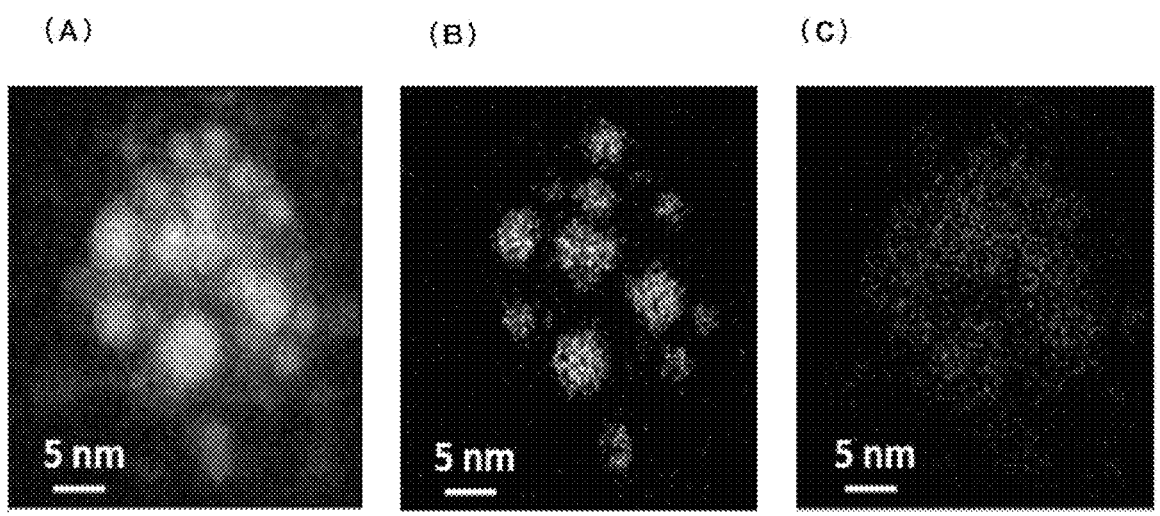

FIG. 57 shows the silver-antimony alloy particle; and in FIG. 57 (A) the STEM-HAADF picture thereof is shown; in (B) the STEM mapping result (Ag) thereof is shown; and in (C) the STEM mapping result (Sb) thereof is shown. These were obtained by using the energy dispersive X-ray analyzer Centurio (manufactured by JEOL Ltd.) and by the atomic resolution analytical electron microscope JEM-ARM 200F (manufactured by JEOL Ltd.) with the acceleration voltage of 200.0 kV and the magnification of 6000000.

In this silver-antimony alloy particle (particle diameter of about 20 nm), silver particles having the size of 2 to 5 nm are present in the same particle, wherein there is the place where silver is not present between the silver particles (EDS: 100% antimony).

PRIOR ART DOCUMENTS

Patent Document

Patent Document 1: Japanese Patent Laid-Open Publication No. 2011-068936
Patent Document 2: Japanese Patent Laid-Open Publication No. 2006-183110
Patent Document 3: Japanese Patent Laid-Open Publication No. 2000-144203
Patent Document 4: Japanese Patent Laid-Open Publication No. 2008-057044
Patent Document 5: International Patent Laid-Open Publication No. 2009/008390
Patent Document 6: Japanese Patent Laid-Open Publication No. 2007-132654
Patent Document 7: Japanese Patent Laid-Open Publication No. 2009-197325
Patent Document 8: Japanese Patent Laid-Open Publication No. 2009-289587
Patent Document 9: Japanese Patent Laid-Open Publication No. 2011-122236
Patent Document 10: Japanese Patent Laid-Open Publication No. 2009-289587
Patent Document 11: Japanese Patent Laid-Open Publication No. 2004-84048
Patent Document 12: Japanese Patent Laid-Open Publication No. 2010-232161

Non-Patent Document

Non-Patent Document 1: S. Hassam, Z. Bahari, and B. Legendre, "Phase diagram of the Ag—Bi—Sb ternary system", Journal of Alloys and Compounds, p. 212, 315 (2001).

DISCLOSURE OF THE INVENTION

Problems to be Solved by the Invention

The present invention has an object to provide a novel alloy, which is a solid metal alloy capable of fully expressing the characteristics expected as an alloy, as well as nanoparticles of the said alloy.

Means for Solving the Problems

The present invention provides a solid metal alloy showing a finely mixed state of at least two metals to constitute the said alloy in the level of nanometers.

The solid metal alloy of the present invention shows the afore-mentioned finely mixed state of the two metals also in a particular solid phase region showing a non-solid solution state in an equilibrium diagram thereof. Meanwhile, in the particular solid phase region showing the non-solid solution state, the said at least two metals are eccentrically located; and although different dependent on the kinds of the afore-mentioned at least two metals, for example, the said region includes a eutectic body of the at least two metals or includes a eutectic body as well as an intermetallic compound of the at least two metals.

The region in which the metals to constitute this alloy are eccentrically located is a region in which the composition ratio of the metals to constitute the alloy in the total alloy is different by more than ±30% from the composition ratio of the metals to constitute the alloy within an extremely small area with the size in the level of nanometers by microanalysis. More specifically, in microanalysis by a TEM-EDS analysis using a beam diameter of 5 nm or in microanalysis by a STEM-EDS analysis using a beam diameter of 0.2 nm, as the result of analysis of mole ratio of the two metals by the TEM-EDS microanalysis using the beam diameter of 5 nm or by the STEM-EDS microanalysis using a beam diameter of 0.2 nm, in 50% or more of analysis points, the two metals are present in the mixed state thereof with the mole ratios of the two metals being detected over ±30% of the mole ratios of the two metals obtained by ICP analysis results of the said alloy. Conventional alloys are in the state in which of the at least two metals to constitute the alloy, one metal is not present in these regions as shown in FIG. 54 to FIG. 57.

On the other hand, the alloy of the present invention shows existence of the state in which the at least two metals to constitute the alloy are present as a finely mixed state thereof in the level of nanometers. In the metal alloy of the present invention, preferably, both the at least two metals are detected in all of the analysis points by the TED-EDS microrange analysis using a beam diameter of 5 nm. In addition, in the metal alloy of the present invention, both the at least two metals are detected in all of the analysis points by the STED-EDS microrange analysis using a beam diameter of 0.2 nm.

In the technology level today, accurate judgment whether the obtained alloy is a solid solution or not cannot be made without using the TED-EDS analysis or the STED-EDS analysis as mentioned above. On top that, it is also important to confirm distribution of the elements by mapping. Inventors of the present invention carried out an extensive investigation as to various conditions including a fluid which contains metal ions to constitute the alloy and a fluid which contains a reducing agent by using the apparatus shown in Patent Document 5 with which only alloy particles similar to those shown in FIG. 54 to FIG. 56 had been obtained; and a result of it, they could succeed to develop the alloy showing the finely mixed state of the at least two metals in the level of nanometers.

More preferably, in the metal alloy of the present invention, both the at least two metals are detected in all of the analysis points as the results of the microrange analysis by the TED-EDS analysis using a beam diameter of 5 nm or as the results of the microrange analysis by the STED-EDS analysis using a beam diameter of 0.2 nm.

As discussed above, the alloy and the nanoparticle thereof in the present invention can fully express the characteristics expected as the alloy because the two metals to constitute the alloy show the finely mixed state thereof in the level of nanometers.

In the alloy of the present invention, for example, in a silver-copper alloy, in a silver-copper-tin alloy, in a silver-nickel alloy, and in a gold-nickel alloy, it is thought that these alloys comprise mainly non-eutectic body structures not containing eutectic body bodies of the afore-mentioned at least two metals. In the silver-antimony alloy, it is thought that the alloy comprises mainly a non-eutectic body structure not containing a eutectic body and an intermetallic compound of the afore-mentioned at least two metals.

In addition, it is thought that the solid metal alloy of the present invention comprises mainly a substitutional solid solution of at least two metals to constitute the metal alloy. As it is well known, a solid solution is classified roughly into an interstitial solid solution and a substitutional solid solution; the alloy that is obtained by the present invention is recognized as the substitutional solid solution. The substitutional solid solution and the interstitial solid solution may be differentiated by observation with TEM and STEM, XRD measurement, thermal analysis, and the like, while observation with TEM and STEM is especially effective. The substitutional solid solution is the solid solution in which metal elements at the lattice point in the space lattice are substituted by other elements. Because of this, in the substitutional solid solution, a lattice fringe can be clearly observed especially by observation of the alloy with TEM or STEM; and because of the effect of strain of the crystal lattice caused by replacement of the metal element with other element at the lattice point, the lattice fringe is observed as the surged fringe. On the other hand, in the interstitial solid solution, other element enters into the space of the crystal lattice, so that the alloy is observed by TEM or STEM in the state different from that of the substitutional solid solution alloy.

The alloy of the present invention is an alloy comprising a combination of at least two metal elements in the periodical table and containing a specific region not forming a solid solution in the alloy equilibrium diagram. Before mentioning specific examples thereof, a typical example not showing the specific region like this is the metal alloy belonging to the all proportional solid solution alloy. Specifically, a Ni—Cu alloy belongs to it, and the equilibrium diagram thereof is shown in FIG. 4(A). The all proportional solid solution alloy like this type forms the solid solution having homogeneous mole ratio (fraction) of the alloy in the entire region; and there is no specific region of the solid phase showing a non-solid solution state.

Examples that contain the specific region are shown in FIG. 4(B) to FIG. 5(D). In these Figures, specific areas of the solid phase in which the at least two metals are eccentrically located are shown by the dots.

Figure 4B:
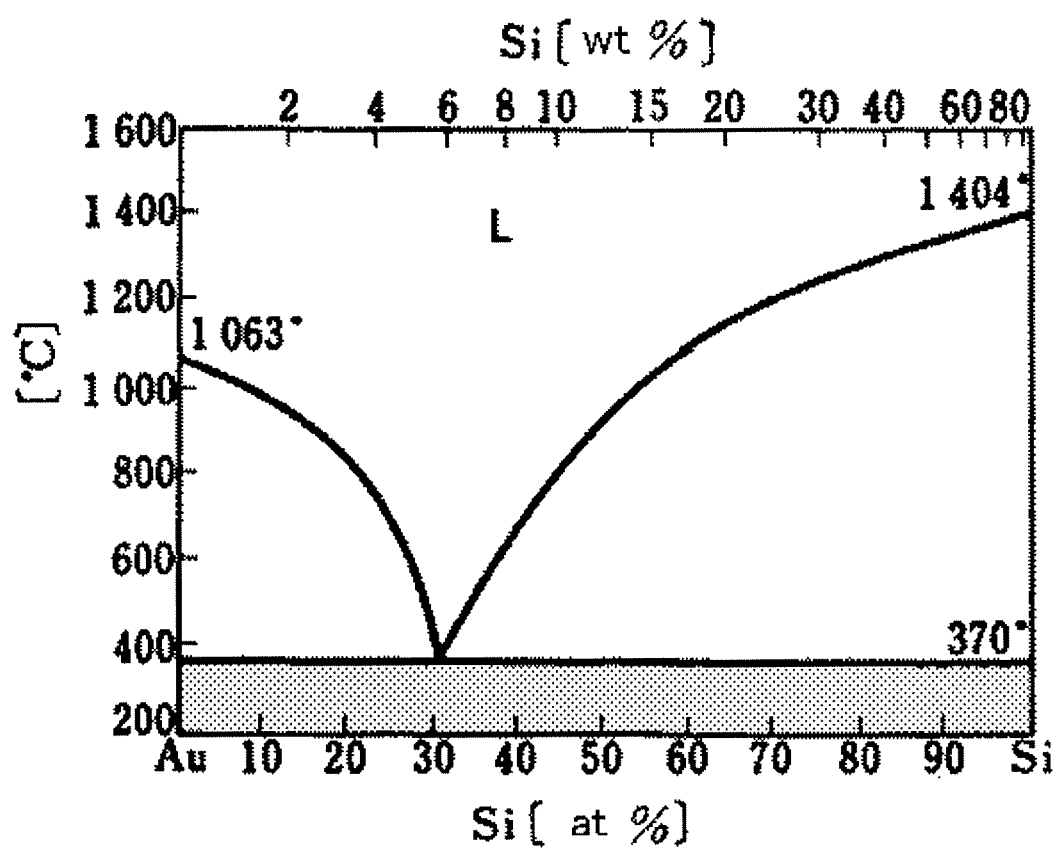

Firstly, FIG. 4(B) is the equilibrium diagram of an Au—Si alloy, called as the eutectic body reaction type. In the alloy showing this type of equilibrium diagram, metals are completely dissolved together in the liquid state; however, they do not make the solid solution together at all in the solid state. Accordingly, with regard to the mole ratio (fraction) of the alloy, the solid region of all the mole ratios belongs to the specific region because the solid solution is not formed in the entire region.

Figure 4:
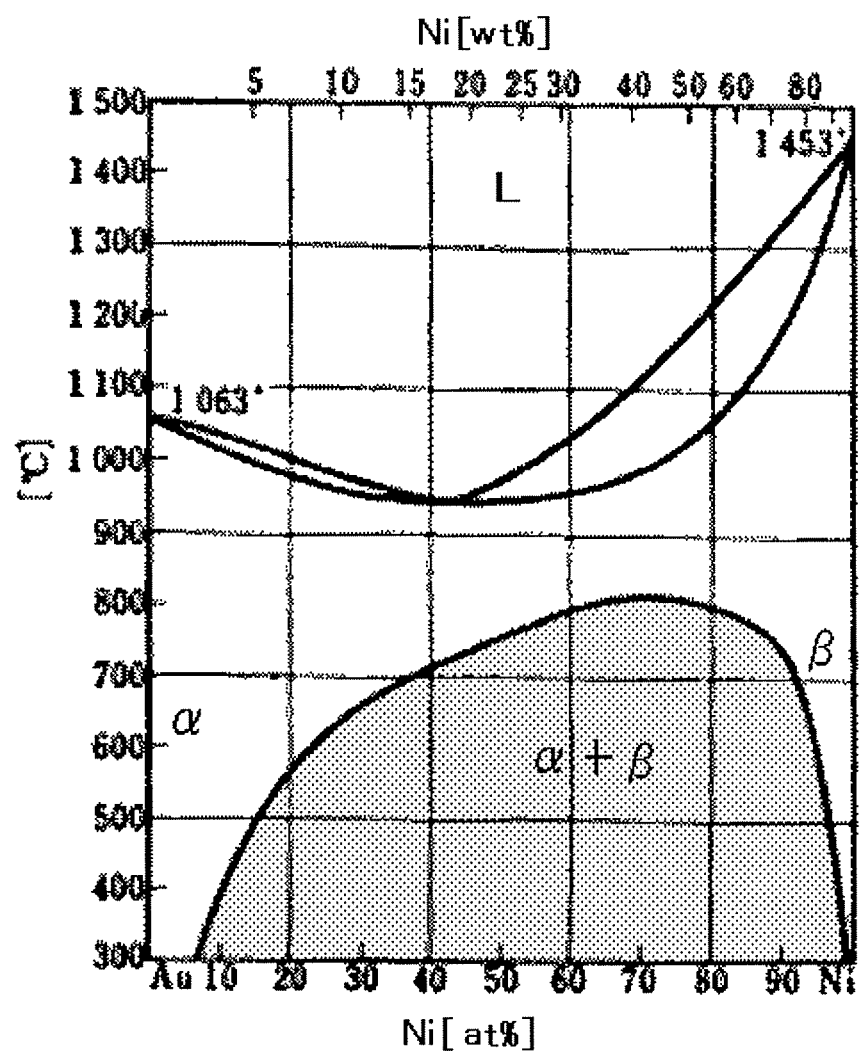
Figure 4:
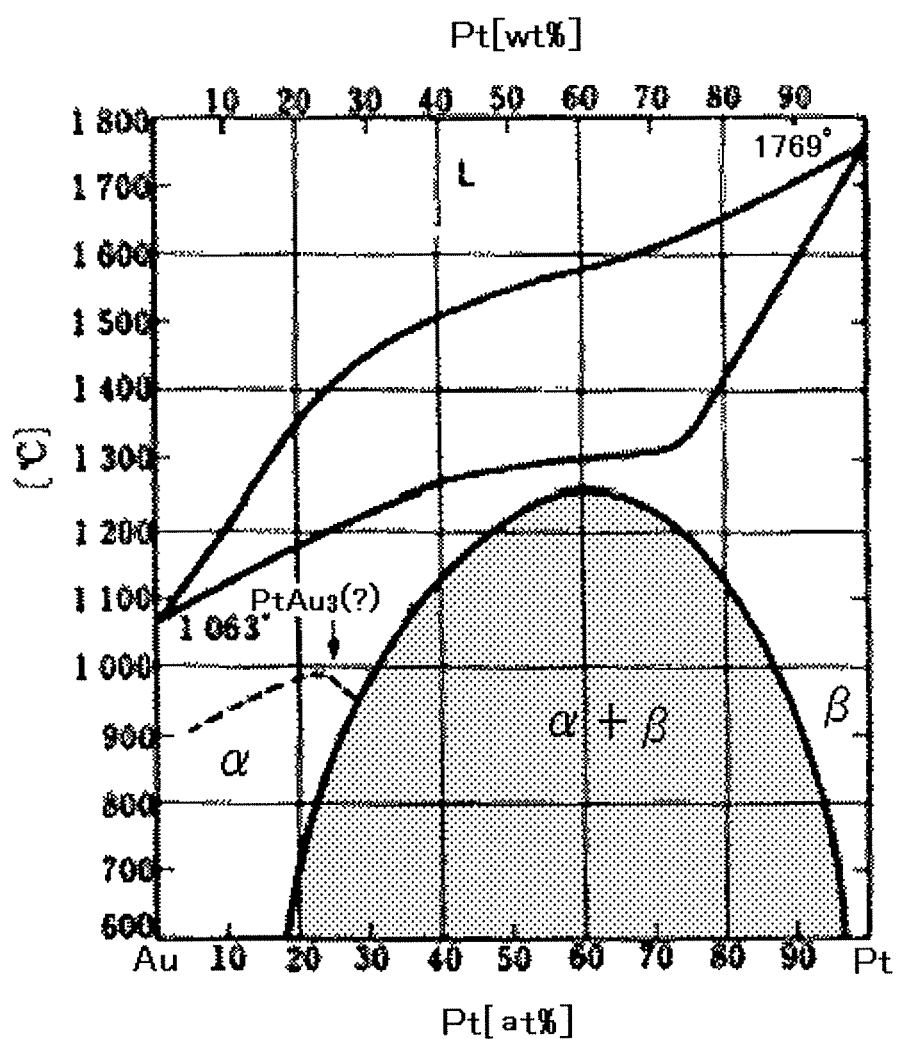
Figure 4:
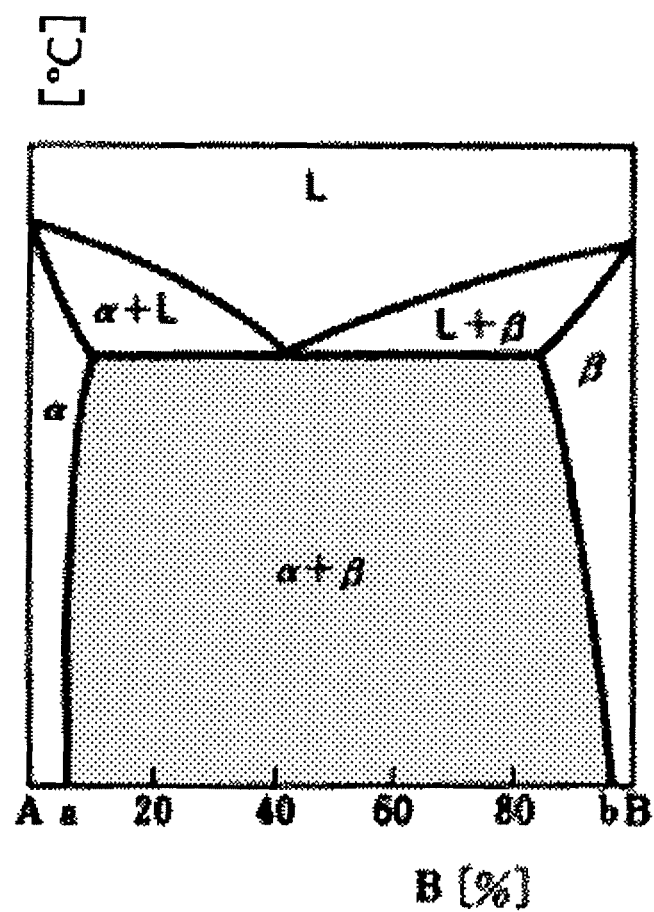
Figure 4:
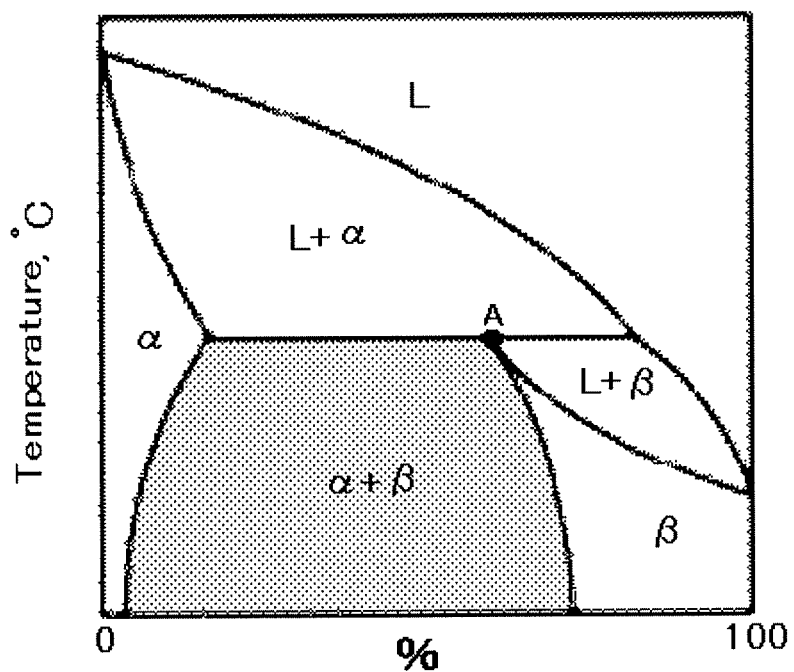

FIG. 4(C1) is the equilibrium diagram of an Au—Ni alloy, FIG. 4(C2) is the equilibrium diagram of an Au—Pt alloy, and FIG. 4(C3) is the representative diagram of this type, called as the eutectic body reaction type. FIG. 4(C4) is the representative diagram of the type called as the peritectic reaction type. In the alloy showing the alloy equilibrium diagram belonging to this type, metals are completely dissolved together in the liquid state; however, they make the solid solution partly in the solid state. Accordingly, the region shown as ($\alpha+\beta$) in the mole ratio (fraction) of the alloy is in the state in which it is separated into two phases of the $\alpha$ phase and the $\beta$ phase, so that this region is in the state in which the $\alpha$ phase and the $\beta$ phase are eccentrically located in a very fine level.

Figure 4D:
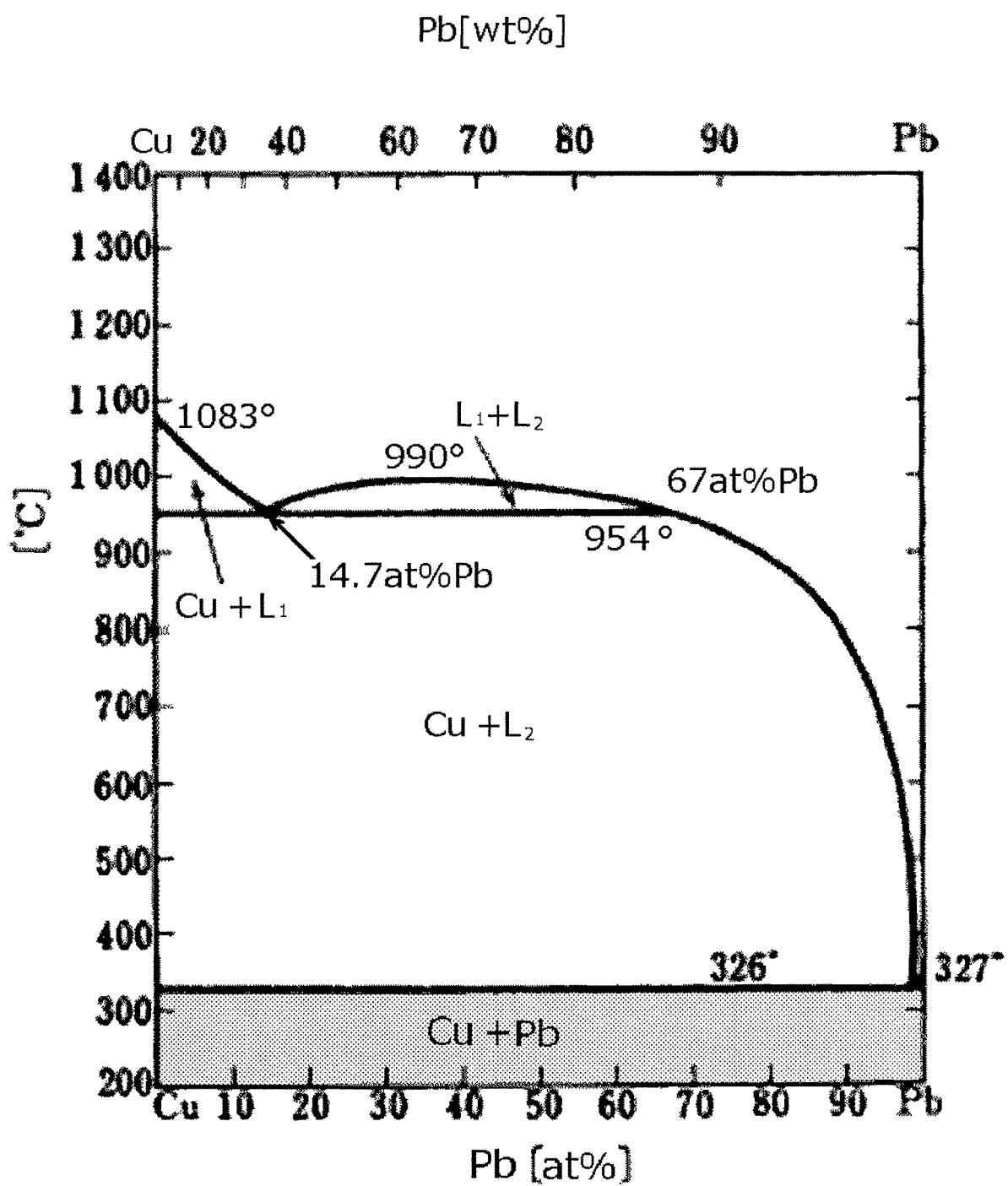
Figure 4:
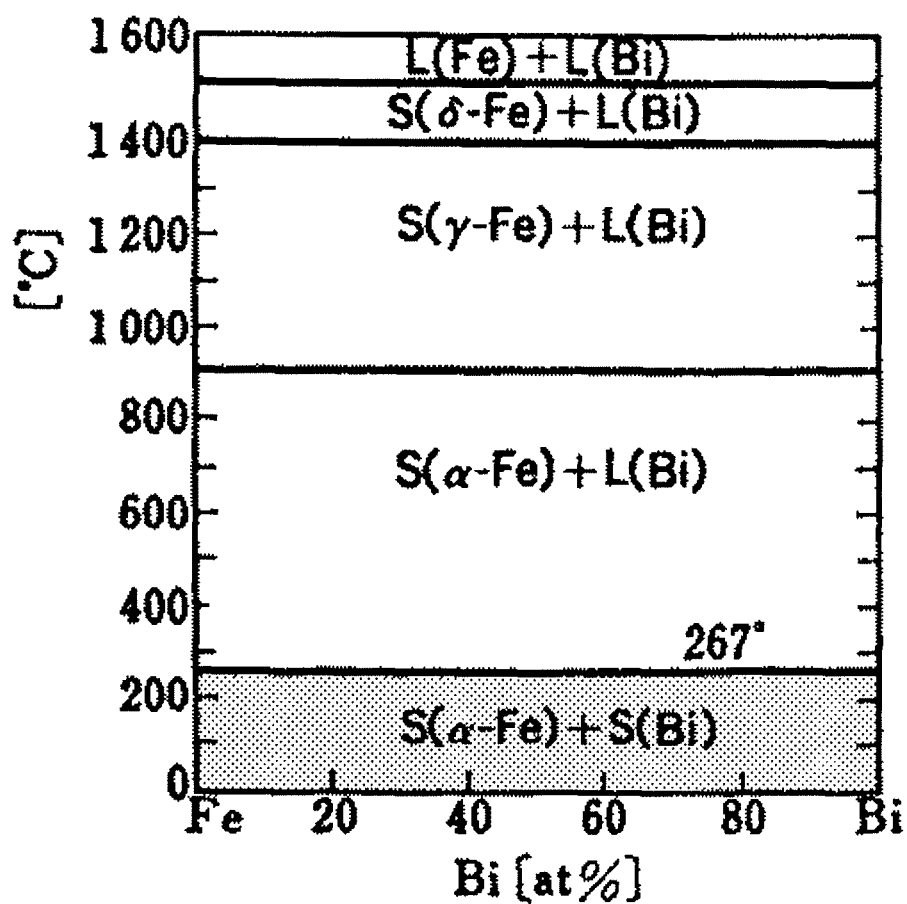
Figure 4:
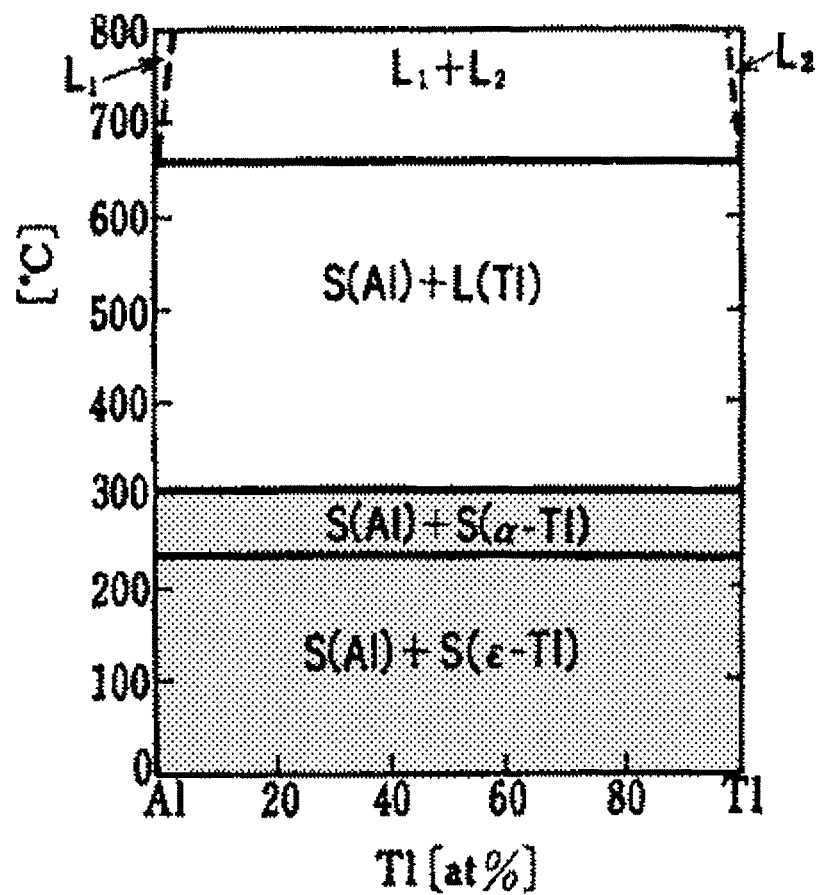

FIG. 4(D) is the equilibrium diagram of a Cu—Pb alloy, called as the monotectic reaction type. In the alloy showing the equilibrium alloy diagram belonging to this type, metals are partly dissolved together in the liquid state; however, in the solid state, they do not make the solid solution together at all or do make the solid solution partly together. Therefore, the region in which two metals contained in the alloy are both in the solid state is the specific region, similarly to the afore-mentioned FIGS. 4(B), (C1), (C2), and (C3).

FIG. 4(E1) is the equilibrium diagram of a Fe—Bi alloy, and FIG. 4(E2) is the equilibrium diagram of an Al—Tl alloy. In the alloys showing the alloy equilibrium diagram of this type, metals are not dissolved at all together in the liquid state, or are dissolved slightly together; however, they are not dissolved at all together as the solid solution in the solid state. Therefore, the region in which two metals contained in the alloy are both in the solid state is the specific region, similarly to the afore-mentioned FIGS. 4(B), (C1), (C2), and (C3).

Figure 4F:
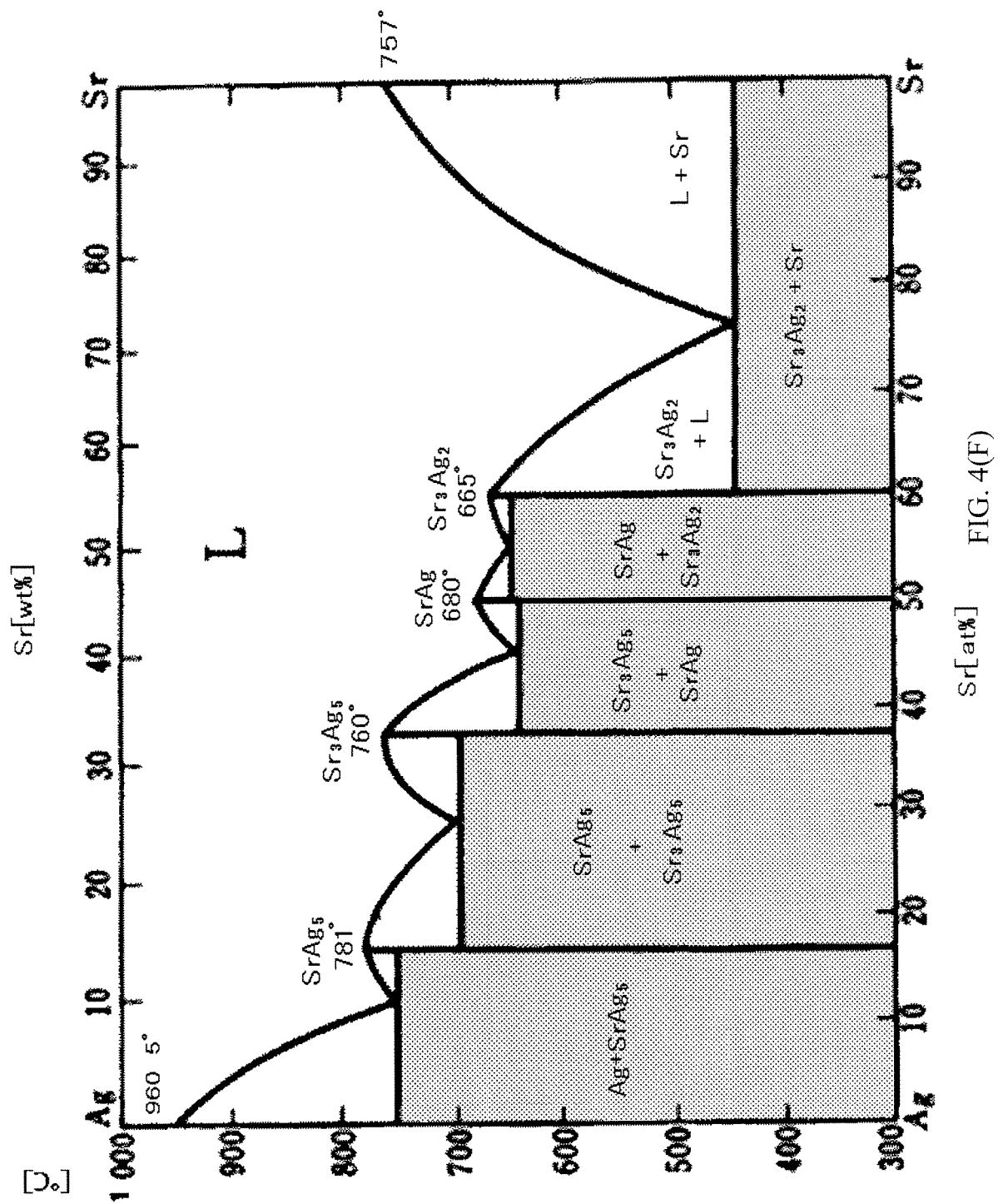
Figure 5:
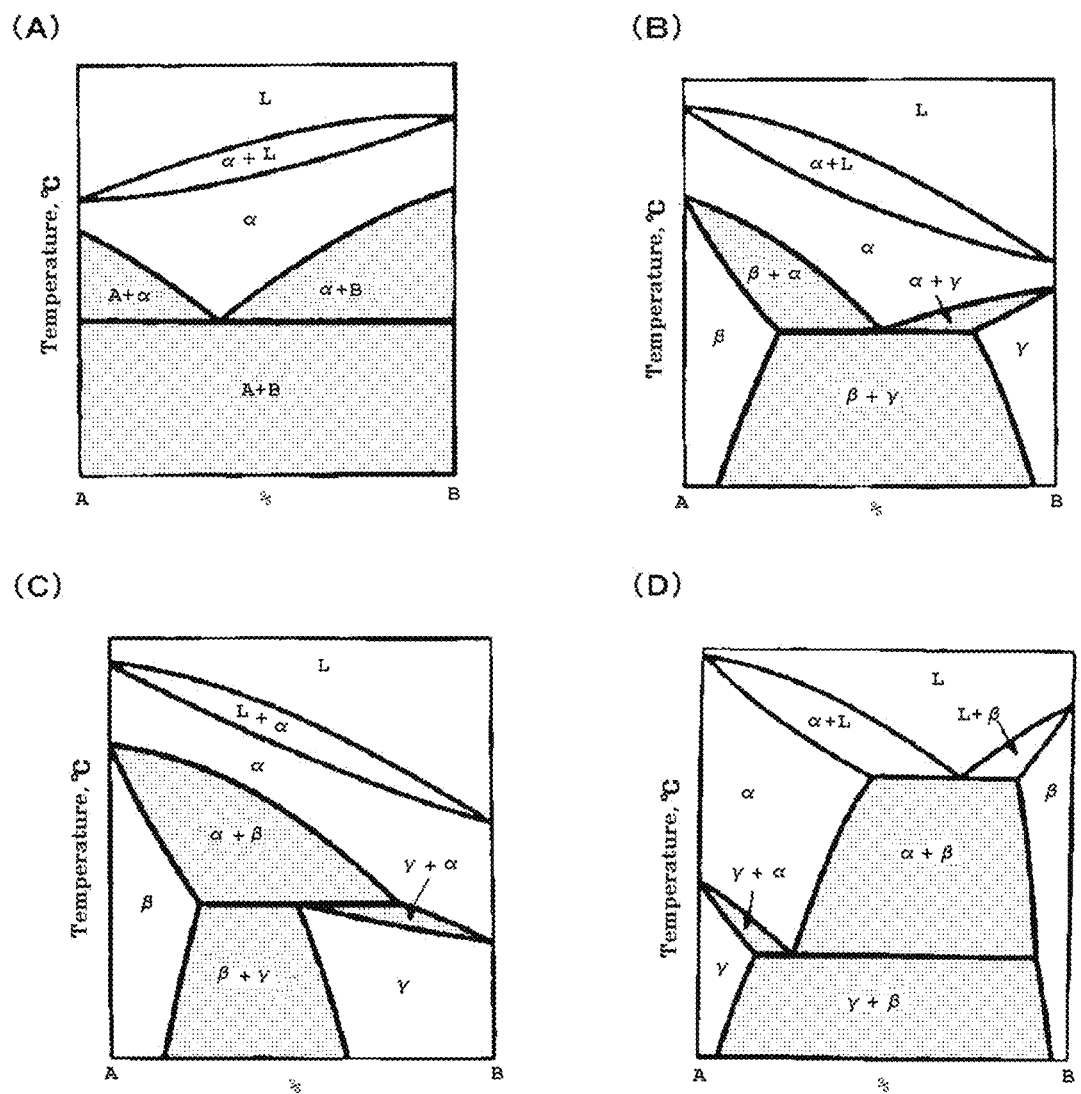
Figure 6A:
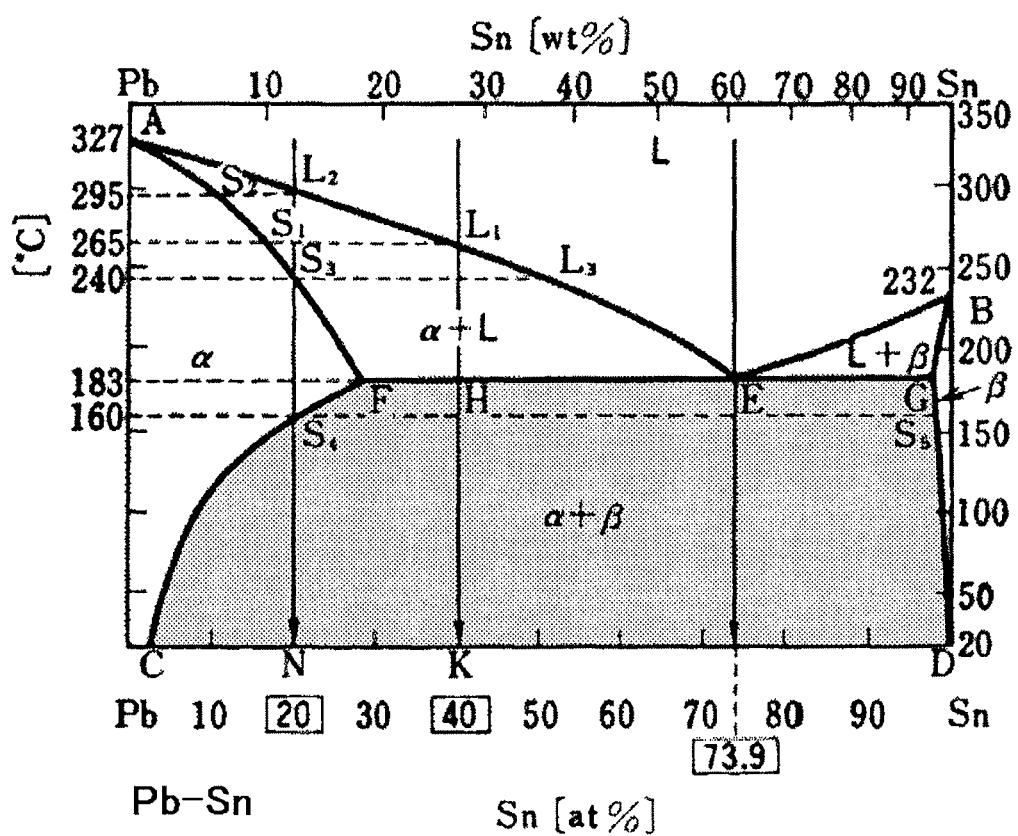
Figure 6B:
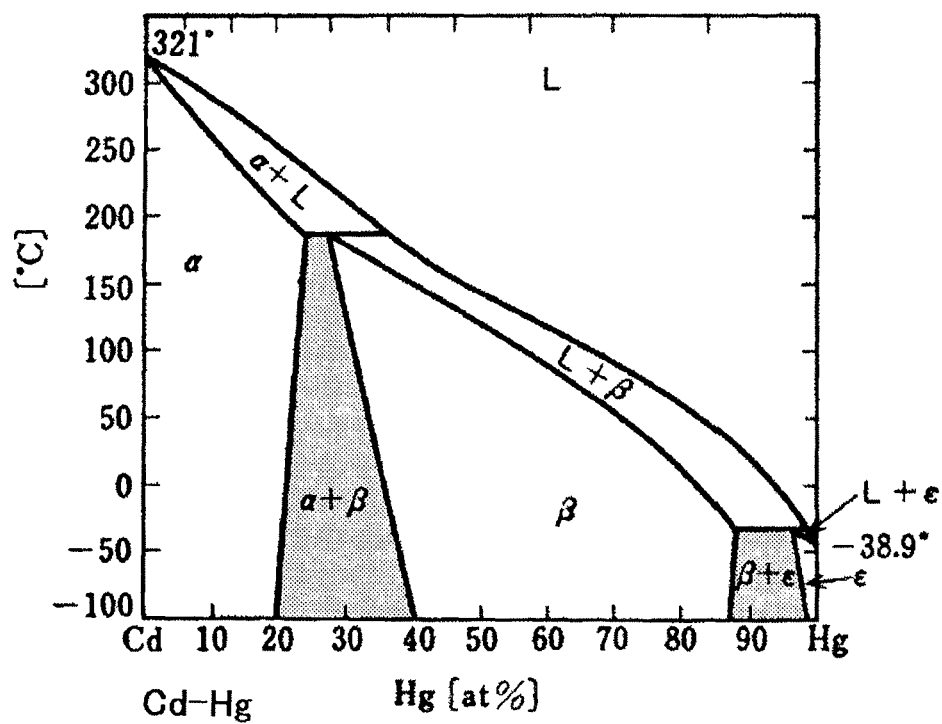
Figure 6C:
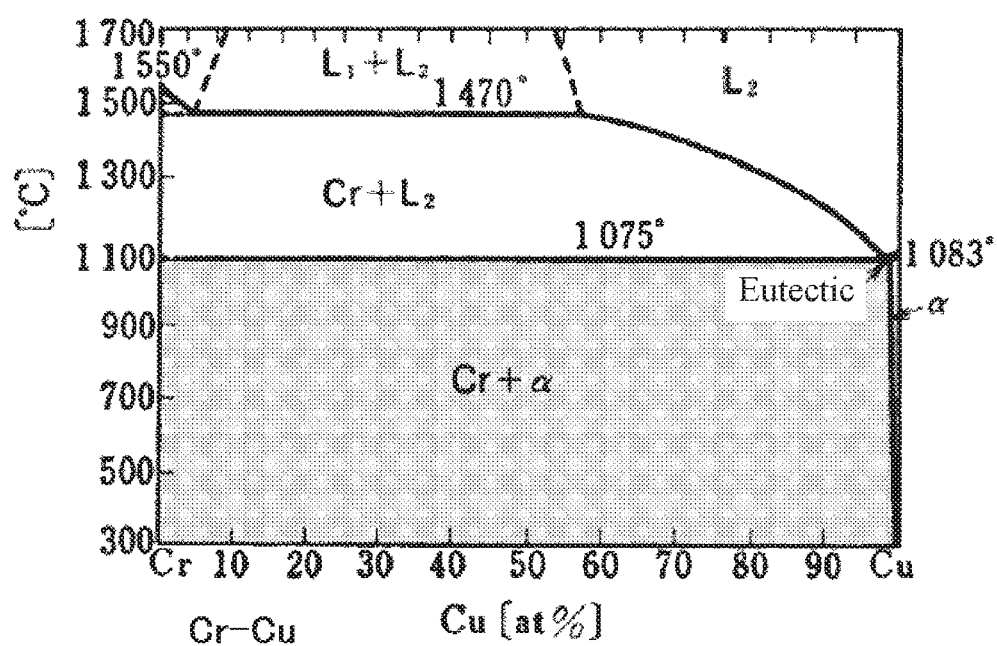
Figure 6D:
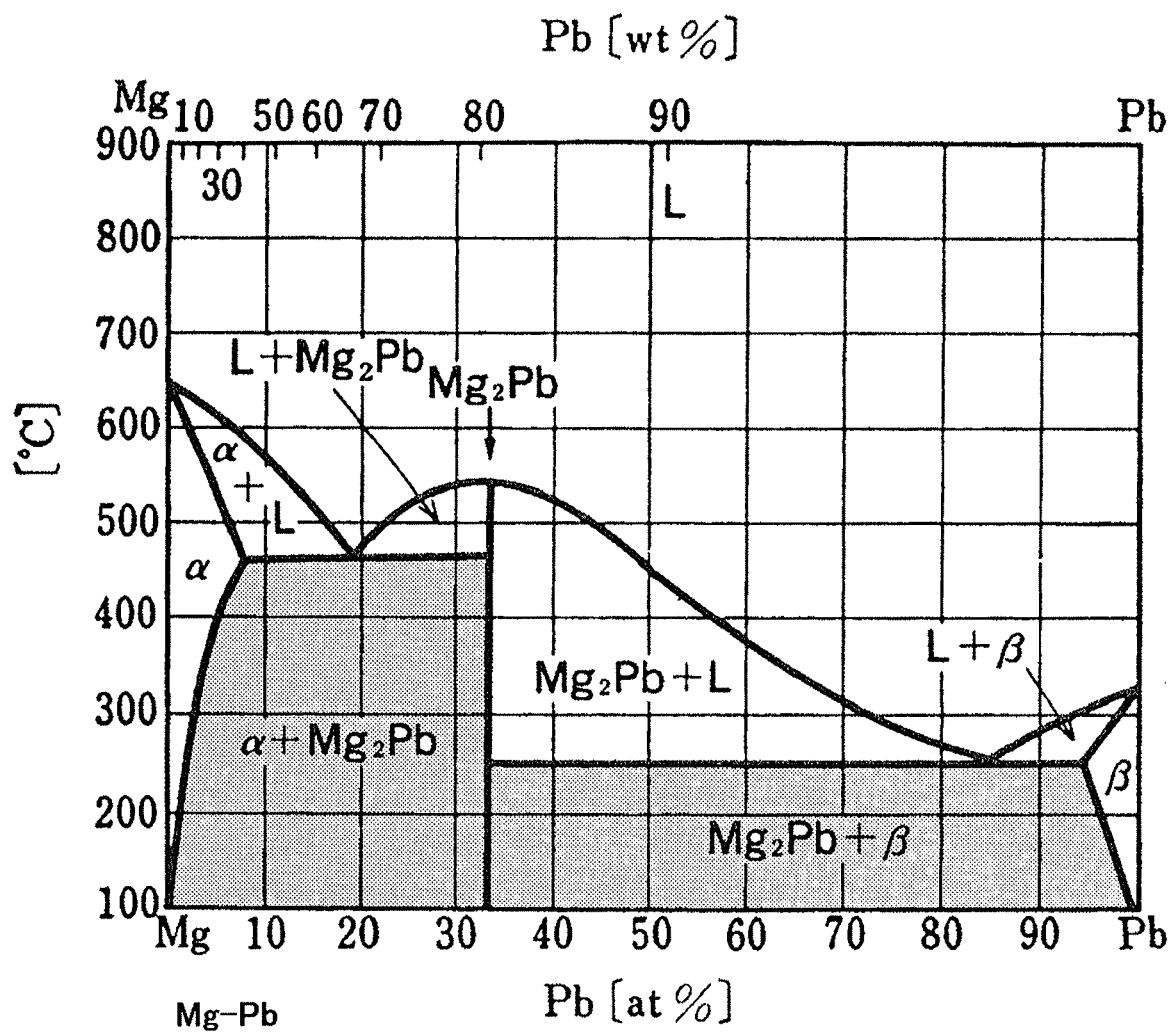
Figure 6E:
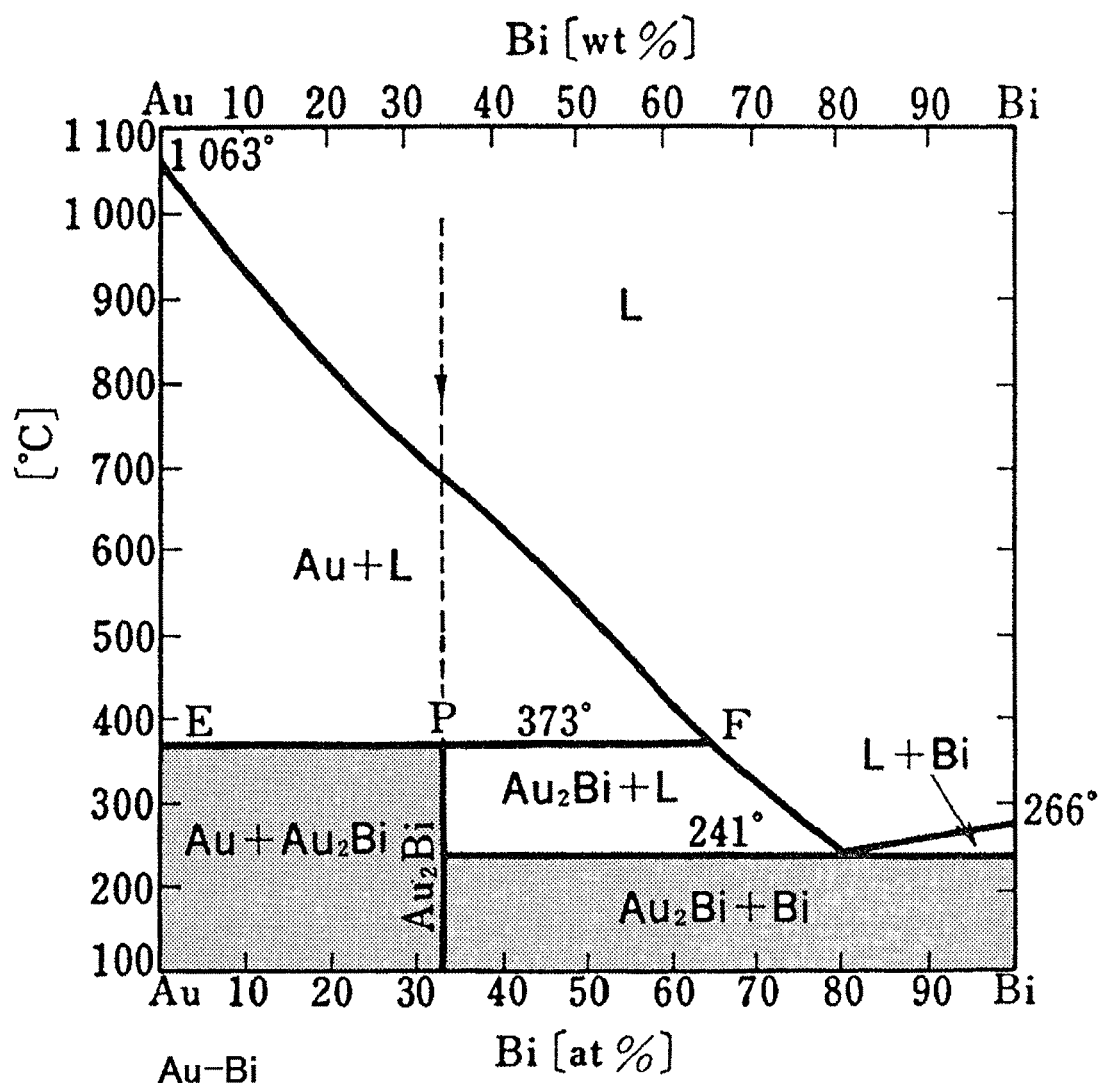
Figure 6F:
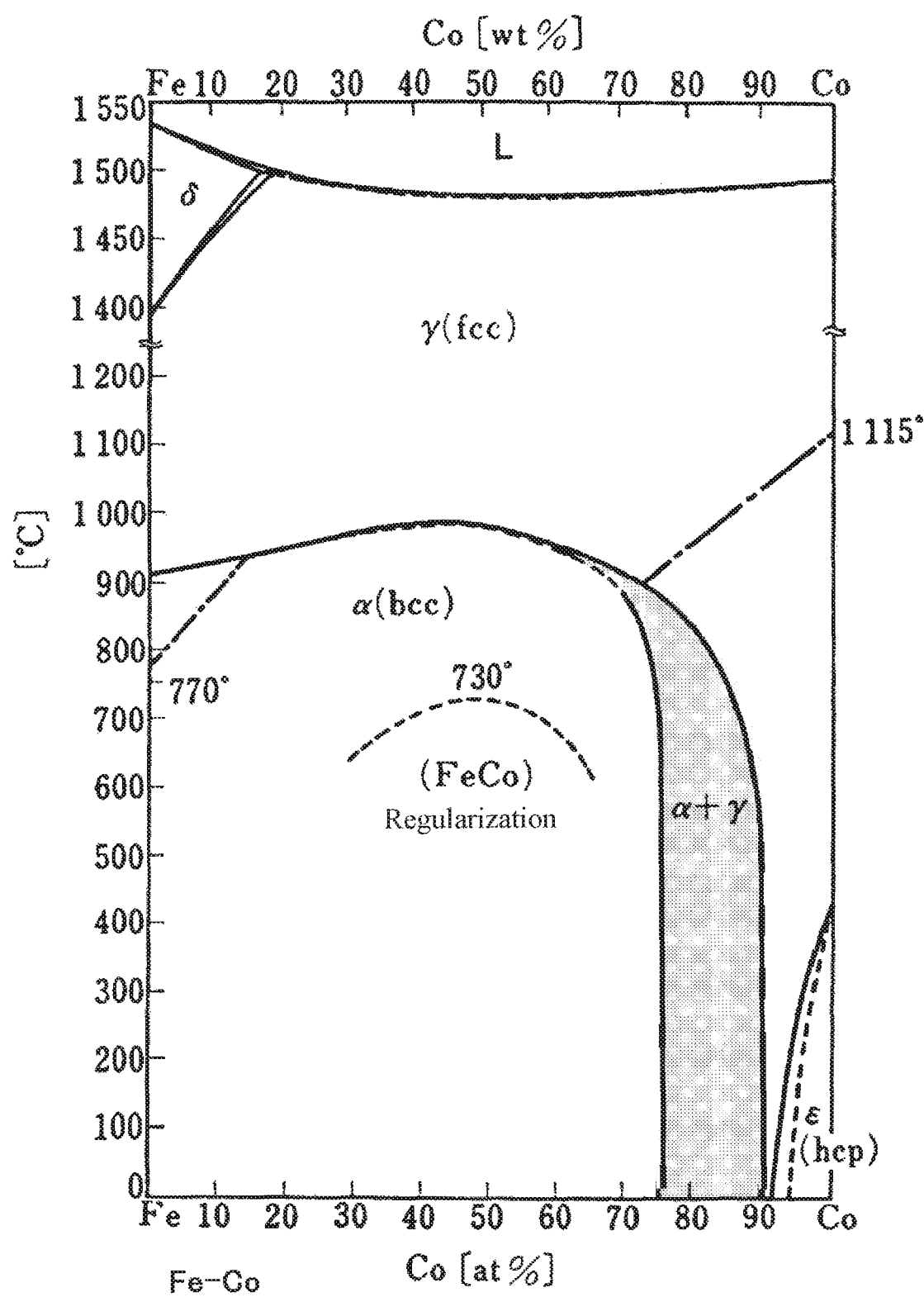
Figure 6G:
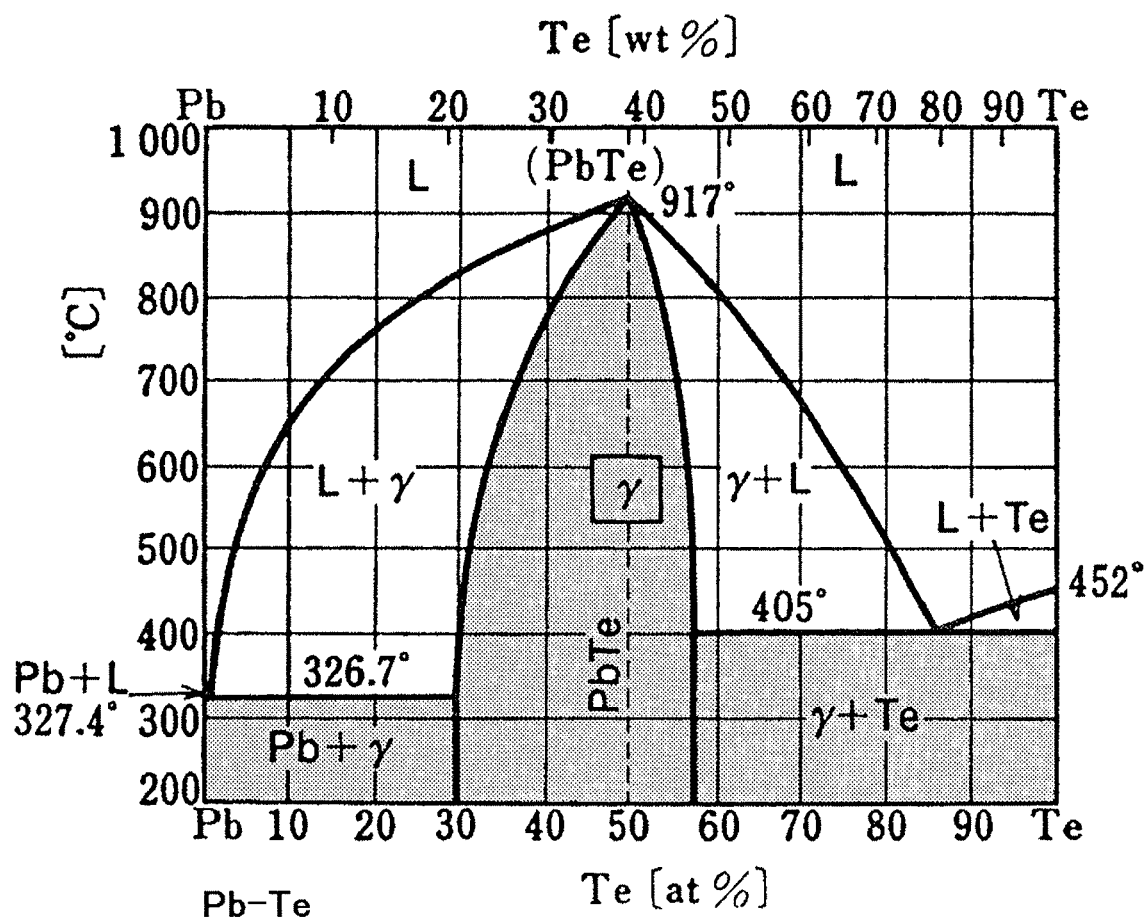
Figure 6H:
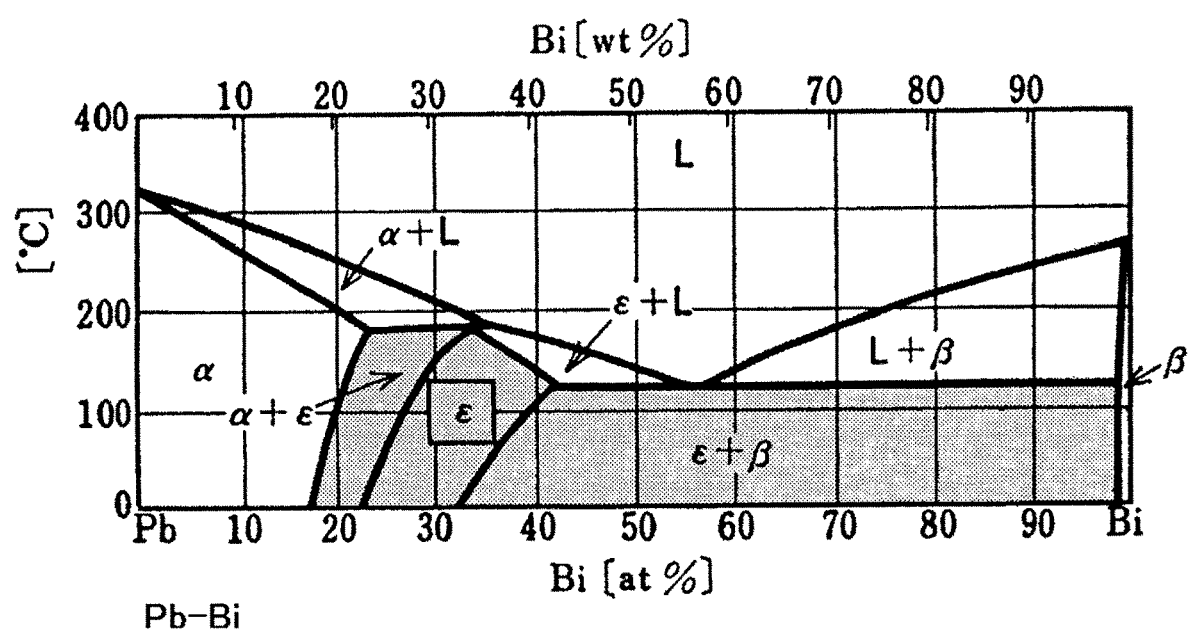
Figure 6I:
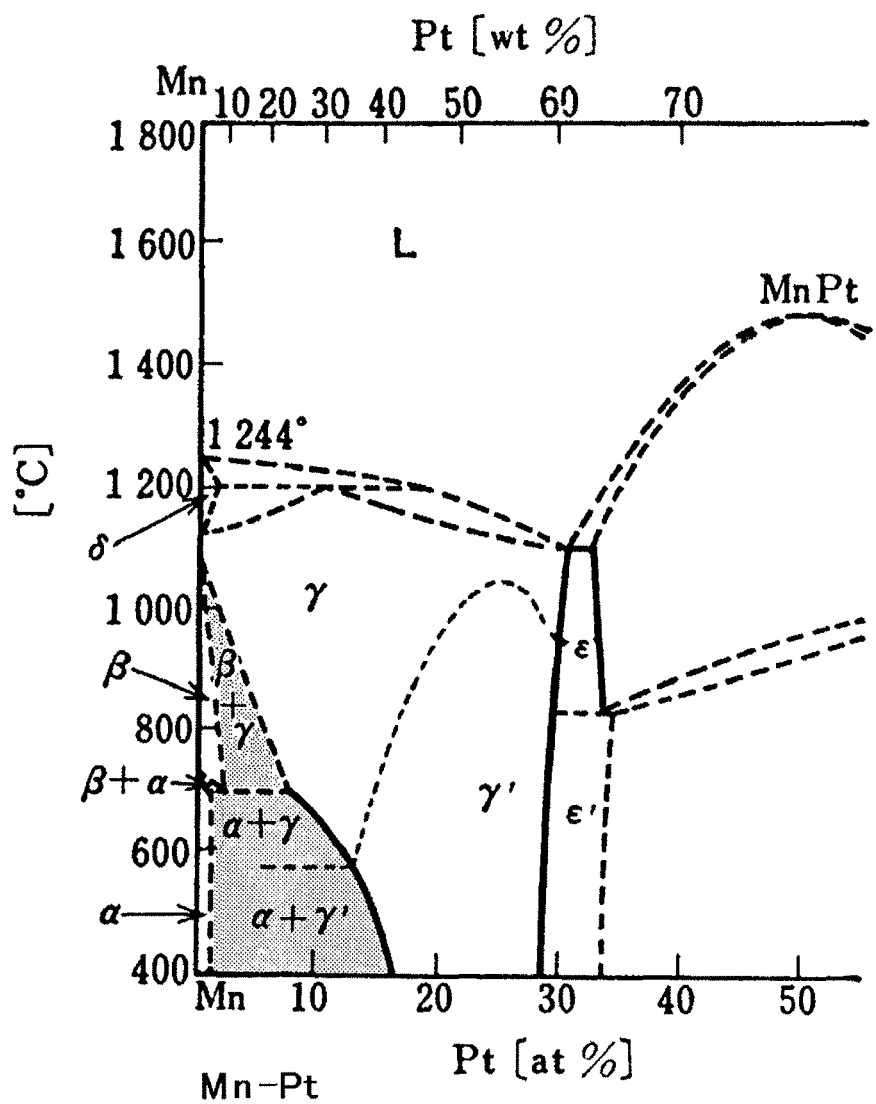
Figure 6J:
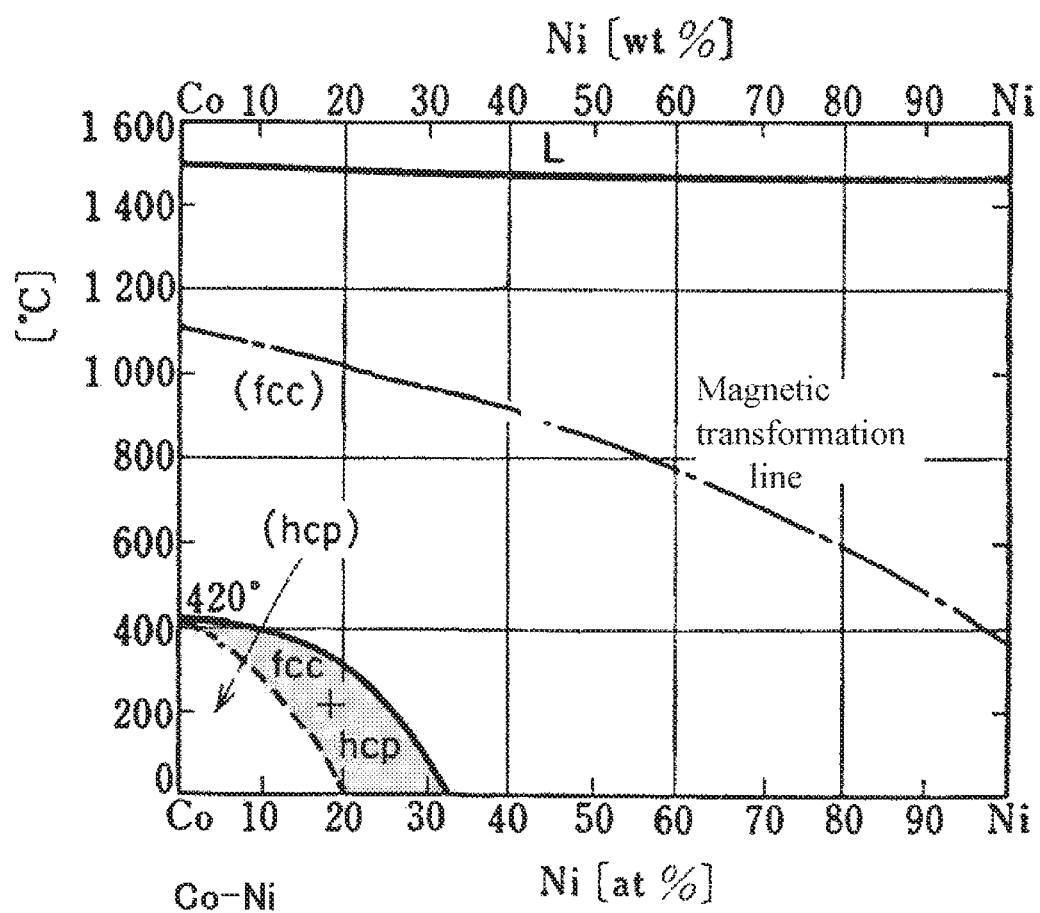

FIG. 4(F) is the equilibrium diagram of an Ag—Sr alloy; in this case, the alloy showing the alloy equilibrium diagram of this type forms an intermetallic compound or an intermediate phase. The region in which this intermetallic compound or this intermediate phase is formed is the specific region.

Besides the above-mentioned, there is an alloy that undergoes allotropic transformation in which the crystal structure of the constituent metals of the alloy changes in accordance with temperature and pressure. In this case, the solid alloy undergoes lattice transformation as a result that the constituent metals have the allotropic transformation. Similarly to the above, in the equilibrium diagram of this case, too, the solid region with the mole ratio in which the solid solution is not formed is the specific region.

As the examples thereof, typical diagrams are shown by FIG. 5(A) to FIG. 5(D). These are typical diagrams in which metals are dissolved completely together as the solid solution in the higher temperature side of the lattice transformation point, but in the lower temperature side thereof, they are dissolved partly together or are not dissolved at all together as the solid solution. Those shown by FIG. 5(A) and FIG. 5(B) undergo the same change as the eutectic body reaction in the solid state and are called as the eutectoid type. The one shown by FIG. 5(C) undergoes the same change as the peritectic reaction in the solid state and are called as theperitectoid type. FIG. 5(D) represents one example in which only one constituent metal in the alloy has the allotropic transformation point; and this represents the typical case in which the solid-solution limit lowers discontinuously because of the presence of the allotropic transformation point. In the equilibrium diagrams of FIG. 5(A) to FIG. 5(D), the regions shown by (A+α), (α+B), (A+B), (β+α), (α+γ), (β+γ), (α+β), (β+γ), and (γ+α), are in the state of at least two separated phases, not mixing together in the very fine level; and thus, the solid regions with these mole ratios are the specific regions.

There is no restriction as to the method for producing the metal alloys of the present invention. For example, they may be produced by a method in which at least two metal ions mentioned above and a reducing agent are mixed in a thin film fluid formed between at least two processing surfaces which are disposed in a position they are faced with each other so as to be able to approach to and separate from each other, at least one of which rotates relative to the other, whereby separating the said alloy. Specifically, they may be produced by using the apparatus shown in Patent Document 5.

By using this production apparatus, inventors of the present invention separated these alloys by mixing a fluid which contains at least two metal ions mentioned above with a fluid which contains a reducing agent, wherein the reducing agent is not limited, though it may be exemplified by hydrazine monohydrate and sodium borohydride. Moreover, in addition to these reducing agents, preferably a dispersant showing a reducing property such as polyvinyl pyrrolidone and octylamine may be used.

In this apparatus, inventors of the present invention assume that because the reducing reaction of at least two metals could be controlled in the atomic level, a homogenous mixing state of the alloy of at least two metals could be realized in the atomic level by controlling various conditions including kinds of the processing fluids, pH thereof, mole ratio of the metal ions, rotation number of the processing surfaces, and so forth.

During this time, it is thought preferable that the separation time be controlled such that the at least two metals to constitute the alloy may be separated substantially at the same time whereby not separating the at least two metals as the respective single bodies. Accordingly, although the fluid which contains a reducing agent may contain one reducing agent or at least two reducing agents (or substances showing a reducing property), if at least two reducing agents are contained therein, simultaneous separation of the at least two metals to constitute the alloy may substantially become easier by controlling the separation time of the at least two metals to constitute the alloy, and thereby the alloy showing a finely mixed state thereof in the level of nanometers may be separated. As a matter of course, as shown in the later-mentioned Examples, even if only one reducing agent is contained therein, the alloy showing the finely mixed state of the two metals to constitute the alloy in the level of nanometers may be obtained.

The metal alloy may be produced as the alloy comprising the solid particles having the particle diameter of 500 nm or less, preferably the particle diameter of 100 nm or less, or more preferably the particle diameter of 50 nm or less. In spite of the fine particles as mentioned above, the metal alloy particle of the present invention shows the finely mixed state of the at least two metals to constitute the alloy in the level of nanometers; and thus, every particle can express the characteristics that are expected as the alloy thereof.

Advantages

As discussed above, the present invention could provide a novel solid metal alloy capable of fully expressing the characteristics that are expected as the alloy thereof and a nanoparticle of the said alloy as well.

Specifically, in the silver-copper alloy, eminent expression of characteristics to suppress the oxidation susceptibility possessed by copper, to suppress migration of silver, and the like may be expected. Especially, provided is the solid solution silver-copper alloy, wherein expression of characteristics to suppress the oxidation susceptibility possessed by copper, to suppress migration of silver, and the like may be expected. Furthermore, the present invention can provide a solid alloy comprising three metals, i.e., silver, copper, and other metal than silver and copper, wherein the said alloy does not substantially contain a eutectic body, whereby expression of characteristics to suppress the oxidation susceptibility possessed by copper, to suppress migration of silver, and the like may be expected.

In the silver-nickel alloy of the present invention, silver and nickel in the silver-nickel alloy are substantially mixed together; and thus, high corrosion resistance to arc discharge may be expressed, and in addition, characteristics expected as the silver-nickel alloy, such as heat resistance, abrasion resistance, fusion resistance, catalysis performance, durability as an ignition plug, and so forth may be fully expressed.

In the solid gold-nickel alloy of the present invention, gold and nickel in the gold-nickel alloy are substantially mixed together; and thus, performance as a high-reliable electric contact material may be expressed, and in addition, characteristics expected as the gold-nickel alloy, such as heat resistance, abrasion resistance, catalysis performance, and so forth may be fully expressed.

Furthermore, the present invention could provide the silver-antimony alloy mainly comprising a non-eutectic body structure substantially not containing a eutectic body and an intermetallic compound; especially the solid solution silver-antimony alloy in which silver and antimony are substantially mixed together could be provided, whereby it may be expected to express characteristics expected as the silver-antimony alloy, including abrasion resistance and performances as a recording medium, a low-temperature soldering material, a superconductive material, and an electrode material.

FIG. 1:

This shows a rough sectional view of the fluid processing apparatus according to the embodiment of the present invention.

FIG. 2:

This shows (A) a rough plane view of the first processing surface of the fluid processing apparatus shown in FIG. 1, and (B) an enlarged drawing of the essential part of the processing surface of the said apparatus.

FIG. 3:

This shows (A) a cross section view of the second introduction part of the said apparatus, and (B) an enlarged drawing of the essential part of the processing surface to explain the said second introduction part.

FIG. 4

All of these show alloy equilibrium diagrams, respectively: (A) shows the equilibrium diagram of a Ni—Cu alloy, (B) shows the equilibrium diagram of an Au—Si alloy, (C1) shows the equilibrium diagram of an Au—Ni alloy, and (C2) shows the equilibrium diagram of an Au—Pt alloy, wherein (C3) shows the representative diagram of the eutectic body alloy and (C4) shows the representative diagram of the peritectic alloy; and further, (D) shows the equilibrium diagram of a Cu—Pb alloy, (E1) shows the equilibrium diagram of a Fe—Bi alloy, (E2) shows the equilibrium diagram of an Al—Tl alloy, and (F) shows the equilibrium diagram of an Ag—Sr alloy.

FIG. 5

All of these show alloy equilibrium diagrams, respectively: (A) and (B) show the representative equilibrium diagrams of the eutectoid type alloys, (C) shows the representative equilibrium diagram of the peritectoid type alloys, and (D) shows one example of the equilibrium diagrams in which only one component in the alloy has the allotropic transformation point.

FIGS. 6(A)-6(J)

All of these show alloy equilibrium diagrams.

FIG. 7:

This shows (A) the STEM-HAADF picture, (B) the EDS mapping result (Ag), and (C) the EDS mapping result (Cu) of the silver-copper alloy particles prepared in Example A2.

FIG. 8:

This shows (A) the STEM-HAADF picture, (B) the EDS mapping result (Ag), and (C) the EDS mapping result (Cu) of the silver-copper alloy particles prepared in Example A4.

FIG. 9:

This shows (A) the STEM-HAADF picture, (B) the EDS mapping result (Ag), and (C) the EDS mapping result (Cu) of the silver-copper alloy particles prepared in Example A8.

FIG. 10:

This shows an equilibrium diagram of Ag—Cu alloy.

FIG. 11:

This shows the HRTEM picture of the silver-copper alloy particle prepared in Example A8 and the STEM-EDS analysis points (4 points) in the silver-copper alloy particle of the said HRTEM picture.

Figure 11:
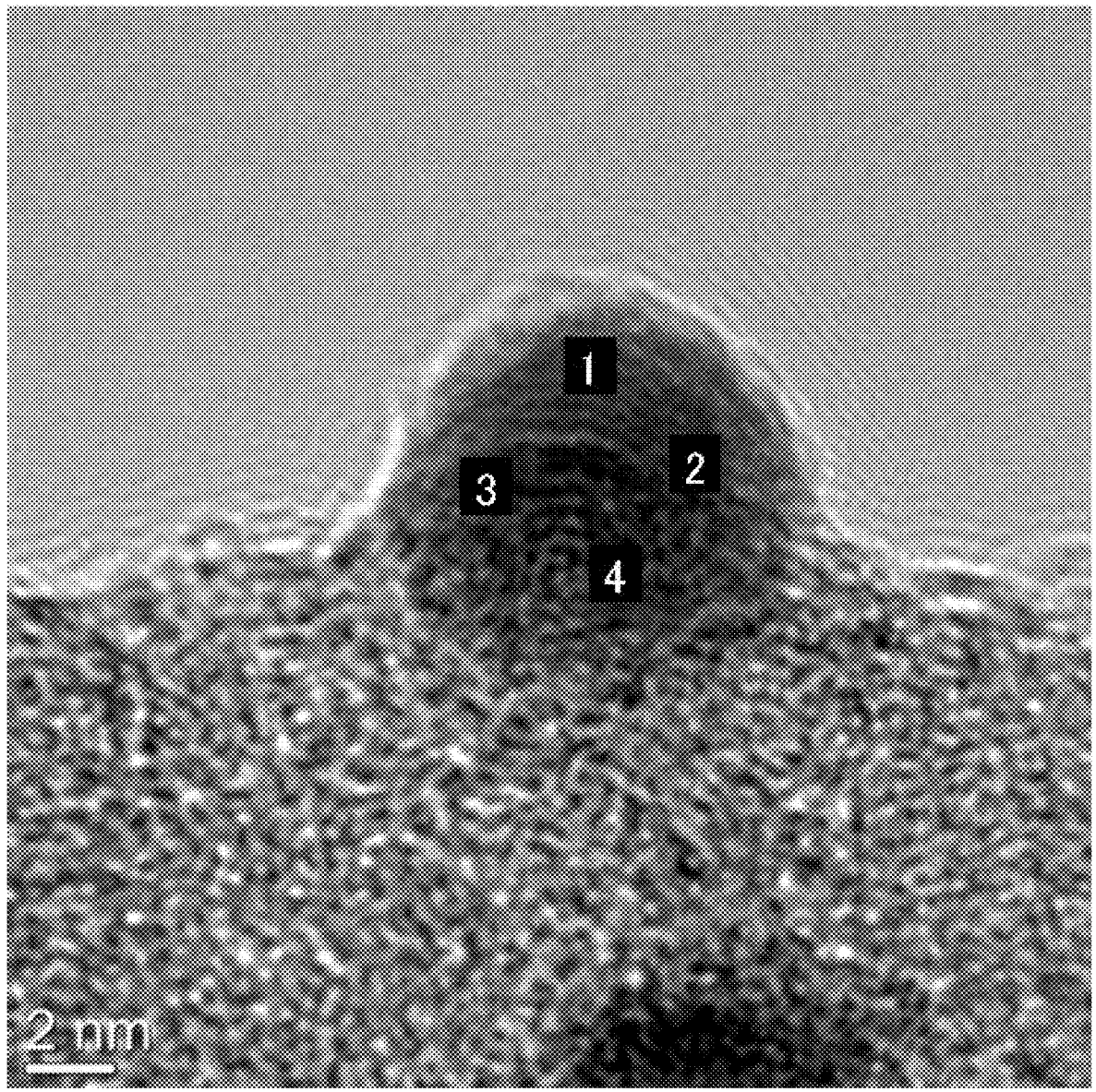

FIG. 12:

This shows the STEM-EDS analysis results and the ICP analysis results measured at each of the STEM-EDS analysis points shown in FIG. 11 of the silver-copper alloy particle prepared in Example A8.

FIG. 13:

This shows the TEM picture of the silver-copper alloy particle prepared in Example A10.

FIG. 14:

This shows the TEM picture of the silver-copper alloy particle prepared in Example A6.

FIG. 15:

This shows the HRTEM picture of the silver-copper alloy particle prepared in Example A10 and the TEM-EDS analysis points (5 points) in the silver-copper alloy particle of the said HRTEM picture.

Figure 15:
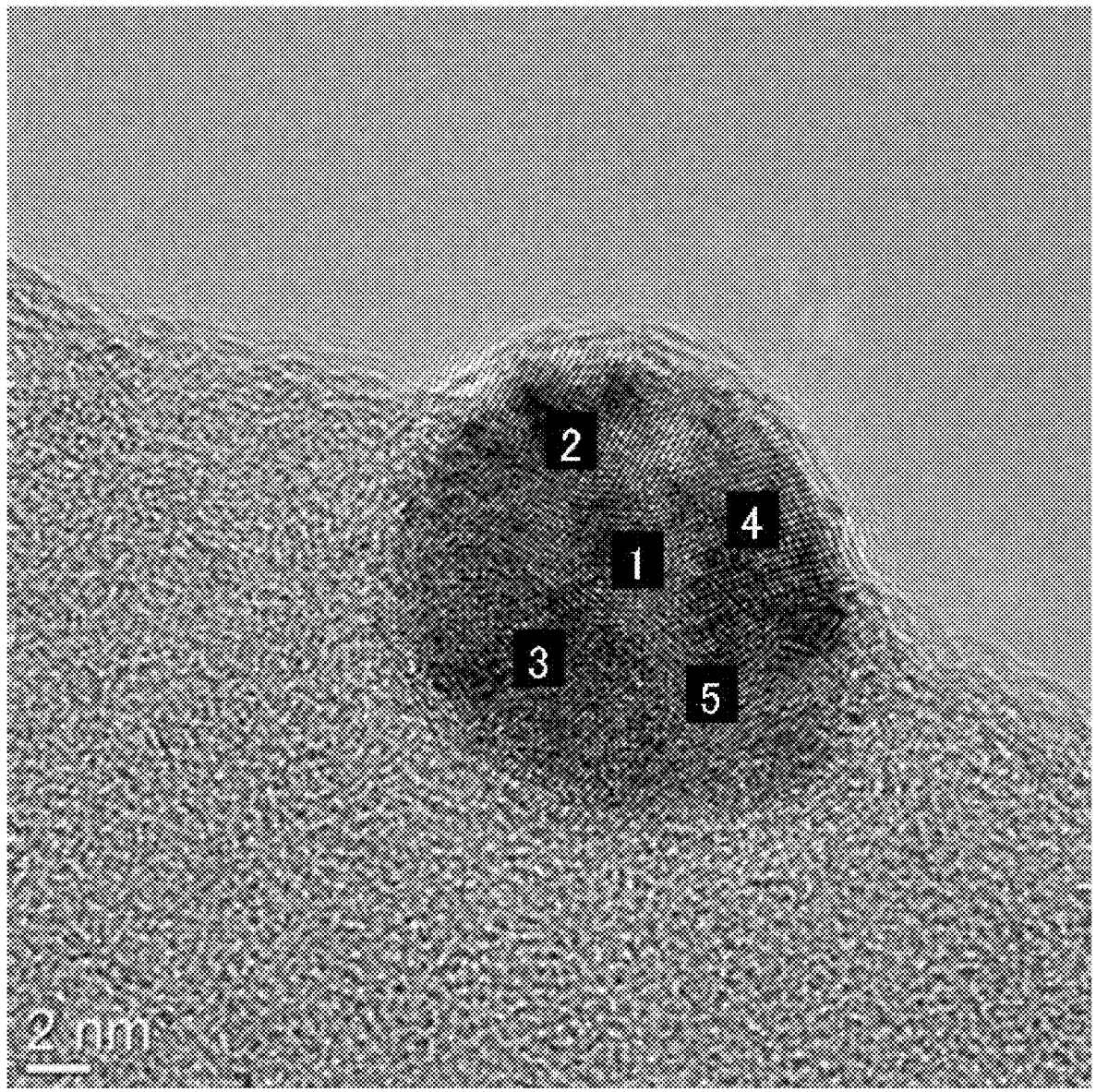

FIG. 16:

This shows the TEM-EDS analysis results and the ICP analysis results measured at each of the TEM-EDS analysis points, shown in FIG. 15, of the silver-copper alloy particle prepared in Example A10.

FIG. 17:

This shows the XRD measurement results by using the dried powders of the silver-copper alloy particles prepared in Examples A2, A4, and A10, and the XRD measurement results by using the heat-treated powders obtained by heat-treating the said dried powders of the silver-copper alloy particles, wherein the heat-treatment was done at 300° C. for 30 minutes.

FIG. 18:

This shows the TEM picture of the silver-copper alloy particle prepared in Example A7.

FIG. 19:

This shows the TEM picture of the silver-copper alloy particle prepared in Example A3.

FIG. 20:

This shows the low magnification TEM picture of the silver-copper alloy particle prepared in Example A4.

FIG. 21:

This shows the lattice parameters of the silver-copper alloy particles prepared in Examples A2, A4, and A10, the lattice parameters of the AgCu solid solution obtained from the Vegard law, and change of the lattice parameters relative to the Cu ratios of the AgCu solid solutions obtained by rapid cooling to cause coagulation.

FIG. 22:

This shows the TEM picture of the silver-copper alloy particle after heat-treatment of the dried powders of the silver-copper alloy particles prepared in Example A10, wherein the heat-treatment was done at 300° C. for 30 minutes.

FIG. 23:

This shows the TG-DTA measurement results of the silver-copper alloy particles prepared in Example A2, wherein the measurement was done under the nitrogen atmosphere.

FIG. 24

This shows the DSC measurement results by using the dried powders of the silver-copper alloy particles prepared in Examples A2, A4, and A10, and by using the silver-copper alloy particles after heat-treatment of the dried powders of the silver-copper alloy particles prepared in Example 10, wherein the heat-treatment was done at 300° C. for 30 minutes.

Figure 25:
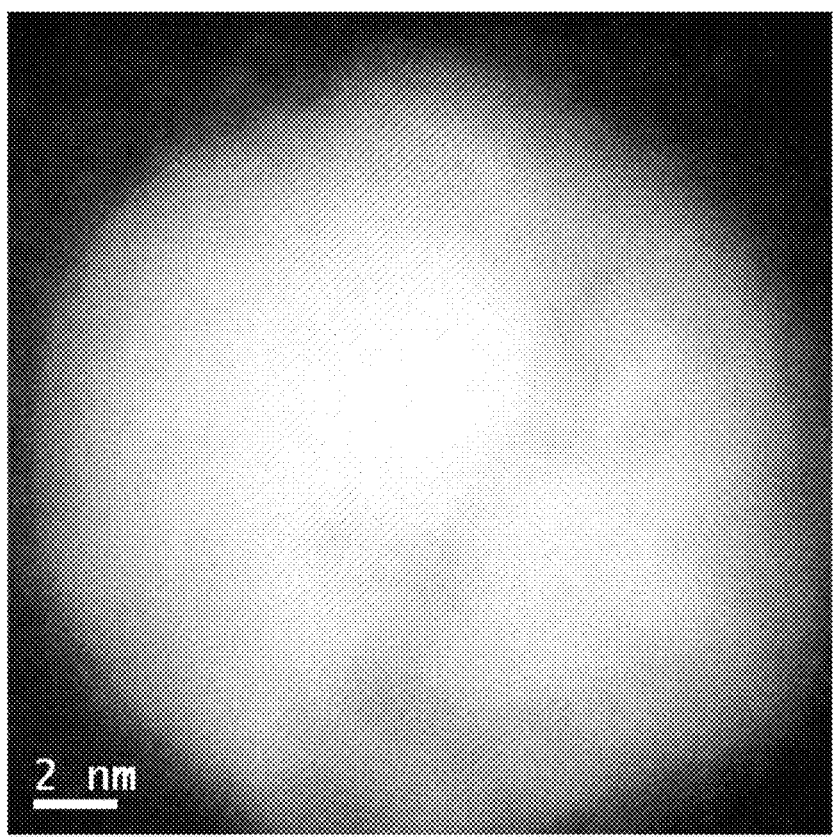
Figure 25:
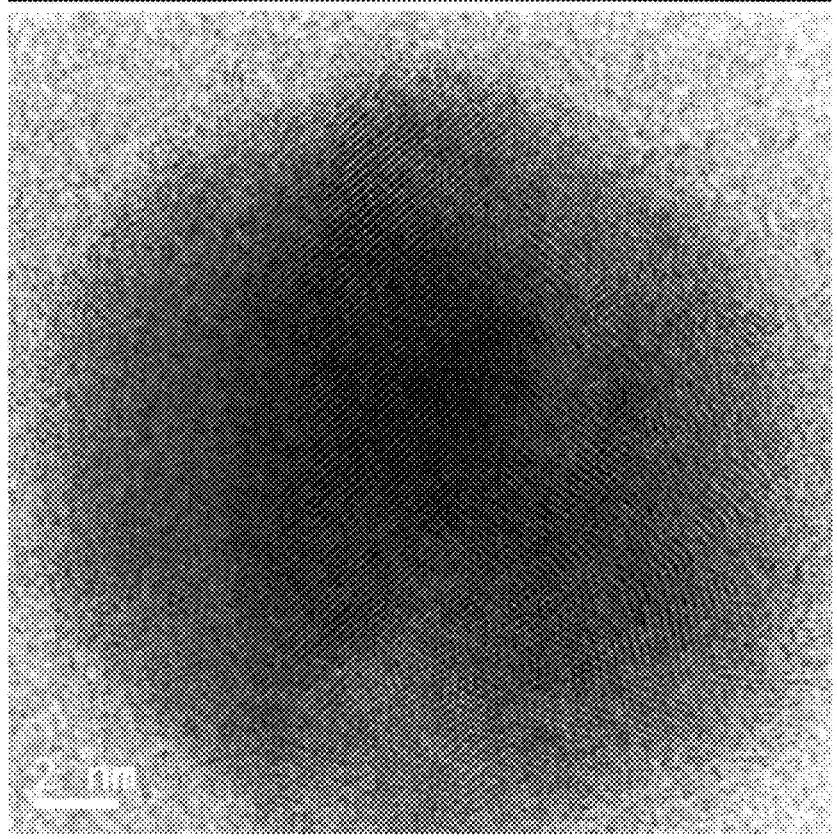

FIG. 25:
This shows (A) the STEM-HAADF picture and (B) the STEM-BF (bright view) picture of the silver-copper alloy-particle prepared in Example A13 (magnification of 10 million in both (A) and (B)).

Figure 26:
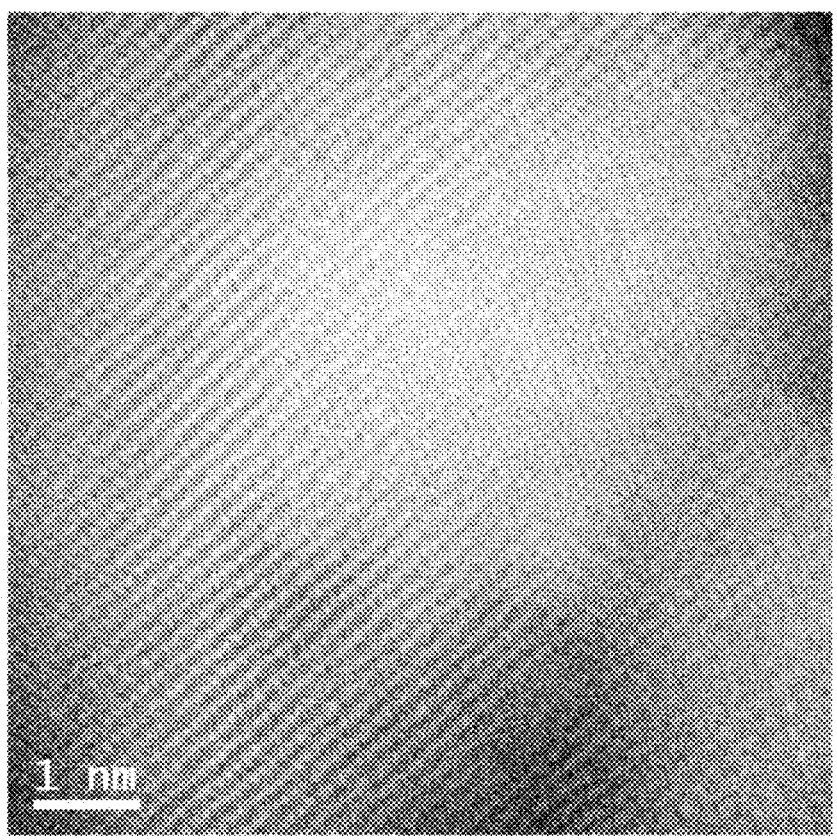
Figure 26:
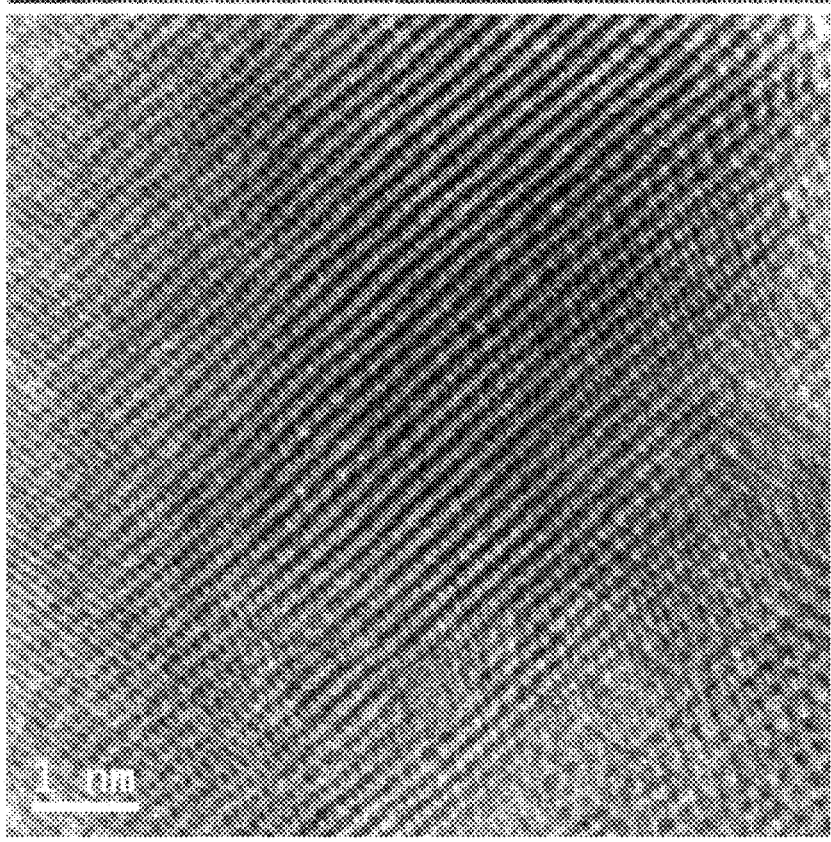

FIG. 26:
This shows (A) the STEM-HAADF picture and (B) the STEM-BF (bright view) picture of the silver-copper alloy particle prepared in Example A13 (magnification of 20 million in both (A) and (B)).

Figure 27:
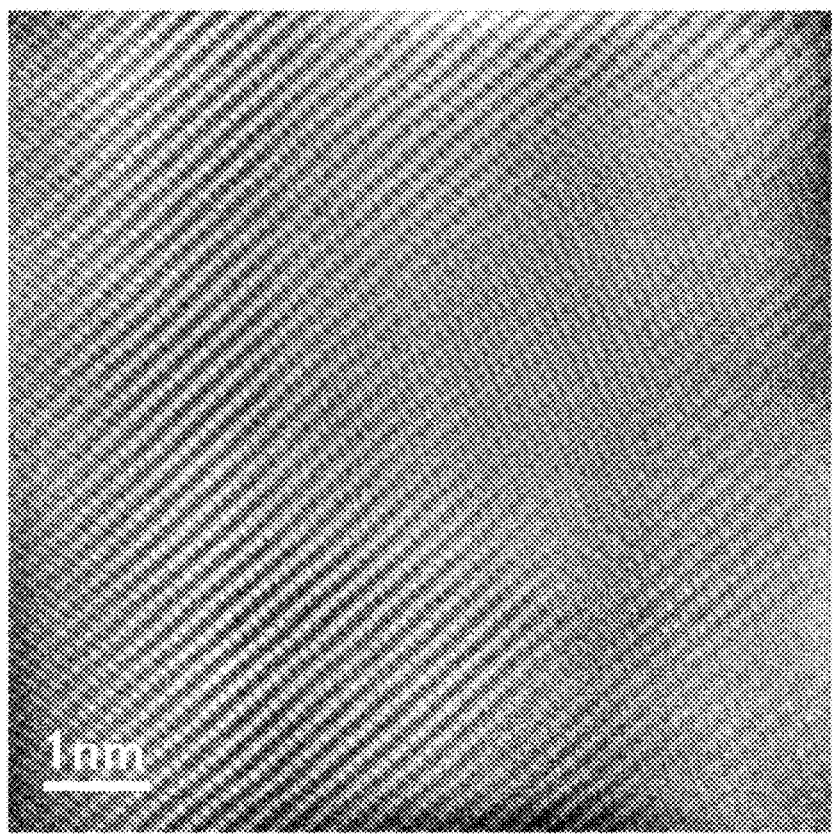
Figure 27:
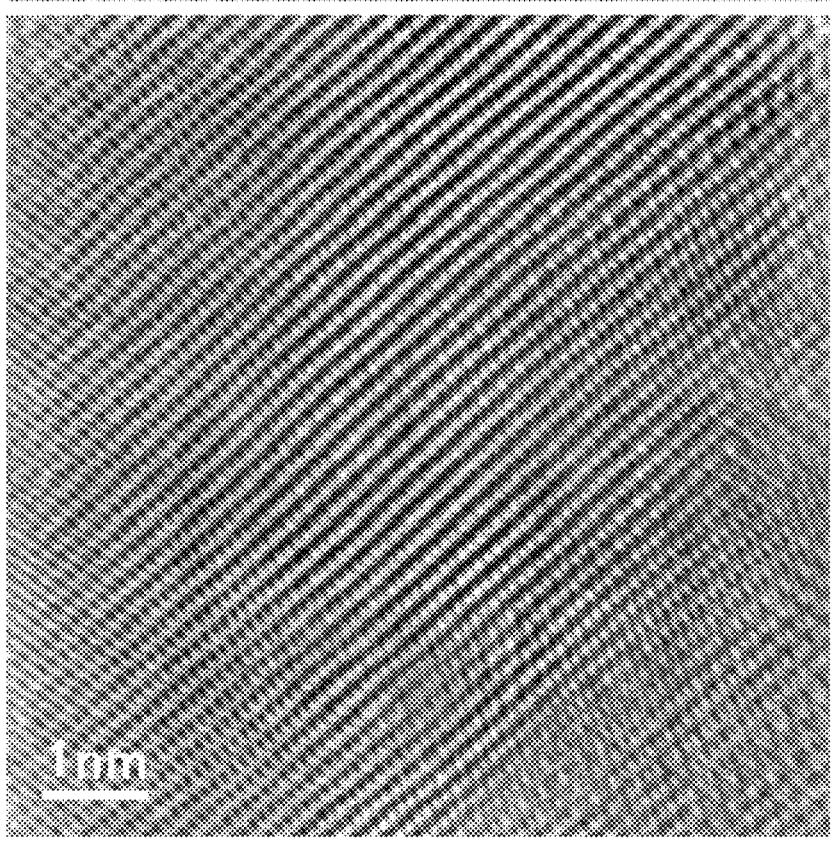

FIG. 27:
This shows (A) the STEM-HAADF picture and (B) the STEM-BF (bright view) picture of the silver-copper alloy particle prepared in Example 13 (magnification of 20 million in both (A) and (B)), wherein these pictures were treated by the radial difference filter in the same viewing fields of the respective pictures of FIGS. 26 (A) and (B).

Figure 28:
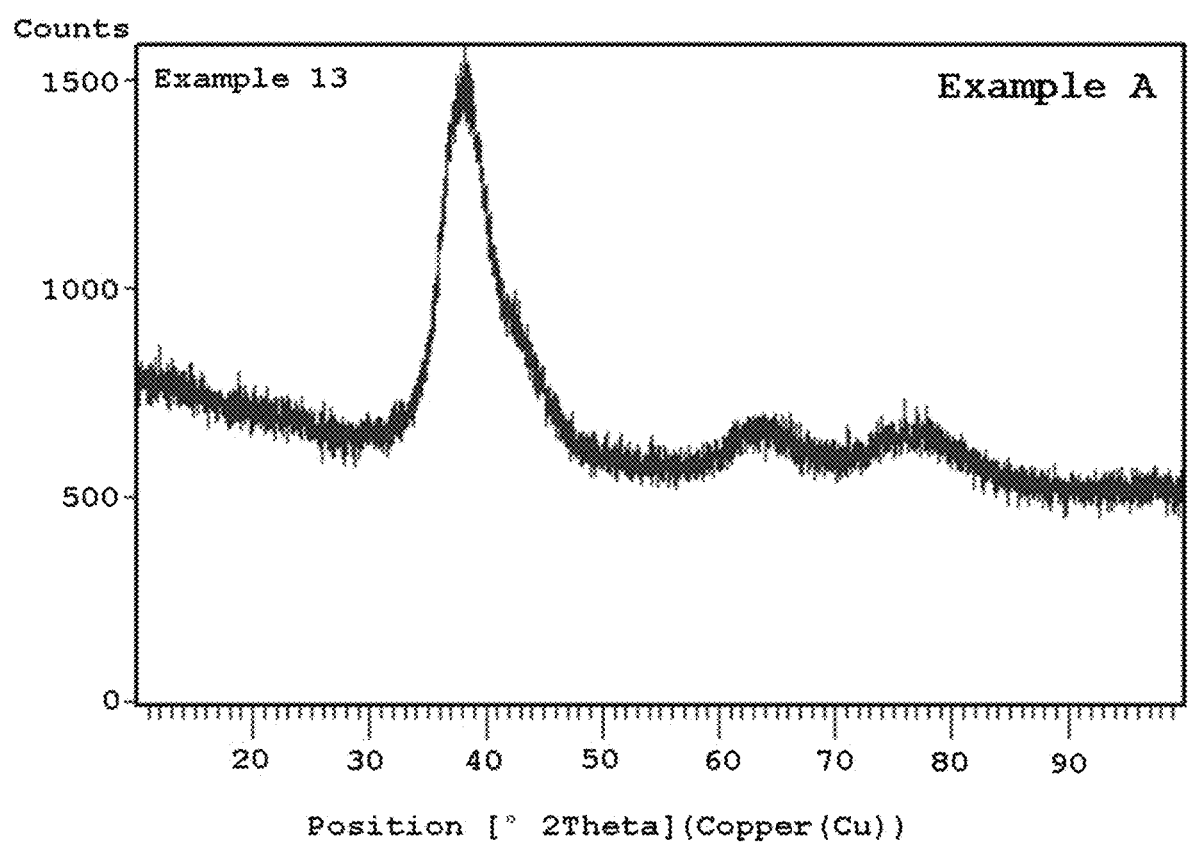

FIG. 28:
This shows the XRD measurement result by using the dried powders of the silver-copper alloy particles prepared in Example A13.

Figure 29:
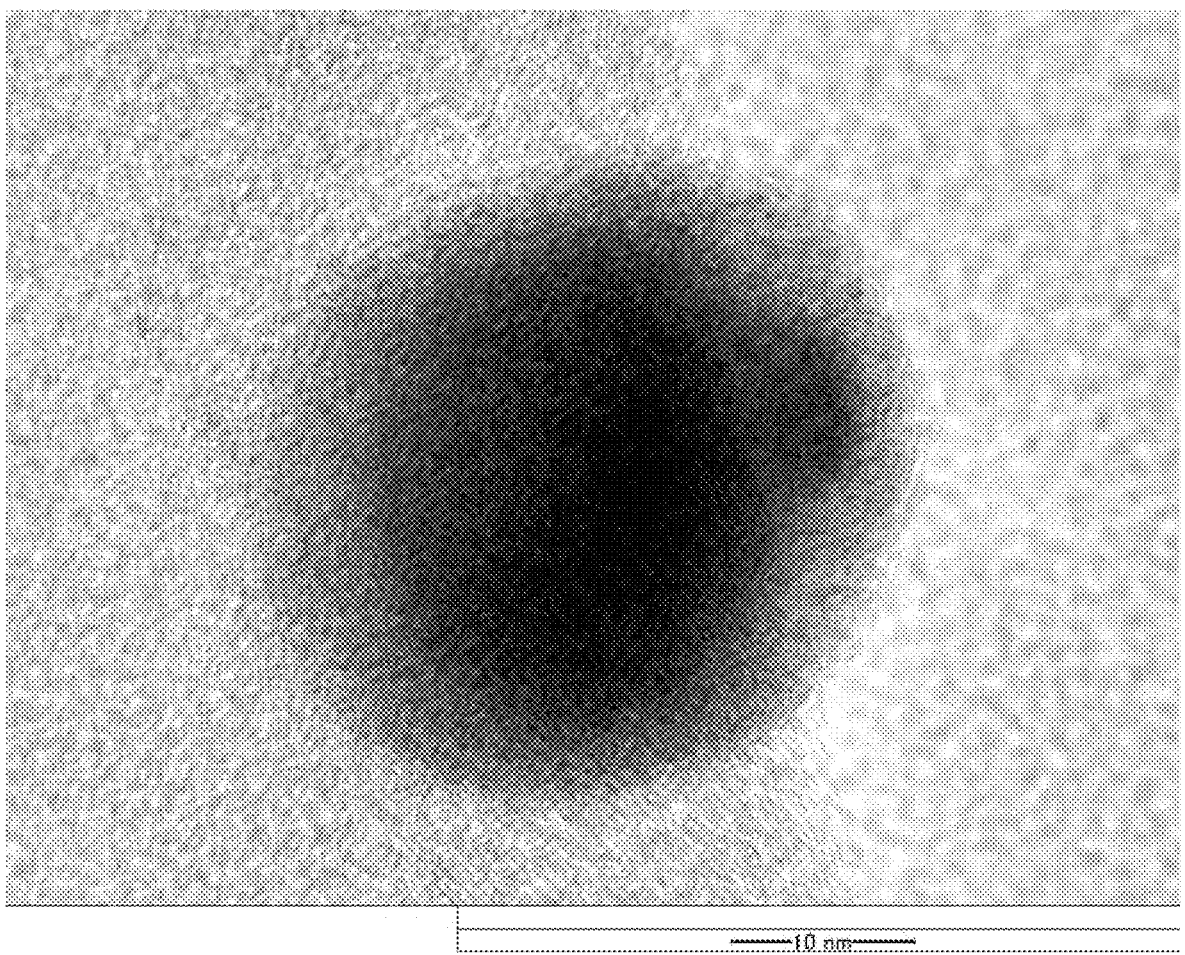

FIG. 29:
This shows the TEM picture of the tin-silver-copper alloy particle prepared in Example A16.

Figure 30:
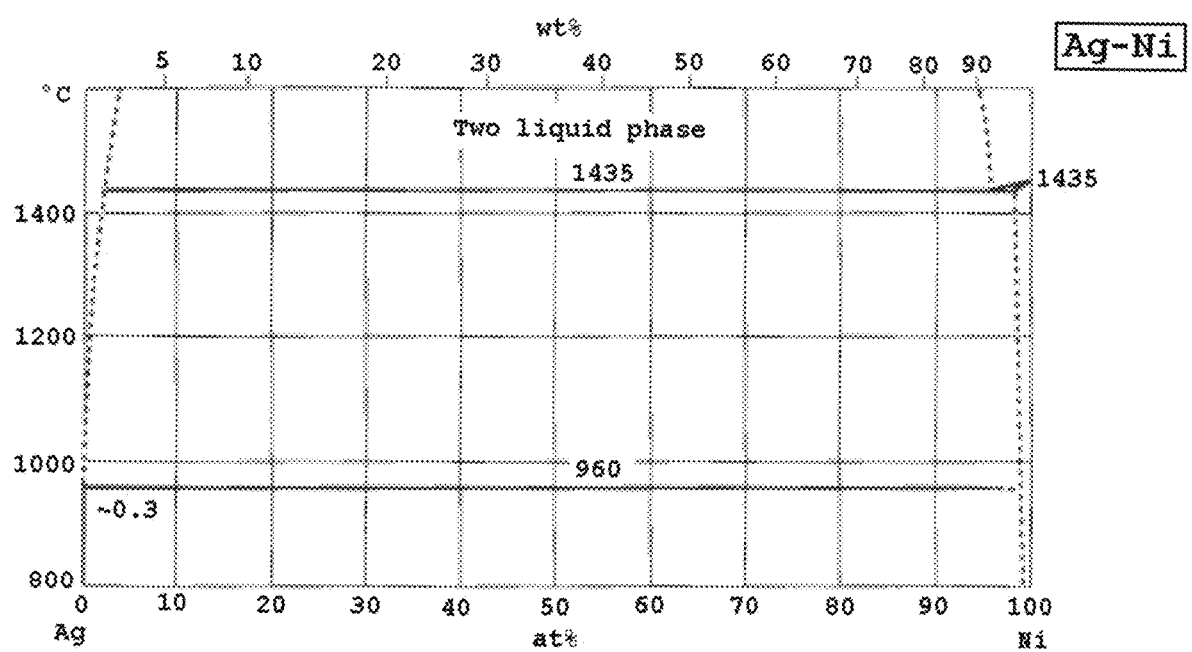

FIG. 30:
This shows an equilibrium diagram of Ag—Ni alloy.

Figure 31:
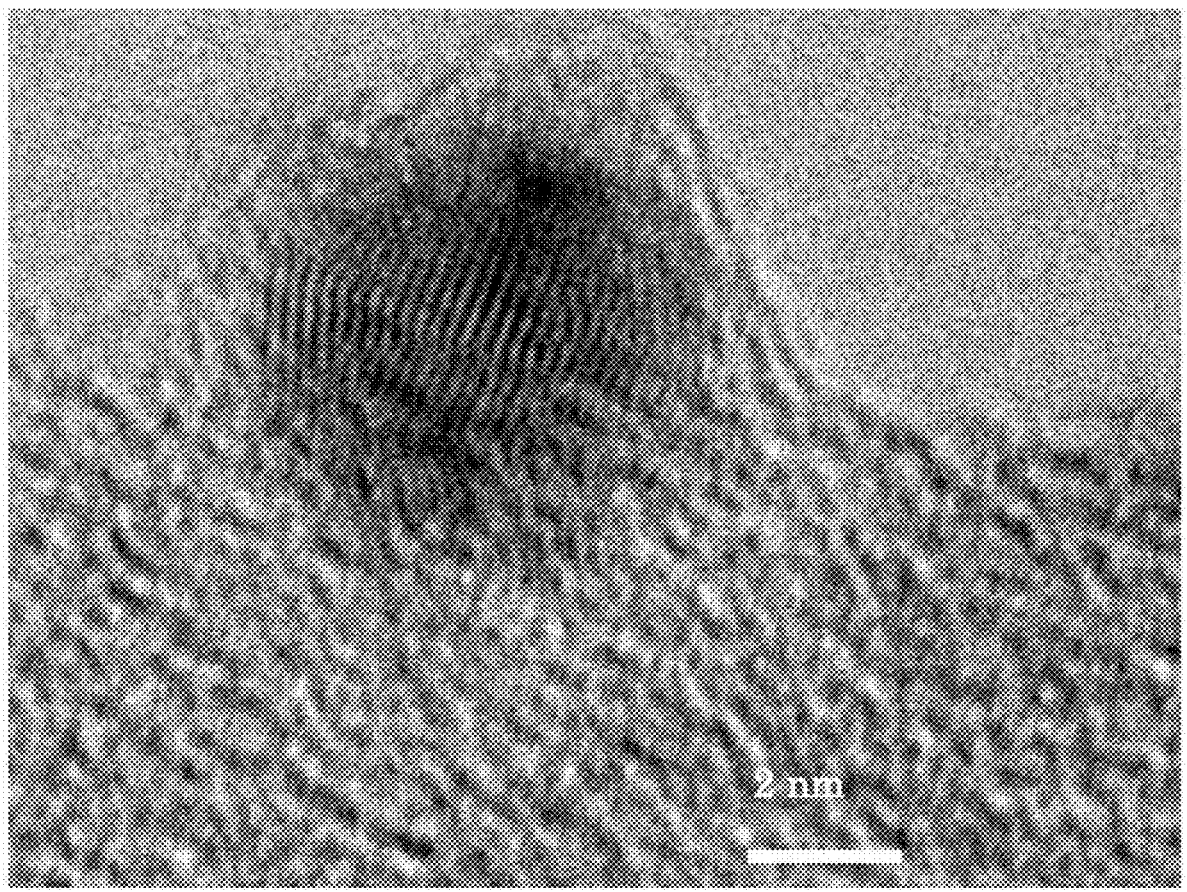

FIG. 31:
This shows the TEM picture of the silver-nickel alloy particle prepared in Example B1.

Figure 32:
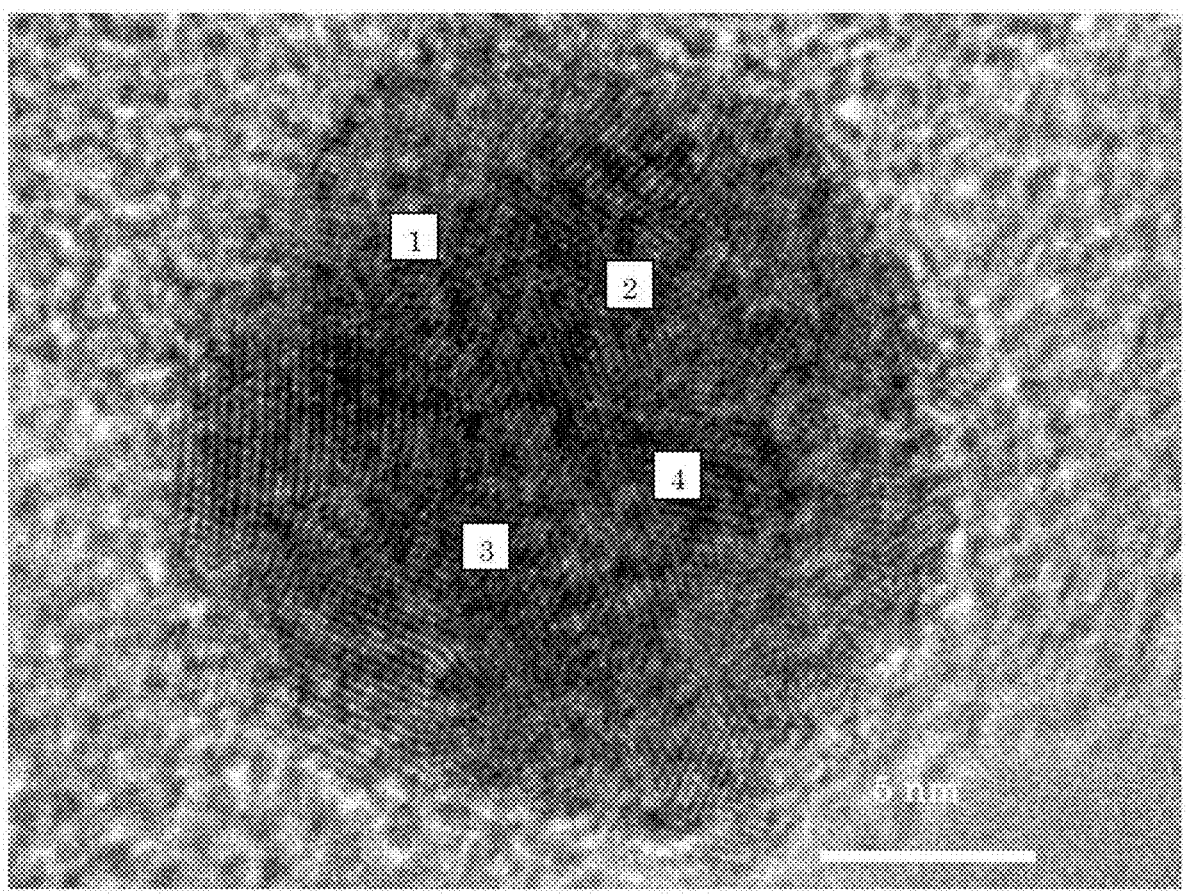

FIG. 32:
This shows the STEM picture of the silver-nickel alloy particle prepared in Example B2 and the STEM-EDS analysis points (4 points) in the silver-nickel alloy particle of the said STEM picture.

Figure 33:
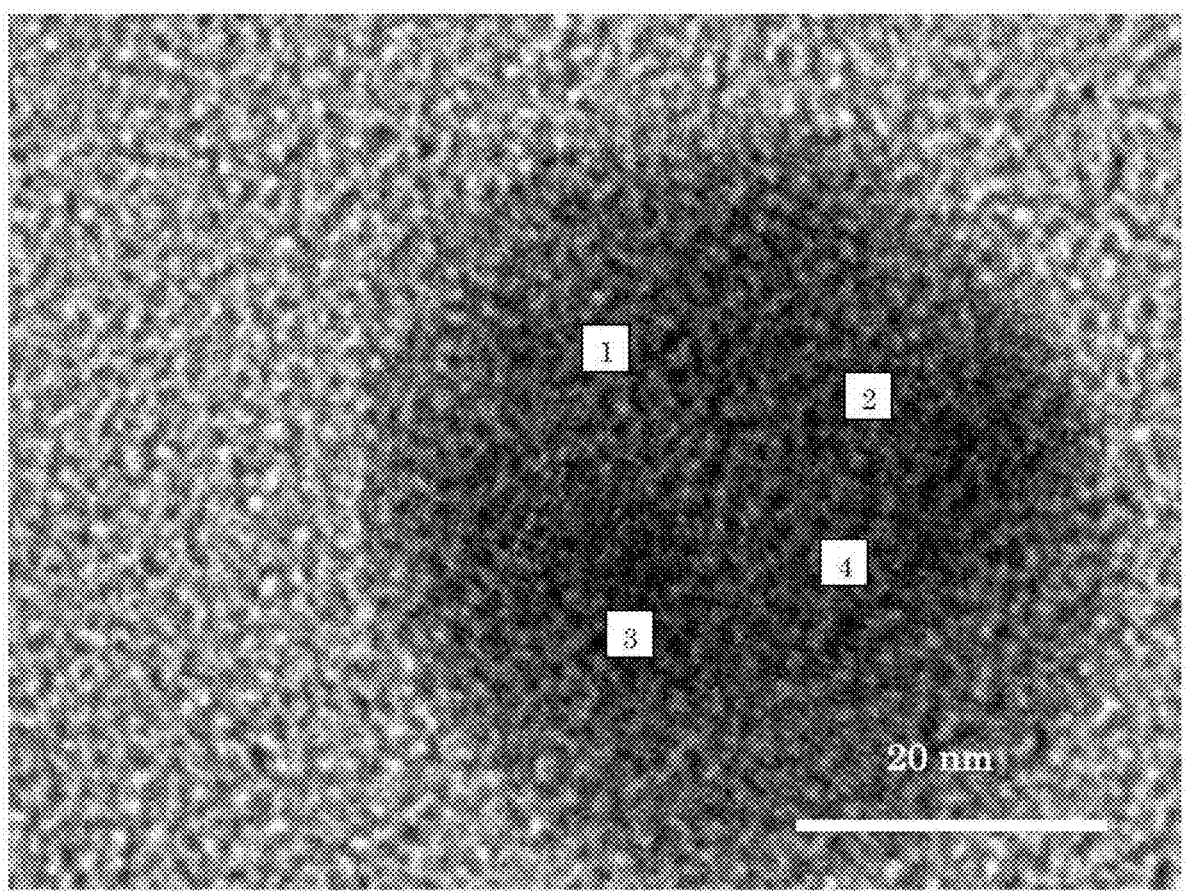

FIG. 33:
This shows the TEM picture of the silver-nickel alloy particle prepared in Example B3 and the TEM-EDS analysis points (4 points) in the silver-nickel alloy particle of the said TEM picture.

Figure 34:
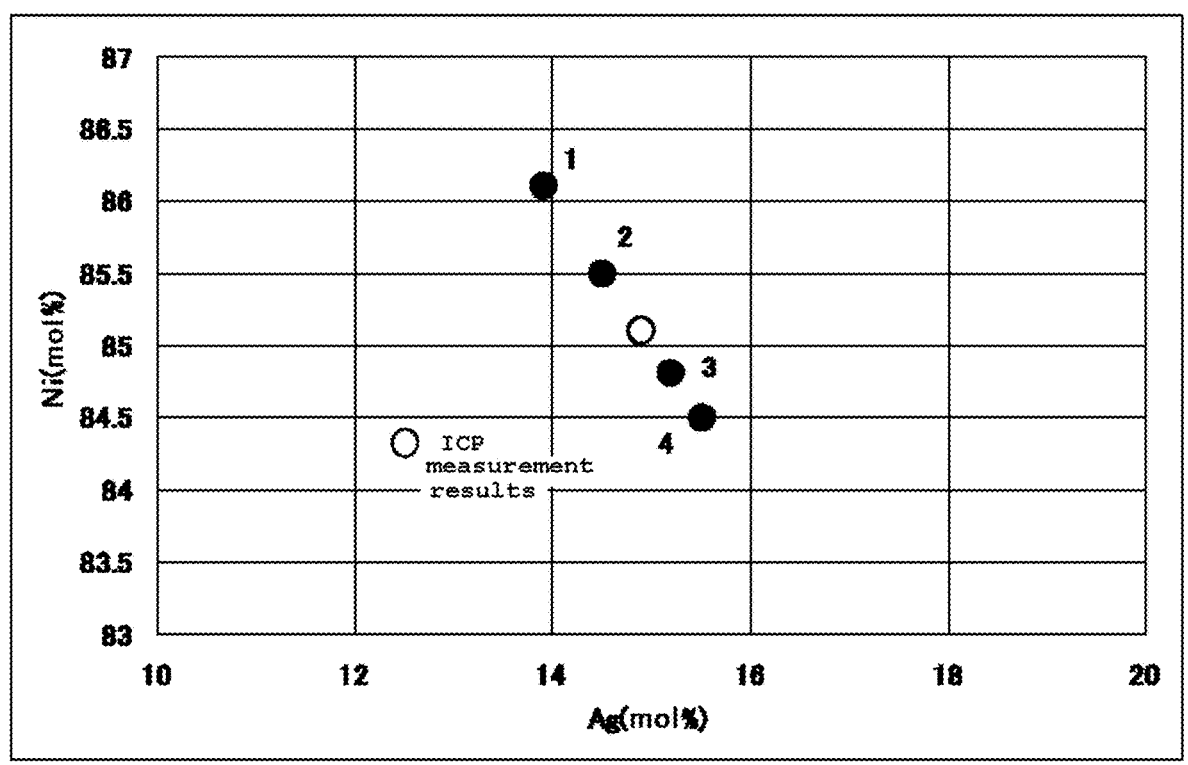

FIG. 34:
This shows the EDS analysis results and ICP analysis results measured at each of the STEM-EDS analysis points shown in FIG. 32 of the silver-nickel alloy particle prepared in Example B2.

Figure 35:
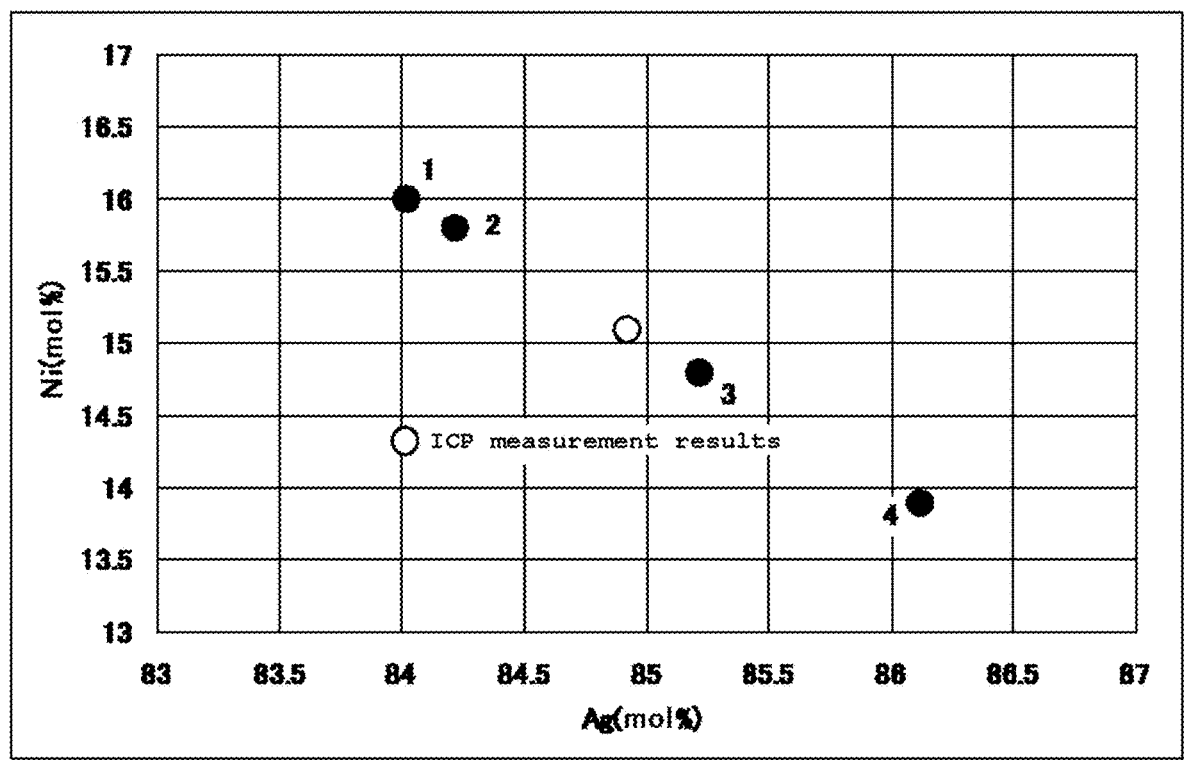

FIG. 35:
This shows the EDS analysis results and ICP analysis results measured at each of the TEM-EDS analysis points, shown in FIG. 33, of the silver-nickel alloy particle prepared in Example B3.

Figure 36:
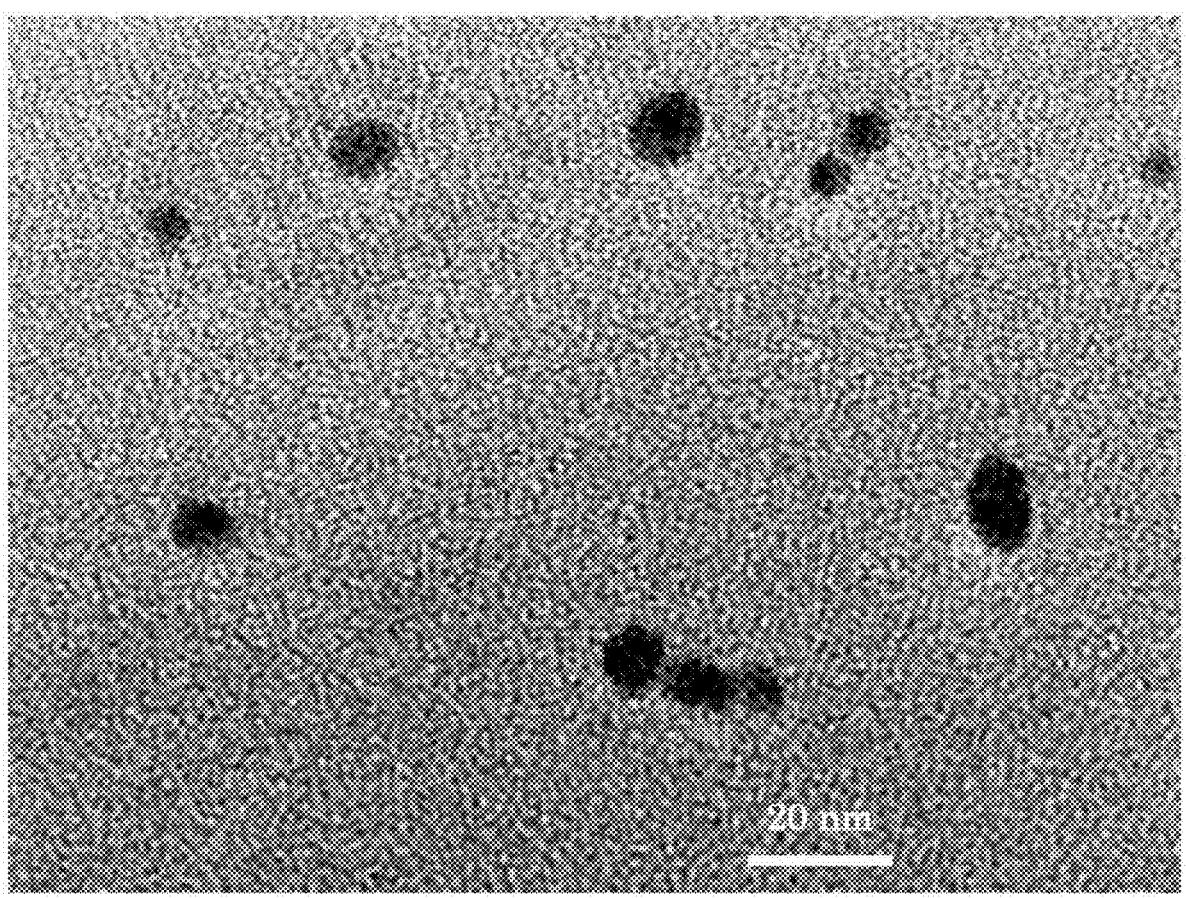

FIG. 36:
This shows the low magnification TEM picture of the silver-nickel alloy particle prepared in Example B1.

Figure 37:
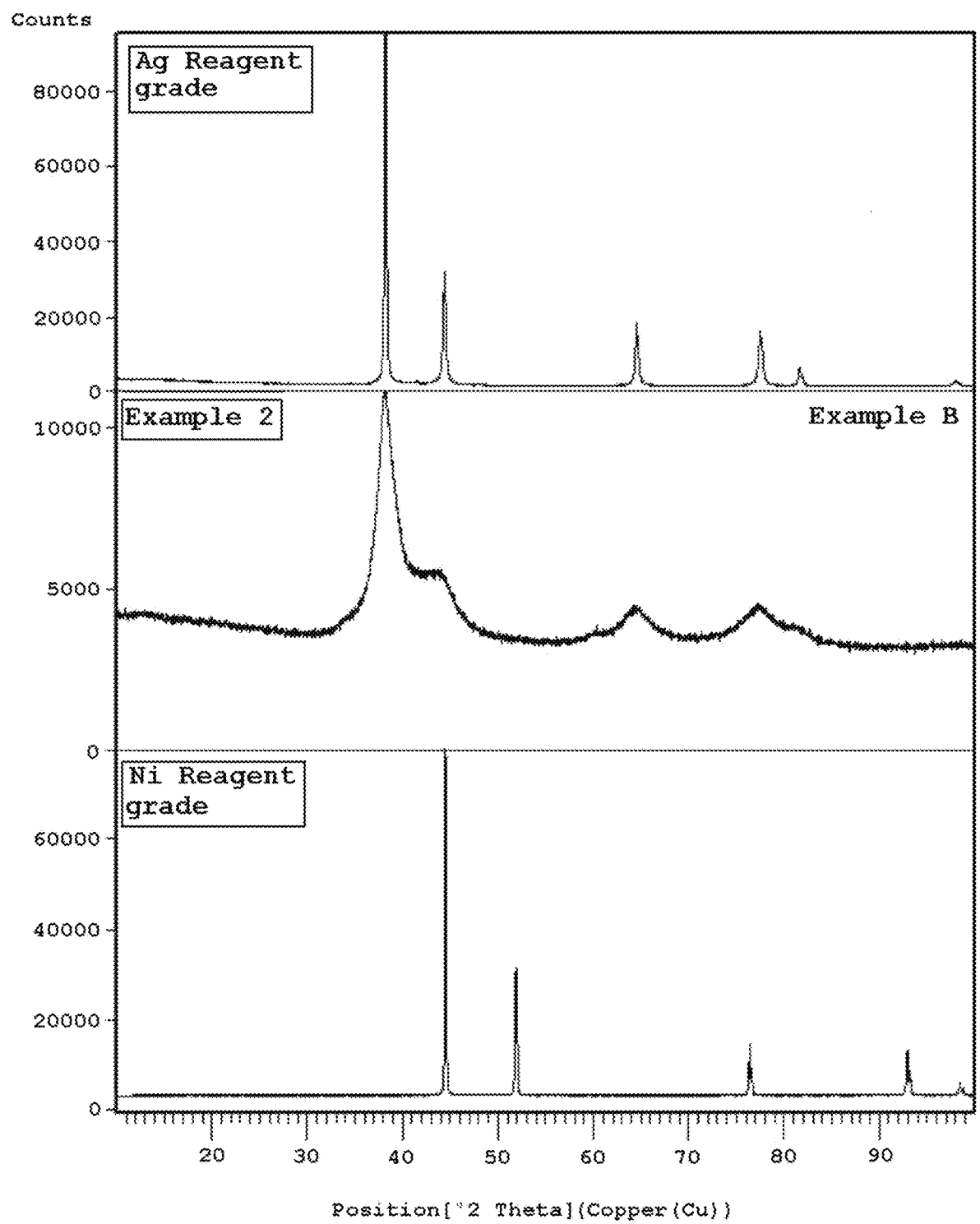

FIG. 37:
This shows the XRD measurement results by using the dried powders of the silver-nickel alloy particles prepared in Examples B2.

Figure 38:
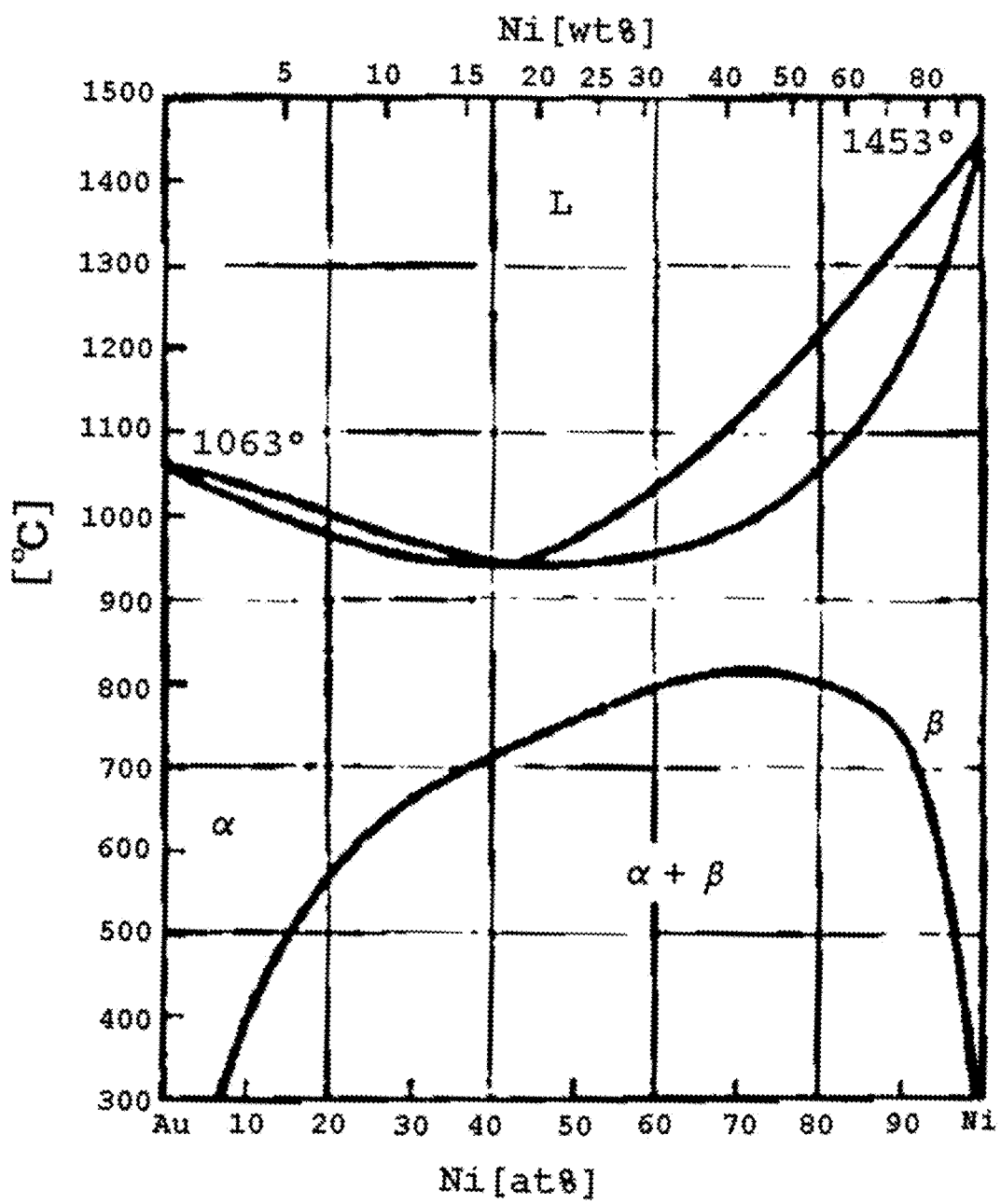

FIG. 38:
This shows an equilibrium diagram of Au—Ni alloy.

Figure 39:
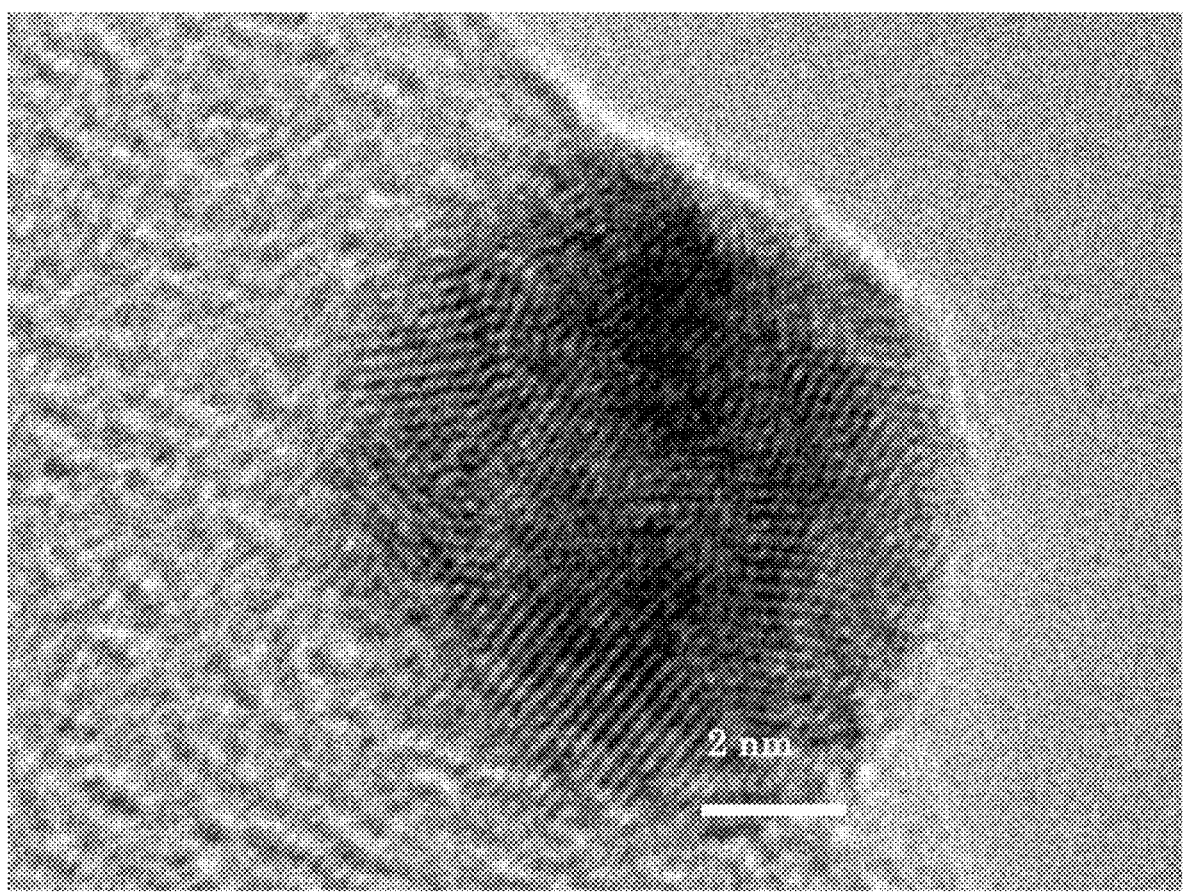

FIG. 39:
This shows the TEM picture of the gold-nickel alloy particle prepared in Example C1.

Figure 40:
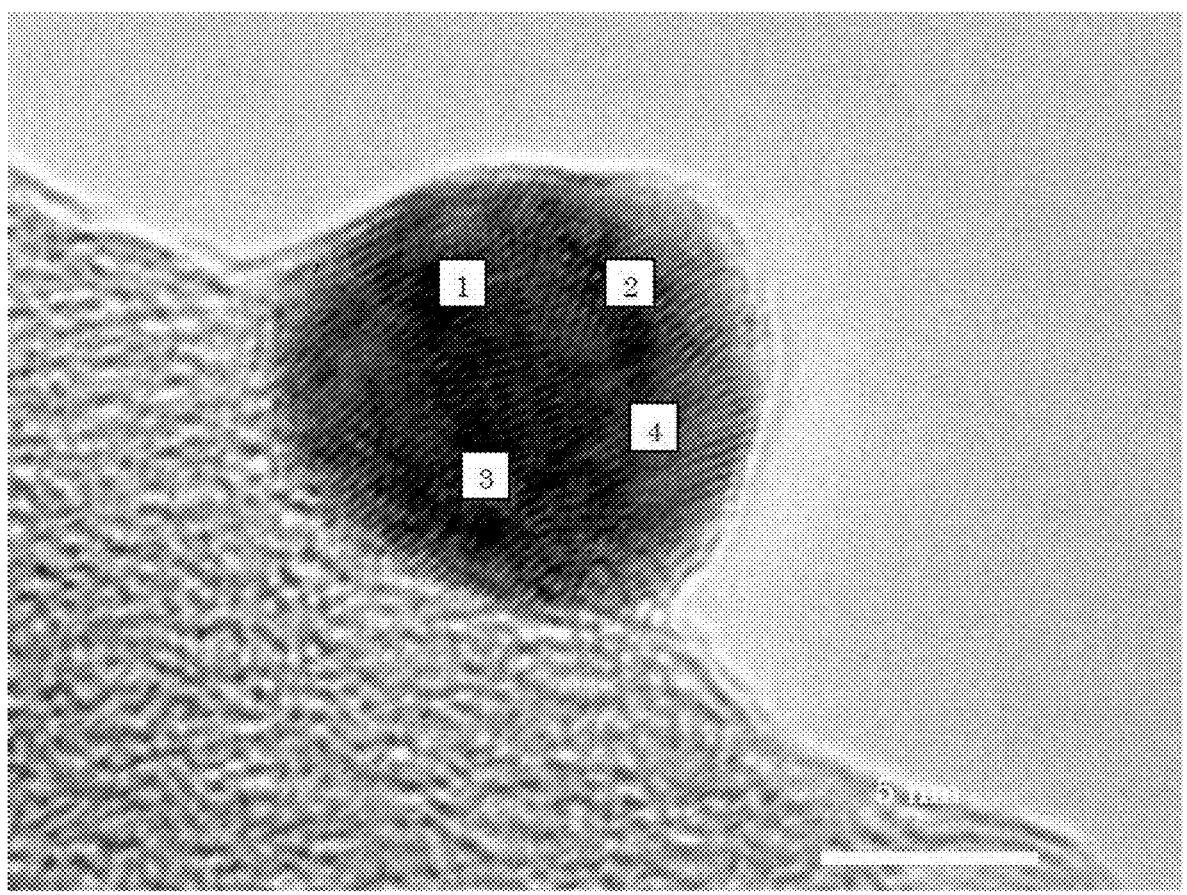

FIG. 40:
This shows the STEM picture of the gold-nickel alloy particle prepared in Example C2 and the STEM-EDS analysis points (4 points) in the gold-nickel alloy particle of the said STEM picture.

Figure 41:
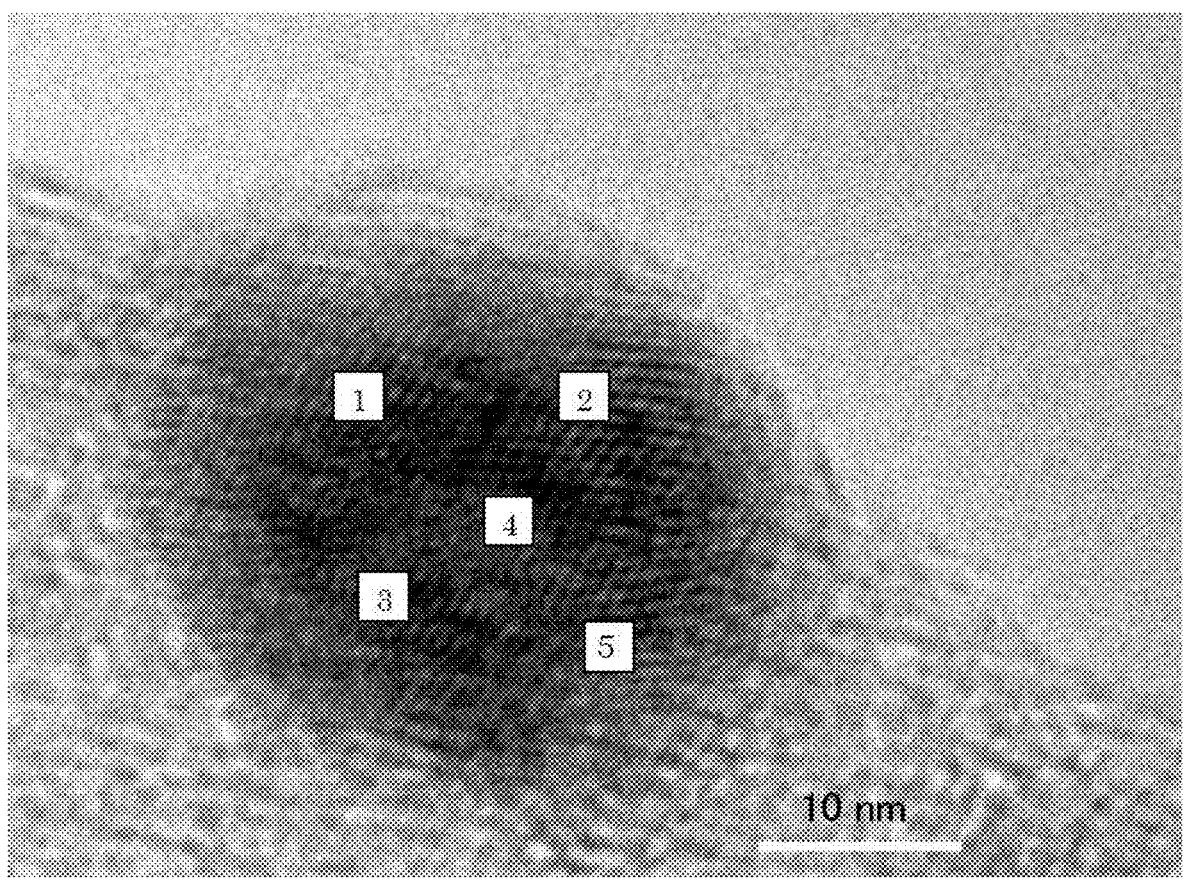

FIG. 41:
This shows the TEM picture of the gold-nickel alloy particle prepared in Example C3 and the TEM-EDS analysis points (5 points) in the gold-nickel alloy particle of the said TEM picture.

Figure 42:
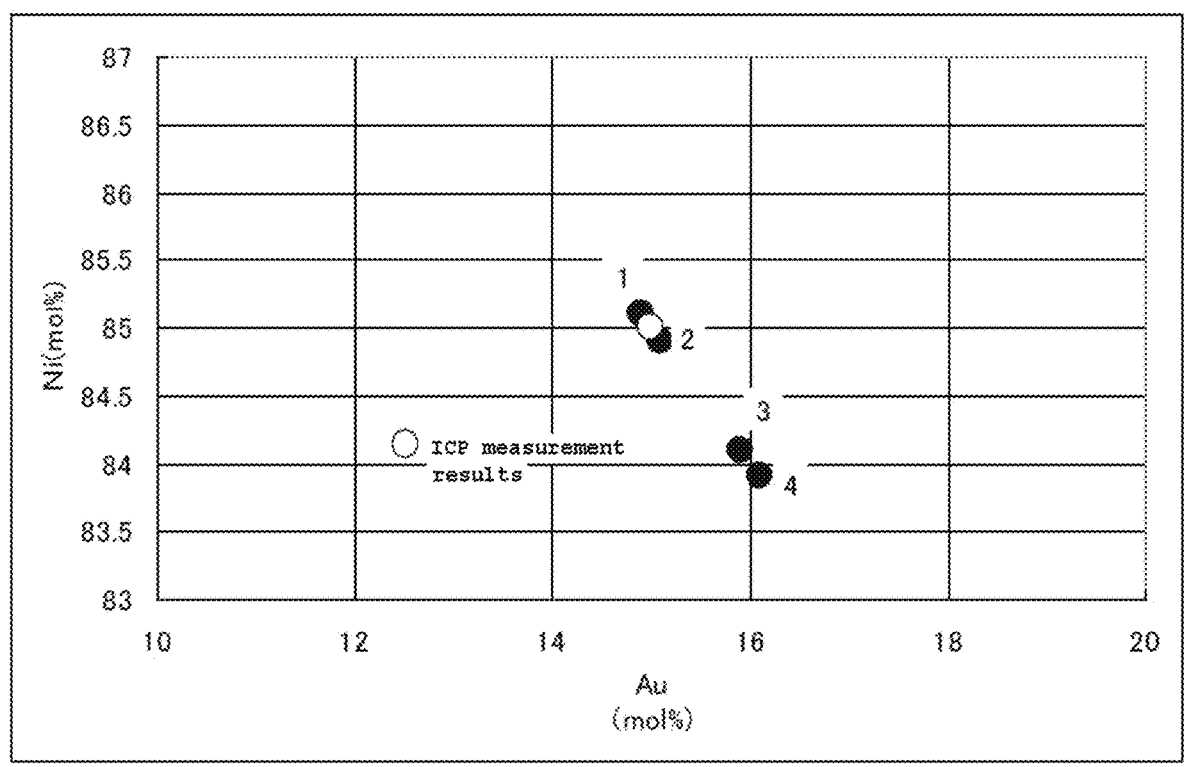

FIG. 42:
This shows the EDS analysis results and ICP analysis results measured at each of the STEM-EDS analysis points, shown in FIG. 40, of the gold-nickel alloy particle prepared in Example C2.

Figure 43:
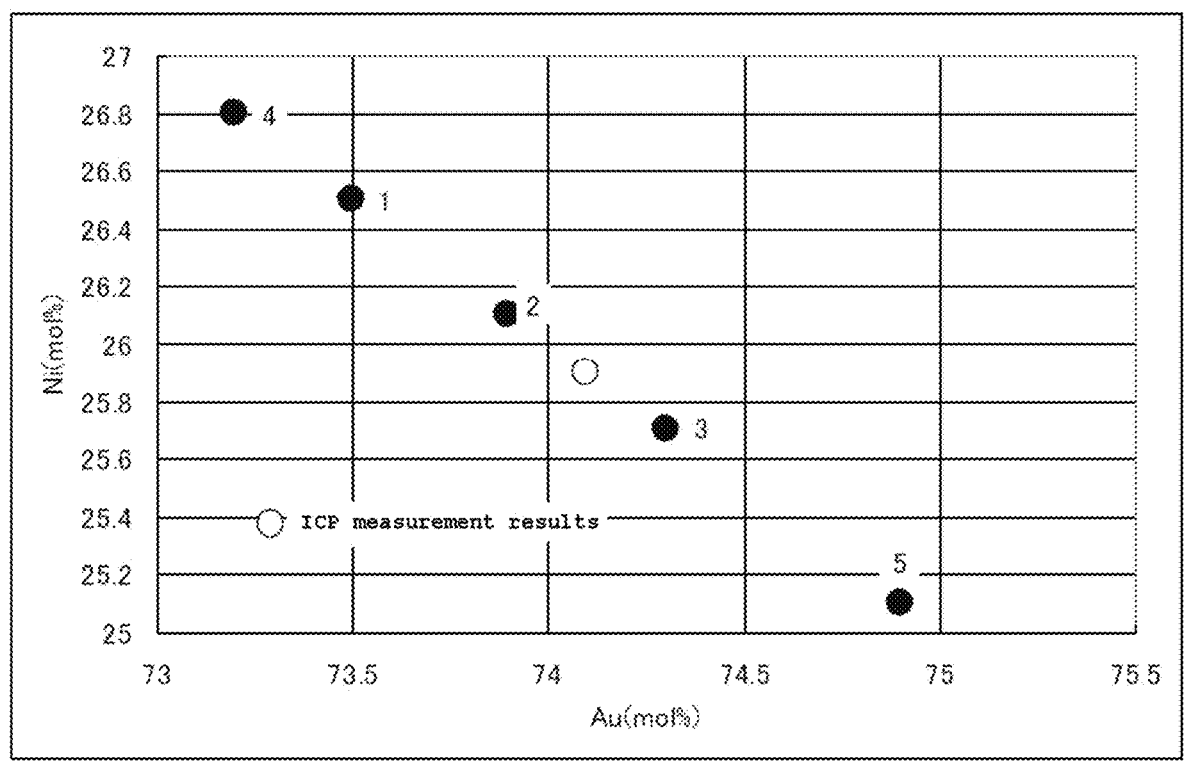

FIG. 43:
This shows the EDS analysis results and ICP analysis results measured at each of the TEM-EDS analysis points, shown in FIG. 41, of the gold-nickel alloy particle prepared in Example C3.

Figure 44:
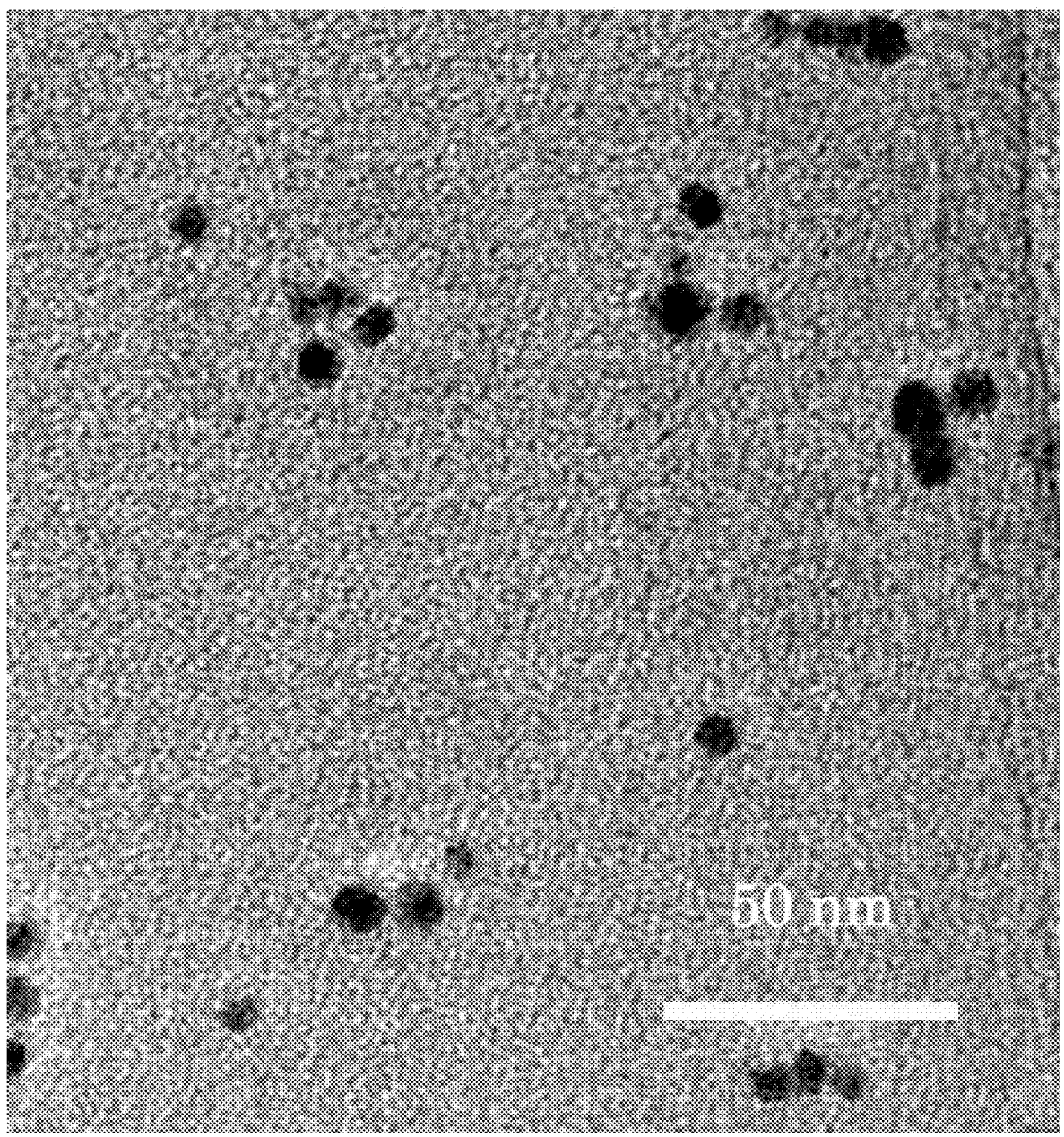

FIG. 44:
This shows the low magnification TEM picture of the gold-nickel alloy particle prepared in Example C1.

Figure 45:
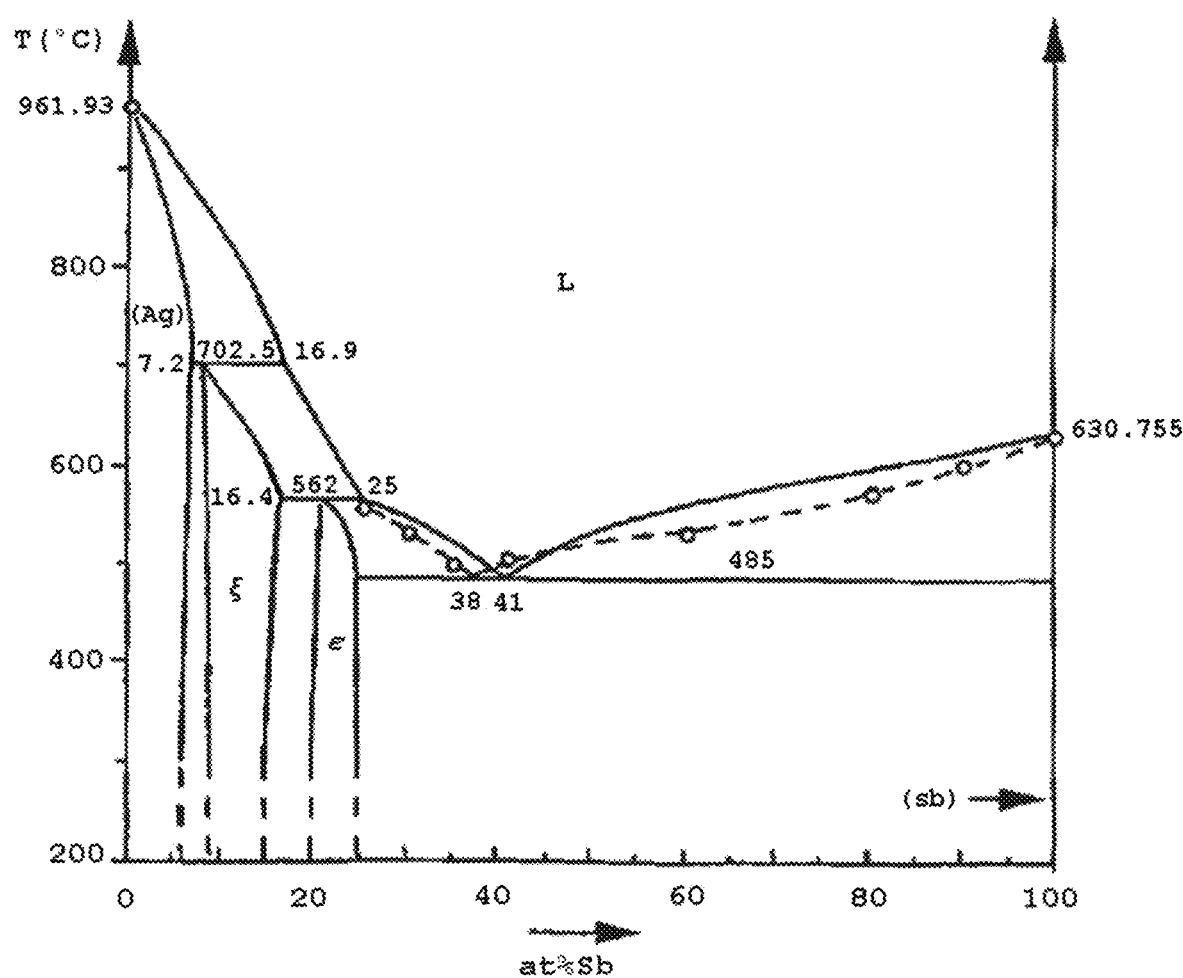

FIG. 45:
This shows an equilibrium diagram of Ag—Sb alloy.

Figure 46:
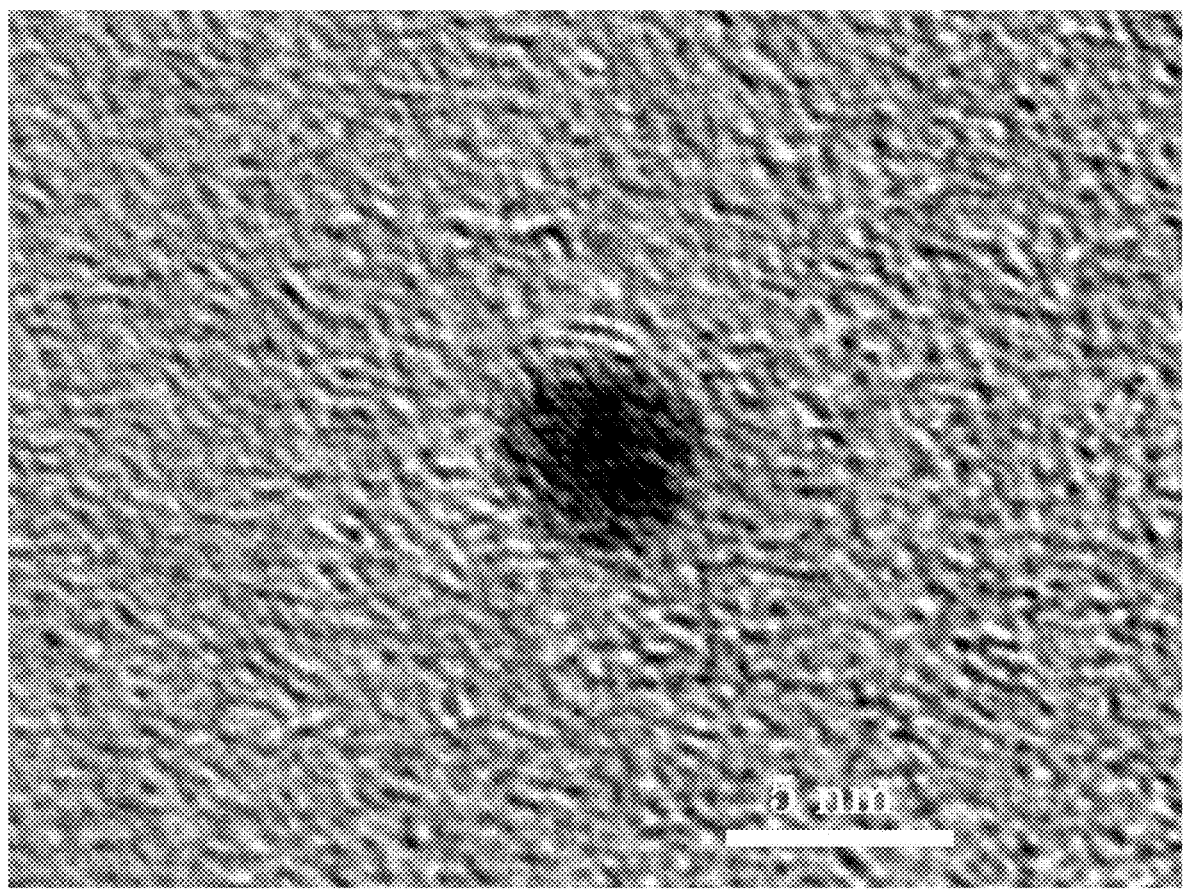

FIG. 46:
This shows the TEM picture of the silver-antimony alloy particle prepared in Example D1.

Figure 47:
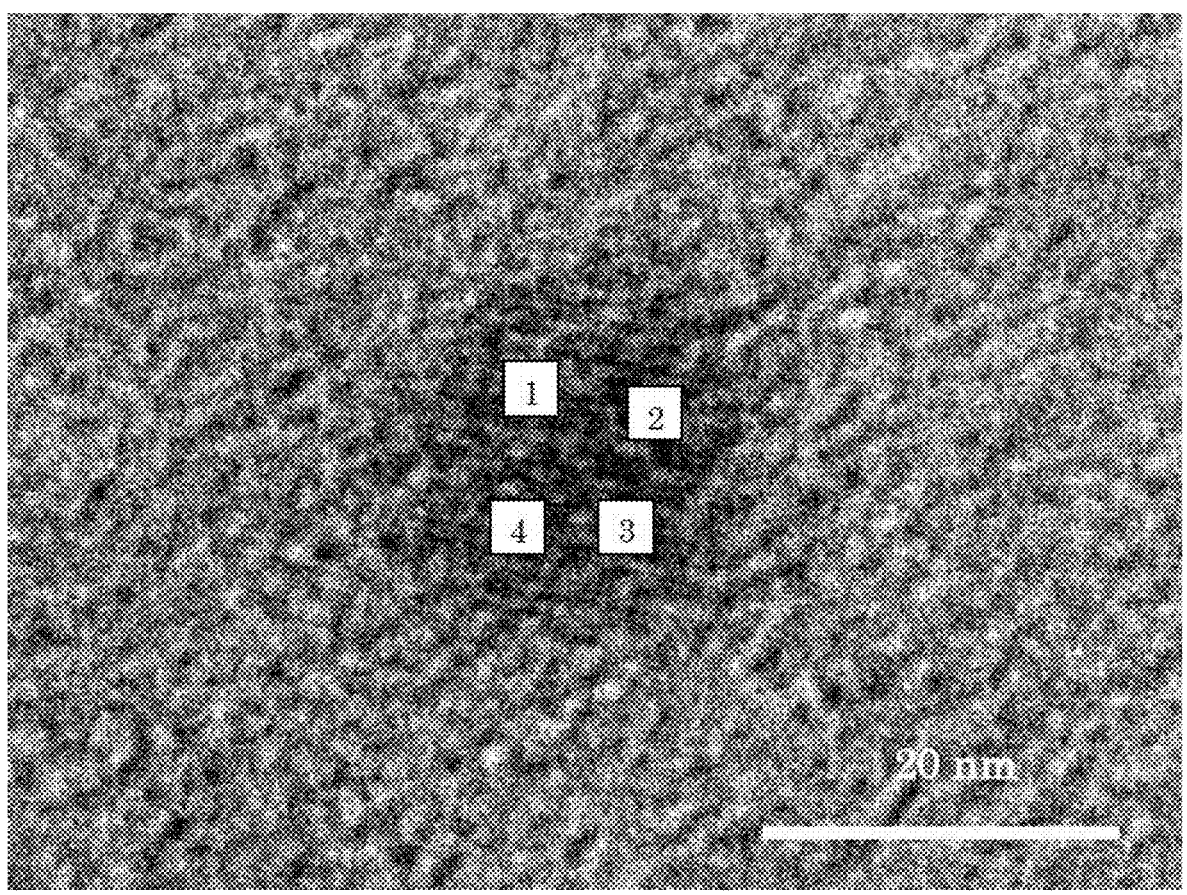

FIG. 47:
This shows the STEM picture of the silver-antimony alloy particle prepared in Example D2 and the STEM-EDS analysis points (4 points) in the silver-antimony alloy particle of the said STEM picture.

Figure 48:
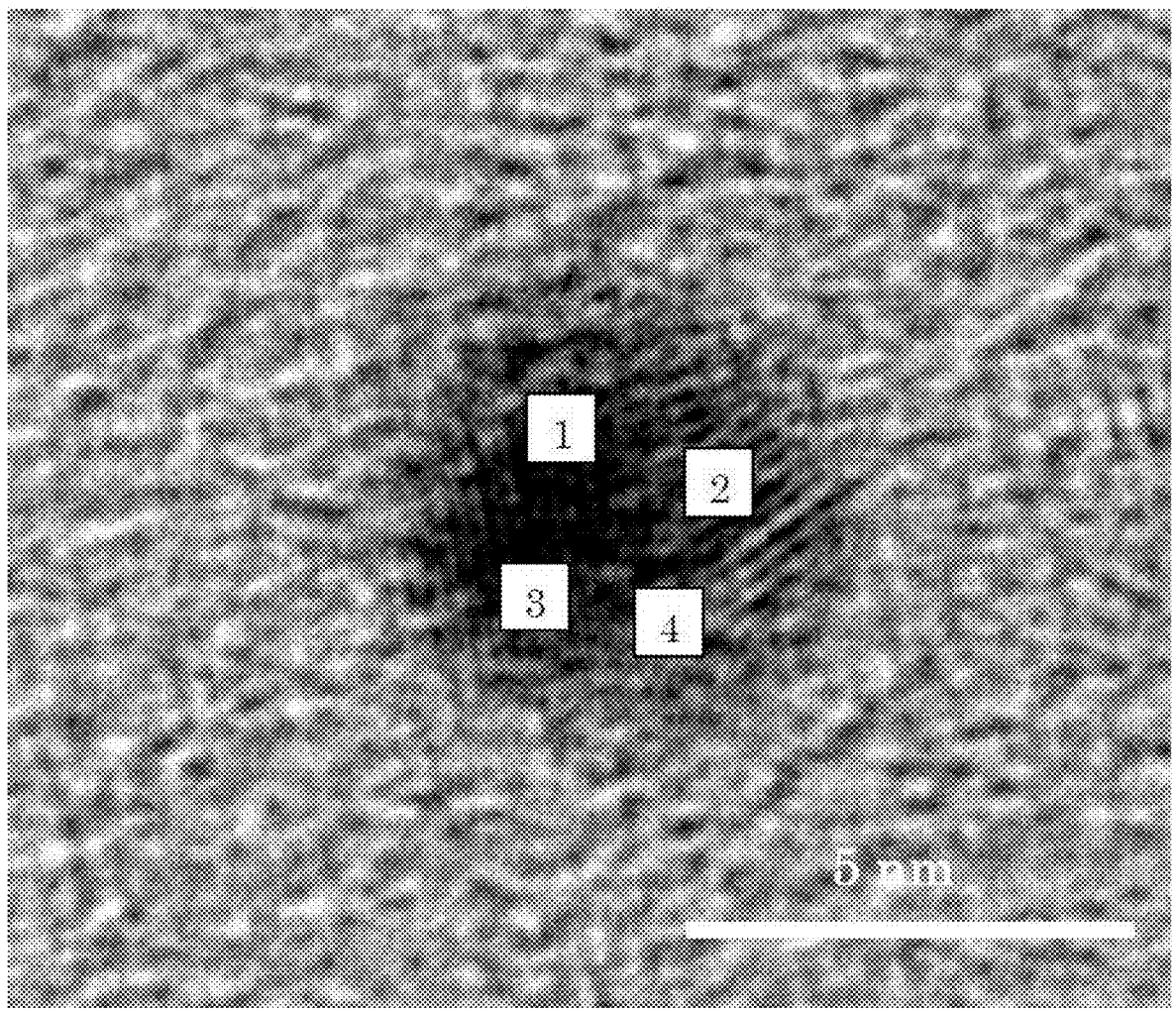

FIG. 48:
This shows the TEM picture of the silver-antimony alloy particle prepared in Example D3 and the TEM-EDS analysis points (4 points) in the silver-antimony alloy particle of the said TEM picture.

Figure 49:
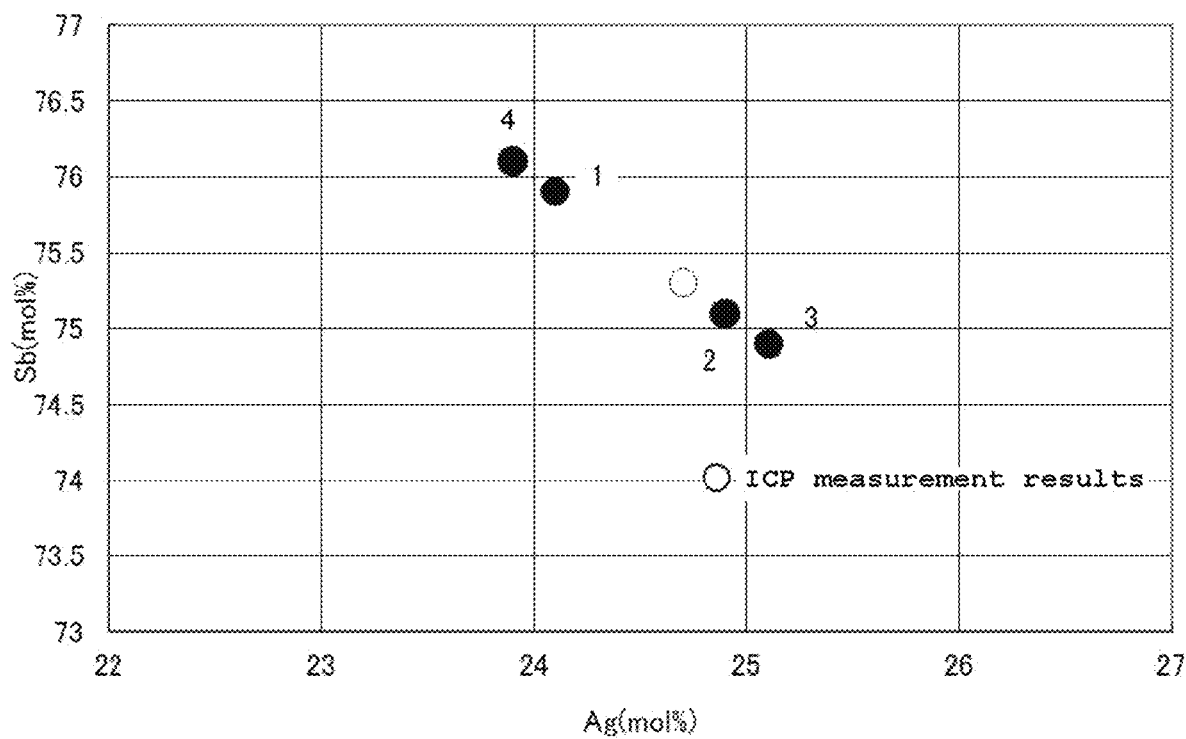

FIG. 49:
This shows the EDS analysis results and ICP analysis results measured at each of the STEM-EDS analysis points, shown in FIG. 47, of the silver-antimony alloy particle prepared in Example D2.

Figure 50:
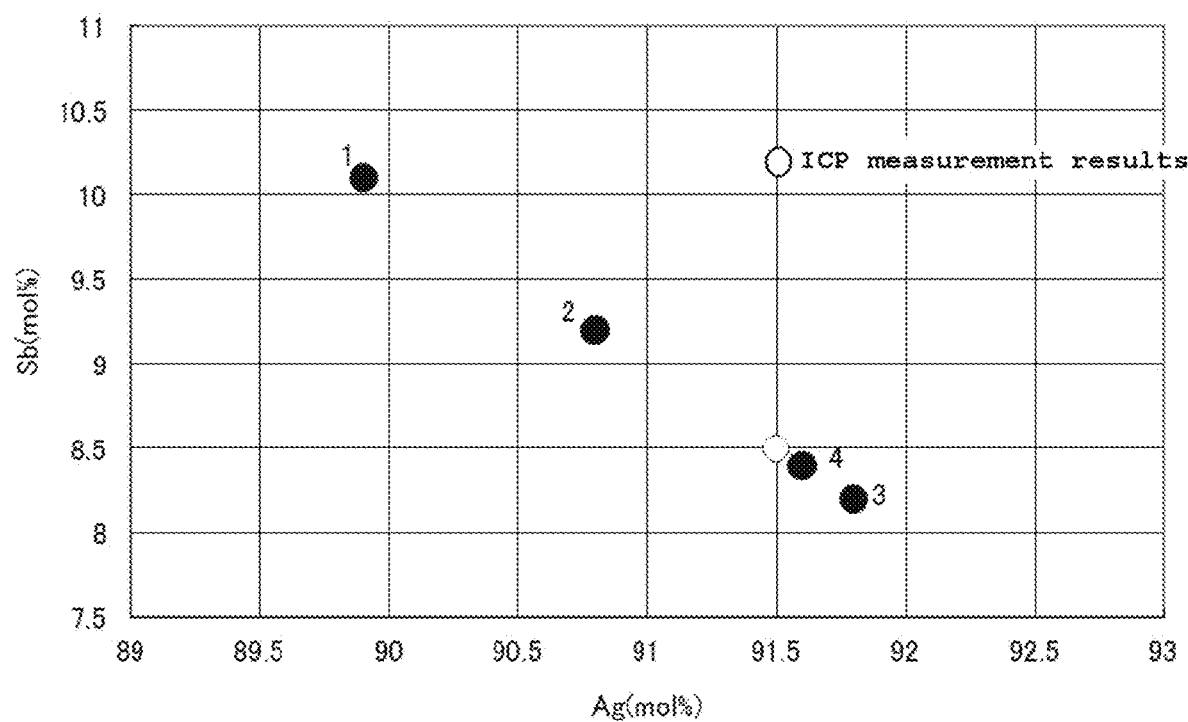

FIG. 50:
This shows the EDS analysis results and ICP analysis results measured at each of the TEM-EDS analysis points, shown in FIG. 48, of the silver-antimony alloy particle prepared in Example D3.

Figure 51:
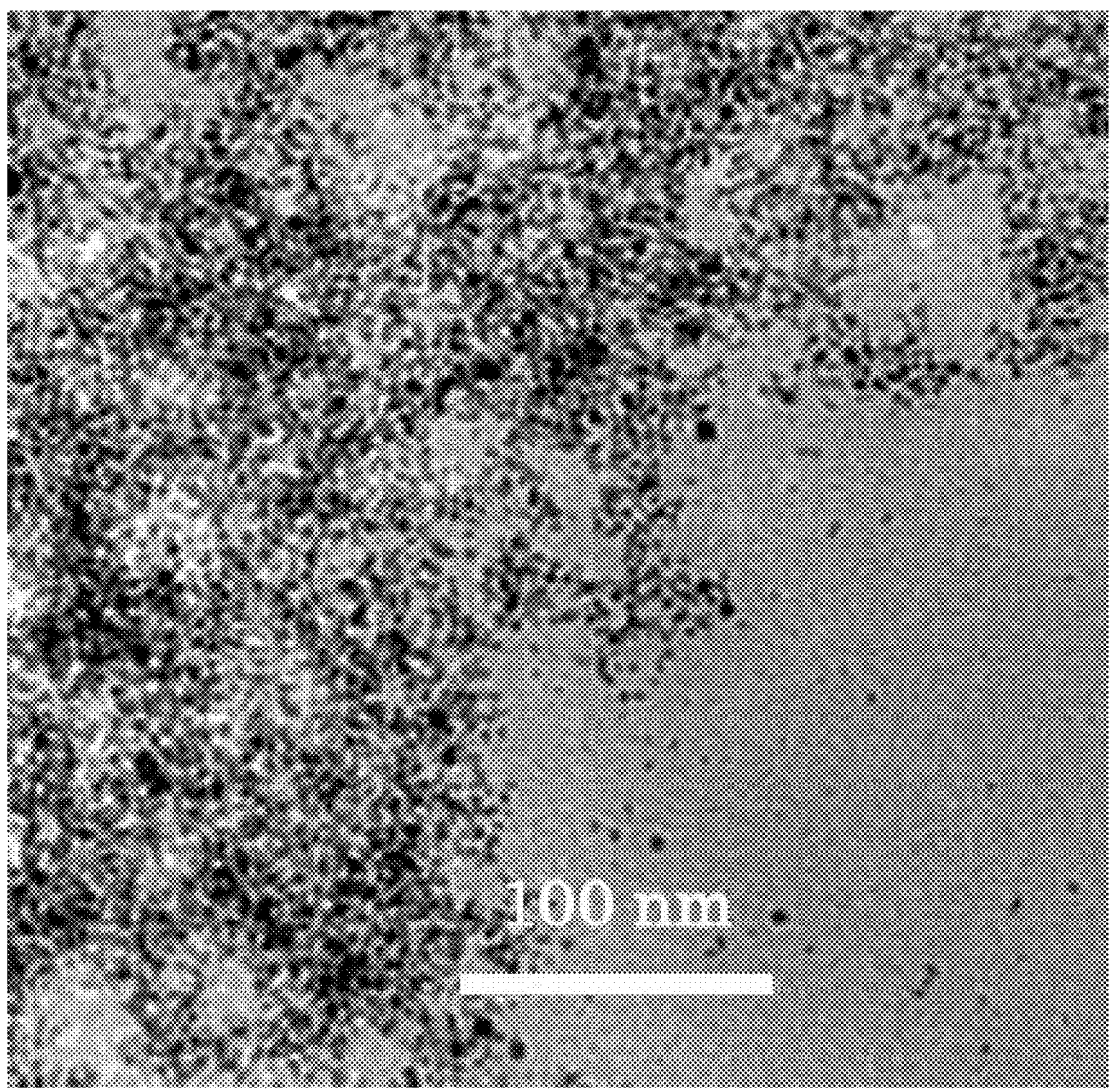

FIG. 51:
This shows the low magnification TEM picture of the silver-antimony alloy particle prepared in Example D1.

Figure 52:
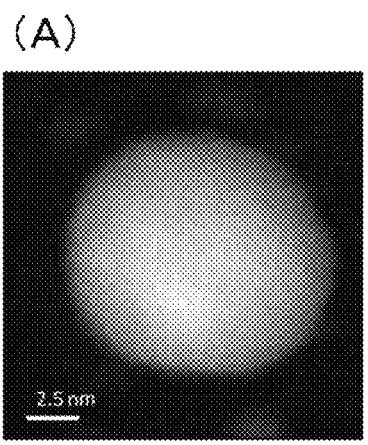
Figure 52:
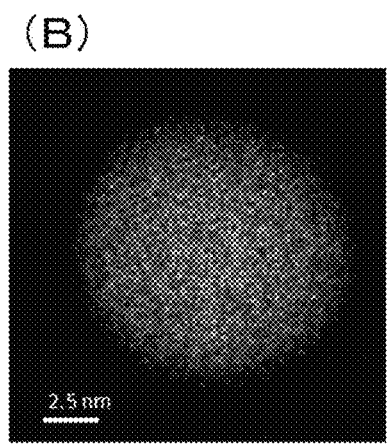
Figure 52:
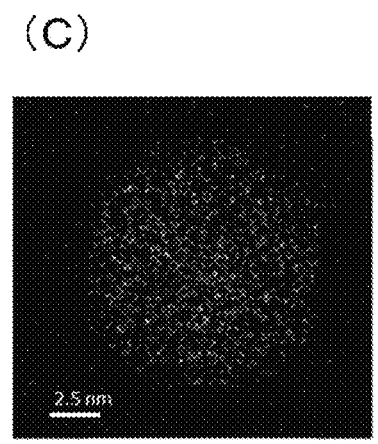

FIG. 52:
This shows (A) the STEM-HAADF picture, (B) the EDS mapping result (Ag), and (C) the EDS mapping result (Sb) of the silver-antimony alloy particles prepared in Example D3.

Figure 53:
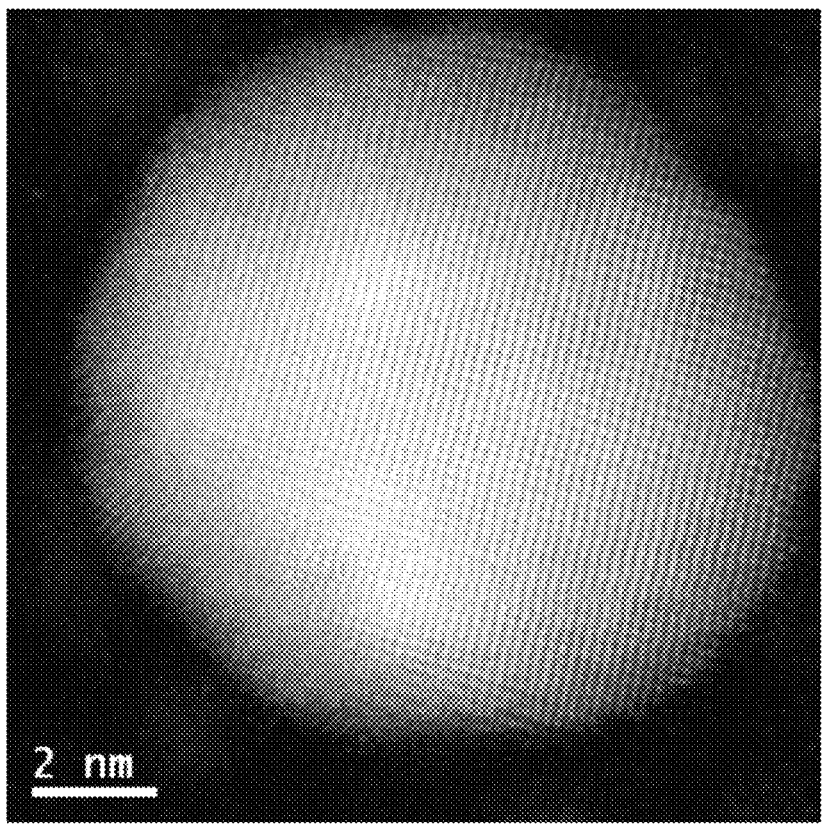
Figure 53:
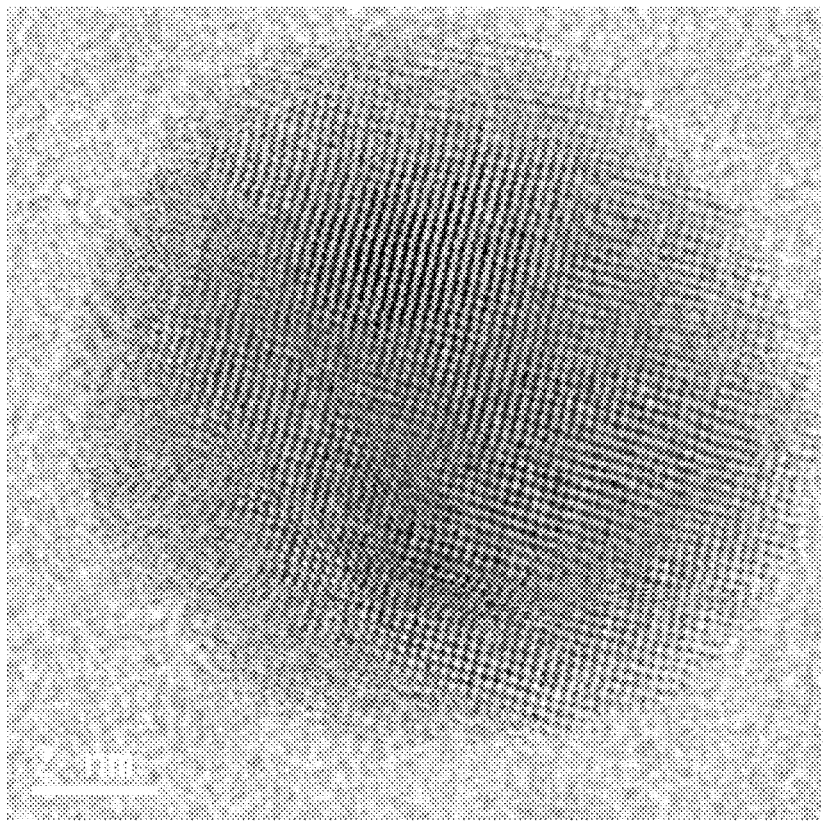

FIG. 53:
This shows (A) the STEM-HAADF picture and (B) the STEM-BF (bright view) picture of the silver-antimony alloy particle prepared in Example D3 (magnification of 12 million in both (A) and (B)).

FIG. 54:
This shows (A) the STEM-HAADF picture, (B) the EELS mapping results (Ag), and (C) the EELS mapping results (Cu) of the observation results with an electron microscope which shows an example of a conventional silver-copper alloy particle.

FIG. 55:

This shows (A) the STEM-HAADF picture, (B) the STEM mapping results (Ag), and (C) the STEM mapping results (Cu) of the observation results with an electron microscope which shows other example of a conventional silver-copper alloy particle.

FIG. 56:

This shows (A) the STEM-HAADF picture, (B) the STEM mapping results (Ag), and (C) the STEM mapping results (Cu) of the observation results with an electron microscope which shows still other example of a conventional silver-copper alloy particle.

FIG. 57:

This shows (A) the STEM-HAADF picture, (B) the STEM mapping results (Ag), and (C) the STEM mapping results (Cu) and (Sb) of the observation results with an electron microscope which shows other illustrative example of a conventional silver-antimony alloy particle.

BEST MODES TO CARRY OUT THE INVENTION

Hereunder, the metal alloys and the method for producing the same according to the present invention will be explained in detail.

In the present invention, there is no particular restriction as to the kind of the alloys, provided that the afore-mentioned two metals show the finely mixed state thereof in the level of nanometers in a specific region of the solid phase in which the at least two metals are eccentrically located in the alloy equilibrium diagram.

Kind of Alloys:

Specifically, a silver-copper alloy, a silver-copper-tin alloy, a silver-nickel alloy, a gold-nickel alloy, and a silver-antimony alloy may be exemplified.

In these alloys, specific regions of the solid phase in which the at least two metals are eccentrically located are shown in the alloy equilibrium diagrams, including the region which comprises mainly a eutectic body of the at least two metals to constitute the alloy, the region which contains an intermetallic compound, and the region which is an inhomogeneous solid solution even if the two metals form a solid solution.

Specifically, according to the afore-mentioned alloy equilibrium diagrams shown in FIG. 4(B) to FIG. 5(D), the regions shown by the dots belong to this specific region. As known well, the state of the alloy changes according to temperature, and under a specific temperature condition of a solid with a specific composition ratio, at least two metals mentioned above are eccentrically located. On the other hand, in the alloy of the present invention, even in the regions shown by the dots in FIG. 4(B) to FIG. 5(D), the metals to constitute the alloy show the finely mixed state in the level of nanometers.

More specifically, the alloy contains at least one metal among gold, silver, nickel, antimony, tin, sodium, magnesium, aluminum, silicon, phosphorous, sulfur, potassium, calcium, scandium, titanium, vanadium, chromium, manganese, iron, cobalt, copper, zinc, gallium, germanium, arsenic, selenium, yttrium, zirconium, niobium, molybdenum, technetium, ruthenium, rhodium, palladium, indium, tellurium, cesium, barium, hafnium, tantalum, tungsten, rhenium, osmium, iridium, platinum, mercury, thallium, lead, bismuth, polonium, radium, lanthanum, cerium, praseodymium, neodymium, promethium, samarium, europium, gadolinium, actinium, and thorium. Still more specifically, these alloys are: silver-copper, gold-copper, silver-nickel, gold-nickel, silver-antimony, gold-antimony, silver-copper-tin, gold-copper-tin, silver-nickel-tin, gold-nickel-tin, silver-antimony-tin, gold-antimony-tin, cobalt-nickel, platinum-manganese, silver-titanium, niobium-zirconium, zinc-manganese, copper-tin, gold-silicon, tin-lead, silver-silicon, aluminum-tin, aluminum-beryllium, cadmium-bismuth, gold-platinum, platinum-palladium, cadmium-mercury, cobalt-copper, copper-lead, zinc-lead, aluminum-cadmium, aluminum-thallium, magnesium-lead, gold-bismuth, tellurium-lead, bismuth-lead, silver-strontium, and titanium-zirconium; and a combination of iron with one element selected from beryllium, aluminum, silicon, phosphorous, titanium, barium, chromium, arsenic, molybdenum, tin, antimony, tungsten, lead, nickel, and cobalt. Taking some of the alloys shown above as examples, the specific regions thereof are shown by the dots in the equilibrium diagrams in FIG. 6.

Production method of the alloys of the present invention is not restricted, while one example thereof is the method in which one fluid having at least two metals to constitute the alloy dissolved or molecular-dispersed into a solvent is mixed with another fluid containing a reducing agent to separate the alloy particles.

The reducing agent mentioned above is not particularly restricted; and thus, any reducing agent capable of reducing at least two metals to constitute the alloys mentioned above may be used.

More specific example the reducing agent thereof includes hydrazines (such as hydrazine, hydrazine monohydrate, phenyl hydrazine, and hydrazinium sulfate), amines (such as dimethylamino ethanol, triethylamine, octylamine, and dimethylamino borane), organic acids (such as citric acid, ascorbic acid, tartaric acid, malic acid, malonic acid, or salts of them, formic acid, and formaldehyde), alcohols (such as methanol, ethanol, isopropyl alcohol, ethylene glycol, diethylene glycol, triethylene glycol, tetraethylene glycol, and benzotriazole), hydrides (such as sodium borohydride, lithium borohydride, and lithium triethylborohydride), lithium aluminum hydride, diisobutylaluminum hydride, tributyltin hydride, lithium tri(sec-butyl)borohydride, potassium tri(sec-butyl)borohydride, zinc borohydride, sodium acetoxyborohydride, transition metal salts (iron sulfate and stannous sulfate), and pyrrolidones (polyvinyl pyrrolidone, 1-vinyl pyrrolidone, N-vinyl pyrrolidone, and methyl pyrrolidone).

These reducing agents may be used singly; however, it is advantageous to use at least two reducing agents selected from these reducing agents because two metal ions to constitute the alloy can be reduced almost simultaneously.

Of the above mentioned reducing agents, alcohols (such as methanol, ethanol, isopropyl alcohol, ethylene glycol, diethylene glycol, triethylene glycol, tetraethylene glycol, and benzotriazole) may be used also as a solvent; and these may be used together with other reducing agents. Furthermore, of the above mentioned reducing agents, pyrrolidones (such as polyvinyl pyrrolidone, 1-vinyl pyrrolidone, N-vinyl pyrrolidone, and methyl pyrrolidone) and amines (especially octylamine) can play a role as a dispersant; and these may be used together with other reducing agents. As just discussed above, a reducing agent and a reducing substance that plays a role of other action may be used concurrently for adjustment so as to reduce two metal ions to constitute the alloy almost simultaneously. In this case, the substance that can play a role as a solvent or as a dispersant may be blended not only in the fluid which contains a reducing agent but also in the fluid which contains metal ions.

As mentioned above, the present invention is not limited to (A) a solid silver-copper alloy, (B) a solid silver-nickel alloy, (C) a solid gold-nickel alloy, and (D) a solid silver-antimony alloy, or to a solid metal alloy comprising at least three metals including a metal other than the metals to constitute these alloys, however in order to understand more specifically, each of these alloys will be explained in the order of (A) to (D).

(A) Solid Silver-Copper Alloy

Firstly, a silver-copper alloy which is one example of the embodiments of the present invention and a production method of it will be explained specifically.

Figure 10:
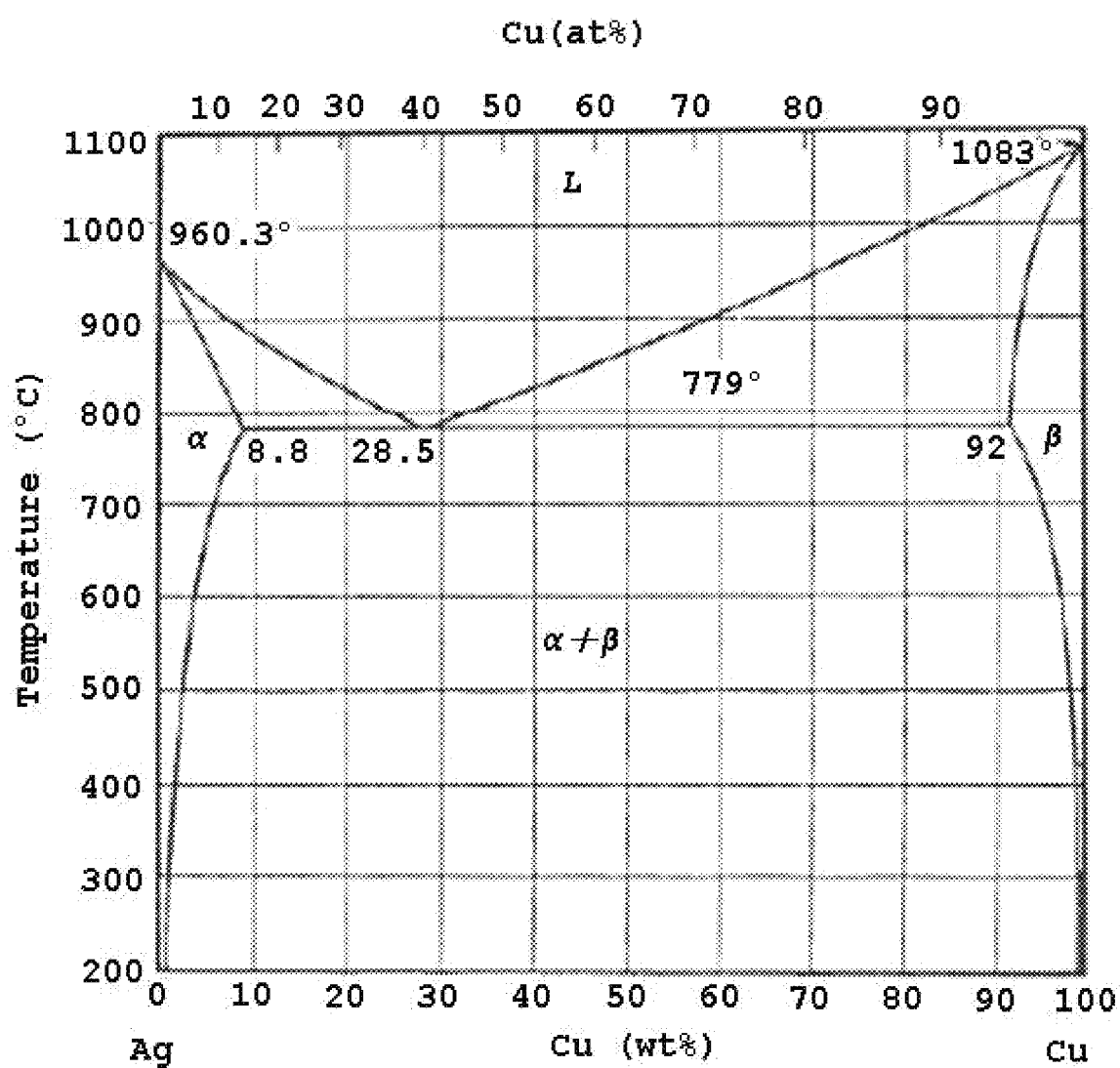

Silver-Copper Alloy Substantially not Containing Eutectic Body and Particles Thereof:

The silver-copper alloy of the present invention is the silver-copper alloy (AgCu alloy) which substantially does not contain the eutectic body. Especially, it is the solid silver-copper alloy whose ratio of silver to copper (weight ratio and mole ratio) is in the solid phase $\alpha+\beta$ region in the equilibrium diagram of the Ag—Cu alloy (as one example thereof, an equilibrium diagram of Ag—Cu alloy is shown in FIG. 10). Generally, silver and copper form the eutectic body in this region (the region in which copper concentration in the silver-copper alloy is in the range of 0.1 to 99.94% by weight); however, in the present invention, the silver-copper alloy comprises mainly the non-eutectic body structure not containing the eutectic body. Accordingly, the solid silver-copper alloy of the present invention is the solid silver-copper alloy in which concentration of copper contained in the silver-copper alloy is in the range of 0.1 to 99.94% by weight, preferably in the range of 0.5 to 99.5% by weight, or more preferably in the range of 1.0 to 99.00% by weight, and the said solid silver-copper alloy is the solid silver-copper alloy which has mainly the non-eutectic body structure not containing the eutectic body at room temperature. It is assumed that because of this, suppression of migration of silver, especially suppression of migration of a silver ion generated by ionization of silver is possible. The silver-copper alloy of the present invention is the silver-copper alloy which has mainly the non-eutectic body structure not containing the eutectic body; and in the present invention, the term "silver-copper alloy which has mainly the non-eutectic body structure" means that the silver-copper alloyhas the non-eutectic body structure with the amount thereof being preferably 65% or more by volume, or more preferably 80% or more by volume in the silver-copper alloy of the present invention. As to the non-eutectic body structure in the present invention, a solid solution, an amorphous form, and the like may be exemplified.

As mentioned above, the inventor of the present invention observed the silver-copper alloy of the present invention with various instruments at room temperature, and then identified that the silver-copper alloy of the present invention was the solid silver-copper alloy which had mainly the non-eutectic body structure not containing the eutectic body.

More specifically, it was confirmed that the silver-copper alloy was the silver-copper alloy which had mainly the non-eutectic body structure not containing the eutectic body under the state that the silver-copper alloy was placed in the environment of microscopic analysis (TEM-EDS analysis or STEM-EDS analysis) used in the later-mentioned Examples at room temperature with the irradiation of an electron beam having the acceleration voltage of 200 kV. During this operation, temperature of the sample itself to which the electron beam was irradiated was not controlled. In addition, as to the silver-copper alloy particles that had been subjected to these observations, the DSC measurements were carried out in the later-mentioned Examples (A2, A4, and A10); and it was confirmed that there were no changes in their states in the temperature range of room temperature to 180° C.

Figure 8:
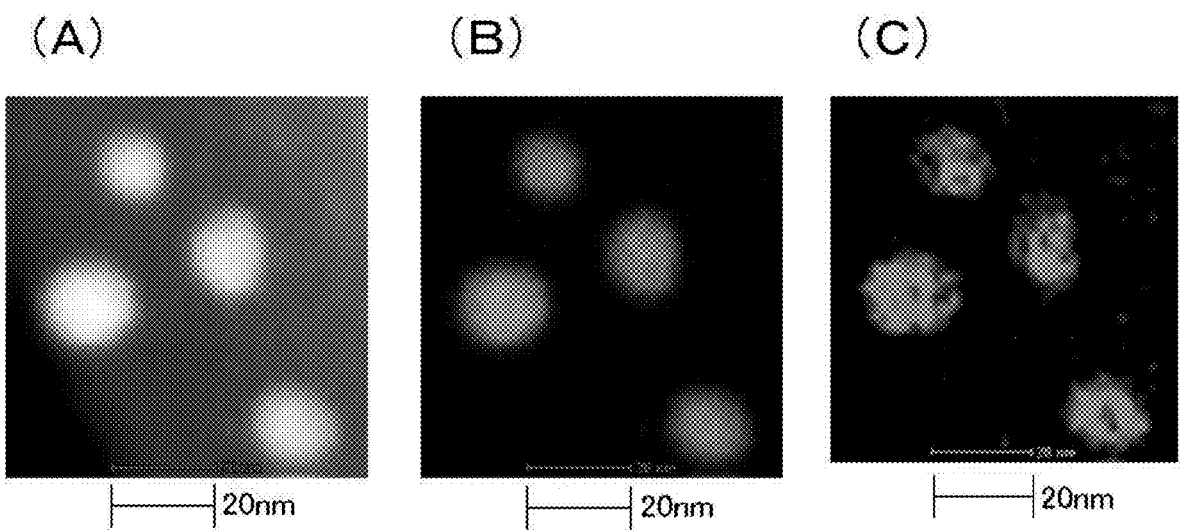
Figure 9:
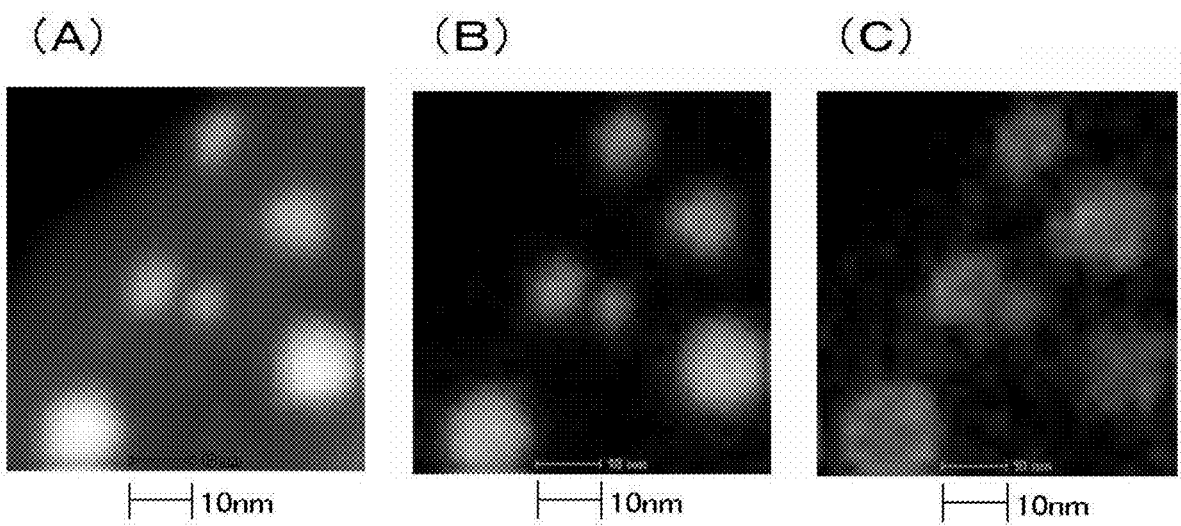

There is no particular restriction in the analysis method to measure the existence of the eutectic body in the silver-copper alloy; however, a microscopic analysis is preferable, especially an analytical method with which distribution state of silver and copper, and in addition, the weight ratio or the mole ratio of silver to copper can be analyzed in an extremely small area is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). Other methods may be used, too; but to demonstrate that the silver-copper alloy has the non-eutectic body structure not containing the eutectic body, spectroscopic analyses are preferable. As to the silver-copper alloy of the present invention which has mainly the non-eutectic body structure not containing the eutectic body, illustrative example thereof includes the silver-copper alloy particles such as those shown by the STEM-HAADF pictures shown in FIG. 7, FIG. 8, and FIG. 9 (FIG. 7(A), FIG. 8(A), and FIG. 9(A)) with the EDS mapping results of them (FIG. 7(B) and FIG. 7(c), FIG. 8 (B), and FIG. 8(C), and FIG. 9 (B) and FIG. 9 (C), wherein each (B) shows the mapping results of Ag, and each (C) shows the mapping results of Cu).

Figure 7:
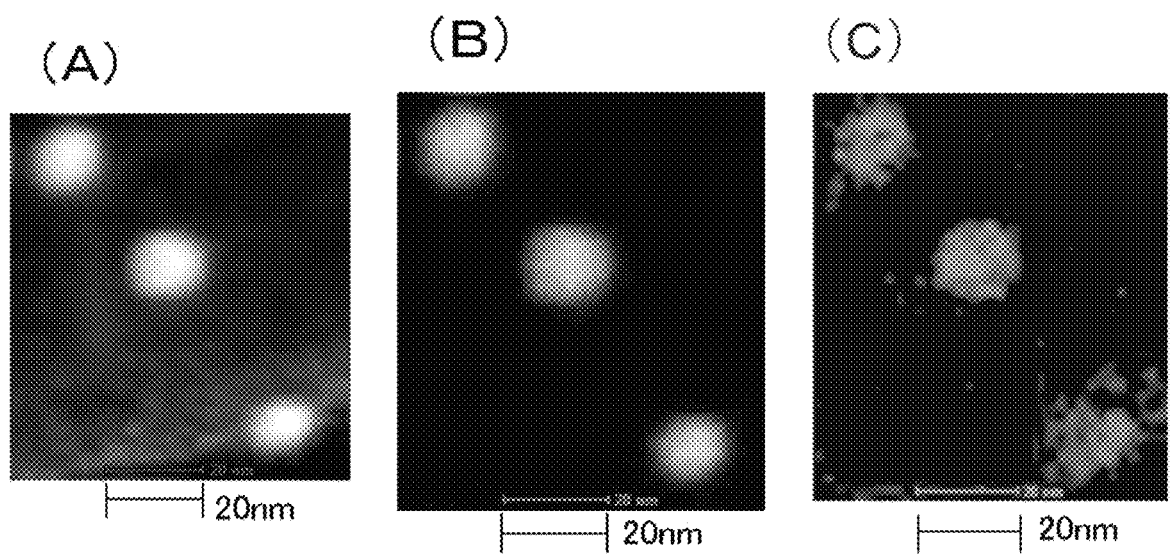

As to the silver-copper alloy particles shown in FIG. 7, ICP analysis result of the silver-copper alloy particle powders is Ag:Cu=85.5:14.5 (mole ratio); in other words, the concentration of copper contained in the silver-copper alloy is 9.1% by weight. As to the silver-copper alloy particles shown in FIG. 8, ICP analysis result of the silver-copper alloy particle powders is Ag:Cu=69.9:30.1 (mole ratio); in other words, the concentration of copper contained in the silver-copper alloy is 20.2% by weight. As to the silver-copper alloy particles shown in FIG. 9, ICP analysis result of the silver-copper alloy particle powders is Ag:Cu=95.0:5.0 (mole ratio); in other words, the concentration of copper contained in the silver-copper alloy is 3.0% by weight. In the silver-copper alloys mentioned above, it was not confirmed that silver and copper were clearly segregated in a single particle as can be seen in the respective EDS mapping results, even though ratios of silver to copper in entirety of the silver-copper alloy are in the solid phase $\alpha+\beta$ region in the equilibrium diagram of the Ag—Cu alloy; and in addition, the region of silver only or the region of copper only was not confirmed therein, nor was confirmed the particle of silver only or the particle of copper only.

In the silver-copper alloy of the present invention, as the result of analysis of mole ratios of silver to copper within the extremely small area by the beam diameter of 5 nm using TEM-EDS analysis, in 50% or more of the analysis points, the mole ratios of silver to copper are detected within ±30%, preferably within ±20%, more preferably within ±10% of the mole ratios of silver to copper obtained by the ICP analysis result.

Figure 16:
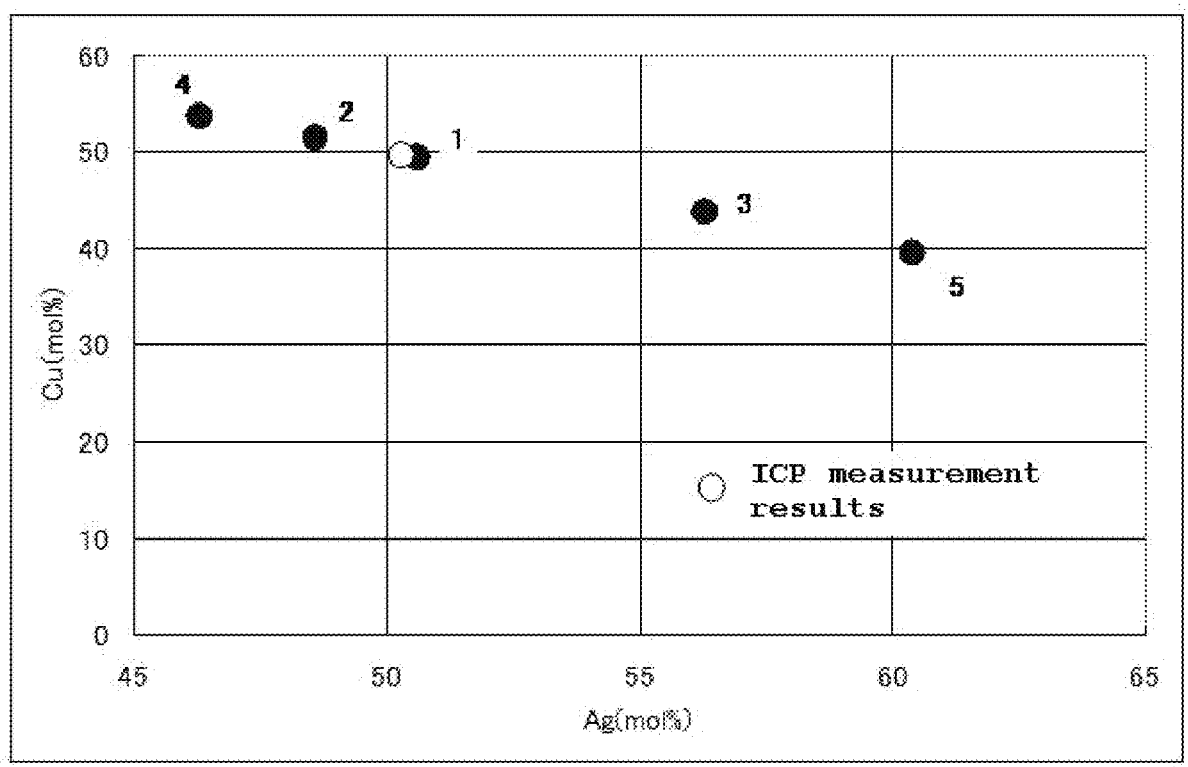

In FIG. 15, the HRTEM picture of the silver-copper alloy particle (Ag:Cu=50.3:49.7 (mole ratio)) and the TEM-EDS analysis points (5 points) by the beam diameter of 5 nm in this particle are shown; and in FIG. 16, the TEM-EDS analysis results measured in each analysis point shown in FIG. 15 are shown. As can be seen in the analysis results shown in FIG. 16, in 50% or more of the analysis points, the mole ratios of silver to copper in the TEM-EDS analysis are detected within ±30% of the mole ratios of silver to copper obtained by the ICP analysis result; and thus, this condition is satisfied.

If the silver-copper alloy particle had contained the eutectic body therein, the analysis points with 100% of Ag and 100% of Cu as well as many analysis points having the silver-copper ratios of the α-phase and the β-phase should have been detected. Therefore, it can be seen that the above-mentioned silver-copper metal alloy particle is the silver-copper alloy which does not contain the eutectic body.

In the silver-copper alloy of the present invention, as the result of analysis of mole ratios of silver to copper within the extremely small area by the beam diameter of 0.2 nm using STEM-EDS analysis, in 50% or more of the analysis points, the mole ratios of silver to copper are detected preferably within ±30% of the mole ratios of silver to copper obtained by the ICP analysis result. The 0.2-nm beam is nearly equal to the atomic radius of silver and of copper; however, in the actual observation, because informations of the depth direction and of the surrounding area are taken, it is possible to take informations substantially in the larger area than the atom size of silver and of copper. In FIG. 11, the HRTEM picture of the silver-copper alloy particle shown in FIG. 9 (Ag:Cu=95.0:5.0 (mole ratio)) and the STEM-EDS analysis points (4 points) by the beam diameter of 0.2 nm in this particle are shown; and in FIG. 12, the STEM-EDS analysis results measured at each analysis point shown in FIG. 11 are shown. As can be seen in the analysis results shown in FIG. 12, in 50% or more of the analysis points, the mole ratios of silver to copper in the STEM-EDS analysis are detected within ±30% of the mole ratios of silver to copper obtained by the ICP analysis result; and thus, this condition is satisfied. If the silver-copper alloy particle had contained the eutectic body therein, the analysis points with 100% of Ag or 100% of Cu as well as many analysis points having the silver-copper ratios of the α-phase and the β-phase should have been detected. Therefore, it can be seen that the above-mentioned silver-copper metal alloy particle is the silver-copper alloy which does not contain the eutectic body.

Figure 13:
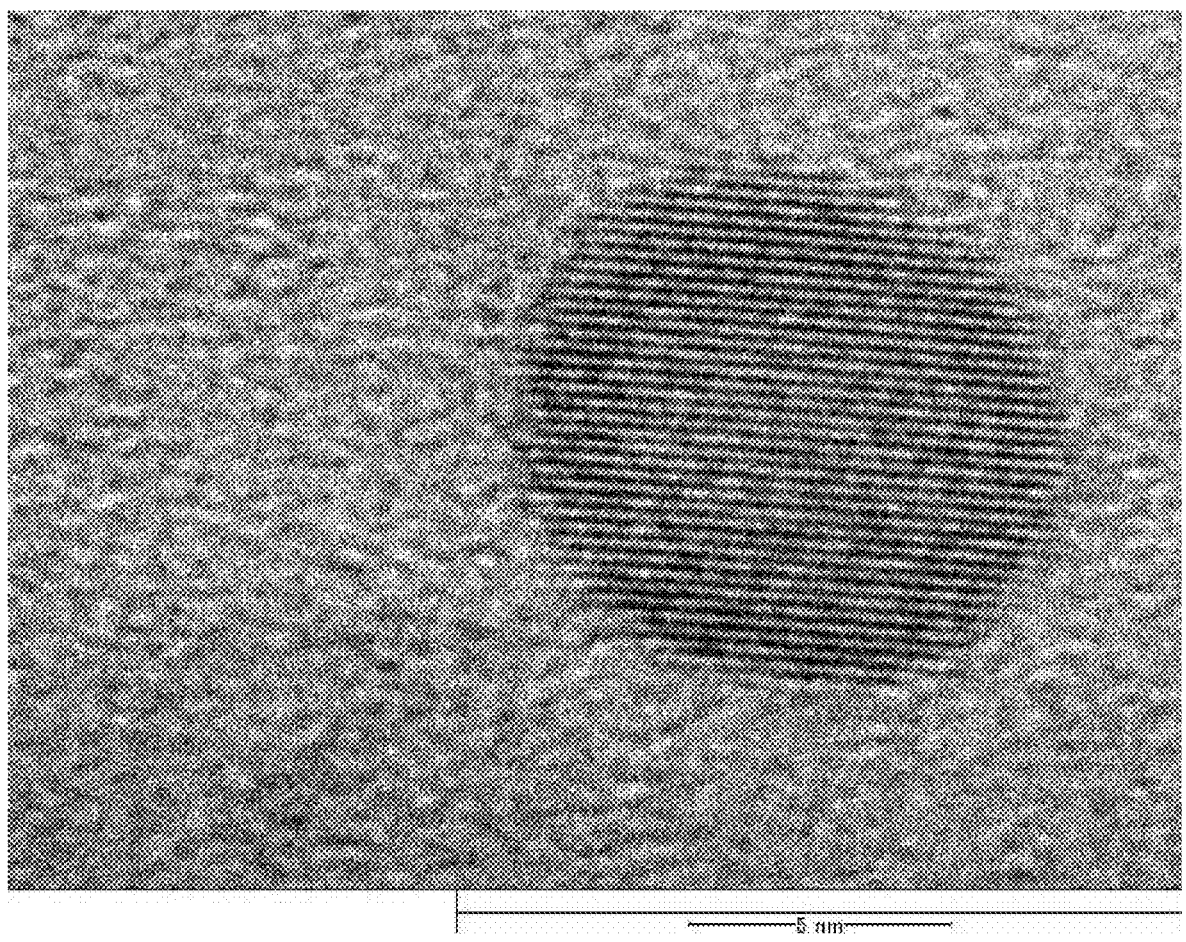

In addition, in the silver-copper alloy particle shown in FIG. 13 (Ag:Cu=50.3:49.7 (mole ratio); the copper concentration in the silver-copper alloy is 36.8% by weight), the lattice fringes (atomic arrays in crystal) are observed in one direction; and thus, it can be seen that the silver-copper alloy particle show in FIG. 13 does not have crystal grain boundary.

In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis. In addition, as the observation condition of TEM or STEM, the magnifications of them are preferably 250,000 or more, or more preferably 500,000 or more.

As to the EDS analysis method, determination of the analysis site is not particularly restricted regardless of whether it is single site or plural sites; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle.

The number of the EDS analysis sites is not particularly restricted; however, it is preferably 3 sites or more, more preferably 10 sites or more, or still more preferably 25 sites or more.

In the silver-copper alloy of the present invention, as the result of analysis of mole ratios of silver to copper within the extremely small area by the afore-mentioned beam diameters using the TEM-EDS analysis or the STEM-EDS analysis, in 50% or more, preferably in 65% or more, or more preferably 80% or more of the analysis points, the mole ratios of silver to copper are detected within ±30%, preferably within ±20%, or more preferably within ±10% of the mole ratios of silver to copper obtained by the ICP analysis result.

However, if the mole ratios exceed the range within ±30% of the mole ratios of silver to copper obtained by the ICP analysis result in 50% or more of the analysis points, the mole ratios of silver to copper in the analysis results of the extremely small area obtained by the TEM-EDS analysis or the STEM-EDS analysis are significantly different from the mole ratios of silver to copper obtained by the ICP analysis result; and thus, there is a possibility that the uniform silver-copper alloy may not be obtained.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.); and as the energy dispersive X-ray spectroscopy under observation with the scanning transmission electron microscope (STEM-EDS), the high resolution transmission electron microscope Titan 80-300 (manufactured by FEI Company) equipped with the r-TEM EDS detector (manufactured by AMETEK, Inc.), and the atomic resolution analytical electron microscope JEM-ARM 200F (manufactured by JEOL Ltd.) equipped with the energy dispersive X-ray analyzer Centurio (manufactured by JEOL Ltd.).

Ratio of Silver to Copper:

The ratio of silver to copper (mole ratio) contained in the silver-copper alloy of the present invention is not particularly restricted. Both the silver-copper alloy having higher mole ratio of silver and the silver-copper alloy having higher mole ratio of copper may be used. Meanwhile, in the present invention, regardless of mole ratio of silver to copper contained in the silver-copper alloy, all the alloys comprising silver and copper are described as the silver-copper alloy.

Particle Diameter of Silver-Copper Alloy:

In the silver-copper alloy of the present invention, the silver-copper alloy particle having particle diameter of 50 nm or less is preferable. More preferable is the silver-copper alloy having particle diameter of 25 nm or less; and still more preferable is the silver-copper alloy particle having particle diameter of 10 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the silver-copper alloys of the present invention including those silver-copper alloys shown in respective drawings, the particle diameters thereof were 50 nm or less in the obtained silver-copper alloy; and there existed even the silver-copper alloyparticles having the particle diameters of 25 nm or less as well as 10 nm or less.

In addition, the silver-copper alloy of the present invention is the silver-copper alloy particle not requiring heat-treatment by the dry process.

As is the case with many other alloys, the silver-copper alloy of the present invention may contain minute amount of impurities in a certain instance; and thus, in the present invention the silver-copper alloy may contain intentionally or unintentionally an element other than silver or copper. The element that can be intentionally contained therein may be exemplified by tin element. The ratio of the element like this is not particularly restricted; however, if the purpose thereof is for soldering, the range of tin:silver:copper is preferably 95.0 to 93.0:5.0 to 3.0:2.0 to 0.5 (mole ratio). Elements other than tin are not particularly restricted; and thus all elements may be mentioned, while illustrative example thereof includes gold, palladium, nickel, chromium, manganese, vanadium, iron, and molybdenum. If other metals are thought to be contained therein unintentionally as impurities, the ratio thereof is, though not particularly restricted, preferably less than 0.05% by weight, more preferably less than 0.02% by weight, or still more preferably less than 0.01%, relative to entirety of the silver-copper alloy.

Production Method 1 of Silver-Copper Alloy Particle: Overview

Method for producing the above-mentioned silver-copper alloy is not particularly restricted. Any of the method involving pyrolysis of a silver and a copper compound and the method involving reduction of a silver and a copper ion may be used; however, the production method of the silver-copper alloy particle in which a fluid which contains a silver ion and a copper ion is mixed with a fluid which contains a reducing agent thereby separating particles of the silver-copper alloy is preferable. Alternatively, the production method of the silver-copper alloy particle in which a fluid which contains a silver ion, a fluid which contains a copper ion, and a fluid which contains a reducing agent are mixed to separate particles of the silver-copper alloy may also be used. As to the fluid which contains a reducing agent, any of a fluid which contains one reducing agent and a fluid which contains at least two reducing agents may be used. If the fluid which contains at least two reducing agents is used as the fluid which contains a reducing agent, the separation times of silver and copper can be controlled so that silver and copper can be separated substantially simultaneously; and thus, there is an advantage that the separation can takes place so as to form the silver-copper alloy. If the fluid which contains only one reducing agent is used, it is thought that control of the separation times of silver and copper is difficult thereby tending to separate silver and copper as the respective single bodies; however, the present invention does not exclude the use of the fluid which contains only one reducing agent as the fluid which contains a reducing agent.

Alternatively, as the fluid which contains a reducing agent, two fluids comprising a first fluid which contains at least one reducing agent and a second fluid which contains at least one reducing agent that is different from the reducing agent used in the first fluid may also be used.

Production Method 2 of Silver-Copper Alloy Particle: A Fluid which Contains a Silver Ion and a Copper Ion, and a Fluid which Contains a Silver Ion and a Fluid which Contains a Copper Ion The fluid which contains a silver ion and a copper ion, or the fluid which contains a silver ion and the fluid which contains a copper ion are not particularly restricted; however, a solution containing a silver ion and a copper ion, or a solution containing a silver ion and a solution containing a copper ion are preferable. Illustrative example of the method to prepare them includes a method in which metal single body such as silver or copper is dissolved in hydrochloric acid, nitric acid, aqua regia, or the like, and a method in which a silver or a copper compound is dissolved in a solvent. In addition, the fluid which contains a silver ion and a copper ion may be obtained by dissolving a silver single body and/or a silver compound and a copper single body and/or a copper compound in a solvent all at once, or the fluid which contains a silver ion and a copper ion may be obtained by mixing a silver solution obtained by dissolving a silver single body and/or a silver compound in a solvent with a copper solution obtained by dissolving a copper single body and/or a copper compound in a solvent.

Compounds:

There are no restrictions as to the silver compound or the copper compound; and illustrative example thereof includes silver or copper in the form of salts, oxides, nitrides, carbides, complexes, organic salts, organic complexes, and organic compounds. There are no restrictions as to the silver salt or the copper salt; and illustrative example thereof includes nitrate salts, nitritesalts, sulfatesalts, sulfitesalts, formatesalts, acetate salts, phosphate salts, phosphite salts, phosphinate salts, chlorides, oxy salts, and acetyl acetonato salts. Illustrative example of the other compounds includes silver alkoxides and copper alkoxides.

Solvents:

The two metals and/or their compounds mentioned above are mixed, or preferably dissolved or molecular-dispersed, into a solvent, whereby a fluid which contains either one or both of the two metals may be prepared.

Solvents:

In the case of the silver-copper alloy, the fluid which contains a silver ion and a copper ion, or the fluid which contains a silver ion and the fluid which contains a copper ion may be prepared by mixing the silver single body and/or the silver compound and/or the copper single body and/or the copper compound with a solvent, or preferably by dissolving or molecular-dispersing these substances in a solvent. In addition, the silver single body and/or the silver compound and/or the copper single body and/or the copper compound may be used by arbitrarily selecting single body or plural bodies from them in accordance with an intended purpose. As the solvent to dissolve the silver single body and/or the silver compound and/or the copper single body and/or the copper compound, water, an organic solvent, or a mixture of them may be exemplified.

Illustrative example of the water includes a tap water, an ion-exchanged water, a purified water, a ultrapurified water, and a RO water; and illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxid compound solvent, a halogen compound solvent, an ester compound solvent, an ionic liquid, a carboxylic acid compound, and a sulfonic acid compound. These solvents each may be used solely or as a mixture of two or more of them.

Alternatively, a basic substance or an acidic substance may be used by mixing it with or dissolving it into the forgoing solvents Illustrative example of the basic substance includes metal hydroxides such as sodium hydroxide and potassium hydroxide, metal alkoxides such as sodium methoxide and sodium isopropoxide, and amine compounds such as triethylamine, 2-diethylaminoethanol, and diethylamine. Illustrative example of the acidic substance includes inorganic acids such as aqua regia, hydrochloric acid, nitric acid, fuming nitric acid, sulfuric acid, and fuming sulfuric acid; and organic acids such as formic acid, acetic acid, chloroacetic acid, dichloroacetic acid, oxalic acid, trifluoroacetic acid, and trichloroacetic acid. These basic substances or acidic substances may be respectively used solely or as a mixture with the solvents mentioned before.

Detailed Explanation of Solvents:

To explain the solvents mentioned above in more detail, illustrative example of the alcohol compound solvent includes methanol, ethanol, isopropanol, n-propanol, 1-methoxy-2-propanol, a linear alcohol such as n-butanol; branched alcohols such as 2-butanol and tert-butanol; polyalcohols such as ethylene glycol and diethylene glycol; and propylene glycol monomethyl ether. Illustrative example of the ketone compound solvent includes acetone, methyl ethyl ketone, and cyclohexanone. Illustrative example of the ether compound solvent includes dimethyl ether, diethyl ether, and tetrahydrofurane. Illustrative example of the aromatic compound solvent includes benzene, toluene, xylene, nitrobenzene, chlorobenzene, and dichlorobenzene. Illustrative example of the aliphatic compound solvent includes hexane. Illustrative example of the nitrile compound solvent includes acetonitrile. Illustrative example of the sulfoxide compound solvent includes dimethyl sulfoxide, diethyl sulfoxide, hexamethylene sulfoxide, and sulfolane. Illustrative example of the halogen compound solvent includes chloroform, dichloromethane, trichloroethylene, and iodoform. Illustrative example of the ester compound solvent includes ethyl acetate, butyl acetate, methyl lactate, ethyl lactate, and 2-(1-methoxy)propyl acetate. Illustrative example of the ionic liquid includes a salt between 1-butyl-3-methylimidazolium and PF6-(hexafluorophosphate ion). Illustrative example of the amide compound solvent includes N,N-dimethylformamide, 1-methyl-2-pyrrolidone, 2-pyrrolidinone, 1,3-dimethyl-2-imidazolidinone, epsilon-caprolactam, formamide, N-methylformamide, acetamide, N-methylacetamide, N,N-dimetnylacetamide, N-methylpropanamide, and hexamethylphosphoric triamide. Illustrative example of the carboxylic acid compound includes 2,2-dichloropropionic acid and squaric acid. Illustrative example of the sulfonic acid compound includes methanesulfonic acid, p-toluenesulfonic acid, chlorosulfonic acid, and trifluoromethanesulfonic acid.

Reducing Agents:

The reducing agent mentioned above is not particularly restricted; and thus, any reducing agent capable of reducing ions of the afore-mentioned two metals (in the case of silver-copper alloy, silver and/or copper) may be used.

As to one example of the case of silver-copper alloy thereof includes hydride reducing agents such as sodium borohydride and lithium borohydride; aldehydes such as formalin and acetaldehyde; sulfite salts; carboxylic acids and lactones such as formic acid, oxalic acid, succinic acid, citric acid, ascorbic acid, and salts of them; aliphatic monoalcohols such as ethanol, butanol, and octanol; alicyclic alcohol such as terpineol; aliphaticdiols such as ethylene glycol, propylene glycol, diethylene glycol, and dipropylene glycol; polyalcohols such as glycerin and trimethylolpropane; polyethers such as polyethylene glycol and polypropylene glycol; alkanol amines such as diethanol amine and monoethanol amine; and hydroquinone, resorcinol, aminophenol, glucose, sodium citrate, hypochlorous acid or its salts, transition metal ions (such as titanium ion and iron ion), hydrazines, and amines.

Reducing Agents: Hydrazines and Amines

In the present invention, at least one reducing agent selected from the above-mentioned reducing agents is used. It is preferable to use at least 2 reducing agents selected from the above-mentioned reducing agents in order to control the reduction rates of silver and copper, or to control the separating times of silver and copper. It is more preferable to use at least 2 reducing agents selected from hydrazines and amines; and still more preferably to use at least one kind selected from hydrazines and at least one kind selected from amines. There is no particular restriction as to the hydrazines; and illustrative example thereof includes hydrazine, hydrazine monohydrate, hydrazine carbonate, hydrazinium sulfate, phenyl hydrazine, 1-methyl-1-phenyl hydrazine, and 1, 1-diphenyl hydrazine hydrochloride salt. There is no particular restriction as to the amines; and illustrative example thereof includes compounds shown by the formulae $R^a NH_2$, $R^a R^b NH$, and $R^a R^b RCN$, or their salts (in the formulae, $R^a$, $R^b$, and $R^c$ represent the same group or different groups with each other, wherein $R^a$ and $R^b$ may optionally be bonded with each other to form a cyclic amino group together with the neighboring nitrogen atom). Illustrative example thereof includes triethylamine, triethanol amine, and dimethylamino ethanol.

By using at least 2 reducing agents, as mentioned above, the reduction rates of silver and copper, or the separating times of silver and copper may be controlled. The mechanism as to how it works has yet to be clarified; however, inventors of the present invention assume that if an attempt is made to reduce silver and copper which have different characteristics, especially silver and copper which have different standard electrode potentials ($Cu^{2+}+2e^- \Leftrightarrow Cu$: +0.337 V, and $Ag^+ +e^- \Leftrightarrow Ag$: +0.799 V) by a single reducing agent, nobler and more readily reducible silver tends to be reduced and separated faster than copper thereby tending to separate out as the silver single body and the copper single body respectively, or as an alloy which contains the eutectic body; however, if at least 2 reducing agents are used, facilitation of the rates of reduction and separation of copper, or retardation of the rates of reduction and separation of silver, or both of them may occur to give rise the effect to simultaneous separation of silver and copper. Accordingly, the silver-copper alloy of the present invention tends to have a non-eutectic body structure not containing an eutectic body readily; and as a result, uniform and homogenous silver-copper alloy particles as confirmed by the later-mentioned Examples can be produced by mixing a fluid which contains a silver ion and a copper ion with a fluid which contains a reducing agent by using the fluid processing apparatus described in Patent Document 5 to cause separation of the silver-copper alloy particles.

Fluid which Contains Reducing Agent:

The fluid which contains a reducing agent contains preferably at least one reducing agent mentioned above; and in addition, the reducing agent is preferably in the state of solution, or in the state of being dissolved or molecular dispersed by mixing with a solvent. There is no particular restriction as to the solvent. The solvents mentioned before may be used in accordance with the purpose. The fluid which contains the reducing agent may include the states such as dispersion solution and slurry solution at the time of execution thereof.

In addition, as the fluid which contains a reducing agent, as mentioned above, a fluid which contains at least two reducing agents may be used, or alternatively, two fluids comprising a first fluid which contains at least one reducing agent and a second fluid which contains at least one reducing agent that is different from the reducing agent used in the first fluid may also be used.

As to pH: The Each of the Fluid, and the Fluid after Mixing

In the present invention, pH of each of the fluids is not particularly restricted. It can be arbitrarily changed in accordance with mole ratio of two kinds of metals, particle diameter, crystallinity, and so force in the intended at least two kinds of metal alloy particle. Adjustment of pH of the fluid which contains two kinds of fluids or the fluid which contains a metal and the fluid which contains the other metal, and the fluid which contains a reducing agent may be executed by adding the afore-mentioned acidic substance or basic substance to the respective fluids; or pH may be changed by the metals, compound of them, or the reducing agent to be used, or by the respective concentrations.

As to pH: The Fluid which Contains Silver and Copper Ions or the Fluid which Contains Silver Ion and the Fluid which Contains Copper Ion, the Fluid which Contains Reducing Agent, and the Fluid after Mixing In addition, pH of the fluid after mixing the fluid which contains a silver ion and a copper ion, or the fluid which contains a silver ion and the fluid which contains a copper ion, with the fluid which contains a reducing agent is not particularly restricted; however, it is preferably in the range of 7 to 14, more preferably in the range of 8 to 13, or still more preferably in the range of 11 to 13. To be in more detail, if pH of the fluid after mixing the fluid which contains a silver ion and a copper ion, or the fluid which contains a silver ion and the fluid which contains a copper ion, with the fluid which contains a reducing agent is 7 or less, reduction of a silver ion or of a copper ion tends to be insufficient, and in addition, control of the reduction rates of silver and copper tends to be difficult. If pH of the fluid after the mixing is higher than 14, oxygen-containing compounds of silver and of copper, for example, hydroxides and oxides thereof tend to be produced readily. Especially pH of the fluid after the mixing is preferably in the range of 11 to 13, because within this range silver and copper in the produced silver-copper alloy particles tends to be highly uniform not only among respective plural particles but also within the individual particle. In addition, there is no particular restriction as to the method for adjustment of pH of the fluid after the mixing. The adjustment of pH may be executed by adjusting pH of each of the fluids or by changing flow rate of each fluid such that pH of the fluid after the mixing may fall in the above-mentioned pH range.

Meanwhile, in Examples, it was difficult to measure pH of the fluid immediately after mixing of the fluid which contains a silver ion and a copper ion with the fluid which contains a reducing agent; and thus, pH of the fluid discharged from between the processing surfaces 1 and 2 of the later-described fluid processing apparatus was measured.

Temperature:

There is no particular restriction as to the temperature of each of the fluids of the present invention. Similarly to pH, the respective temperatures can be arbitrarily changed in accordance with mole ratio of at least two kinds of metals, particle diameter, crystallinity, and so force in the intended at least two kinds of metal alloy particles.

Dispersant and so Forth:

In the present invention, various dispersing agents and surfactants may be used in accordance with the object and the necessity. Though not particularly restricted, various commercially available general surfactants and dispersing agents as well as a newly synthesized substance may be used.

Illustrative example thereof includes an anionic surfactant, a cationic surfactant, a nonionic surfactant, as well as a dispersing agent such as various kinds of polymers. These may be used singly or as a combination of two or more of them. Among the dispersants, some of them have a reducing property; and as the example of it, polyvinylpyrrolidone and n-octylamine may be mentioned.

The afore-mentioned surfactant and dispersant may be contained in any of fluids to be used in production of the metal alloy particles, i.e., in a fluid which contains the afore-mentioned two metal ions, in a fluid which contains one metal ion and in a fluid which contains other metal ion, and in a fluid which contains a reducing agent, or in plurality of these fluids to be used. Alternatively, the afore-mentioned surfactant and dispersant may be contained in a third fluid. Here, the third fluid means a fluid other than the fluid which contains the two metal ions, the fluid which contains one metal ion, the fluid which contains the other metal ion, and the fluid which contains the reducing agent. Especially in order to improve dispersibility, it is preferable that the dispersant and so forth be introduced in advance into at least one fluid selected from the fluid which contains the reducing agent, the fluid which contains the two metal ions, the fluid which contains one of the metals, and the fluid which contains the other metal.

(B) Solid Silver-Nickel Alloy

Next, a silver-nickel alloy which is one example of the embodiments of the present invention and a production method of it will be explained specifically.

Silver-Nickel Alloy, Silver-Nickel Alloy Substantially not Containing Eutectic Body, and Particle Thereof:

The silver-nickel alloy of the present invention is a silver-nickel alloy (AgNi alloy) substantially not containing a eutectic body. Here, the eutectic body means a body which contains a eutectic body texture. Specifically, it is the solid silver-nickel alloy in the ratio of silver to nickel (weight ratio and mole ratio) in the solid phase region in the equilibrium diagram of the Ag—Ni alloy (as one example, a general equilibrium diagram of the Ag—Ni alloy is shown in FIG. 30). Generally, silver and nickel do not mix together in this region (in the region in which nickel concentration contained in the silver-nickel alloy is more than 0% by weight); however, in the alloy of the present invention, they are homogenously mixed together even in this region, so that it is the silver-nickel alloy mainly comprising the non-eutectic body structure not containing the eutectic body. With this, high corrosion resistance to arc discharge may be expressed, and in addition, characteristics expected as the silver-nickel alloy, such as heat resistance, abrasion resistance, fusion resistance, catalysis performance, durability as an ignition plug, and so forth may be enhanced. The silver-nickel alloy of the present invention is the silver-nickel alloy mainly comprising the non-eutectic body structure not containing the eutectic body. In the present invention, the term "silver-nickel alloy comprising mainly the non-eutectic body structure" means that the silver-nickel alloy has the non-eutectic body structure with the amount thereof being 50% or more by volume in the silver-nickel alloy of the present invention. The non-eutectic body structure of the present invention may be exemplified by a solid solution, an amorphous form, and the like.

There is no particular restriction in the analysis method to measure the existence (quantity) of the eutectic body in the silver-nickel alloy; however, similar to the case of the silver-copper alloy mentioned-above, a microscopic analysis is preferable, especially an analytical method with which distribution state of silver and nickel, and the weight ratio or the mole ratio can be analyzed in an extremely small area is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). Other methods may be used, too; but to demonstrate that the silver-nickel alloy has the non-eutectic body structure not containing the eutectic body, spectroscopic analyses are preferable. As to the silver-nickel alloy of the present invention which has mainly the non-eutectic body structure not containing the eutectic body, illustrative example thereof includes the silver-nickel alloy particles such as those shown by the TEM pictures and STEM pictures shown in FIG. 31 to FIG. 33.

As to the silver-nickel alloy particles shown in FIG. 31, ICP analysis result of the silver-nickel alloy particle powders is Ag:Ni=50.3:49.7 (mole ratio); in other words, the concentration of nickel contained in the silver-nickel alloy is 35.0% by weight. As to the silver-nickel alloy particles shown in FIG. 32, ICP analysis result of the silver-nickel alloy particle powders is Ag:Ni=14.9:85.1 (mole ratio); in other words, the concentration of nickel contained in the silver-nickel alloy is 75.6% by weight. As to the silver-nickel alloy particles shown in FIG. 33, ICP analysis result of the silver-nickel alloy particle powders is Ag:Ni=84.9:15.1 (mole ratio); in other words, the concentration of nickel contained in the silver-nickel alloy is 8.8% by weight. The above-mentioned silver-nickel alloy is in all the ratios of silver to nickel in the region in which they are not mixed together in the Ag—Ni alloy equilibrium diagram, wherein the clear state in which silver and nickel each is eccentrically located in the same particle is not confirmed by the later-mentioned Examples; and neither the region of only silver nor the region of only nickel is confirmed. In FIG. 33, the STEM-EDS analysis points (4 points) by using a beam diameter of 0.2 nm in the silver-nickel alloy particle are shown; and in FIG. 34, the EDS analysis results obtained by analyzing at respective analysis points shown in FIG. 32 are shown. In the silver-nickel alloy of the present invention, as the result of the microregion analysis by the STEM-EDS analysis using the beam diameter of 0.2 nm, in 50% or more of the analysis points, the mole ratios of silver to nickel are detected preferably within ±30% of the mole ratios of silver to nickel obtained by the ICP analysis result; and then, from the analysis results shown in FIG. 34, in 50% or more of the analysis points, the mole ratios of silver to nickel by the STEM-EDS analysis are detected within ±30% of the mole ratios of silver to nickel obtained by the ICP analysis result, and thus, this condition is fulfilled. If the silver-nickel alloy particle contains the eutectic body, then many analysis points at which Ag is 100% or Ni is 100% should be detected. And thus, it can be seen that the above-mentioned silver-nickel alloy is the silver-nickel alloy not containing the eutectic body. Further, in FIG. 33, the TEM-EDS analysis points (4 points) by using a beam diameter of 5 nm in the silver-nickel alloy particle are shown; and in FIG. 35, the EDS analysis results obtained by measuring at respective analysis points shown in FIG. 33 are shown. In the silver-nickel alloy of the present invention, as the result of the microregion analysis by the TEM-EDS analysis using the beam diameter of 5 nm, in 50% or more of the analysis points, the mole ratios of silver to nickel are detected preferably within ±30% of the mole ratios of silver to nickel obtained by the ICP analysis result; and then, from the analysis results shown in FIG. 35, in 50% or more of the analysis points, the mole ratios of silver to nickel by the TEM-EDS analysis are detected within ±30% of the mole ratios of silver to nickel obtained by the ICP analysis result, and thus, this condition is fulfilled.

Analysis as described above in the present invention, it is preferable to be carried out in the region with diameter of 50 nm or less. In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis.

As to the EDS analysis method, determination of the analysis site is not particularly restricted; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle. In the present invention, it is more preferable that the method of EDS analysis be carried out at plural sites of a single particle.

The number of the EDS analysis sites is not particularly restricted; however, it is preferably 3 sites or more, more preferably 10 sites or more, or still more preferably 25 sites or more.

In the present invention, as the result of analysis within the extremely small area by the afore-mentioned beam diameters using the TEM-EDS analysis or the STEM-EDS analysis, in 50% or more, preferably in 65% or more, or more preferably 80% or more of plural sites of the analysis points, the mole ratios of silver to nickel are detected within ±30%, preferably within ±20%, or more preferably within ±10% of the mole ratios of silver to nickel obtained by the ICP analysis result.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.), and the high resolution transmission electron microscope Titan 80-300 (manufactured by FEI Company) equipped with the r-TEM EDS detector (manufactured by AMETEK, Inc.).

Ratio of Silver to Nickel:

The ratio of silver to nickel (mole ratio) contained in the silver-nickel alloy of the present invention is not particularly restricted. Both the silver-nickel alloy having higher mole ratio of silver and the silver-nickel alloy having higher mole ratio of nickel may be used. Meanwhile, in the present invention, regardless of mole ratio of silver to nickel contained in the silver-nickel alloy, all the alloys comprising silver and nickel are described as the silver-nickel alloy.

Particle Diameter of Silver-Nickel Alloy:

In the silver-nickel alloy of the present invention, the silver-nickel alloy particle having particle diameter of 50 nm or less is preferable. More preferable is the silver-nickel alloy having particle diameter of 25 nm or less; and still more preferable is the silver-nickel alloy particle having particle diameter of 10 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the silver-nickel alloys of the present invention including those silver-nickel alloys shown in respective drawings, the particle diameters thereof were 50 nm or less in all of the obtained silver-nickel alloy; and there existed even the silver-nickel alloy particles having the particle diameters of 25 nm or less as well as 10 nm or less.

As is the case with many other alloys, the silver-nickel alloy of the present invention may contain minute amount of impurities in a certain instance; and thus, in the present invention the silver-nickel alloy may contain intentionally or unintentionally an element other than silver or nickel.

Production Method 1 of Silver-Nickel Alloy Particle: Overview

Method for producing the above-mentioned silver-nickel alloy particle is not particularly restricted. Any of the method involving pyrolysis of a silver and a nickel compound and the method involving reduction of a silver and a nickel ion may be used; however, the production method of the silver-nickel alloy particle in which a fluid which contains a silver ion and a nickel ion is mixed with a fluid which contains a reducing agent thereby separating the silver-nickel alloy is preferable. In addition, in the method for producing the silver-nickel alloy particle in which a fluid which contains a silver ion and a nickel ion is mixed with a fluid which contains a reducing agent to separate the silver-nickel alloy particle, two fluids comprising a first reducing fluid which contains at least one reducing agent and a second reducing fluid which contains at least one reducing agent other than the reducing agent used in the first reducing fluid may be used as the fluid which contains the reducing agent. Alternatively, the method for producing the silver-nickel alloy particle may be executed by mixing a fluid which contains a silver ion, a fluid which contains a nickel ion, and a fluid which contains a reducing agent.

Production Method 2 of Silver-Nickel Alloy Particle: A Fluid which Contains a Silver Ion and a Nickel Ion, and a Fluid which Contains a Silver Ion and a Fluid which Contains a Nickel Ion The fluid which contains a silver ion and a nickel ion, or the fluid which contains a silver ion and the fluid which contains a nickel ion are not particularly restricted; however, a solution containing a silver ion and a nickel ion, or a solution containing a silver ion and a solution containing a nickel ion are preferable. Illustrative example of the method to prepare them includes a method in which metal single body such as silver or nickel is dissolved in hydrochloric acid, nitric acid, aqua regia, or the like, and a method in which a silver or a nickel compound is dissolved in a solvent. In addition, the fluid which contains a silver ion and a nickel ion may be obtained by dissolving a silver single body or a silver compound and a nickel single body or a nickel compound in a solvent all at once, or the fluid which contains a silver ion and a nickel ion may be obtained by mixing a silver solution obtained by dissolving a silver single body or a silver compound in a solvent with a nickel solution obtained by dissolving a nickel single body or a nickel compound in a solvent.

Compounds:

There are no restrictions as to the silver compound or the nickel compound; and illustrative example thereof includes silver or nickel in the form of salts, oxides, nitrides, carbides, complexes, organic salts, organic complexes, and organic compounds. There are no restrictions as to the silver salt or the nickel salt; and illustrative example thereof includes nitrate salts, nitritesalts, sulfatesalts, sulfitesalts, formate-salts, acetate salts, phosphate salts, phosphite salts, phosphinate salts, chlorides, oxy salts, and acetyl acetonato salts. Illustrative example of the other compounds includes silver alkoxides and nickel alkoxides.

Solvents and so forth to mix, preferably to dissolve or to molecular disperse the afore-mentioned two metals to constitute the alloy (in this case, silver and nickel), are the same as those previously explained in the silver-copper alloy, that is, more specifically, those explained in "Solvents", "Acidic substance and basic substance", "Detailed explanation of solvents", "Fluid containing reducing agent", "pH: Fluids of each fluid and fluid after mixing", "Temperature", and "Dispersants and so forth"); and thus, explanation thereof is omitted.

Reducing Agents:

Meanwhile, the reducing agents are somewhat different from the above, so that the entirety thereof is shown below. There is no particular restriction as to the reducing agent, so that any reducing agents capable of reducing a silver ion and/or a nickel ion may be used. Illustrative example thereof includes hydride reducing agents such as sodium borohydride and lithium borohydride; aldehydes such as formalin and acetaldehyde; sulfite salts; carboxylic acids and lactones such as formic acid, citric acid, oxalic acid, succinic acid, ascorbic acid, and salts of them; aliphatic monoalcohols such as ethanol, butanol, and octanol; alicyclic alcohol such as terpineol; aliphatic diols such as ethylene glycol, propylene glycol, diethylene glycol, and dipropylene glycol; polyalcohols such as glycerin and trimethylolpropane; polyethers such as polyethylene glycol and polypropylene glycol; alkanol amines such as diethanol amine and monoethanol amine; and hydroquinone, resorcinol, aminophenol, glucose, sodium citrate, hypochlorous acid or its salts, transition metal ions (such as titanium ion and iron ion), hydrazines, and amines such as triethylamine, triethanolamine, and dimethylamino ethanol.

Reducing Agents: Hydrazines

In the present invention, at least one reducing agent selected from the above-mentioned reducing agents is used. If two or more reducing agents selected from the above-mentioned reducing agents are used, it may be possible to control the reducing rates of silver and nickel, or the separating times of silver and nickel. It is preferable to use a hydrazine as the reducing agent. Illustrative example of the hydrazine includes hydrazine, hydrazine monohydrate, hydrazinium carbonate, hydrazinium sulfate, phenyl hydrazine, 1-methyl-1-phenyl hydrazine, and 1,1-diphenyl hydrazine hydrochloride salt.

For example, by using two or more reducing agents, as mentioned above, it may be possible to control the reducing rates of silver and nickel, or the separating times of silver and nickel. The mechanism as to how it works cannot be particularly restricted; however, it is thought that if an attempt is made to reduce silver and nickel which have different characteristics with each other, especially silver and nickel which have different standard electrode potentials ($Ni^{2+}+2e^- \Leftrightarrow Ni$: −0.228 V, and $Ag^+ e^- \Leftrightarrow Ag$: +0.799 V), by a single reducing agent, nobler and more readily reducible silver tends to be reduced and separated faster than nickel thereby tending to separate out as the silver single body and the nickel single body respectively, or as an inhomogeneous alloy; however, if two or more reducing agents are used, facilitation of the rates of reduction and separation of nickel, or retardation of the rates of reduction and separation of silver, or both of them may occur to give rise the effect to simultaneous separation of silver and nickel.

(B) Solid Gold-Nickel Alloy

Next, a gold-nickel alloy which is one example of the embodiments of the present invention and a method for preparing it will be explained specifically.

Solid Gold-Nickel Alloy Particle, Solid Solution Gold-Nickel Alloy Showing Finely Mixed State of Two Metals in the Level of Nanometers, and the Nanoparticle Thereof:

The solid gold-nickel alloy particle of the present invention is the gold-nickel alloy particle whose particle diameter is 500 nm or less, preferably the gold-nickel alloy particle whose particle diameter is 100 nm or less, or more preferably the gold-nickel alloy particle whose particle diameter is 50 nm or less.

Further, the solid gold-nickel alloy particle of the present invention is a nanoparticle mainly comprising the solid solution gold-nickel alloy (AuNi alloy) which shows the finely mixed state of the two metals, gold and nickel, in the level of nanometers, wherein nickel concentration in the gold-nickel alloy is in the range of 2.0 to 92.7% by weight, or preferably in the range of 3.0 to 90.0% by weight. A general Au—Ni alloy equilibrium diagram is shown in FIG. 38; generally, conventional alloys have the mixed state of the α-phase and the β-phase. In the present invention, the gold-nickel alloy is homogeneous even in this region, whereby the gold-nickel alloy comprises mainly the solid solution alloy which is made so as to show the finely mixed state of the two metals in the level of nanometers. With this, not only performance as a high-reliable electric contact material of electronic parts such as a connector, a small relay, and a printed wire board can be expressed, but also characteristics expected as the gold-nickel alloy, that is, heat resistance, abrasion resistance, catalysis performance, and so forth can be expressed. As discussed above, the gold-nickel alloy of the present invention is the gold-nickel alloy mainly comprising the solid solution alloy which is made so as to show the finely mixed state of the two metals in the level of nanometers. The solid solution alloy of the present invention which is made so as to show the finely mixed state of the two metals in the level of nanometers may also include an amorphous form thereof and the like.

The analysis method as to the homogeneity of gold and nickel in the gold-nickel alloy and as to whether or not the gold-nickel alloy mainly comprises the solid solution alloy which is made so as to show the finely mixed state of the two metals in the level of nanometers is not particularly restricted, though a microscopic analysis method is preferable; especially for analysis in an extremely small area, an analysis method by which the distribution state of gold and nickel as well as the weight ratio or the mole ratio thereof can be analyzed is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). Other methods may be used, too; but to demonstrate the homogeneity of gold and nickel in the gold-nickel alloy and whether or not the gold-nickel alloy mainly comprises the solid solution alloy which is made so as to show the finely mixed state of the two metals in the level of nanometers, a spectroscopic analysis is preferable. As to the gold-nickel alloy of the present invention which is the homogeneous gold-nickel alloy and comprises mainly the solid solution alloy which is made so as to show the finely mixed state of the two metals in the level of nanometers, the gold-nickel alloy particles shown by the TEM pictures and the STEM picture in FIG. 39, FIG. 40, and FIG. 41 may be exemplified.

As to the gold-nickel alloy particles shown in FIG. 39, the ICP analysis result of the gold-nickel alloy particle powders is Au:Ni=50.1:49.9 (mole ratio); in other words, the concentration of nickel contained in the gold-nickel alloy is 22.9% by weight. As to the gold-nickel alloy particles shown in FIG. 40, the ICP analysis result of the gold-nickel alloy particle powders is Au:Ni=14.9:85.1 (mole ratio); in other words, the concentration of nickel contained in the gold-nickel alloy is 63.0% by weight. As to the gold-nickel alloy particles shown in FIG. 41, the ICP analysis result of the gold-nickel alloy particle powders is Au:Ni=74.1:25.9 (mole ratio); in other words, the concentration of nickel contained in the gold-nickel alloy is 9.4% by weight. In the gold-nickel alloy particles mentioned above, it was not confirmed that gold and nickel each was clearly segregated in a single nanoparticle, even though all the ratios of gold to nickel were in the α+β region in the Au—Ni alloy equilibrium diagram (FIG. 4 (C1)); and in addition, the region of gold only or the region of nickel only could not be confirmed. In FIG. 40, the STEM-EDS analysis points (4 points) by using a beam diameter of 0.2 nm in the gold-nickel alloy particle are shown; and in FIG. 42, the EDS analysis results obtained by analyzing at respective analysis points shown in FIG. 40 are shown. In the gold-nickel alloy particle of the present invention, as the result of the microregion analysis by the STEM-EDS analysis using the beam diameter of 0.2 nm, in 50% or more of the analysis points, the mole ratios of gold to nickel are detected preferably within ±30% of the mole ratios of gold to nickel obtained by the ICP analysis result; and then, from the analysis results shown in FIG. 42, in 50% or more of the analysis points, the mole ratios of gold to nickel by the STEM-EDS analysis are detected within ±30% of the mole ratios of gold to nickel obtained by the ICP analysis result, and thus, this condition is fulfilled. If the gold-nickel alloy particle is inhomogeneous, or contains the portion of the alloy in which the solid solution was not made so as to show the finely mixed state of the two metals in the level of nanometers, then there should be many analysis points at which the ratios of gold to nickel in the gold-nickel alloy particles are the ratios of gold to nickel in α or β, respectively. And thus, it can be seen that the above-mentioned gold-nickel alloy particles are the homogeneous gold-nickel alloy and are the solid solution gold-nickel alloy which is made so as to show the finely mixed state of the two metals in the level of nanometers. Further, in FIG. 41, the TEM-EDS analysis points (5 points) by using a beam diameter of 5 nm in the gold-nickel alloy particle are shown; and in FIG. 43, the EDS analysis results obtained by analyzing at respective analysis points shown in FIG. 41 are shown. In the gold-nickel alloy of the present invention, as the result of analysis of the microregion analysis by the TEM-EDS analysis using the beam diameter of 5 nm, in 50% or more of the analysis points, the mole ratios of gold to nickel are detected within ±30%, preferably within ±20%, or more preferably ±10%, of the mole ratios of gold to nickel obtained by the ICP analysis result; and then, from the analysis results shown in FIG. 43, in 50% or more of the analysis points, the mole ratios of gold to nickel by the TEM-EDS analysis are detected within ±30% of the mole ratios of gold to nickel obtained by the ICP analysis result, and thus, this condition is fulfilled. In the present invention, the term "homogeneous gold-nickel alloy" means that this alloy is the gold-nickel alloy having the intended ratio of gold to nickel in the gold-nickel alloy; specifically, in a single gold-nickel alloy particle, the ratio of gold to nickel (mole ratio) obtained by the EDS analysis is within ±30% of the ratio of gold to nickel (mole ratio) obtained by the ICP analysis result, wherein the same results are obtained in plural gold-nickel alloy particles. And, the above-mentioned "homogeneous gold-nickel alloy" is the gold-nickel alloy in which gold and nickel are mixed homogeneously together.

As to the gold-nickel alloy nanoparticles shown in FIG. 39, the ICP analysis result of the gold-nickel alloy nanoparticle powders is Au:Ni=50.1:49.9 (mole ratio); in other words, the concentration of nickel contained in the gold-nickel alloy is 22.9% by weight. As to the gold-nickel alloy nanoparticles shown in FIG. 40, the ICP analysis result of the gold-nickel alloy particle powders is Au:Ni=14.9:85.1 (mole ratio); in other words, the concentration of nickel contained in the gold-nickel alloy is 63.0% by weight. As to the gold-nickel alloy nanoparticles shown in FIG. 41, the ICP analysis result of the gold-nickel alloy nanoparticle powders is Au:Ni=74.1:25.9 (mole ratio); in other words, the concentration of nickel contained in the gold-nickel alloy is 9.4% by weight. In the gold-nickel alloy nanoparticles mentioned above, it was not confirmed that gold and nickel each was clearly segregated in a single nanoparticle, even though all the ratios of gold to nickel were in the α+β region in the Au—Ni alloy equilibrium diagram (FIG. 4 (C1) and FIG. 38); and in addition, the region of gold only or the region of nickel only could not be confirmed. In FIG. 40, the STEM-EDS analysis points (4 points) by using a beam diameter of 0.2 nm in the gold-nickel alloy nanoparticle are shown; and in FIG. 42, the EDS analysis results obtained by analyzing at respective analysis points shown in FIG. 40 are shown. In the gold-nickel alloy nanoparticle of the present invention, as the result of the microregion analysis by the STEM-EDS analysis using the beam diameter of 0.2 nm, in 50% or more of the analysis points, the mole ratios of gold to nickel are detected within ±30%, preferably within ±20%, more preferably within ±10%, of the mole ratios of gold to nickel obtained by the ICP analysis result; and then, from the analysis results shown in FIG. 42, in 50% or more of the analysis points, the mole ratios of gold to nickel by the STEM-EDS analysis are detected within ±30% of the mole ratios of gold to nickel obtained by the ICP analysis result, and thus, this condition is fulfilled. If the gold-nickel alloy nanoparticle is inhomogeneous, or contains the portion of the alloy in which the solid solution was not made so as to show the finely mixed state of the two metals in the level of nanometers, then there should be many analysis points at which the ratios of gold to nickel in the gold-nickel alloy nanoparticles are the ratios of gold to nickel in α or β, respectively. And thus, it can be seen that the above-mentioned gold-nickel alloy nanoparticles are the homogeneous gold-nickel alloy and are the solid solution gold-nickel alloy which is made so as to show the finely mixed state of the two metals in the level of nanometers. Further, in FIG. 41, the TEM-EDS analysis points (5 points) by using a beam diameter of 5 nm in the gold-nickel alloy nanoparticle are shown; and in FIG. 43, the EDS analysis results obtained by analyzing at respective analysis points shown in FIG. 41 are shown. In the gold-nickel alloy of the present invention, as the result of analysis of the microregion analysis by the TEM-EDS analysis using the beam diameter of 5 nm, in 50% or more of the analysis points, the mole ratios of gold to nickel are detected preferably within ±30% of the mole ratios of gold to nickel obtained by the ICP analysis result; and then, from the analysis results shown in FIG. 43, in 50% or more of the analysis points, the mole ratios of gold to nickel by the TEM-EDS analysis are detected within ±30% of the mole ratios of gold to nickel obtained by the ICP analysis result, and thus, this condition is fulfilled. In the present invention, the term "homogeneous gold-nickel alloy" means that this alloy is the gold-nickel alloy having the intended ratio of gold to nickel in the gold-nickel alloy; specifically, in a single gold-nickel alloy nanoparticle, the ratio of gold to nickel (mole ratio) obtained by the EDS analysis is within ±30% of the ratio of gold to nickel (mole ratio) obtained by the ICP analysis result, wherein the same results are obtained in plural gold-nickel alloy nanoparticles. And, the above-mentioned "homogeneous gold-nickel alloy" is the gold-nickel alloy in which gold and nickel are mixed homogeneously together.

Analysis as described above in the present invention, it is preferable to be carried out in the range of diameter of 50 nm or less. In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis.

As to the EDS analysis method, determination of the analysis site is not particularly restricted regardless of whether it is single site or plural sites; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle. In the present invention, it is more preferable that the method of EDS analysis be carried out at plural sites of a single particle.

The number of the EDS analysis sites is not particularly restricted; however, it is preferably 3 sites or more, more preferably 10 sites or more, or still more preferably 25 sites or more.

In the present invention, as the result of analysis of the gold-nickel alloy nanoparticle within the extremely small area by the afore-mentioned beam diameters using the TEM-EDS analysis or the STEM-EDS analysis, in 50% or more, preferably in 65% or more, or more preferably 80% or more of plural sites of the analysis points, the mole ratios of gold to nickel are detected within ±30%, preferably within ±20%, or more preferably within ±10% of the mole ratios of gold to nickel obtained by the ICP analysis result.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.), and the high resolution transmission electron microscope Titan 80-300 (manufactured by FEI Company) equipped with the r-TEM EDS detector (manufactured by AMETEK, Inc.).

Ratio of Gold to Nickel:

The ratio of gold to nickel (mole ratio) contained in the gold-nickel alloy nanoparticle of the present invention is not particularly restricted. Both the gold-nickel alloy having higher mole ratio of gold and the gold-nickel alloy having higher mole ratio of nickel may be used. Meanwhile, in the present invention, regardless of mole ratio of gold to nickel contained in the gold-nickel alloy nanoparticle, all the alloys comprising gold and nickel are described as the gold-nickel alloy, and then the nanoparticle of gold-nickel alloy is described as the gold-nickel alloy nanoparticle.

Nanoparticle Diameter of Gold-Nickel Alloy:

In the gold-nickel alloy nanoparticle of the present invention, as mentioned above, the gold-nickel alloy nanoparticle having particle diameter of 500 nm or less is preferable. More preferable is the gold-nickel alloy nanoparticle having particle diameter of 100 nm or less; and still more preferable is the gold-nickel alloy nanoparticle having particle diameter of 50 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the gold-nickel alloys of the present invention including those gold-nickel alloys shown in respective drawings, the particle diameters thereof were 500 nm or less in the obtained gold-nickel alloy; and there existed even the gold-nickel alloy nanoparticles having the particle diameters of 100 nm or less as well as 50 nm or less.

Production Method 1 of Gold-Nickel Alloy Nanoparticle: Overview

Method for producing the above-mentioned gold-nickel alloy nanoparticle is not particularly restricted. Any of the method involving pyrolysis of a gold and a nickel compound and the method involving reduction of a gold and a nickel ion may be used; however, the production method of the gold-nickel alloy nanoparticle in which a fluid which contains a gold ion and a nickel ion is mixed with a fluid which contains a reducing agent thereby separating the gold-nickel alloy nanoparticle is preferable. Alternatively, the production method of the gold-nickel alloy nanoparticle in which a fluid which contains a gold ion, a fluid which contains a nickel ion, and a fluid which contains a reducing agent are mixed to separate nanoparticles of the gold-nickel alloy nanoparticle may also be used. As the fluid which contains the reducing agent, two fluids comprising a first reducing fluid which contains at least one reducing agent and a second reducing fluid which contains at least one reducing agent other than the reducing agent used in the first reducing fluid may be used.

Production Method 2 of Gold-Nickel Alloy Nanoparticle: A Fluid which Contains a Gold Ion and a Nickel Ion, and a Fluid which Contains a Gold Ion and a Fluid which Contains a Nickel Ion The fluid which contains a gold ion and a nickel ion, or the fluid which contains a gold ion and the fluid which contains a nickel ion are not particularly restricted; however, a solution containing a gold ion and a nickel ion, or a solution containing a gold ion and a solution containing a nickel ion are preferable. Illustrative example of the method to prepare them includes a method in which metal single body such as gold or nickel is dissolved in hydrochloric acid, nitric acid, aqua regia, or the like, and a method in which a gold or a nickel compound is dissolved in a solvent. In addition, the fluid which contains a gold ion and a nickel ion may be obtained by dissolving a gold single body and/or a gold compound and a nickel single body and/or a nickel compound in a solvent all at once, or the fluid which contains a gold ion and a nickel ion may be obtained by mixing a gold solution obtained by dissolving a gold single body and/or a gold compound in a solvent with a nickel solution obtained by dissolving a nickel single body and/or a nickel compound in a solvent.

Compounds:

There are no restrictions as to the gold compound or the nickel compound; and illustrative example thereof includes gold or nickel in the form of salts, oxides, nitrides, carbides, complexes, organic salts, organic complexes, and organic compounds. There are no restrictions as to the gold salt or the nickel salt; and illustrative example thereof includes nitrate salts, nitrite salts, sulfate salts, sulfitesalts, formate-salts, acetate salts, phosphate salts, phosphite salts, phosphinate salts, chlorides, oxy salts, and acetyl acetonato salts. Illustrative example of the other compounds includes gold alkoxides and nickel alkoxides.

Solvents and so forth to mix, preferably to dissolve or to molecular disperse the afore-mentioned two metals to constitute the alloy (in this case, gold and nickel), are the same as those previously explained in the silver-copper alloy, that is, more specifically, those explained in "Solvents", "Acidic substance and basic substance", "Detailed explanation of solvents", "Fluid containing reducing agent", "pH: Fluids of each fluid and fluid after mixing", "Temperature", and "Dispersants and so forth"); and thus, explanation thereof is omitted.

Reducing Agents:

Meanwhile, the reducing agents are somewhat different from the above, so that the entirety thereof is shown below. There is no particular restriction as to the reducing agent, so that any reducing agents capable of reducing a gold ion and/or a nickel ion may be used. Illustrative example thereof includes hydride reducing agents such as sodium borohydride and lithium borohydride; aldehydes such as formalin and acetaldehyde; sulfite salts; carboxylic acids and lactones such as formic acid, citric acid, oxalic acid, succinic acid, ascorbic acid, and salts of them; aliphatic monoalcohols such as ethanol, butanol, and octanol; alicyclic alcohol such as terpineol; aliphatic diols such as ethylene glycol, propylene glycol, diethylene glycol, and dipropylene glycol; polyalcohols such as glycerin and trimethylolpropane; polyethers such as polyethylene glycol and polypropylene glycol; alkanol amines such as diethanol amine and monoethanol amine; and hydroquinone, resorcinol, aminophenol, glucose, sodium citrate, hypochlorous acid or its salts, transition metal ions (such as titanium ion and iron ion), hydrazines, and amines such as triethylamine, triethanolamine, and diethylamino ethanol.

Reducing Agents: Hydrazines

In the present invention, at least one reducing agent selected from the above-mentioned reducing agents is used. If two or more reducing agents selected from the above-mentioned reducing agents are used, it may be possible to control the reducing rates of gold and nickel, or the separating times of gold and nickel. It is preferable to use a hydrazine as the reducing agent. Illustrative example of the hydrazine includes hydrazine, hydrazine monohydrate, hydrazinium carbonate, hydrazinium sulfate, phenyl hydrazine, 1-methyl-1-phenyl hydrazine, and 1,1-diphenyl hydrazine hydrochloride salt.

By using two or more reducing agents, as mentioned above, it may be possible to control the reducing rates of gold and nickel, or the separating times of gold and nickel. The mechanism as to how it works cannot be particularly restricted; however, it is thought that if an attempt is made to reduce gold and nickel which have different characteristics with each other, especially gold and nickel which have different standard electrode potentials ($Ni^{2+}+2e \Leftrightarrow Ni$: $-0.228$ E°/V, and $Au^{+}+e \Leftrightarrow Au$: $+1.68$ E°/V, or $[AuCl_4]^{+}+3e \Leftrightarrow Au+4Cl^{-}$:1.002 E°/V, or $[AuCl_2]^{-}+e \Leftrightarrow Au+2Cl^{-}$:1.154 E°/V), by a single reducing agent, nobler and more readily reducible gold tends to be reduced and separated faster than nickel thereby tending to separate out as the gold single body and the nickel single body respectively, or as an inhomogeneous alloy; however, if two or more reducing agents are used, facilitation of the rates of reduction and separation of nickel, or retardation of the rates of reduction and separation of gold, or both of them may occur to give rise the effect to simultaneous separation of gold and nickel.

(D) Solid Silver-Antimony Alloy

Next, a silver-antimony alloy which is one example of the embodiments of the present invention and a method for preparing it will be explained specifically.

Silver-Antimony Alloy, Silver-Antimony Alloy Substantially not Containing a Eutectic Body and an Intermetallic Compound, and Particle Thereof:

The silver-antimony alloy of the present invention is the silver-antimony alloy (AgSb alloy) substantially not containing a eutectic body and an intermetallic compound. Here, the term "eutectic body" means a body which has a eutectic body texture; and in the present invention, when an intermetallic compound is contained, this is sometimes expressed as "a eutectic body is included". A general Ag—Sb alloy equilibrium diagram is shown in FIG. 45 (source of FIG. 45: Non-Patent Document 1). In the Ag—Sb alloy equilibrium diagram, the region in which Sb concentration at 702.5° C. is less than 7.2% by atom (8.05% by weight) is the α solid solution phase mainly comprising silver, whereas the region in which Sb concentration is 8.05% or more by weight and less than 100% by weight is the region which contains the intermetallic compound ζ or ε, or a eutectic body. Generally, silver and antimony do not mix together in this region (antimony concentration contained in the silver-antimony alloy is 8.05% or more by weight and less than 100% by weight); however, in the present invention, even in this region, both are homogeneously mixed together, that is, this alloy is the silver-antimony alloy mainly comprising the non-eutectic body structure not containing the eutectic body and the intermetallic compound. In other words, this alloy is the silver-antimony alloy mainly comprising the solid solution silver-antimony alloy which is made so as to show the finely mixed state of the two metals in the level of nanometers by controlling the antimony concentration contained in the silver-antimony alloy.

The solid silver-antimony alloy of the present invention may be executed as the solid silver-antimony alloy, wherein the antimony concentration in the silver-antimony alloy is more than 8.05% by weight and less than 100% by weight, or preferably in the range of 9.0 to 95% by weight, thereby the said solid silver-antimony alloy is the silver-antimony alloy mainly comprising the non-eutectic body structure not containing the eutectic body and the intermetallic compound at room temperature.

By so doing, it is assumed that characteristics expected as the silver-antimony alloy, including abrasion resistance and performances as a recording medium, a low-temperature soldering material, a superconductive material, and an electrode material can be expressed. The silver-antimony alloy of the present invention is the silver-antimony alloy which has mainly the non-eutectic body structure not containing the eutectic body and the intermetallic compound; and in the present invention, the term "silver-antimony alloy which has mainly the non-eutectic body structure" means that the silver-antimony alloy has the non-eutectic body structure with the amount thereof being 65% or more by volume, or preferably 80% or more by volume in the silver-antimony alloy of the present invention. As to the non-eutectic body structure in the present invention, a solid solution, an amorphous form, and the like may be exemplified.

As mentioned above, the inventors of the present invention observed the silver-antimony alloy of the present invention by using various apparatus at room temperature, and then identified that the silver-antimony alloy of the present invention was the solid silver-antimony alloy which had mainly the non-eutectic body structure not containing the eutectic body and the intermetallic compound.

More specifically, it was confirmed that the silver-antimony alloy was the silver-antimony alloy which had mainly the non-eutectic body structure not containing the eutectic body under the state that the silver-antimony alloy particles were placed in the environment of the microscopic analysis (TEM-EDS analysis or STEM-EDS analysis) used in the later-mentioned Examples at room temperature with the irradiation of an electron beam at the acceleration voltage of 200 kV. During this operation, temperature of the sample itself to which the electron beam was irradiated was not controlled.

In addition, the silver-antimony alloy particles were placed in the environment of XRD measurement (X-ray diffractometry) used in the later-mentioned Examples at room temperature with the irradiation of an X-ray to measure the XRD, and then it was confirmed that this was the silver-antimony alloy not containing the intermetallic compound because there were no peaks derived from the intermetallic compound in the chart. During this operation, temperature of the sample itself to which the X-ray was irradiated was not controlled.

There is no particular restriction in the analysis method to measure the existence of the eutectic body and the intermetallic compound in the silver-antimony alloy; however, as to the analysis method with regard to the existence of the eutectic body in the silver-antimony alloy, a microscopic analysis is preferable, especially an analytical method with which distribution state of silver and antimony, and in addition, the weight ratio or the mole ratio can be analyzed in an extremely small area is preferable. Illustrative example thereof includes the energy dispersive X-ray spectroscopy under observation with the transmission electron microscope (TEM-EDS), the energy dispersive X-ray spectroscopy under observation with the scanning electron microscope (SEM-EDS), the high resolution TEM (HRTEM), the high-angle annular dark-field scanning transmission electron microscopy (HAADF-STEM), the element mapping method using the scanning transmission electron microscopy (STEM), the energy dispersive X-ray spectroscopy under observation with the scanning transmission electron microscope (STEM-EDS), and the electron energy loss spectroscopy (EELS). As to the analysis method with regard to presence of the intermetallic compound in the silver-antimony alloy, the XRD measurement, in addition to thermal analyses such as the simultaneous differential thermal analysis-thermal gravity measurement (TG-DTA) and the differential scanning calorimeter measurement (DSC), may be mentioned. Among others, the XRD measurement is preferable because qualitative and quantitative analyses including identification of the crystal phase of crystalline substance as well as evaluation of the ratio of the amorphous to the crystal are possible.

Other methods may be used, too; but to demonstrate that the silver-antimony alloy has the non-eutectic body structure not containing the eutectic body and the intermetallic compound, a combination of spectroscopic analyses and XRD measurements is preferable. As to the silver-antimony alloy of the present invention which has mainly the non-eutectic body structure not containing the eutectic body and the intermetallic compound, illustrative example thereof includes the silver-antimony alloy particles such as those shown by the TEM pictures and the STEM pictures shown in FIG. 46 to FIG. 48, and the STEM-HAADF pictures shown in FIG. 52 (A) with the EDS mapping results of them (FIG. 52(B) and FIG. 52(c), wherein (B) shows the mapping results of Ag, and (C) shows the mapping results of Cu).

As to the analysis method for obtaining the mole ratio of silver to antimony in the silver-antimony powders, there is no particular restriction, while it may be exemplified by the atomic absorption spectrometric analysis, the X-ray fluorescence elemental analysis, the inductively coupled plasma atomic emission spectrophotometry (hereinafter, abbreviated as ICP analysis), and the like. The ICP analysis is preferable because the mole ratio of silver to antimony can be quantitatively analyzed with high accuracy.

As to the silver-antimony alloy particles shown in FIG. 46, the ICP analysis result of the silver-antimony alloy particle powders is Ag:Sb=51.0:49.0 (mole ratio); in other words, the concentration of antimony contained in the silver-antimony alloy is 52.0% by weight. As to the silver-antimony alloy particles shown in FIG. 47, the ICP analysis result of the silver-antimony alloy particle powders is Ag:Sb=24.7:75.3 (mole ratio); in other words, the concentration of antimony contained in the silver-antimony alloy is 77.5% by weight. As to the silver-antimony alloy particles shown in FIG. 48 and FIG. 52, the ICP analysis result of the silver-antimony alloy particle powders is Ag:Sb=91.5:8.5 (mole ratio); in other words, the concentration of antimony contained in the silver-antimony alloy is 9.5% by weight. The above-mentioned silver-antimony alloy is in all the ratios of silver to antimony in the region which contains the eutectic body or the intermetallic compound in the Ag—Sb alloy equilibrium diagram, but the clear state in which silver and antimony each is eccentrically located in one particle is not confirmed by the TEM-EDS analysis or the STEM-EDS analysis; and neither the region of only silver nor the region of only antimony is confirmed. The same is clear from the EDS mapping results shown by FIGS. 52(B) and (C).

In FIG. 47, the STEM-EDS analysis points (4 points) by using a beam diameter of 0.2 nm in the silver-antimony alloy particle are shown; and in FIG. 49, the EDS analysis results obtained by analyzing at respective analysis points shown in FIG. 47 are shown. In the silver-antimony alloy of the present invention, as the result of the microregion analysis by the STEM-EDS analysis using the beam diameter of 0.2 nm, in 50% or more of the analysis points, the mole ratios of silver to antimony are detected within ±30%, preferably ±20%, more preferably ±10% of the mole ratios of silver to antimony obtained by the ICP analysis; and then, from the analysis results shown in FIG. 49, in 50% or more of the analysis points, the mole ratios of silver to antimony obtained by the STEM-EDS analysis are detected within ±30% of the mole ratios of silver to antimony obtained by the ICP analysis, and thus, this condition is fulfilled. The 0.2-nm beam diameter is nearly equal to the atomic radii of silver and antimony; however, in the actual observation, because informations of the depth direction and of the surrounding area are taken, it is possible to take informations substantially in the larger area than the atom sizes of silver and of antimony. If the silver-antimony alloy particle has contained the eutectic body therein, the analysis points with 100% of Ag or 100% of Sb as well as many analysis points having the ratios of silver to antimony of the α solid solution phase should have been detected. Therefore, it can be seen that the above-mentioned silver-antimony alloy particle is the silver-antimony alloy not containing the eutectic body.

Further, in FIG. 48, the TEM-EDS analysis points (4 points) by using a beam diameter of 5 nm in the silver-antimony alloy particle are shown; and in FIG. 50, the EDS analysis results obtained by analyzing at respective analysis points shown in FIG. 48 are shown. In the silver-antimony alloy of the present invention, as the result of the microregion analysis by the TEM-EDS analysis using the beam diameter of 5 nm, in 50% or more of the analysis points, the mole ratios of silver to antimony are detected within ±30% of the mole ratios of silver to antimony obtained by the ICP analysis; and then, from the analysis results shown in FIG. 50, in 50% or more of the analysis points, the mole ratios of silver to antimony obtained by the TEM-EDS analysis are detected within ±30% of the mole ratios of silver to antimony obtained by the ICP analysis, and thus, this condition is fulfilled. If the silver-antimony alloy particle has contained the eutectic body therein, the analysis points with 100% of Ag or 100% of Sb as well as many analysis points having the ratios of silver to antimony of the α solid solution phase should have been detected. Therefore, it can be seen that the above-mentioned silver-antimony alloy particle is the silver-antimony alloy not containing the eutectic body.

Analysis as described above in the present invention, it is preferable to be carried out in the range of diameter of 50 nm or less. In the present invention, the beam diameter of the EDS analysis (energy dispersive X-ray spectrometric analysis) is different depending on the capacity of the apparatus to be used; however, for example, it is preferably 25 nm, more preferably 10 nm, or still more preferably 5 nm. In addition, depending on the analysis apparatus, it is more preferably 0.5 nm, or still more preferably 0.2 nm. In the present invention, Examples were carried out by using the beam diameter of 5 nm in the case of the TEM-EDS analysis; and the beam diameter of 0.2 nm was used in the case of the STEM-EDS analysis. In addition, as the observation condition of TEM or STEM, the magnifications of them are preferably 250,000 or more, or more preferably 500,000 or more.

As to the EDS analysis method, determination of the analysis site is not particularly restricted regardless of whether it is single site or plural sites; however, plural sites are preferable. In the case that the object of the analysis is particle, the EDS analysis may be done as to each of plural particles, or the EDS analysis may be done as to the plural sites of a single particle. For example, in the case that the particle diameter is 5 nm and the EDS beam diameter is 5 nm, the EDS analysis may be done as to plural particles, or the EDS analysis may be done as to plural sites of a single particle by slightly changing the irradiation site of the beam in the EDS analysis. Alternatively, in the case that the particle diameter is 5 nm and the EDS beam diameter is 0.2 nm, the EDS analysis may be done as to plural sites of a single particle.

The number of the EDS analysis sites is not particularly restricted; however, it is preferably 3 sites or more, more preferably 10 sites or more, or still more preferably 25 sites or more.

In the silver-antimony alloy of the present invention, as the result of analysis of mole ratios of silver to antimony within the extremely small area analysis by the aforementioned beam diameters using the TEM-EDS analysis or the STEM-EDS analysis, in 50% or more, preferably in 65% or more, or more preferably 80% or more of the analysis points, the mole ratios of silver to antimony are detected within ±30%, preferably within ±20%, or more preferably within ±10% of the mole ratios of silver to antimony obtained by the ICP analysis result.

However, if the mole ratios exceed the range within ±30% of the mole ratios of silver to antimony obtained by the ICP analysis result in 50% or more of the analysis points, the mole ratios of silver to antimony in the analysis results of the extremely small area obtained by the TEM-EDS analysis or the STEM-EDS analysis are significantly different from the mole ratios of silver to antimony obtained by the ICP analysis result; and thus, there is a possibility that the uniform silver-antimony alloy may not be obtained.

There is no particular restriction as to the apparatus capable of carrying out the analyses as mentioned above. Illustrative example thereof includes, as the apparatus capable of carrying out the analysis by the energy dispersive X-ray spectroscopy under observation with the transmission electron microscope (TEM-EDS), the transmission electron microscope JEM-2100 (manufactured by JEOL Ltd.) equipped with the energy dispersive X-ray analyzer JED-2300 (manufactured by JEOL Ltd.); and as the energy dispersive X-ray spectroscopy under observation with the scanning transmission electron microscope (STEM-EDS), the high resolution transmission electron microscope Titan 80-300 (manufactured by FEI Company) equipped with the r-TEM EDS detector (manufactured by AMETEK, Inc.), and the atomic resolution analytical electron microscope JEM-ARM 200F (manufactured by JEOL Ltd.) equipped with the energy dispersive X-ray analyzer Centurio (manufactured by JEOL Ltd.).

Ratio of Silver to Antimony:

The ratio of silver to antimony (mole ratio) contained in the silver-antimony alloy of the present invention is not particularly restricted. Both the silver-antimony alloy having higher mole ratio of silver and the silver-antimony alloy having higher mole ratio of antimony may be used. Meanwhile, in the present invention, regardless of mole ratio of silver to antimony contained in the silver-antimony alloy, all the alloys comprising silver and antimony are described as the silver-antimony alloy.

Particle Diameter of Silver-Antimony Alloy:

In the silver-antimony alloy of the present invention, the silver-antimony alloy particle having particle diameter of 50 nm or less is preferable. More preferable is the silver-antimony alloy having particle diameter of 25 nm or less; and still more preferable is the silver-antimony alloy particle having particle diameter of 10 nm or less. This is because the particle whose particle size is in the order of nanometer shows unique physical characteristics such as lowered melting point and lowered sintering temperature due to the quantum size effect thereof. For example, as the progress of nanotechnology in recent years, as the material to form a circuit on a plastic substrate by the coating and burning process, an electrically conductive paste and the like for formation of an electronic circuit by using nanoparticles are wanted; and the unique physical characteristics mentioned above may satisfy such needs among others. In the silver-antimony alloys of the present invention including those silver-antimony alloy particles shown in respective drawings, the particle diameters thereof were 50 nm or less in the obtained silver-antimony alloy particles; and there existed even the silver-antimony alloy particles having the particle diameters of 25 nm or less as well as 10 nm or less. However, in the present invention, the silver-antimony with the particle diameter of 50 nm or more shall not be excluded.

When the solid silver-antimony alloy particles are applied on a substrate including the afore-mentioned plastic substrate followed by solidification thereof, a homogeneous silver-antimony alloy film may be formed.

In addition, when the silver-antimony alloy particles are collected and solidified, a homogeneous solid may be formed.

As is the case with many other alloys, the silver-antimony alloy of the present invention may contain minute amount of impurities in a certain instance; and thus, in the present invention of the silver-antimony alloy may contain intentionally or unintentionally an element other than silver or antimony. The element that can be intentionally contained therein may be exemplified by tin element. It is not particularly restricted to intentionally contain the element, and thus all elements may be mentioned, while illustrative example thereof includes gold, palladium, nickel, chromium, manganese, vanadium, iron, molybdenum, tin, and cobalt. If other metals are thought to be contained therein unintentionally as impurities, the ratio thereof is, though not particularly restricted, preferably less than 0.05% by weight, more preferably less than 0.02% by weight, or still more preferably less than 0.01%, relative to entirety of the silver-antimony alloy.

Production Method 1 of Silver-Antimony Alloy Particle: Overview

Method for producing the above-mentioned silver-antimony alloy is not particularly restricted. Any of the method involving pyrolysis of a silver and an antimony compound and the method involving reduction of a silver and a antimony ion may be used; however, the production method in which a fluid which contains a silver ion and an antimony ion is mixed with a fluid which contains a reducing agent thereby separating particles of the silver-antimony alloy is preferable. Alternatively, the production method in which a fluid which contains a silver ion, a fluid which contains an antimony ion, and a fluid which contains a reducing agent are mixed to separate particles of the silver-antimony alloy may also be used. As the fluid which contains a reducing agent, two fluids comprising a first fluid which contains at least one reducing agent and a second fluid which contains at least one reducing agent that is different from the reducing agent used in the first fluid may also be used.

Production Method 2 of Silver-Antimony Alloy Particle: A Fluid which Contains a Silver Ion and an Antimony Ion, and a Fluid which Contains a Silver Ion and a Fluid which Contains an Antimony Ion The fluid which contains a silver ion and an antimony ion, or the fluid which contains a silver ion and the fluid which contains an antimony ion are not particularly restricted; however, a solution containing a silver ion and an antimony ion, or a solution containing a silver ion and a solution containing an antimony ion are preferable. Illustrative example of the method to prepare them includes a method in which metal single body such as silver or antimony is dissolved in hydrochloric acid, nitric acid, aqua regia, or the like, and a method in which a silver or an antimony compound is dissolved in a solvent. In addition, the fluid which contains a silver ion and an antimony ion may be obtained by dissolving a silver single body and/or a silver compound and an antimony single body and/or an antimony compound in a solvent all at once, or the fluid which contains a silver ion and an antimony ion may be obtained by mixing a silver solution obtained by dissolving a silver single body and/or a silver compound in a solvent with an antimony solution obtained by dissolving an antimony single body and/or an antimony compound in a solvent.

Compounds:

There are no restrictions as to the silver compound or the antimony compound; and illustrative example thereof includes silver or antimony in the form of salts, oxides, nitrides, carbides, complexes, organic salts, organic complexes, and organic compounds. There are no restrictions as to the silver salt or the antimony salt; and illustrative example thereof includes nitrate salts, nitrite salts, sulfate salts, sulfite salts, formate salts, acetate salts, phosphate salts, phosphite salts, phosphinate salts, chlorides, oxy salts, and acetyl acetonato salts. Illustrative example of the other compounds includes silver alkoxides and antimony alkoxides.

Solvents and so forth to mix, preferably to dissolve or to molecular disperse the afore-mentioned two metals to constitute the alloy (in this case, silver and antimony), are the same as those previously explained in the silver-copper alloy, that is, more specifically, those explained in "Solvents", "Acidic substance and basic substance", "Detailed explanation of solvents", "Fluid containing reducing agent", "pH: Fluids of each fluid and fluid after mixing", "Temperature", and "Dispersants and so forth"); and thus, explanation thereof is omitted.

Reducing Agents:

Meanwhile, the reducing agents are somewhat different from the above, so that the entirety thereof is shown below. There is no particular restriction as to the reducing agent, so that any reducing agents capable of reducing a silver ion and/or an antimony ion may be used. Illustrative example thereof includes hydride reducing agents such as sodium borohydride and lithium borohydride; aldehydes such as formaldehyde and acetaldehyde; sulfite salts; carboxylic acids and lactones such as formic acid, citric acid, oxalic acid, succinic acid, ascorbic acid, and salts of them; aliphatic monoalcohols such as ethanol, butanol, and octanol; alicyclic alcohol such as terpineol; aliphatic diols such as ethylene glycol, propylene glycol, diethylene glycol, and dipropylene glycol; polyalcohols such as glycerin and trimethylolpropane; polyethers such as polyethylene glycol and polypropylene glycol; amines such as diethanol amine and monoethanol amine, triethanol amine, dimethylamino ethanol, triethylamine; and hydroquinone, resorcinol, aminophenol, glucose, hypochlorous acid or its salts, transition metal ions (such as titanium ion and iron ion), hydrazines such as hydrazine, hydrazine monohydrate, hydrazine carbonate, hydrazinium sulfate, phenyl hydrazine, 1-methyl-1-phenyl hydrazine, and 1,1-diphenyl hydrazine hydrochloride salt.

In the present invention, of the reducing agents mentioned above, at least one reducing agent is used. For this, in view of reduction susceptibility of silver and antimony, it is preferable to select a hydride reducing agent for use therein.

In addition, if two or more reducing agents are used, it may be possible to control the reduction rates of silver and antimony or separation times of silver and antimony. The mechanism as to how it works cannot be particularly restricted; however, the applicant of the present invention thinks that if an attempt is made to reduce silver and antimony which have different characteristics with each other, especially silver and antimony which have different standard electrode potentials ($Sb^{3+}+3e^- \Leftrightarrow Sb$:+0.21 V, and $Ag^++e^- \Leftrightarrow Ag$: +0.799 V), by a single reducing agent, nobler and more readily reducible silver tends to be reduced and separated faster than antimony thereby tending to separate out as the silver single body and the antimony single body respectively, or as an inhomogeneous alloy; however, if two or more reducing agents are used, facilitation of the rates of reduction and separation of antimony, or retardation of the rates of reduction and separation of silver, or both of them may occur to give rise the effect to simultaneous separation of silver and antimony. If two or more of the reducing agents mentioned above are used, at least one of them is preferably a hydride reducing agent to be selected and used.

Fluid Processing Apparatus:

In the present invention, it is preferable that the fluid which contains the two kinds of metal ions be mixed with the fluid which contains a reducing agent in a thin film fluid formed between processing surfaces which are disposed in a position they are faced with each other so as to be able to approach to and separate from each other, at least one of which rotates relative to the other, whereby separating the intended alloy particles; and it is preferable that the mixing be carried out by using the fluid-processing apparatus described in Patent Document 5 filed by the present applicant to separate the intended alloy particles.

In conventional production methods, there were tendencies to form a metal alloy which contains a mixture of a eutectic body or an intermetallic compound of at least two metals and a solid solution of at least two metals; however, in the present invention, by using the fluid processing apparatus shown below and by obtaining the mixed state of the specific region of the solid phase, it became possible to obtain the metal alloy particle mainly comprising the non-eutectic body structure not containing the eutectic body and the intermetallic body of the at least two metals or the solid solution alloy particle which is made so as to show the finely mixed state of the at least two metals in the level of nanometers. Applicant of the present invention considers the reason for this as following: because the reducing reactions of the at least two metals could be controlled in an atomic level, the alloy of the at least two metals could realize a homogeneous mixing state thereof in an atomic level.

However, preparation of the solid metal alloy particle by the fluid processing apparatus discussed later represents one example, so that any method may be used provided that the reducing reactions of at least two metals can be controlled in an atomic level.

Hereunder, embodiments of the fluid processing apparatus will be explained by using the drawings.

Explanation of Fluid Processing Apparatus

Figure 2:
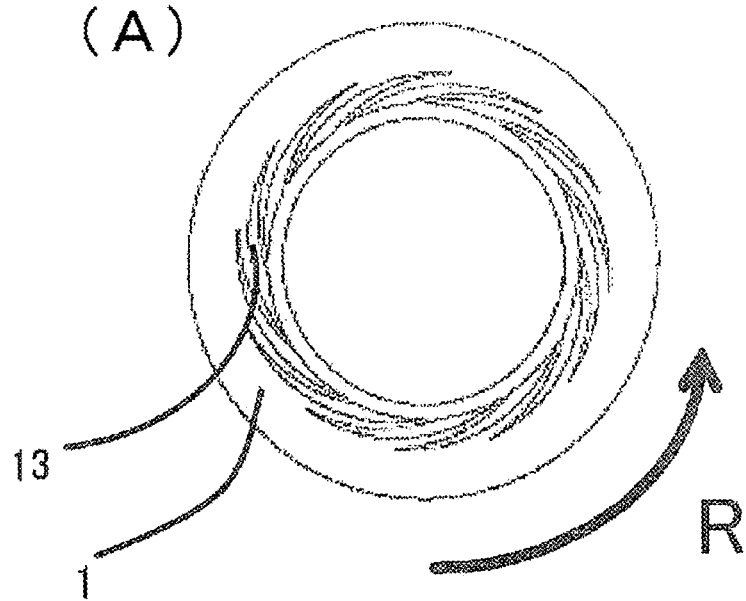
Figure 2:
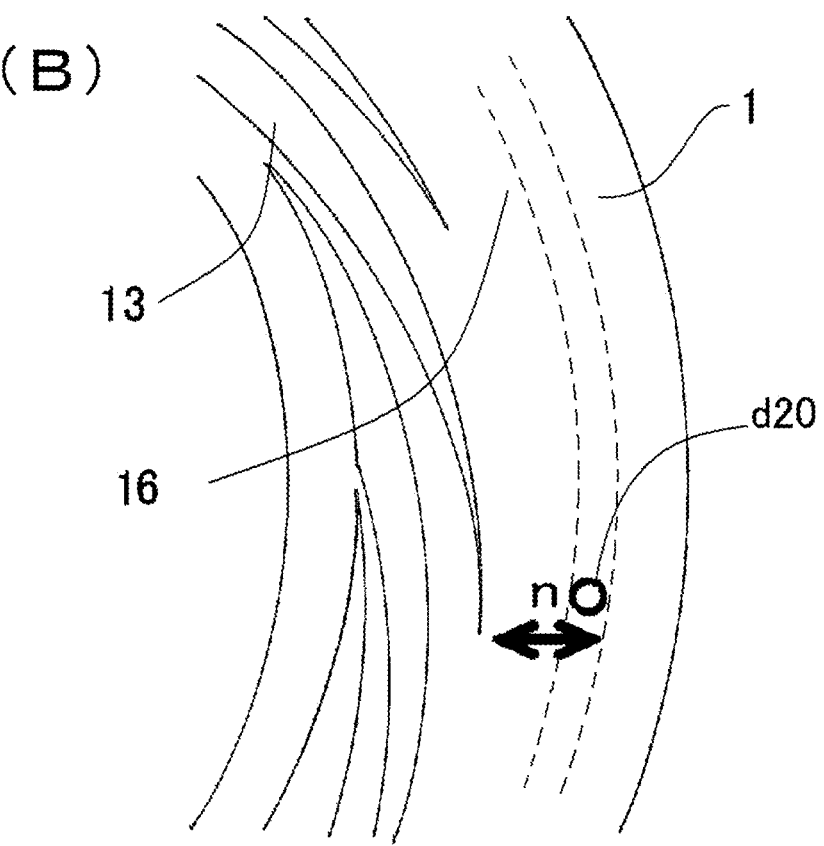
Figure 3:
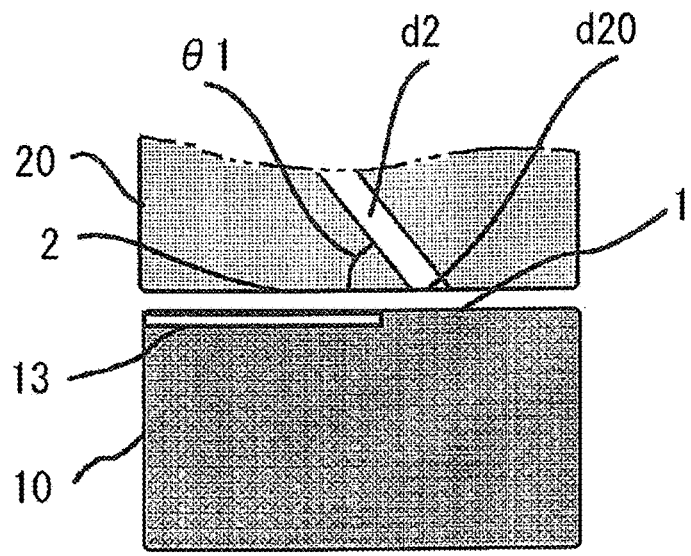
Figure 3:
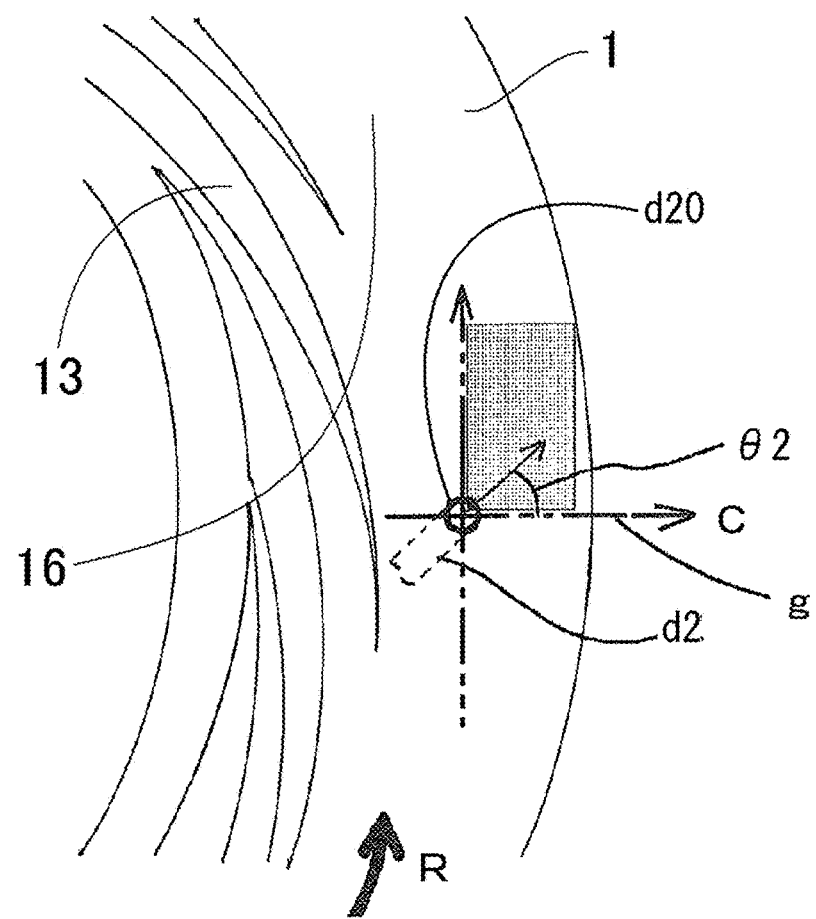

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process (ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also carbon, ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P=P1 \times (K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 10 and 20.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. The shape of the opening part d20 may be circular as shown by solid lines in FIG. 2(B) and FIG. 3(B), or a concentric circular ring of annular shape surrounding the opening in the center of the processing surface 2 having the ring disk shape as shown by dotted lines in FIG. 2(B).

If the opening part d20 having an annular shape is arranged so as to be concentric circular ring surrounding the opening in the center of the processing surface 2, the second fluid to be introduced into between the processing surfaces 1 and 2 can be introduced to a wide range in the circumferential direction with the same condition; and thus, the fluid processing, including diffusion, reaction, and separation, can be done more uniformly. In order to produce large quantities of fine particles, the opening part d20 is preferably in the shape of annular shape, while it is not necessary that the opening part d20 having an annular shape be arranged so as to be concentric circular ring surrounding the opening in the center of the processing surface 2. If the opening part having the annular shape is used, the said opening part having the annular shape may be continuous or discontinuous.

This second introduction part d2 may have directionality. For example, as shown in FIG. 3(A), the direction of introduction from the opening d20 of the second processing surface 2 is inclined at a predetermined elevation angle ($\theta1$) relative to the second processing surface 2. The elevation angle ($\theta1$) is set at more than 0° and less than 90°, and when the reaction speed is high, the angle ($\theta1$) is preferably set in the range of 10 to 450.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta2$) exists facing the rotation direction R from a reference line g, which is the line to the outward direction and in the radial direction passing through the opening d20. This angle ($\theta2$) is also set preferably at more than 0° and less than 90°

This angle ($\theta2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

In the above-mentioned apparatus, a treatment such as separation/precipitation and crystallization is effected while being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, one example of specific embodiment of the production method of the silver-copper alloy particles by using the above-mentioned apparatus will be explained.

The separation reaction of the silver-copper alloy particles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains the silver ion and copper ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the silver-copper alloy particle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

It is said that the migration of silver is the phenomenon in which silver is ionized to give a silver ion, which then reacts with a hydroxide ion ($OH^-$) contained in water to give silver hydroxide; and this reversible reaction is repeated while moving in the solid body to be separated and segregated as silver. However, by using the apparatus described above, fine crystalline particles without a lattice defect can be obtained in the silver-copper alloy; and thus, it is advantageous that the silver-copper alloy particle having the migration suppressed more than before can be obtained.

Meanwhile, in the observation with an electron microscope (TEM) in each of Examples of the present invention, there was no clear lattice defect thereof confirmed.

As mentioned before, the processing apparatus may be provided with, in addition to the first introduction part d1 and the second introduction part d2, the third introduction part d3; and in this case, for example, each of the fluids which contains a silver ion as the first fluid, the fluid which contains a copper ion as the second, and the fluid which contains a reducing agent as the third may be introduced into the apparatus. By so doing, concentration and pressure of each fluid can be controlled separately so that the separation reaction of the silver-copper alloy particles may be controlled more precisely. Similarly, the processing apparatus may be provided with, in addition to the first introduction part d1, the second introduction part d2, the third introduction part d3, and the fourth introduction part d4; and in this case, for example, each of the fluids which contains a silver ion as the first fluid, the fluid which contains a copper ion as the second fluid, the fluid which is the first reducing fluid containing at least one reducing agent as the third fluid, and the fluid which is the second reducing fluid containing at least one reducing agent different from the reducing agent used in the first reducing fluid as the fourth fluid may be introduced into the apparatus. By so doing, concentration and pressure of each solution can be controlled separately so that the separation reaction and stabilization of particle diameter of the microparticles may be controlled more precisely. Meanwhile, a combination of the fluids to be processed (first to fourth fluids) that are introduced into the respective introduction parts may be set arbitrarily. The same is applied if the fifth or more introduction parts are arranged; and by so doing, fluids to be introduced into the processing apparatus may be subdivided. In this case, it is preferable that the fluid which contains a silver ion and the fluid which contains a copper ion be joined together before joining with the fluid which contains a reducing agent; and it is also preferable that the first reducing fluid and the second reducing fluid be joined together before joining with the fluid which contains a silver ion and a copper ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Hereunder, one example of specific embodiment of the production method of the silver-nickel alloy particles by using the above-mentioned apparatus will be explained.

The separation reaction of the silver-copper alloy particles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains the silver ion and nickel ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid. Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the silver-nickel alloy particle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

It is said that the migration of silver is the phenomenon in which silver is ionized to give a silver ion, which then reacts with a hydroxide ion ($OH^-$) contained in water to give silver hydroxide; and this reversible reaction is repeated while moving in the solid body to be separated and segregated as silver. However, by using the apparatus described above, fine crystalline particles without a lattice defect can be obtained in the silver-nickel alloy; and thus, it is advantageous that the silver-nickel alloy particle having the migration suppressed more than before can be obtained.

As mentioned before, the processing apparatus may be provided with, in addition to the first introduction part d1 and the second introduction part d2, the third introduction part d3; and in this case, for example, each of the fluids which contains a silver ion as the first fluid, the fluid which contains a nickel ion as the second, and the fluid which contains a reducing agent as the third may be introduced into the apparatus respectively. By so doing, concentration and pressure of each solution can be controlled separately so that the separation reaction of the silver-nickel alloy particles may be controlled more precisely. Similarly, the processing apparatus may be provided with, in addition to the first introduction part d1, the second introduction part d2, the third introduction part d3, and in this case, for example, the first reducing fluid which contains at least one reducing agent as the first fluid, the second reducing fluid which contains at least one reducing agent different from the reducing agent used in the first reducing fluid as the second fluid, and the fluid which contains a silver ion and nickel ion as the third fluid may be introduced into the apparatus. Meanwhile, a combination of the fluids to be processed (first to third fluids) that are introduced into the respective introduction parts may be set arbitrarily. The same is applied if the forth or more introduction parts are arranged; and by so doing, fluids to be introduced into the processing apparatus may be subdivided. In this case, it is preferable that the fluid which contains a silver ion and the fluid which contains a nickel ion be joined together before joining with the fluid which contains a reducing agent; and it is also preferable that the first reducing fluid and the second reducing fluid be joined together before joining with the fluid which contains a silver ion and a nickel ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Hereunder, one example of specific embodiment of the production method of the gold-nickel alloy nanoparticles by using the above-mentioned apparatus will be explained.

The separation reaction of the gold-nickel alloy nanoparticles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains at least the gold ion and nickel ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid. Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the gold-nickel alloy nanoparticle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

As mentioned before, the processing apparatus may be provided with, in addition to the first introduction part d1 and the second introduction part d2, the third introduction part d3; and in this case, for example, each of the fluids which contains a gold ion as the first fluid, the fluid which contains a nickel ion as the second, and the fluid which contains a reducing agent as the third may be introduced into the apparatus. By so doing, concentration and pressure of each fluid can be controlled separately so that the separation reaction of the gold-nickel alloy nanoparticles may be controlled more precisely. Similarly, the processing apparatus may be provided with, in addition to the first introduction part d1, the second introduction part d2, the third introduction part d3, and in this case, for example, the fluid which contains a gold ion and a nickel ion as the first fluid, the first reducing fluid which contains at least one reducing agent as the second fluid, and the second reducing fluid which contains at least one reducing agent different from the reducing agent used in the first reducing fluid as the third fluid may be introduced into the apparatus respectively. Meanwhile, a combination of the fluids to be processed (first to third fluids) that are introduced into the respective introduction parts may be set arbitrarily. The same is applied if the forth or more introduction parts are arranged; and by so doing, fluids to be introduced into the processing apparatus may be subdivided. In this case, it is preferable that the fluid which contains a gold ion and the fluid which contains a nickel ion be joined together in the thin film fluid before joining with the fluid which contains a reducing agent; and it is also preferable that the first reducing fluid and the second reducing fluid be joined together before joining with the fluid which contains a gold ion and a nickel ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Hereunder, one example of specific embodiment of the production method of the silver-antimony alloy particles by using the above-mentioned apparatus will be explained.

The separation reaction of the silver-antimony alloy particles takes place while forcibly homogeneous mixing the fluids between the processing surfaces 1 and 2 which are disposed in a position they are faced with each other so as to be able to approach to and separate from each other, at least one of which rotates relative to the other in the apparatus shown in FIG. 1 of the present application.

At first, a fluid which contains the silver ion and antimony ion is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid. Then, the fluid which contains a reducing agent is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate the silver-antimony alloy particle.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

During the time of separating the silver-antimony alloy particles by carrying out the reaction between the processing surfaces 1 and 2, the first fluid and the second fluid are controlled such that concentration of antimony contained in the silver-antimony alloy particle may become 8.05% or more by weight and less than 100% by weight.

During the time of separating the silver-antimony alloy particles by mixing a fluid which contains a silver ion and an antimony ion with a fluid which contains a reducing agent, respective concentrations in the fluid which contains the silver ion and the antimony ion in the fluid which contains the reducing agent are not particularly restricted; however, concentration of the silver ion in the fluid which contains the silver ion and the antimony ion is preferably in the range of 0.001 to 2.000M (mol/L), concentration of the antimony ion in the fluid which contains the silver ion and the antimony ion is preferably in the range of 0.0010 to 2.000 M (mol/L), and concentration of the reducing agent in the fluid which contains the reducing agent is preferably in the range of 0.050 to 4.000 M (mol/L), though these are different depending on the compounds to be used and the like.

By using the apparatus shown above, the silver-antimony alloy having fine crystalline particles with fewer lattice defects can be produced; and thus, it is also advantageous that the silver-antimony alloy particles showing the expected characteristics can be obtained.

Meanwhile, in observation by the electron microscope (TEM and STEM) of respective Examples of the present invention, clear lattice defects were not confirmed.

It is thought that the homogeneous solid solution with the concentration not achievable before in the silver-antimony alloy could be obtained because it is possible to mix and react them homogeneously in an atomic level by using the apparatus discussed above.

As mentioned before, the processing apparatus may be provided with, in addition to the first introduction part d1 and the second introduction part d2, the third introduction part d3; and in this case, for example, each of the fluids which contains a silver ion as the first fluid, the fluid which contains an antimony ion as the second, and the fluid which contains a reducing agent as the third may be introduced into the apparatus. By so doing, concentration and pressure of each fluid can be controlled separately so that the separation reaction of the gold-nickel alloy nanoparticles may be controlled more precisely. Similarly, the processing apparatus may be provided with, in addition to the first introduction part d1, the second introduction part d2, the third introduction part d3, and in this case, for example, the fluid which contains a silver ion and an antimony ion as the first fluid, the first reducing fluid which contains at least one reducing agent as the second fluid, and the second reducing fluid which contains at least one reducing agent different from the reducing agent used in the first reducing fluid as the third fluid may be respectively introduced into the apparatus. Meanwhile, a combination of the fluids to be processed (first to third fluids) that are introduced into the respective introduction parts may be set arbitrarily. The same is applied if the forth or more introduction parts are arranged; and by so doing, fluids to be introduced into the processing apparatus may be subdivided. In this case, it is preferable that the fluid which contains a silver ion and the fluid which contains an antimony ion be joined together before joining with the fluid which contains a reducing agent; and it is also preferable that the first reducing fluid and the second reducing fluid be joined together before joining with the fluid which contains a silver ion and an antimony ion.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Hereunder, by showing Examples, the present invention will be explained more specifically as to the solid metal alloy and the production method thereof of the present invention. However, the present invention is not limited to them.

Meanwhile, in the following Examples, the term "from the center" means "from the first introduction part d1" of the processing apparatus shown in FIG. 1; the first fluid means the first fluid to be processed which is introduced from the first introduction part d1; and the second fluid means the second fluid to be processed which is introduced from the second introduction part d2 of the processing apparatus shown in FIG. 1. In addition, the opening part d20 of the second introduction part d2 having the shape of a concentric circular ring of annular shape surrounding the opening in the center of the processing surface 2 as shown by dotted lines in FIG. 2(B) was used.

(A) In Examples and Comparative Examples with regard to the silver-copper alloy, "A" is attached before the respective numbers of the relevant Examples and Comparative Examples; (B) in Examples and Comparative Examples with regard to the silver-nickel alloy, "B" is attached before the respective numbers of the relevant Examples and Comparative Examples; (C) in Examples and Comparative Examples with regard to the gold-nickel alloy, "C" is attached before the respective numbers of the relevant Examples and Comparative Examples; and (D) in Examples and Comparative Examples with regard to the silver-antimony alloy, "D" is attached before the respective numbers of the relevant Examples and Comparative Examples. However, in Table 1 to Table 17, "A", "B", "C", and "D" are omitted.

(A) Silver-Copper Alloy

Firstly, the silver-copper alloy will be explained specifically by showing Examples.

TEM-EDS Analysis:

The element mapping and the quantitative analyses of silver and copper in the silver-copper alloy particles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of silver to copper in the silver-copper alloy particles. Specifically, 5 analysis points shown in FIG. 15 were chosen in each of 10 of the obtained silver-copper alloy particle; and mole ratios of silver to copper at respective analysis points were calculated, from which values the average value was used.

Specific conditions of the TEM observation and the TEM-EDS analysis were as follows; a sample of the silver-copper alloy particles was mounted on the transmission electron microscope at room temperature, and an electron beam was irradiated to the sample of the silver-copper alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-copper alloy particles.

Meanwhile, the acceleration voltage of the electron beam to irradiate the silver-copper alloy particles can be set arbitrarily to approximately several hundred kV by the used transmission electron microscope.

STEM-EDS Analysis:

The element mapping and the quantitative analyses of silver and copper in the silver-copper alloy particles by STEM-EDS were carried out by the ultra-high resolution transmission electron microscope TITAN 80-300 (manufactured by FEI company) equipped with the γ-TEM EDS detector (manufactured by Ametek Inc.), and the atomic resolution analytical electron microscope JEM-ARM200F (manufactured by JEOL Ltd.) equipped with the energy dispersive X-ray analyzer Centurio (manufactured by JEOL Ltd.). The analysis was done by using the beam diameter of 0.2 nm to calculate the mole ratio of silver to copper in the silver-copper alloy particles. Specifically, 4 analysis points shown in FIG. 11 were chosen in each of 10 of the obtained silver-copper alloy particles; and mole ratios of silver to copper at respective analysis points were calculated, from which values the average value was used.

Specific conditions of the STEM observation, the HRTEM observation, and the STEM-EDS analysis were as follows; a sample of the silver-copper alloy particles was mounted on the scanning transmission electron microscope at room temperature, and an electron beam was irradiated to the sample of the silver-copper alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-copper alloy particles.

Meanwhile, the acceleration voltage of the electron beam to irradiate the silver-copper alloy particles can be set arbitrarily to approximately several hundred kV by the used electron microscopes.

ICP Analysis:

Quantitative analyses of silver and copper contained in the dried powders of the silver-copper alloy particles by the inductively coupled plasma atomic emission spectrophotometry (ICP) were carried out by using ICPS-8100 (manufactured by Shimadzu Corp.).

XRD Measurement:

X-Ray diffraction measurements were done by using the powder X-ray diffraction measurement instrument X'pert PRO MPD (XRD; manufactured by Panalytical Business Unit of Spectris Co., Ltd.). The measurement conditions were as following: the Cu anticathode was used with the tube voltage of 45 kV, the tube current of 40 mA, and the scanning rate of 1.6°/minute. In addition, the analysis was made by using the High Score Plus software. The Pseudo Voiget function was used in the Rietvelt analysis and the Williamson-Hall method; and the calculation was made by adding the asymmetric character.

Measurement of pH:

Measurement of pH was done by using a pH test paper or a pH meter Type D-51 (manufactured by Horiba, Ltd.).

DSC Measurement:

In measurement of the differential scanning calorimeter (DSC), the differential scanning calorimeter DSC-60 (manufactured by Shimadzu Corp.) was used. The aluminum crimp cell (φ5.8 mm×t 1.5 mm) was used as the sample cell, α-alumina was used as the reference sample, and 5 mg of the silver-copper alloy particles was used as the measurement sample. The measurement conditions were as following: the $N_2$ flow rate of 30 mL/minutes, the temperature range from room temperature to 400° C., and the temperature ascending rate of 20° C./minute.

Simultaneous Measurements of TG-DTA:

For the simultaneous measurements of differential thermal analysis-thermal gravity measurements (TG-DTA), the high temperature-type simultaneous differential thermal analysis-thermal gravity measurement instrument TG/DTA 6300 (manufactured by Seiko Instrument Inc.) was used. The measurement conditions were as following: 5.5 mg of α-alumina powders was used as the reference sample under the nitrogen atmosphere with the temperature range from 30 to 500° C. and with the temperature ascending rate of 30° C./minute.

As Examples A1 to A15, while the fluid which contained a silver ion and a copper ion or the fluid which contained a reducing agent was introduced as the first fluid from the center with the supply pressure of 0.50 MPaG, of the fluid which contained a silver ion and a copper ion or the fluid which contained a reducing agent, the fluid which was different from the first fluid was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the silver-copper alloy particles was discharged from between the processing surfaces 1 and 2. The discharged dispersion solution of the silver-copper alloy particles was treated by a centrifugal separator (20,000 G) to spin down the silver-copper alloy particles. After the supernatant solution thereof was removed, washing by methanol was repeated for three times; and then, the wet cake thus obtained was dried under air pressure at 25° C. to obtain dried powders of the silver-copper alloy particles. Confirmation of the particle diameter of the silver-copper alloy particles was done by using the TEM observation; and judgment thereof was done by the particle diameter of the primary particle thereof. The TEM measurements were done with the magnification of 250,000 or more; and the maximum value and the minimum value of 3 spots were used. Processing conditions of the first fluid are shown in Table 1; processing conditions of the second fluid are shown in Table 2; and shown in Table 3 are the rotation number of the processing surface 1, pH of the dispersion solution of the silver-copper alloy particles discharged from between the processing surfaces 1 and 2 (discharged solution), the ratio of silver to copper (mole ratio) in the silver-copper alloy particles obtained by the STEM-EDS and the TEM-EDS analyses results, whether or not there was the analysis point (in Table 3, they are referred to as measurement point) at which only silver (100% silver) or only copper (100% copper) was detected, the ratio of silver to copper (mole ratio) in the silver-copper alloy particles based on the ICP analysis results which was done by using the dried powders of the silver-copper alloy particles, and concentration of the copper (% by weight) contained in the silver-copper alloy particles. The abbreviations used in Table 1 and Table 2 are as following: EG; ethylene glycol, Toluene; toluene, $AgNO_3$; silver nitrate, $CH_3COOAg$; silver acetate, Cu-$(NO_3)_2 \cdot 3H_2O$; cupric nitrate trihydrate, $Cu(COOCH_3)_2 \cdot H_2O$; cupric acetate monohydrate, $Cu(COOCH_3)_2$; anhydrous cupric acetate, HMH; hydrazine monohydrate, DMAE; dimethylamino ethanol, PH; phenyl hydrazine, PVP; polyvinyl pyrrolidone, OA; octylamine, KOH; potassium hydroxide, $NaBH_4$; sodium borohydride, MeOH; methanol, EtOH; ethanol, SK08; Thiokalcol (surfactant, manufactured by Kao Corp.), and PW; pure water. Meanwhile, "Measurement point where 100% of Ag or of Cu was detected" shown in Table 3 includes, in addition to the analysis point at which only silver (100% silver) or only copper (100% copper) was detected, the analysis point at which the ratio of silver to copper (mole ratio) was in the α solid phase or the β solid phase. In addition, pH of the dispersion solutions of the silver-copper alloy particles (discharged solution) in Example A13 and Example A15 were measured after the dispersion solutions of the silver-copper alloy solution discharged from between the processing surfaces 1 and 2 were diluted by water by a factor of 10.

Comparative Examples A1 to A3 were carried out in the way similar to Examples A1 to A15.

Meanwhile, in Examples A1 to A12 and A16 and Comparative Examples A1 to A4, all data of Examples described in the specification of the application with the priority claim were thoroughly reviewed, and the data of Examples after reviewed are described herein.

The TEM-EDS analysis and the STEM-EDS analysis were carried out at all analysis points; and as a result, in the silver-copper alloy particles obtained in Examples, it was confirmed that copper concentrations contained in the silver-copper alloy were in the range of 0.1 to 99.94% by weight, that is, the silver-copper alloy particles were in the solid phase $\alpha+\beta$ region in the equilibrium diagram of the Ag—Cu alloy. In addition, there was no analysis point detected at which the ratio of silver to copper (mole ratio) in the silver-copper alloy particles obtained in Examples was the ratio of silver to copper (mole ratio) in the solid phase $\alpha$ or the solid phase $\beta$ in the equilibrium diagram of the Ag—Cu alloy, nor was detected the analysis point at which silver was 100% or copper was 100%.

Figure 14:
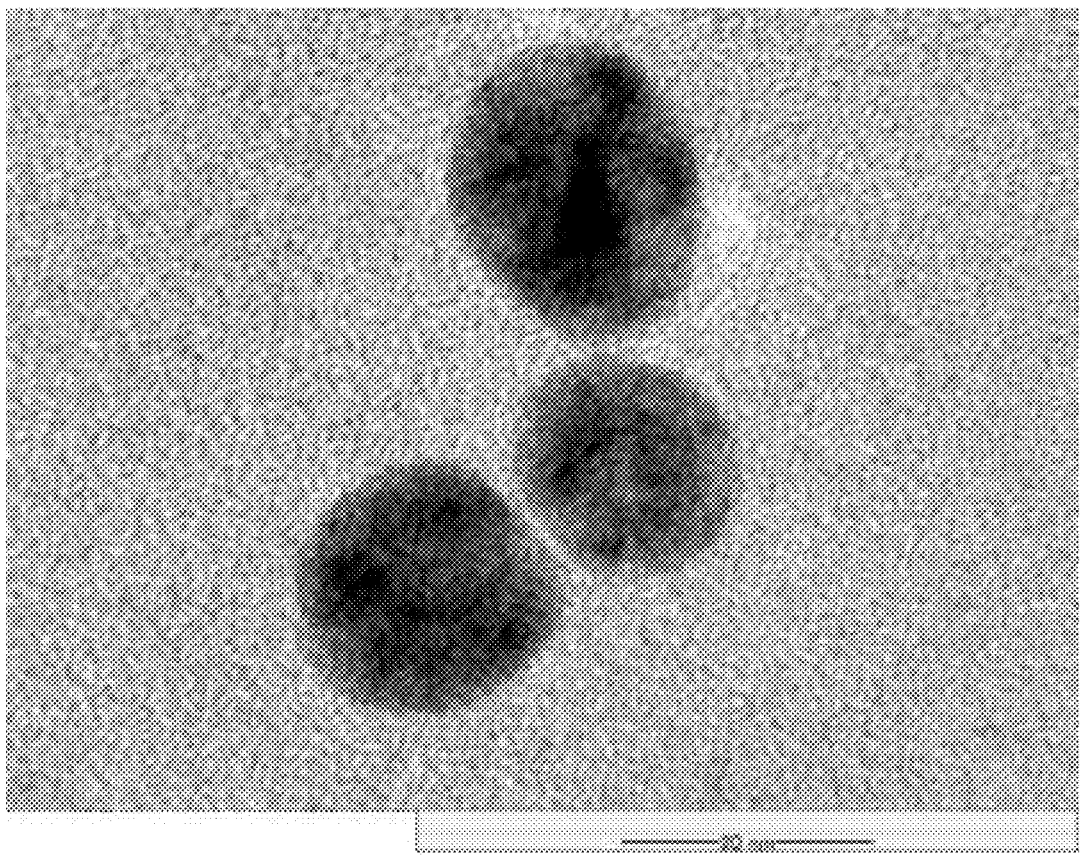
Figure 18:
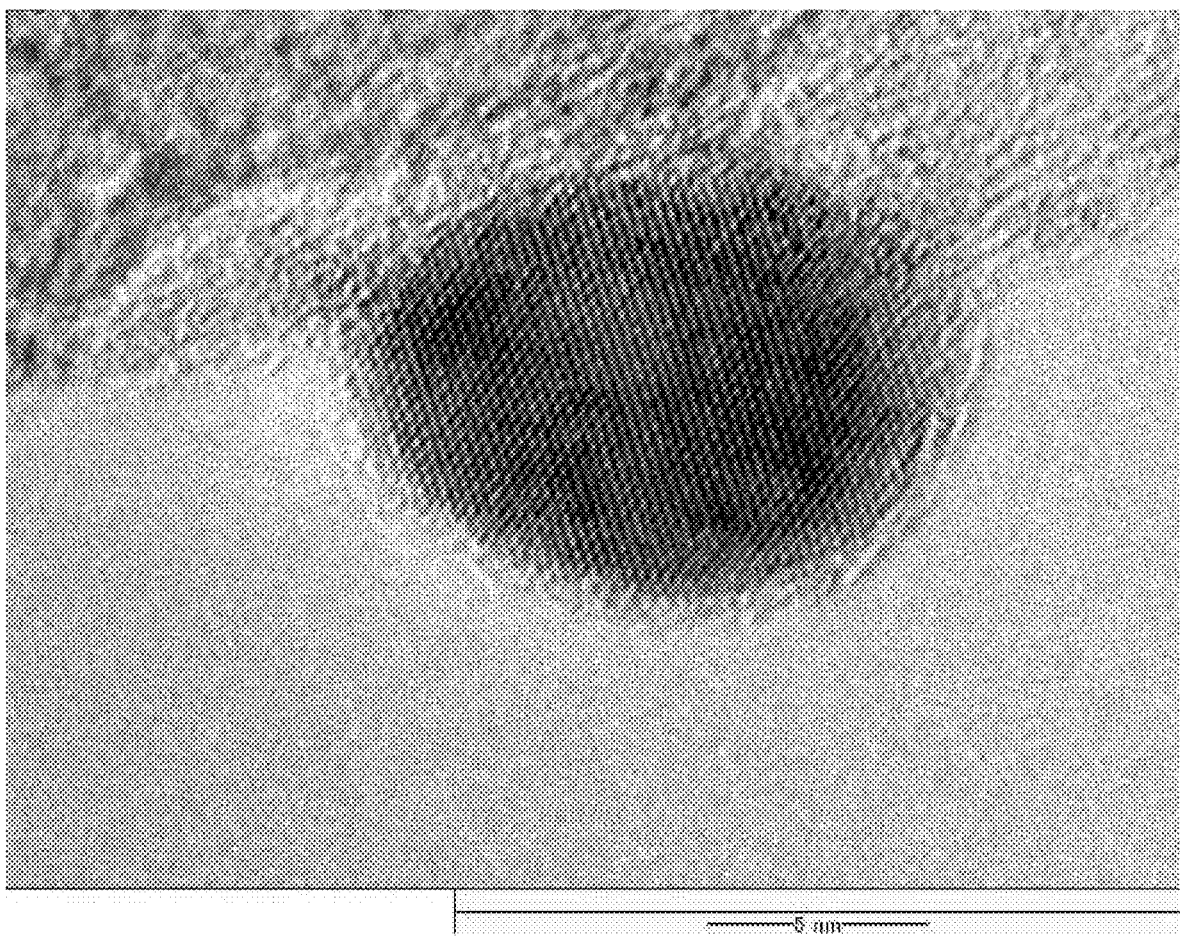
Figure 19:
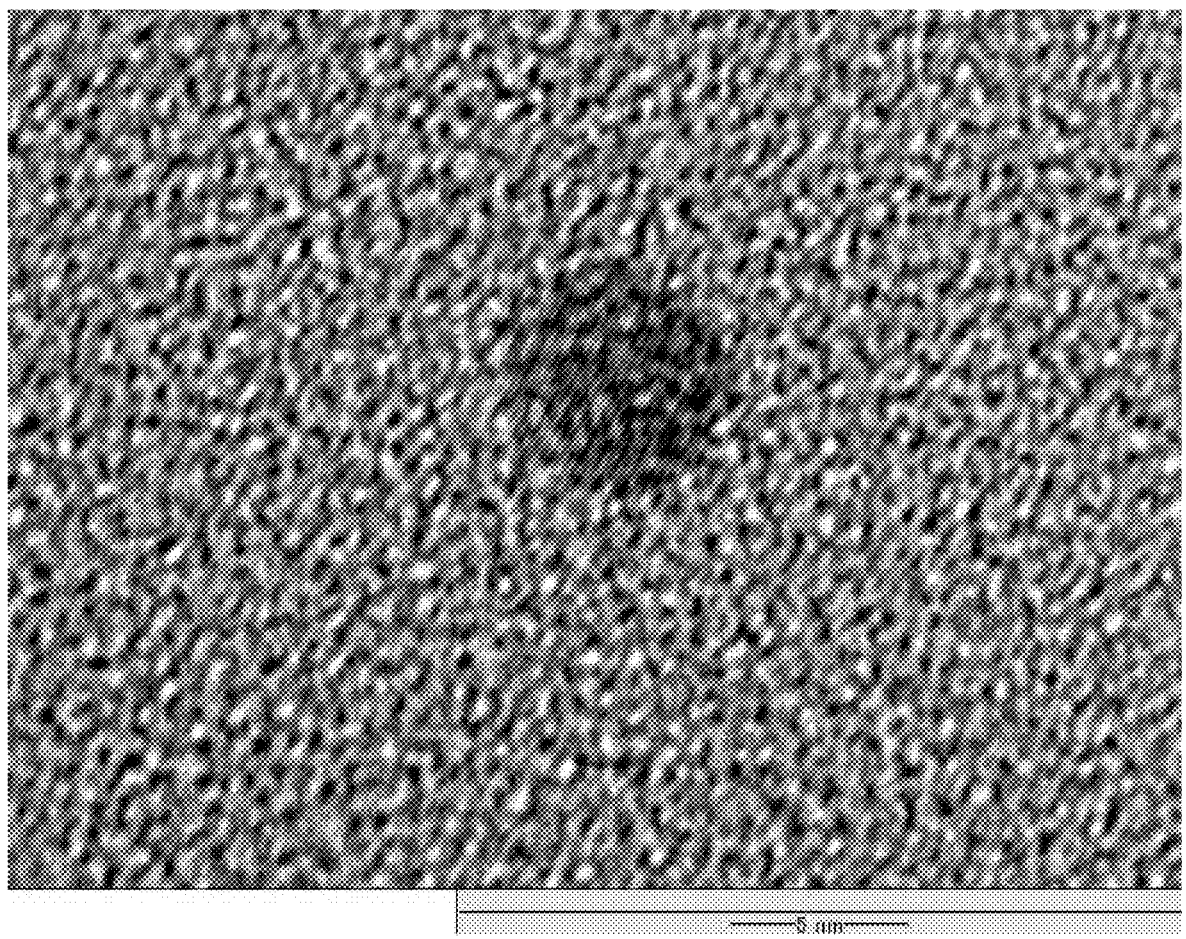
Figure 20:
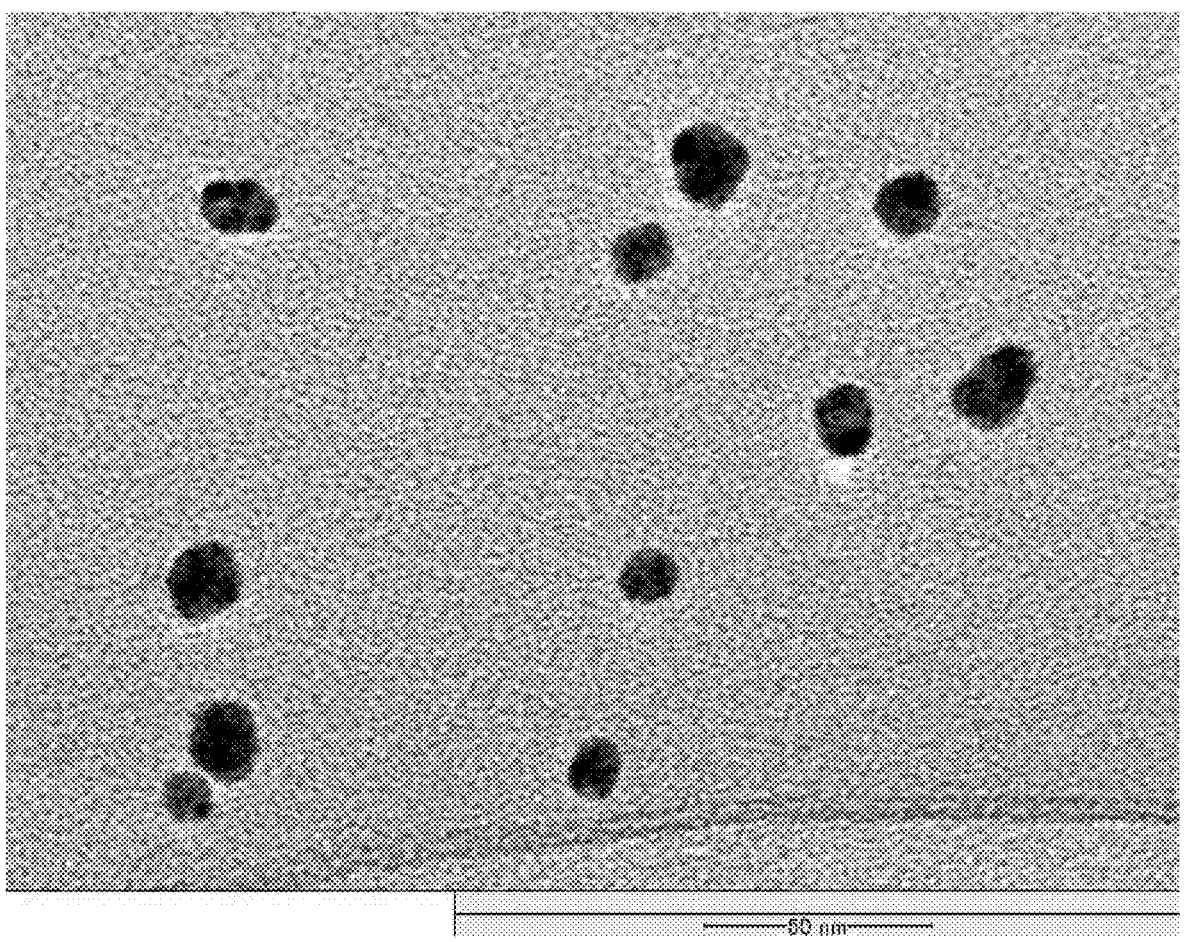

In FIG. 7, (A) the STEM-HAADF picture and the EDS mapping results ((B): Ag, and (C): Cu) of the silver-copper alloy particles obtained in Example A2 are shown; in FIG. 8, (A) the STEM-HAADF picture and the EDS mapping results ((B): Ag, and (C): Cu) of the silver-copper alloy particles obtained in Example A4 are shown; and in FIG. 9, (A) the STEM-HAADF picture and the EDS mapping results ((B): Ag, and (C): Cu) of the silver-copper alloy particles obtained in Example A8 are shown. In FIG. 11, the HRTEM picture and the STEM-EDS analysis points (4 points) of the silver-copper alloy particle obtained in Example A8 are shown; and in FIG. 12, the STEM-EDS analysis results measured at each of the analysis points shown in FIG. 11 are shown. In FIG. 15, the HRTEM picture and the TEM-EDS analysis points (5 points) of the silver-copper alloy particle obtained in Example A10 are shown; and in FIG. 16, the TEM-EDS analysis results measured at each of the analysis points shown in FIG. 15 are shown. In FIG. 13, the TEM picture of the silver-copper alloy particle obtained in Example A10 is shown; in FIG. 14, the TEM picture of the silver-copper alloy particles obtained in Example A6 is shown; in FIG. 18, the TEM picture of the silver-copper alloy particle obtained in Example A7 is shown: in FIG. 19, the TEM picture of the silver-copper alloy particle obtained in Example A3 is shown; and in FIG. 20, the low magnification TEM picture of the silver-copper alloy particles obtained in Example A4 is shown.

Figure 12:
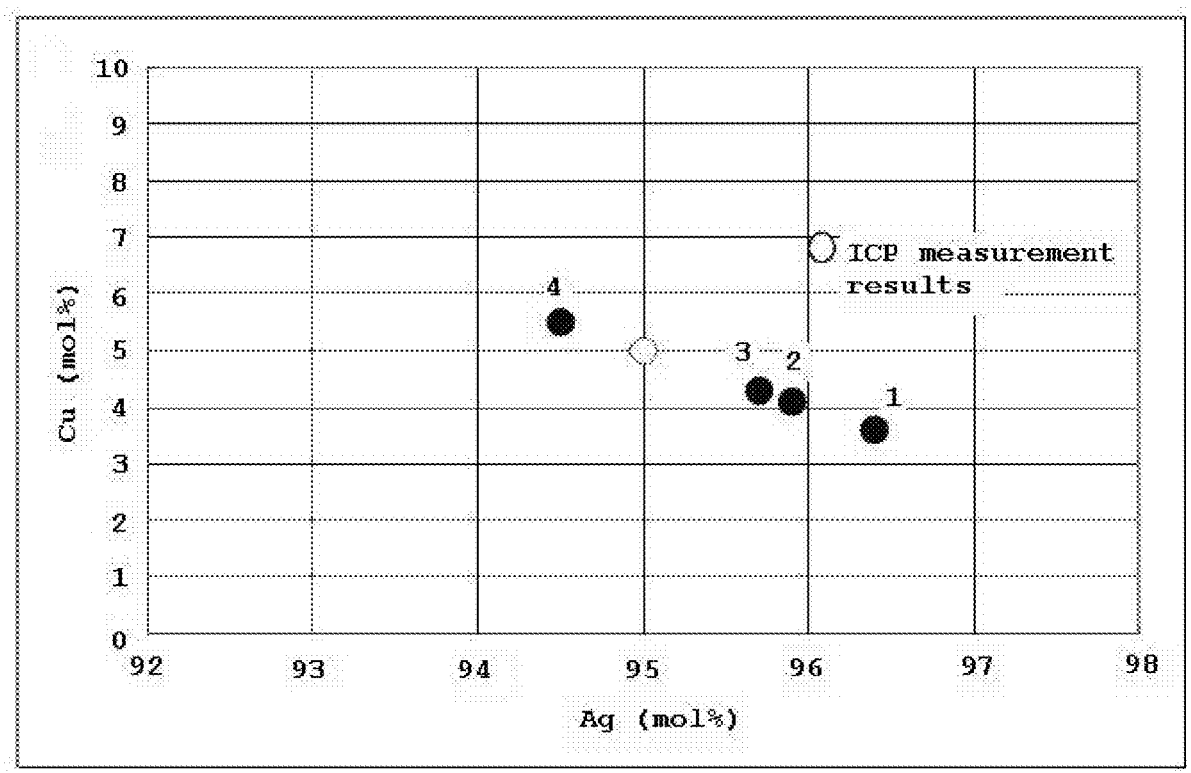

The STEM-EDS analysis results in FIG. 12 are one example of the silver-copper alloy particles obtained in Example A8; and it was found that in each of 10 silver-copper alloy particles whose EDS analyses were conducted, in 50% or more points of the 4 analysis points, the mole ratios of silver to copper in the STEM-EDS analysis were detected within ±30% of the mole ratios of silver to copper obtained by the ICP analysis. In addition, as the results of the similar STEM-EDS analyses in other Examples shown in Table 3, the analysis points at which the mole ratios of the silver to copper in the STEM-EDS analysis in some analysis points were maximum ±30% relative to the mole ratios of silver to copper obtained by the ICP analysis of each Example were present. Further, in the analysis using the EDS mapping, there were no such phenomenon that silver and copper were clearly segregated when observed at each analysis point.

The EDS analysis results in FIG. 16 are one example of the silver-copper alloy particles obtained in Example A10; and it was found that in each of 10 silver-copper alloy particles whose TEM-EDS analyses were conducted, in 50% or more points of the 5 analysis points, the mole ratios of the silver to copper in the TEM-EDS analysis were detected within ±30% of the mole ratios of the silver to copper obtained by the ICP analysis. In addition, as the results of the similar TEM-EDS analyses in other Examples shown in Table 3, the analysis points at which the mole ratios of the silver to copper in the TEM-EDS analysis in some analysis points were maximum ±30% relative to the mole ratios of silver to copper obtained by the ICP analysis of each Example were present.

Figure 17:
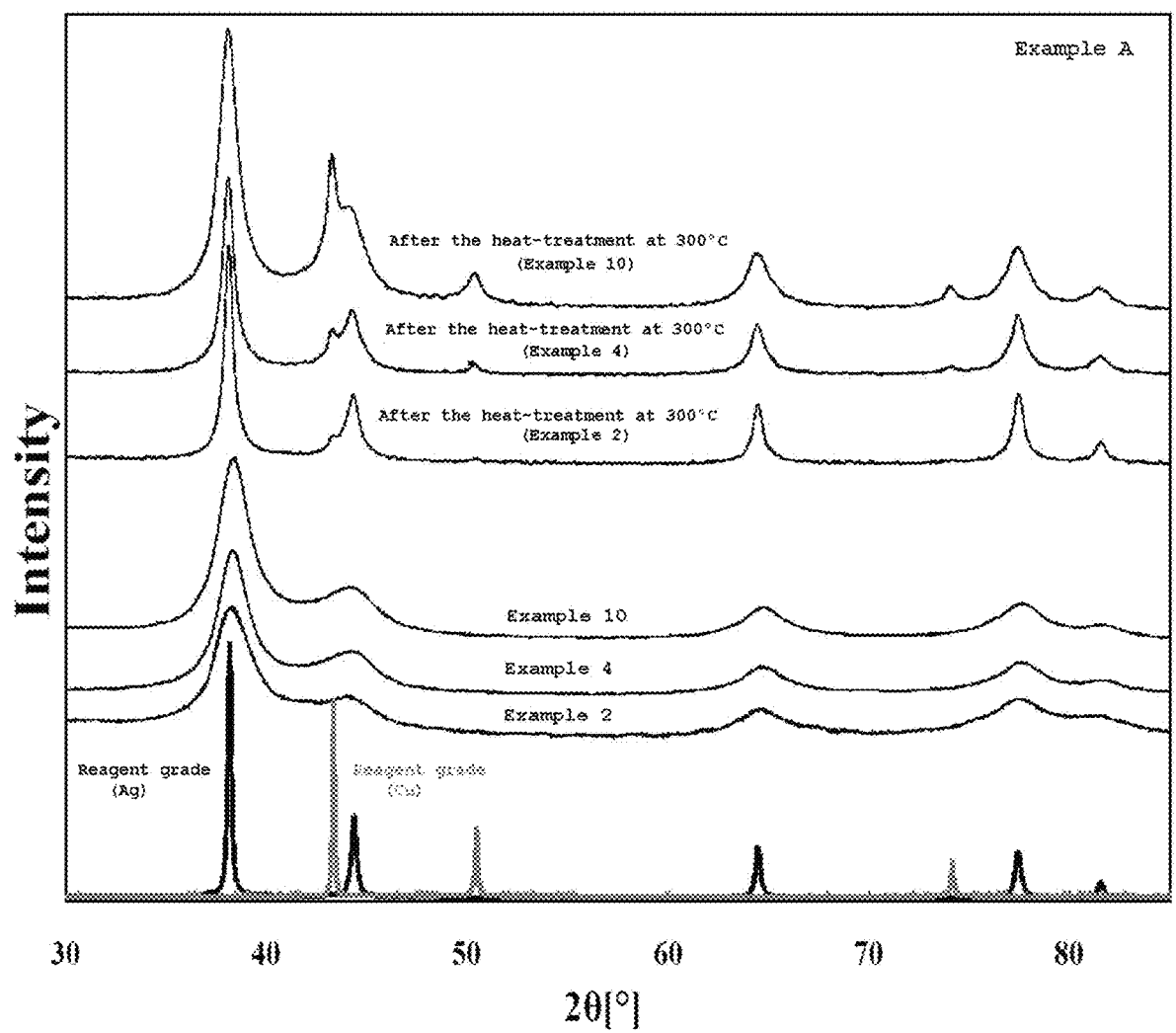

In FIG. 17, the XRD measurement results by using the dried powders of the silver-copper alloy particles prepared in Examples A2, A4, and A10, as well as the XRD measurement results by using the heat-treated powders obtained by heat-treating the said silver-copper alloy particles at 300° C. for 30 minutes are shown. The respective dried powders of the silver-copper alloy particles prepared in Examples A2, A4, and A10 were heat-treated at 300° C. for 30 minutes to obtain the respective heat-treated powders. Hereunder, the dried powders of the silver-copper alloy particles obtained in Examples are described as "silver-copper alloy particles before the heat treatment (or untreated)", and the dried powders of the silver-copper alloy particle obtained in Examples which are heat-treated by the afore-mentioned condition are described as "silver-copper alloy particles after the heat treatment". For comparison purpose, as the reference sample, the diffraction patterns of the reagent grade Ag and Cu are shown as well. It can be seen that the diffraction peaks of the silver-copper alloy particles before the heat treatment are wider. In addition, it can be seen that all of the silver-copper alloy particles before the heat treatment show the diffraction peaks near to the peaks of Ag used as the reference sample. From the diffraction pattern, it is thought that the silver-copper alloy particle before the heat treatment has the mother structure form of Ag having the FCC structure. It was confirmed that in the peak appearing at near 38.2°, which is attributable to [111] of Ag having the FCC structure, the peak of the silver-copper alloy particle before the heat treatment shifted slightly toward the higher angle side as the ratio of Cu in the silver-copper alloy particle increased. In addition, each diffraction peak of the silver-copper alloy particles became sharper after the heat treatment, and included the diffraction peaks of Cu having the FCC structure, thereby appearing that respective diffractive patterns were separated as if they were the mixtures of Cu and Ag. The peaks of the silver-copper alloy particles after the heat treatment which coincide with the peaks of Cu increased their relative strengths as the ratio of Cu in the silver-copper alloy increased (in the order from Example A2 to Example A4 and then to Example A10).

The lattice parameters, the crystallite sizes, and the strains obtained by using the Rietvelt analysis and the Williamson-Hall method based on the XRD measurement results shown in FIG. 17 are shown in Table 4. With regard to the silver-copper alloy particles after the heat treatment, the analyses were made as two phases of Ag and Cu. With regard to the silver-copper alloy particles before the heat treatment, all the lattice parameters are larger than the lattice parameter 4.086 (A) of Ag (Reference No. 1: R. K. Linde, in Partial Fulfillment of the Requirements for the Degree of Doctor of Philosophy, California Institute of Technology, 1964). In addition, it can be seen that the crystallite sizes of the silver-copper alloy particles before the heat treatment obtained by the afore-mentioned methods are about 5 to 6 nm, and that they are strained. One reason for spreading of the lattice parameters may be attributed to, in addition to the effects of the crystallite size and of the strain, the composite effects due to random distribution of Ag and Cu inside the particle.

Figure 21:
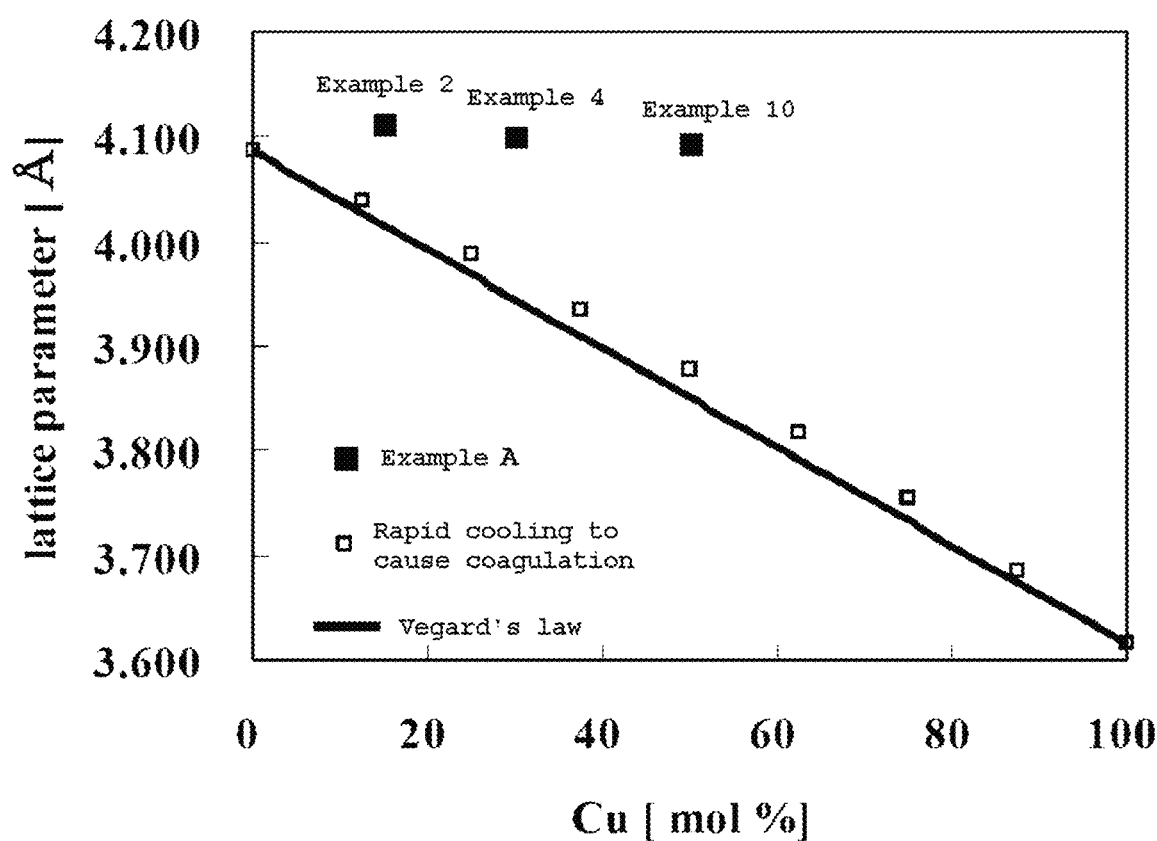

With regard to the change in lattice parameter, in FIG. 21 the lattice parameters of the silver-copper alloy particles before the heat treatment in Examples A2, A4, and A10 are shown in the graph showing the lattice parameters of the AgCu solid solutions obtained from the Vegard law shown in Reference No. 1 and the lattice parameters of the AgCu solid solutions obtained by rapid cooling to cause coagulation. It can be seen that in the silver-copper alloy particles before the heat treatment, too, as the Cu ratio in the silver-copper alloy particles increases, the lattice parameter thereof tends to decrease.

The lattice parameters of the silver-copper alloy particles after the heat treatment were almost the same as the lattice parameters of Ag and Cu (3.615 (Å), Reference No. 1) as shown in Table 4.

Figure 22:
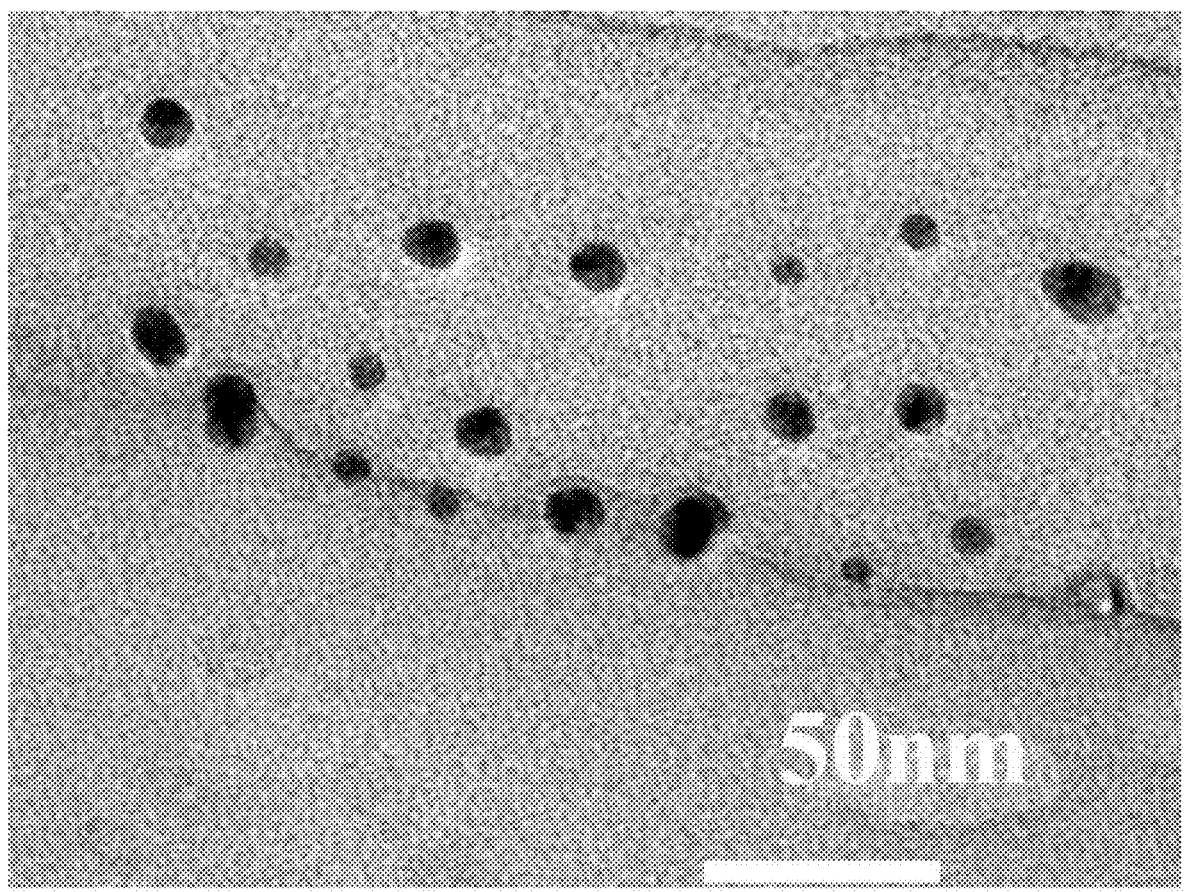
Figure 23:
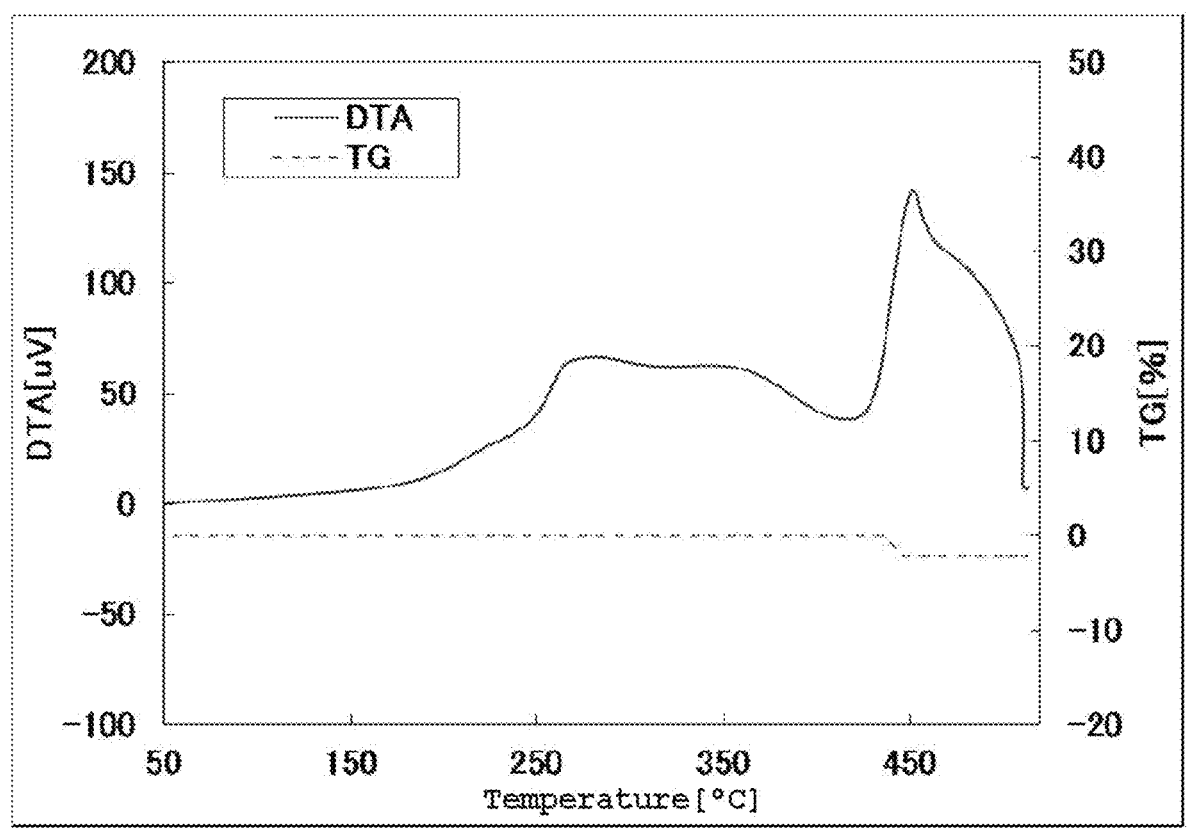

The quantitative analyses results of silver and copper in the silver-copper alloy particles after the heat treatment obtained by the above-mentioned XRD measurement results are shown in Table 5. Approximately the same Ag:Cu mole ratio values as those in the silver-copper alloy particles before the heat treatment shown in Table 3 were obtained. In FIG. 22, the TEM picture of the silver-copper alloy particles after the heat treatment in Example A10 is shown as the representative thereof. As can be seen clearly in this picture, the particle diameters of the particles were about in the range of 10 to 20 nm even after the heat treatment; and thus, there was no change in particle diameters of the silver-copper alloy particles before and after the heat treatment. In addition, the quantitative analyses of the silver-copper alloy particles after the heat treatment were carried out in the way similar to those in the silver-copper alloy particles before the heat treatment by using the TEM-EDS analysis; and it was confirmed that the Ag:Cu ratio of the silver-copper alloy particles did not change before and after the heat treatment. Further, in FIG. 23, the TG-DTA measurement results of the silver-copper alloy particles obtained in Example A2, wherein the measurement was done under the nitrogen atmosphere, are shown. From FIG. 23, it was confirmed that there was no change in the weight of the silver-copper alloy particles by the heat treatment up to 300° C. The weight loss and the heat generation from around 450° C. to 500° C. in this graph can be attributable to PVP. Therefore, in the silver-copper alloy particles after the heat treatment, it is thought that there occurred the phase separation of Ag and Cu in the same particle, namely, the eutectic body or single bodies of silver and of copper were clearly generated. In other words, it can be seen that the silver-copper alloy particles before the heat treatment are the solid solutions not containing the eutectic body.

Figure 24:
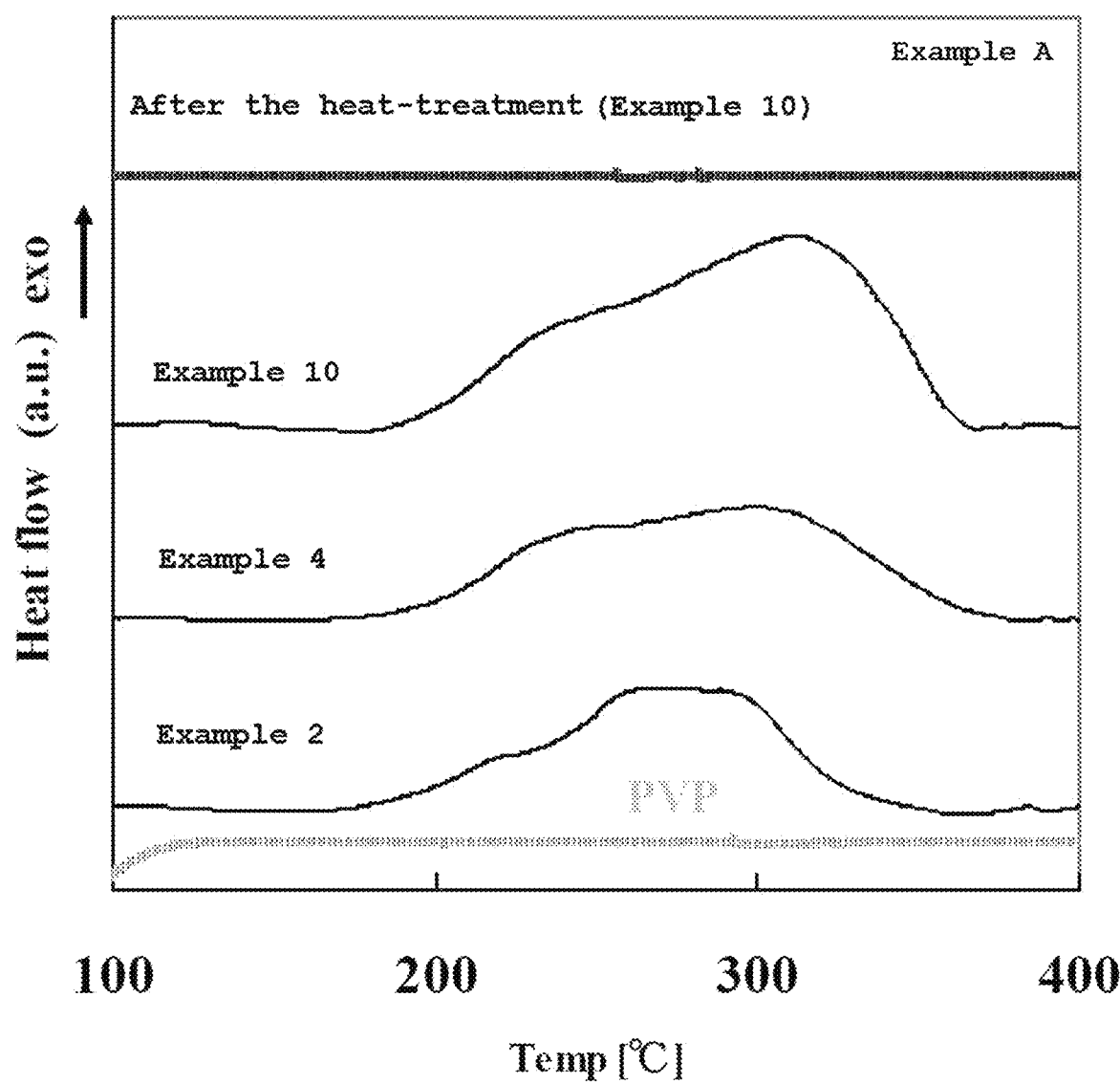

In FIG. 24, shown therein are the DSC measurement results by using the dried powders of the silver-copper alloy particles obtained in Examples A2, A4, and A10, and by using the silver-copper alloy particles after heat treatment of the dried powders of the silver-copper alloy particles obtained in Example A10, wherein the heat treatment was done at 300° C. for 30 minutes. Because there might be a protective film formed by PVP that was contained in the first fluid or the second fluid, the DSC measurement result of PVP is also included in the DSC measurement results. In the measurement range, no specific peak attributable to PVP was confirmed. In the silver-copper alloy particles obtained by these Examples, very broad exothermic peaks were confirmed around in the range of 180 to 350° C. It is thought that this is attributable to decomposition and growth of the Ag—Cu terminal of the solid solution thereof (Reference No. 2: H. W. Sheng, G. Wilde, and E. Ma, Acta. Materialia, 50, 475 (2002); and Reference No. 3: Klassen T., Herr U., and Averback R. S., Acta. Mater., 49, 453 (1997)). In the DSC measurement result of the silver-copper alloy particles after the heat treatment in Example A10, no specific peak can be seen, suggesting that there occurred the irreversible change. In addition, as shown in Table 4, the crystal sizes of the silver-copper alloy particles after the heat treatment obtained by the XRD measurements became larger in any of silver and copper or both; and in addition, it can be seen that the strains thereof became smaller. Accordingly, it is thought that by the heat treatment at 300° C. for 30 minutes, the solid solution phase to constitute the silver-copper alloy particles before the heat treatment was decomposed so that the eutectic body or the single bodies of silver and copper were generated while Ag and Cu grew respectively.

Next, in FIG. 25, the STEM pictures of the silver-copper alloy particle obtained in Example A13 ((A) the HAADF picture, and (B) the BF picture (bright view)) (magnification of 10 million) are shown. As shown in FIGS. 25 (A) and (B), the lattice fringes were observed in the silver-copper alloy particle. In FIG. 26, the STEM pictures of the silver-copper alloy particle obtained in Example A13 ((A) the HAADF picture, and (B) the BF picture (bright view)) (magnification of 2000) are shown. In FIG. 27, the STEM pictures of the silver-copper alloy particle ((A) the HAADF picture, and (B) the BF picture (bright view)) (magnification of 20 million), wherein these pictures were treated by the radial difference filter in the same viewing fields of the respective pictures of FIGS. 26 (A) and (B) to remove the effect of the collodion film on which the silver-copper alloy particles were mounted, are shown. In all the pictures shown in FIGS. 26(A) and (B) and FIGS. 27(A) and (B), the surged lattice fringes were confirmed. Meanwhile, the same lattice fringe was confirmed in other Examples with regard to the silver-copper alloy particle (Examples A1 to A12 and Examples A14 to A15). Also, in Example A16 with regard to the tin-silver-copper, the same lattice fringe was confirmed.

In the case that each of silver and copper forms the crystallite of its own, there appear surges occasionally due to inconsistency in the grain boundary of these crystallites; however, the surges that were observed in the silver-copper alloy particles of Example A13 were observed inside the crystallite; and thus, it is thought that as silver and copper formed the solid solution, the surges were generated by strain of the crystal lattice due to the difference of the atomic radius between them. In addition, according to the results of the powder X-ray diffractometry measurement of the silver-copper alloy particles of Example A13 shown in FIG. 28, only the diffraction pattern near to the FCC silver was confirmed while the crystalline diffractions derived from copper were not observed; and thus, it is thought that the surges that were observed in the STEM pictures of FIG. 26 and FIG. 27 demonstrate that copper forms the solid solution in the FCC silver structure. In addition, the XRD measurement of the powders obtained by heat-treating the dried powders of the silver-copper particles of Example A13 at 300° C. for 30 minutes and the DSC measurements of the dried powders of the silver-copper particles of Example A13 and the powders obtained by heat-treating the said dried powders at 300° C. for 30 minutes showed the same results as those of Examples A2, A4, and A10; and the TG-DTA simultaneous measurements of the silver-copper alloy particles of Example 13 gave the same results as Example A2.

From the above results, it was found that the silver-copper alloy particles obtained in Examples A1 to A15 were the solid solution silver-copper alloy particles, specifically substitutional solid solution alloy particles, substantially not containing the eutectic body.

TABLE 1

| | | First fluid | | | | | | | | |
|---|---|---|---|---|---|---|---|---|---|---|
| | Solvent | Mixed and dissolved substances | | | | | | | Supply temperature | pH (pH-test |
| | | 1 | | 2 | | 3 | | 4 | | |
| Example A | Kind | (M) | Kind | (M) | Kind | (wt %) | Kind | (wt %) | Kind | (° C.) | paper) |
| 1 | EG | 0.00075 | $AgNO_3$ | 0.00425 | $Cu(NO_3)_2 \cdot 3H_2O$ | — | | — | | 160 | 4 to 5 |
| 2 | EG | 0.0043 | $AgNO_3$ | 0.00076 | $Cu(NO_3)_2 \cdot 3H_2O$ | — | | — | | 160 | 4 to 5 |
| 3 | EG | 0.44 | HMH | 0.063 | DMAE | 1 | PVP | 0.4 | KOH | 160 | 12 |
| 4 | EG | 0.0035 | $AgNO_3$ | 0.0015 | $Cu(NO_3)_2 \cdot 3H_2O$ | — | | — | | 160 | 4 to 5 |
| 5 | EG | 0.00182 | $AgNO_3$ | 0.00425 | $Cu(NO_3)_2 \cdot 3H_2O$ | — | | — | | 160 | 4 to 5 |
| 6 | EG | 0.007 | $AgNO_3$ | 0.063 | $Cu(NO_3)_2 \cdot 3H_2O$ | — | | — | | 160 | 4 to 5 |
| 7 | EG | 0.063 | $AgNO_3$ | 0.007 | $Cu(NO_3)_2 \cdot 3H_2O$ | — | | — | | 160 | 4 to 5 |
| 8 | EG | 0.00425 | $AgNO_3$ | 0.00022 | $Cu(NO_3)_2 \cdot 3H_2O$ | — | | — | | 160 | 4 to 5 |
| 9 | EG | 0.00425 | $AgNO_3$ | $8.52 \times 10^{-6}$ | $Cu(NO_3)_2 \cdot 3H_2O$ | — | | — | | 160 | 4 to 5 |
| 10 | EG | 0.0025 | $AgNO_3$ | 0.0025 | $Cu(NO_3)_2 \cdot 3H_2O$ | — | | — | | 160 | 4 to 5 |
| 11 | EG | 0.0043 | $AgNO_3$ | 0.00076 | $Cu(NO_3)_2 \cdot 3H_2O$ | — | | — | | 160 | 4 to 5 |
| 12 | EG | 0.063 | $AgNO_3$ | 0.007 | $Cu(NO_3)_2 \cdot 3H_2O$ | — | | — | | 160 | 4 to 5 |
| 13 | Toluene | 0.0025 | $CH_3COOAg$ | 0.0025 | $Cu(COOCH_3)_2$ | 0.005 | OA | — | | 24 | 4 to 5 |
| 14 | EG | 0.002 | $AgNO_3$ | 0.002 | $Cu(NO_3)_2 \cdot 3H_2O$ | — | | — | | 140 | 4 to 5 |
| 15 | Toluene | 0.002 | $CH_3COOAg$ | 0.005 | $Cu(COOCH_3)_2$ | 0.08 | OA | — | | 24 | — |
| Comparative Example 1 | MeOH | 0.1000 | $NaBH_4$ | 0.0033 | SK08 | — | | — | | 29 | 12 |
| Comparative Example 2 | EG | 0.00425 | $AgNO_3$ | 0.00022 | $Cu(NO_3)_2 \cdot 3H_2O$ | — | | — | | 160 | 4 to 5 |
| Comparative Example 3 | EG | 0.00425 | $AgNO_3$ | 0.00022 | $Cu(NO_3)_2 \cdot 3H_2O$ | — | | — | | 160 | 4 to 5 |

TABLE 2

| | Solvent | | | Mixed and dissolved substances | | | | | | | | Supply temperature | pH (pH-test |
|---|---|---|---|---|---|---|---|---|---|---|---|---|---|
| | 1 | 2 | | 1 | | 2 | | 3 | | 4 | | | |
| Example A | Kind | (wt %) | Name | (M) | Kind | (M) | Kind | (wt %) | Kind | (wt %) | Kind | (° C.) | paper) |
| 1 | EG | 7 | PW | 0.56 | DMAE | 3.95 | HMH | 9.75 | PVP | 3 | KOH | 25 | >14 |
| 2 | EG | 7 | PW | 0.56 | DMAE | 3.95 | HMH | 9.75 | PVP | 3 | KOH | 25 | >14 |
| 3 | EG | — | — | 0.0425 | $AgNO_3$ | 0.0075 | $Cu(COOCH_3)_2 \cdot 3H_2O$ | — | — | — | — | 25 | 4 to 5 |
| 4 | EG | 7 | PW | 0.56 | DMAE | 3.95 | HMH | 9.75 | PVP | 3 | KOH | 25 | >14 |
| 5 | EG | 7 | PW | 0.56 | DMAE | 3.95 | HMH | 9.75 | PVP | 3 | KOH | 25 | >14 |
| 6 | EG | 7 | PW | 0.56 | DMAE | 3.95 | HMH | 9.75 | PVP | 3 | KOH | 25 | >14 |
| 7 | EG | 7 | PW | 0.56 | DMAE | 3.95 | HMH | 9.75 | PVP | 3 | KOH | 25 | >14 |
| 8 | EG | 7 | PW | 0.56 | DMAE | 3.95 | HMH | 9.75 | PVP | 3 | KOH | 25 | >14 |
| 9 | EG | 7 | PW | 0.56 | DMAE | 3.95 | HMH | 9.75 | PVP | 3 | KOH | 25 | >14 |
| 10 | EG | 7 | PW | 0.56 | DMAE | 3.95 | HMH | 9.75 | PVP | 3 | KOH | 25 | >14 |
| 11 | EG | 7 | PW | 0.315 | DMAE | 0.55 | HMH | 4.00 | PVP | | | 25 | 10 to 11 |
| 12 | EG | 7 | PW | 0.315 | DMAE | 0.55 | HMH | 4.00 | PVP | | | 25 | 10 to 11 |
| 13 | Toluene | 24 | EtOH | 0.98 | PH | 0.24 | KOH | — | — | — | — | 24 | >14 |
| 14 | EG | 3.5 | PW | 0.31 | OA | 0.55 | HMH | 45 | EtOH | 1.5 | KOH | 22 | >14 |
| 15 | Toluene | 18.1 | EtOH | 0.99 | PH | — | — | — | — | 11.3 | 0.5N KOH in EtOH | 25 | >14 |
| Comparative Example 1 | MeOH | — | — | 1.9 | $AgNO_3$ | 0.3 | $Cu(NO_3)_2 \cdot 3H_2O$ | — | — | — | — | 26 | 4 to 5 |
| Comparative Example 2 | EG | 7 | PW | — | — | 4.51 | HMH | 9.75 | PVP | 3 | KOH | 25 | >14 |
| Comparative Example 3 | EG | 7 | PW | 4.51 | DMAE | — | — | — | — | 3 | KOH | 25 | >14 |

TABLE 3

| Example A | Processing surface Rotation number (rpm) | Discharged solution pH (pH meter) | EDS STEM-EDS Copper Mole ratio | EDS STEM-EDS Silver Mole ratio | EDS TEM-EDS Copper Mole ratio | EDS TEM-EDS Silver Mole ratio | Measurement point where 100% of Ag or of Cu was detected | ICP Copper Mole ratio | ICP Silver Mole ratio | Cu concentration in AgCu alloy (wt %) | Particle diameter (nm) |
|---|---|---|---|---|---|---|---|---|---|---|---|
| 1 | 1700 | 11.4 | 83.9 | 16.1 | 84.8 | 15.2 | No | 84.7 | 15.3 | 76.5 | 10 to 20 |
| 2 | 1700 | 11.1 | 15.2 | 84.8 | 14.9 | 85.1 | No | 14.5 | 85.5 | 9.1 | 10 to 20 |
| 3 | 1700 | 11.4 | 15.2 | 84.8 | 15.6 | 84.4 | No | 15.0 | 85.0 | 9.4 | 5 to 10 |
| 4 | 1700 | 11.5 | 30.9 | 69.1 | 30.0 | 70.0 | No | 30.1 | 69.9 | 20.2 | 10 to 20 |
| 5 | 1700 | 11.8 | 69.9 | 30.1 | 70.2 | 29.8 | No | 69.9 | 30.1 | 57.8 | 3 to 5 |
| 6 | 1700 | 10.2 | 89.6 | 10.4 | 90.3 | 9.7 | No | 90.1 | 9.9 | 84.3 | 20 to 45 |
| 7 | 1700 | 9.94 | 10.4 | 89.6 | 9.8 | 90.2 | No | 10.1 | 89.9 | 6.2 | 10 to 15 |
| 8 | 1700 | 11.9 | 5.3 | 94.7 | 5.1 | 94.9 | No | 5.0 | 95.0 | 3.0 | 5 to 10 |
| 9 | 1700 | 12.4 | 0.2 | 99.8 | 0.2 | 99.8 | No | 0.2 | 99.8 | 0.1 | 20 |
| 10 | 1700 | 11.7 | 47.6 | 52.4 | 49.1 | 50.9 | No | 49.7 | 50.3 | 36.8 | 10 to 20 |
| 11 | 1700 | 8.6 | 14.9 | 85.1 | 15.4 | 84.6 | No | 15.1 | 84.9 | 9.5 | 15 to 20 |
| 12 | 1700 | 7.4 | 7.2 | 92.8 | 8.9 | 91.1 | No | 10.2 | 89.8 | 6.3 | 20 to 30 |
| 13 | 1700 | 10.5 | 49.8 | 50.2 | 49.7 | 50.3 | No | 50.1 | 49.9 | 37.2 | 15 to 25 |
| 14 | 1700 | 11.2 | 50.3 | 49.7 | 50.1 | 49.9 | No | 49.7 | 50.3 | 36.8 | 10 |
| 15 | 1700 | 10.4 | 71.1 | 28.9 | 71.8 | 28.2 | No | 71.6 | 28.4 | 59.8 | 30 |
| Comparative Example 1 | 1700 | 12.0 | 54.4 | 45.6 | 67.4 | 32.6 | Yes | 10.2 | 89.8 | 6.3 | 10 to 20 |
| Comparative Example 2 | 1700 | 11.2 | 65.9 | 34.1 | 55.1 | 44.9 | Yes | 5.3 | 94.7 | 3.2 | 5 to 15 |
| Comparative Example 3 | 1700 | 10.8 | 38.2 | 61.8 | 54.6 | 45.4 | Yes | 4.9 | 95.1 | 2.9 | 15 to 30 |

TABLE 4

| Example A | Lattice parameter Untreated | Lattice parameter Heat treatment at 300° C. Ag (Å) | Lattice parameter Heat treatment at 300° C. Cu | Crystallite size Untreated | Crystallite size Heat treatment at 300° C. Ag (Å) | Crystallite size Heat treatment at 300° C. Cu | Strain Untreated | Strain Heat treatment at 300° C. Ag (%) | Strain Heat treatment at 300° C. Cu |
|---|---|---|---|---|---|---|---|---|---|
| 2 | 4.122 | 4.083 | 3.620 | 61 | 217 | 44 | 2.1 | 0.5 | 0.6 |
| 4 | 4.101 | 4.084 | 3.618 | 56 | 134 | 137 | 1.1 | 0.6 | 0.7 |
| 10 | 4.094 | 4.084 | 3.618 | 54 | 94 | 145 | 1.1 | 0.8 | 0.7 |

TABLE 5

| Example A | Ag (mol %) | Cu (mol %) |
|---|---|---|
| 2 | 85.8 | 14.2 |
| 4 | 70.5 | 29.5 |
| 10 | 50.9 | 49.1 |

Accordingly, it became clear that the silver-copper alloy according to the present invention is the silver-copper alloy substantially not containing the eutectic body, and that the silver-copper alloy is the solid solution.

In addition, it became clear that the silver-copper alloy of the present invention could be produced by mixing the fluid which contained a silver ion and a copper ion with the fluid which contained a reducing agent in the thin film fluid formed between at least two processing surfaces which were disposed in a position they were faced with each other so as to be able to approach to and separate from each other, at least one of which rotated relative to the other, whereby separating the silver-copper alloy particles substantially not containing the eutectic body.

At this occasion, it was confirmed that the silver-copper alloy particles substantially not containing the eutectic body could be produced equally regardless of whether the fluid which contained one reducing agent was used or the fluid which contained two reducing agents was used as the fluid which contained the reducing agent. Although the mechanism how the silver-copper alloy particles substantially not containing the eutectic body as mentioned above could be produced is not clear yet, it is thought that depending on the reducing agent and the kind and amount of the dispersant showing the reducing property, the effects of them to production of the silver-copper alloy particles are different.

In addition, it was found that to produce the silver-copper alloy particles substantially not containing the eutectic body, pH of the fluid after mixing of the fluid which contains a reducing agent with the fluid which contains a silver ion and a copper ion is preferably 7 or higher, or more preferably 8 or higher.

Production of Tin-Silver-Copper Alloy:

In Example A16, while the fluid which contained a silver ion, a copper ion, and a stannous (Sn) ion was introduced as the first fluid from the center with the supply pressure of 0.30 MPaG, the fluid which contained the reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the tin-silver-copper alloy particles discharged from between the processing surfaces 1 and 2 was treated by a centrifugal separator (21,000 G) to spin down the tin-silver-copper alloy particles. After the supernatant solution thereof was removed, washing by methanol was repeated for three times; and then, the wet cake thus obtained was dried at −0.095 MPaG at 25° C. to obtain dried powders of the tin-silver-copper alloy particles. Confirmation of the particle diameter of the tin-silver-copper alloy particles was done by using the TEM observation; and judgment thereof was done by the particle diameter of the primary particles thereof. The TEM measurements were done with the magnification of 250,000 or more, or preferably 500,000 or more; and the maximum value and the minimum value of 3 spots were used. Processing conditions of the first fluid are shown in Table 6; processing conditions of the second fluid are shown in Table 7; and shown in Table 8 are the rotation number of the processing surface 1, pH of the dispersion solution of the tin-silver-copper alloy particles (discharged solution), the ratio of tin, silver, and copper (mole ratio) in the tin-silver-copper alloy particles obtained by the TEM-EDS analyses results, whether or not there was the analysis point (in Table 8, they are referred to as measurement point) at which only tin, only silver (100% silver), or only copper (100% copper) was detected by the TEM-EDS analyses, and the mole ratio of tin, silver, and copper in the tin-silver-copper alloy particles based on the ICP analysis results which was done by using the dried powders of the tin-silver-copper alloy particles. The abbreviations used in Table 6 and Table 7 are as following: EG; ethylene glycol, $AgNO_3$; silver nitrate, $Cu(NO_3)_2 \cdot 3H_2O$; cupric nitrate trihydrate, PVP; polyvinyl pyrrolidone, KOH; potassium hydroxide, $NaBH_4$; sodium borohydride, PW; pure water, $SnCl_4$; stannous chloride; T. A; tartaric acid, and $NH_3$; ammonia. Meanwhile, in the TEM-EDS analysis, tin, silver, and copper in the tin-silver-copper alloy particles were quantitatively analyzed in the way similar to Examples A1 to A15; and in the ICP analysis, too, tin, silver, and copper in dried powders of the tin-silver-copper alloy particles were quantitatively analyzed in the way similar to Examples A1 to A15.

Comparative Examples A4 was carried out in the way similar to Examples A16.

TABLE 6

| | First fluid | | | | | | | | | | | | |
|---|---|---|---|---|---|---|---|---|---|---|---|---|---|
| | Solvent | Mixed and dissolved substances | | | | | | | | | | Supply | |
| | | 1 | | 2 | | 3 | | 4 | | 5 | | 6 | temperature | pH |
| Example A | Kind | Kind | (M) | Kind | (M) | Kind | (M) | Kind | (wt %) | Kind | (wt %) | Kind | (° C.) | (pH meter) |
| 16 | PW | 0.05 | $SnCl_4$ | 0.00171 | $AgNO_3$ | 0.000479 | $Cu(NO_3)_2 \cdot 3H_2O$ | 2.08 | T. A. | 1.18 | $NH_3$ | 100 | 9.43 |
| Comparable Example 4 | PW | 0.05 | $SnCl_4$ | 0.00171 | $AgNO_3$ | 0.000479 | $Cu(NO_3)_2 \cdot 3H_2O$ | 2.08 | T. A. | 1.18 | $NH_3$ | 100 | 9.43 |

TABLE 7

| | Second fluid | | | | | | | | | |
|---|---|---|---|---|---|---|---|---|---|---|
| | Solvent | Mixed and dissolved substances | | | | | | | Supply | |
| | 1 | 1 | | 2 | | 3 | | 4 | temperature | pH |
| Example A | Kind | Kind | (wt %) | Kind | (wt %) | Kind | (wt %) | Kind | (° C.) | (pH meter) |
| 16 | PW | 10 | $NaBH_4$ | 3 | KOH | 0.85 | EG | 0.15 | PVP | 25 | 13.52 |
| Comparable Example 4 | PW | 10 | $NaBH_4$ | 0.02 | KOH | — | — | — | — | 25 | 13.94 |

TABLE 8

| | Processing surface Rotation number (rpm) | Discharged solution pH pH meter | TEM-EDS Mole ratio | | | Measurement point where 100% of Sn, of Ag, or of Cu was detected | ICP Mole ratio | | | Particle diameter (nm) |
|---|---|---|---|---|---|---|---|---|---|---|
| Example A | | | Tin | Silver | Copper | | Tin | Silver | Copper | |
| 16 | 1700 | 9.74 | 95.84 | 3.54 | 0.62 | No | 96.6 | 2.9 | 0.5 | 30 to 40 |
| Comparable Example 4 | 1700 | 10.1 | 98.76 | 1.08 | 0.16 | Yes | 95.8 | 3.4 | 0.8 | 40 to 90 |

According to the TEM-EDS analyses of all the analysis points in Example A16, in the ratio of tin, silver, and copper (mole ratio) in the tin-silver-copper alloy particles of Example A16, there was not detected the analysis point at which tin was 100%, silver was 100%, or copper was 100%. It was found that in each of 10 tin-silver-copper alloy particles in Example 16 whose EDS analyses were conducted, in 50% or more points of the 5 analysis points, the mole ratios of tin, silver, and copper in the TEM-EDS analysis were detected within ±30% of the mole ratios of tin, silver, and copper obtained by the ICP analyses.

Meanwhile, in the STEM-EDS analyses, too, in 50% or more of the analysis points, the mole ratios of tin, silver, and copper were detected within ±30% of the mole ratios of tin, silver, and copper obtained by the ICP analyses. Further, in the XRD analysis, the peak attributable to tin was confirmed; but the peaks attributable to the single body of silver or of copper could not be confirmed.

As discussed above, although the tin-silver-copper alloys that have been reported in the past were eutectic body alloys, it could be confirmed that the alloy of the Example A16 was the tin-silver-copper alloy particles substantially not containing the eutectic body.

As discussed above, in Example A16, it was found that the tin-silver-copper alloy particles not containing the eutectic body could be obtained when the fluid which contained a stannous ion, a silver ion, and a copper ion was mixed with the fluid which contained at least two reducing agents (sodium borohydride, and in this Example, PVP and ethylene glycol were used as the reducing agents) in the thin film fluid formed between at least two processing surfaces which were disposed so as to be able to approach to and separate from each other, at least one of which rotated relative to the other, preferably when pH of the fluid after the mixing was made 8 or higher. In addition, the composition ratio of Example 16 (tin:silver:copper=96.6:2.9:0.5 (mole ratio) and 97.0:2.7:0.3 (weight ratio), based on the ICP analysis result) is the composition of the metal alloy that can be used in a general solder. Melting point of a general solder is 217° C.; however, in the alloy obtained in Example 16, starting temperature of the endothermic peak was 195.68° C., showing depression of the melting point based on the result of the measurement by the DSC (by the differential scanning calorimeter DSC-60, manufactured by Shimadzu Corp.) with the temperature ascending rate of 10° C./minute (40 to 230° C.) under a nitrogen atmosphere with the sample amount of 5.4 mg. The TEM picture of the particle obtained in Example A16 is shown in FIG. 29.

(B) Silver-Nickel Alloy

Next, the silver-nickel alloy will be explained specifically by showing Examples.

TEM-EDS Analysis:

The quantitative analyses of silver and nickel in the silver-nickel alloy particles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of silver to nickel in the silver-nickel alloy particles. Specifically, 4 analysis points shown in FIG. 33 were chosen in each of 10 of the obtained silver-nickel alloy particle; and mole ratios of silver to nickel at respective analysis points were calculated, from which values the average value was used.

STEM-EDS Analysis:

The quantitative analyses of silver and nickel in the silver-nickel alloy particles by STEM-EDS were carried out by the ultra-high resolution transmission electron microscope TITAN 80-300 (manufactured by FEI company) equipped with the γ-TEM EDS detector (manufactured by Ametek Inc.). The analysis was done by using the beam diameter of 0.2 nm to calculate the mole ratio of silver to nickel in the silver-nickel alloy particles. Specifically, 4 analysis points shown in FIG. 32 were chosen in each of 10 of the obtained silver-nickel alloy particles; and mole ratios of silver to nickel at respective analysis points were calculated, from which values the average value was used.

ICP analysis:

Quantitative analyses of silver and nickel contained in the dried powders of the silver-nickel alloy particles by the inductively coupled plasma atomic emission spectrophotometry (ICP) were carried out by using ICPS-8100 (manufactured by Shimadzu Corp.).

XRD Measurement:

X-Ray diffraction measurements were done by using the powder X-ray diffraction measurement instrument X'pert PRO MPD (XRD; manufactured by Panalytical Business Unit of Spectris Co., Ltd.). The measurement conditions were as following: the Cu anticathode was used with the tube voltage of 45 kV, the tube current of 40 mA, and the scanning rate of 1.6°/minute.

As Examples B1 to B10, while the fluid which contained a silver ion and a nickel ion was introduced as the first fluid from the center with the supply pressure of 0.50 MPaG, the fluid which contained a reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the silver-nickel alloy particles was discharged from between the processing surfaces 1 and 2. The discharged dispersion solution of the silver-nickel alloy particles was treated by a centrifugal separator (20,000 G) to spin down the silver-nickel alloy particles. After the supernatant solution thereof was removed, washing by methanol was repeated for three times; and then, the wet cake thus obtained was dried under air pressure at 25° C. to obtain dried powders of the silver-nickel alloy particles. Confirmation of the particle diameter of the silver-nickel alloy particles was done by using the TEM observation; and judgment thereof was done by the particle diameter of the primary particle thereof. The TEM measurements were done with the magnification of 50,000 or more; and the average value of 3 spots were used. Processing conditions of the first fluid are shown in Table 9; processing conditions of the second fluid are shown in Table 10; and shown in Table 11 are the rotation number, the ratio of silver to nickel (mole ratio) in the silver-nickel alloy particles obtained by the STEM-EDS or the TEM-EDS analyses results, whether or not there was the analysis point (in Table 11, they are referred to as measurement point) at which only silver (100% silver) or only nickel (100% nickel) was detected, the silver to nickel (mole ratio) in the silver-nickel alloy particles based on the ICP analysis results which was done by using the dried powders of the silver-nickel alloy particles, and particle diameters of the silver-nickel alloy particles. The abbreviations used in Table 9 and Table 10 are as following: EG; ethylene glycol, $AgNO_3$; silver nitrate, $Ni(No_3)_2 \cdot 6 H_2O$; Nickel nitrate hexahydrate, HMH; hydrazine monohydrate, PVP; polyvinyl pyrrolidone, KOH; potassium hydroxide, and PW; pure water.

As Comparative Examples B1, B2, and B3, the aforementioned reducing reaction was carried out by using a beaker. Each of the same fluids which contained the silver ion and the nickel ion as those of Examples Bi, B2, and B3 at 130° C. was added with stirring into the respective same fluids which contained the reducing agent as those of Examples BI, B2, and B3 at 20° C. in a beaker to mix them. The particles respectively obtained by the same procedures as those of Examples B1, B2, and B3 were recovered; and they were subjected to the STEM-EDS analysis, the TEM-EDS analysis, the ICP analysis, and the TEM observation.

In FIG. 31, the TEM picture of the silver-nickel alloy particle obtained by Example B1 is shown. In FIG. 36, the TEM picture of the silver-nickel alloy particles obtained by Example B1 with a lower magnification is shown.

In addition, in FIG. 32, the STEM picture of the silver-nickel particle obtained in Example B2 and the STEM-EDS analysis points (4 points) of the said particle by the 0.2 nm beam diameter are shown, and in FIG. 34, the EDS analysis results measured at the respective analysis points shown in FIG. 32 are shown. The EDS analysis results in FIG. 34 are representative of the silver-nickel alloy particles prepared by Example B2. From the analysis results shown in FIG. 34, in 50% or more of the analysis points, the mole ratios of silver to nickel in the STEM-EDS analysis were detected within ±30% of the mole ratios of silver to nickel obtained by the ICP analysis result. The EDS analysis results in FIG. 34 are one example of the silver-nickel alloy particles obtained in Example B2; and in each of 10 silver-nickel alloy particles whose EDS analyses were conducted, in 50% or more of the analysis points, the mole ratios of silver to nickel in the STEM-EDS analysis were detected within ±30% of the mole ratios of silver to nickel obtained by the ICP analysis result.

In addition, the XRD measurement result by using dried powders of the silver-nickel alloy particles obtained by Example B2 is shown in FIG. 37. For comparison, the diffraction pattern of the reagent grade Ag and the diffraction pattern of the reagent grade nickel are also shown as the references. In all the TEM observation of Examples B1 to B10, interference bands of the crystal were confirmed; on the other hand, as the result of the XRD measurement, the diffraction peaks coinciding with those of the reagent grade nickel were not found, but what was found were broadened peaks of the reagent grade silver.

In addition, in FIG. 33, the TEM picture of the silver-nickel particle obtained in Example B3 and the TEM-EDS analysis points (4 points) of the said particle by the 5 nm beam diameter are shown, and in FIG. 35, the EDS analysis results measured at the respective analysis points shown in FIG. 33 are shown. The EDS analysis results in FIG. 35 are representative of the silver-nickel alloy particles prepared by Example B3. From the analysis results shown in FIG. 35, in 50% or more of the analysis points, the mole ratios of silver to nickel were detected within ±30% of the mole ratios of silver to nickel obtained by the ICP analysis result. The EDS analysis results in FIG. 35 are one example of the silver-nickel alloy particles obtained in Example B3; and in each of 10 silver-nickel alloy particles whose EDS analyses were conducted, in 50% or more of the analysis points, the mole ratios of silver to nickel in the TEM-EDS analysis were detected within ±30% of the mole ratios of silver to nickel obtained by the ICP analysis result.

Accordingly, it could be confirmed that the silver-nickel alloy particles obtained by these Examples were the silver-nickel alloys not containing the eutectic body, especially the substitutional solid solution alloy particles.

TABLE 9

| | First fluid | | | | | | |
|---|---|---|---|---|---|---|---|
| | | Mixed and dissolved substance | | | | Supply | |
| | Solvent | 1 | | 2 | | temperature | pH |
| Example B | Kind | (M) | Kind | (M) | Kind | (° C.) | (pH test paper) |
| 1 | EG | 0.0024 | AgNO$_3$ | 0.0024 | Ni(NO$_3$)$_2$·6H$_2$O | 130 | 4 to 5 |
| 2 | EG | 0.00085 | AgNO$_3$ | 0.0048 | Ni(NO$_3$)$_2$·6H$_2$O | 130 | 4 to 5 |
| 3 | EG | 0.0048 | AgNO$_3$ | 0.00085 | Ni(NO$_3$)$_2$·6H$_2$O | 130 | 4 to 5 |
| 4 | EG | 0.0024 | AgNO$_3$ | 0.00013 | Ni(NO$_3$)$_2$·6H$_2$O | 130 | 4 to 5 |
| 5 | EG | 0.0024 | AgNO$_3$ | 0.000015 | Ni(NO$_3$)$_2$·6H$_2$O | 130 | 4 to 5 |
| 6 | EG | 0.0024 | AgNO$_3$ | 0.0008 | Ni(NO$_3$)$_2$·6H$_2$O | 130 | 4 to 5 |
| 7 | EG | 0.0008 | AgNO$_3$ | 0.0024 | Ni(NO$_3$)$_2$·6H$_2$O | 130 | 4 to 5 |
| 8 | EG | 0.0024 | AgNO$_3$ | 0.0456 | Ni(NO$_3$)$_2$·6H$_2$O | 130 | 4 to 5 |
| 9 | EG | 0.00048 | AgNO$_3$ | 0.0955 | Ni(NO$_3$)$_2$·6H$_2$O | 130 | 4 to 5 |
| 10 | EG | 0.0008 | AgNO$_3$ | 0.0776 | Ni(NO$_3$)$_2$·6H$_2$O | 130 | 4 to 5 |
| Comparative Example 1 | EG | 0.0024 | AgNO$_3$ | 0.0024 | Ni(NO$_3$)$_2$·6H$_2$O | 130 | 4 to 5 |
| Comparative Example 2 | EG | 0.00085 | AgNO$_3$ | 0.0048 | Ni(NO$_3$)$_2$·6H$_2$O | 130 | 4 to 5 |
| Comparative Example 3 | EG | 0.0048 | AgNO$_3$ | 0.00085 | Ni(NO$_3$)$_2$·6H$_2$O | 130 | 4 to 5 |

TABLE 10

| | Second fluid | | | | | | | | | |
|---|---|---|---|---|---|---|---|---|---|---|
| | Solvent | | Mixed and dissolved substance | | | | | | Supply | pH |
| | | 2 | | | 2 | | 3 | | | |
| | 1 | (% by | | 1 | (% by | | (% by | | temperature | (pH test |
| Example B | Kind | weight) | Name | (M) | Kind | weight) | Kind | weight) | Kind | (° C.) | paper) |
| 1 | EG | 39 | PW | 2 | HMH | 10 | PVP | 1 | KOH | 20 | >14 |
| 2 | EG | 39 | PW | 2 | HMH | 10 | PVP | 1 | KOH | 20 | >14 |
| 3 | EG | 39 | PW | 2 | HMH | 10 | PVP | 1 | KOH | 20 | >14 |
| 4 | EG | 39 | PW | 2 | HMH | 10 | PVP | 1 | KOH | 20 | >14 |
| 5 | EG | 39 | PW | 2 | HMH | 10 | PVP | 1 | KOH | 20 | >14 |
| 6 | EG | 39 | PW | 2 | HMH | 10 | PVP | 1 | KOH | 20 | >14 |
| 7 | EG | 39 | PW | 2 | HMH | 10 | PVP | 1 | KOH | 20 | >14 |
| 8 | EG | 39 | PW | 2 | HMH | 10 | PVP | 1 | KOH | 20 | >14 |
| 9 | EG | 39 | PW | 2 | HMH | 10 | PVP | 1 | KOH | 20 | >14 |
| 10 | EG | 39 | PW | 2 | HMH | 10 | PVP | 1 | KOH | 20 | >14 |
| Comparative Example 1 | EG | 39 | PW | 2 | HMH | 10 | PVP | 1 | KOH | 20 | >14 |
| Comparative Example 2 | EG | 39 | PW | 2 | HMH | 10 | PVP | 1 | KOH | 20 | >14 |
| Comparative Example 3 | EG | 39 | PW | 2 | HMH | 10 | PVP | 1 | KOH | 20 | >14 |

TABLE 11

| | Processing | EDS | | | | | | |
|---|---|---|---|---|---|---|---|---|
| | surface Rotation | STEM-EDS | | TEM-EDS | | Measurement point at which 100% Ag | ICP | | Particle |
| Example B | number (rpm) | Silver Mole | Nickel ratio | Silver Mole | Nickel ratio | or 100% Ni was detected | Silver Mole | Nickel ratio | diameter (nm) |
| 1 | 1700 | 50.1 | 49.9 | 50.8 | 49.2 | No | 50.3 | 49.7 | 5 |
| 2 | 1700 | 15.4 | 84.6 | 15.1 | 84.9 | No | 14.9 | 85.1 | 10 to 20 |
| 3 | 1700 | 84.9 | 15.1 | 84.6 | 15.4 | No | 84.9 | 15.1 | 30 to 50 |
| 4 | 1700 | 95.1 | 4.9 | 93.4 | 6.6 | No | 95.1 | 4.9 | 20 to 45 |
| 5 | 1700 | 99.4 | 0.6 | 99.1 | 0.9 | No | 99.5 | 0.5 | 3 to 5 |
| 6 | 1700 | 75.3 | 24.7 | 73.9 | 26.1 | No | 75.4 | 24.6 | 20 to 30 |
| 7 | 1700 | 24.6 | 75.4 | 24.9 | 75.1 | No | 24.8 | 75.2 | 10 to 15 |
| 8 | 1700 | 4.8 | 95.2 | 5.3 | 94.7 | No | 5.3 | 94.7 | 5 to 10 |
| 9 | 1700 | 0.4 | 99.6 | 0.6 | 99.4 | No | 0.5 | 99.5 | 10 to 20 |
| 10 | 1700 | 3.1 | 96.9 | 2.7 | 97.3 | No | 3.1 | 96.9 | 3 to 5 |
| Comparative Example 1 | 1700 | 12.3 | 87.7 | 46.9 | 53.1 | Yes | 50.1 | 49.9 | 15 to 20 |
| Comparative Example 2 | 1700 | 1.3 | 98.7 | 87.6 | 12.4 | Yes | 14.1 | 85.9 | 20 to 30 |
| Comparative Example 3 | 1700 | 99.9 | 0.1 | 4.6 | 95.4 | Yes | 83.6 | 16.4 | 20 |

As discussed above, from the results of the TEM-EDS analysis and the STEM-EDS analysis, it was confirmed that in Examples B1 to B10, the silver-nickel alloy particles having the non-eutectic body structure not containing the eutectic body were obtained. Similarly to Examples with regard to the silver-copper alloy particles, in these silver-nickel alloy particles obtained by Examples B1 to B10, too, the surged lattice fringes were observed in the crystal lattice as shown by the STEM pictures.

(C) Gold-Nickel Alloy Nanoparticle

Next, the gold-nickel alloy nanoparticle will be explained specifically by showing Examples.

TEM-EDS Analysis:

The quantitative analyses of gold and nickel in the gold-nickel alloy nanoparticles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of gold to nickel in the gold-nickel alloy nanoparticles. Specifically, 5 analysis points shown in FIG. 41 were chosen in each of 10 of the obtained gold-nickel alloy nanoparticle; and mole ratios of gold to nickel at respective analysis points were calculated, from which values the average value was used.

STEM-EDS Analysis:

The quantitative analyses of gold and nickel in the gold-nickel alloy nanoparticles by STEM-EDS were carried out by the ultra-high resolution transmission electron microscope TITAN 80-300 (manufactured by FEI company) equipped with the γ-TEM EDS detector (manufactured by Ametek Inc.). The analysis was done by using the beam diameter of 0.2 nm to calculate the mole ratio of gold to nickel in the gold-nickel alloy nanoparticles. Specifically, 4 analysis points shown in FIG. 40 were chosen in each of 10 of the obtained gold-nickel alloy nanoparticles; and mole ratios of gold to nickel at respective analysis points were calculated, from which values the average value was used.
ICP Analysis:

Quantitative analyses of gold and nickel contained in the dried powders of the gold-nickel alloy nanoparticles by the inductively coupled plasma atomic emission spectrophotometry (ICP) were carried out by using ICPS-8100 (manufactured by Shimadzu Corp.).

As Examples C1 to C6, while the fluid which contained a gold ion and a nickel ion was introduced as the first fluid from the center with the supply pressure of 0.50 MPaG, the fluid which contained a reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the gold-nickel alloy nanoparticles was discharged from between the processing surfaces 1 and 2. The discharged dispersion solution of the gold-nickel alloy nanoparticles was treated by a centrifugal separator (20,000 G) to spin down the gold-nickel alloy nanoparticles. After the supernatant solution thereof was removed, washing by methanol was repeated for three times; and then, the wet cake thus obtained was dried under air pressure at 25° C. to obtain dried powders of the gold-nickel alloy nanoparticles. Confirmation of the particle diameter of the gold-nickel alloy nanoparticles was done by using the TEM observation; and judgment thereof was done by the particle diameter of the primary particle thereof. The TEM measurements were done with the magnification of 50,000 or more; and the average value of 3 spots were used. In Table 12, processing conditions of the first fluid are shown; and in Table 13, processing conditions of the second fluid are shown. In Table 14, shown are rotation number of the processing surface 1, the ratio of gold to nickel (mole ratio) obtained by the STEM-EDS analysis and the TEM-EDS analysis of the gold-nickel alloy nanoparticles, the ratio of gold to nickel in the STEM-EDS analysis and the TEM-EDS analysis of the gold-nickel alloy nanoparticles, whether or not there was an analysis point at which the ratio of gold to nickel was in α or β (in Table 14, this point is shown as measurement point), the ratio of gold to nickel (mole ratio) in the gold-nickel alloy nanoparticles by the ICP analysis result which was done by using dried powders of the gold-nickel alloy nanoparticles, and the nickel concentration (% by weight) contained in the gold-nickel alloy. The abbreviations used in Table 12 and in Table 13 are as follows: EG; ethylene glycol, HAuCl$_4$.4H$_2$O; chloroauric acid tetrahydrate, NiCl$_2$.6H$_2$O; nickel chloride hexahydrate, HMH; hydrazine monohydrate, PVP; polyvinyl pyrrolidone, KOH; potassium hydroxide, and PW; pure water.

As Comparative Examples C1 to C3, mixing of the first fluid and the second fluid was carried out by using a beaker. Each of the same fluids which contained the gold ion and nickel ion as those of Examples C1 to C3 at 130° C. was added with stirring into each of the same fluid which contained the reducing agent as those of Examples C1 to C3 at 20° C. in a beaker to mix them. The particles respectively obtained by the same procedures as those of Examples C1 to C3 were recovered; and they were subjected to the STEM-EDS analysis, the TEM-EDS analysis, and the ICP analysis.

From the results of the TEM-EDS analysis and the STEM-EDS analysis in all the analysis points, it was confirmed that the gold-nickel alloy nanoparticles obtained in these Examples were the gold-nickel alloy nanoparticles whose nickel concentrations contained in the gold-nickel alloy were in the range of 2.0 to 92.7% by weight (all were in the α+β region of the Au—Ni alloy equilibrium diagram). In addition, there was no analysis point detected at which the ratio of gold to nickel (mole ratio) in the gold-nickel alloy nanoparticles obtained by these Examples was the ratio of gold to nickel (mole ratio) in α or β, respectively.

In FIG. 39, the TEM picture of the gold-nickel alloy nanoparticle obtained by Example C1 is shown; in FIG. 40, the STEM picture of the gold-nickel alloy nanoparticle obtained by Example C2 is shown; and in FIG. 41, the TEM picture of the gold-nickel alloy nanoparticle obtained by Example C3 is shown. In FIG. 44, the TEM picture of the gold-nickel alloy nanoparticles obtained by Example C1 with a lower magnification is shown. As shown in FIG. 39 to FIG. 41, the clear state in which gold and nickel each is segregated was not confirmed in the gold-nickel alloy nanoparticles obtained by these Examples.

In addition, in FIG. 40, the gold-nickel alloy nanoparticle obtained in Example C2 by the STEM-EDS analysis points (4 points) by the particle diameter of 0.2 nm beam diameter are shown. From the analysis results shown in FIG. 42, in 50% or more of the analysis points, the mole ratios of gold to nickel in the STEM-EDS analysis were detected within ±30% of the mole ratios of gold to nickel obtained by the ICP analysis result.

The EDS analysis results in FIG. 42 are one example of the gold-nickel alloy nanoparticles obtained in Example C2; and in each of 10 gold-nickel alloy nanoparticles whose EDS analyses were conducted, in 50% or more of the analysis points, the mole ratios of gold to nickel in the STEM-EDS analysis were detected within ±30% of the mole ratios of gold to nickel obtained by the ICP analysis result.

In addition, in FIG. 41, the gold-nickel alloy nanoparticle obtained by Example C3 by the TEM-EDS analysis points (5 points) by the particle diameter of 5 nm beam diameter are shown. From the analysis results shown in FIG. 43, in 50% or more of the analysis points, the mole ratios of gold to nickel were detected within ±30% of the mole ratios of gold to nickel obtained by the ICP analysis result.

The EDS analysis results in FIG. 43 are one example of the gold-nickel alloy nanoparticles obtained in Example C3; and in each of 10 gold-nickel alloy nanoparticles whose EDS analyses were conducted, in 50% or more of the analysis points, the mole ratios of gold to nickel in the TEM-EDS analysis were detected within ±30% of the mole ratios of gold to nickel obtained by the ICP analysis result.

TABLE 12

| | First fluid | | | | | | |
|---|---|---|---|---|---|---|---|
| | Solvent | Mixed and dissolved substance | | | | Supply temperature | pH (pH test |
| | | 1 | | 2 | | | |
| Example C | Kind | (M) | Kind | (M) | Kind | (° C.) | paper) |
| 1 | EG | 0.0075 | HAuCl$_4$•4H$_2$O | 0.0075 | NiCl$_2$•6H$_2$O | 130 | 2 to 3 |
| 2 | EG | 0.0017 | HAuCl$_4$•4H$_2$O | 0.0096 | NiCl$_2$•6H$_2$O | 130 | 2 to 3 |
| 3 | EG | 0.0075 | HAuCl$_4$•4H$_2$O | 0.0026 | NiCl$_2$•6H$_2$O | 130 | 2 to 3 |
| 4 | EG | 0.00024 | HAuCl$_4$•4H$_2$O | 0.00936 | NiCl$_2$•6H$_2$O | 130 | 2 to 3 |
| 5 | EG | 0.0024 | HAuCl$_4$•4H$_2$O | 0.0008 | NiCl$_2$•6H$_2$O | 130 | 2 to 3 |
| 6 | EG | 0.0016 | HAuCl$_4$•4H$_2$O | 0.0189 | NiCl$_2$•6H$_2$O | 130 | 2 to 3 |
| Comparative Example 1 | EG | 0.0075 | HAuCl$_4$•4H$_2$O | 0.0075 | NiCl$_2$•6H$_2$O | 130 | 2 to 3 |
| Comparative Example 2 | EG | 0.0017 | HAuCl$_4$•4H$_2$O | 0.0096 | NiCl$_2$•6H$_2$O | 130 | 2 to 3 |
| Comparative Example 3 | EG | 0.0075 | HAuCl$_4$•4H$_2$O | 0.0013 | NiCl$_2$•6H$_2$O | 130 | 2 to 3 |

TABLE 13

| | Second fluid | | | | | | | | | |
|---|---|---|---|---|---|---|---|---|---|---|
| | Solvent | | | Mixed and dissolved substance | | | | | Supply temperature | pH (pH test |
| | 1 | 2 (% by weight) | Name | 1 (M) | Kind | 2 (% by weight) | Kind | 3 (% by weight) | Kind | |
| Example C | Kind | | | | | | | | | (° C.) | paper) |
| 1 | EG | 32.3 | PW | 2.15 | HMH | 10.8 | PVP | 3.23 | KOH | 20 | >14 |
| 2 | EG | 32.3 | PW | 2.15 | HMH | 10.8 | PVP | 3.23 | KOH | 20 | >14 |
| 3 | EG | 32.3 | PW | 2.15 | HMH | 10.8 | PVP | 3.23 | KOH | 20 | >14 |
| 4 | EG | 32.3 | PW | 2.15 | HMH | 10.8 | PVP | 3.23 | KOH | 20 | >14 |
| 5 | EG | 32.3 | PW | 2.15 | HMH | 10.8 | PVP | 3.23 | KOH | 20 | >14 |
| 6 | EG | 32.3 | PW | 2.15 | HMH | 10.8 | PVP | 3.23 | KOH | 20 | >14 |
| Comparative Example 1 | EG | 32.3 | PW | 2.15 | HMH | 10.8 | PVP | 3.23 | KOH | 20 | >14 |
| Comparative Example 2 | EG | 32.3 | PW | 2.15 | HMH | 10.8 | PVP | 3.23 | KOH | 20 | >14 |
| Comparative Example 3 | EG | 32.3 | PW | 2.15 | HMH | 10.8 | PVP | 3.23 | KOH | 20 | >14 |

TABLE 14

| | Processing surface Rotation number (rpm) | EDS | | | | Measurement point at which the ratio of gold to nickel was in α or β | ICP | | Nickel concentration contained in AuNi alloy (% by weight) | Particle diameter (nm) |
|---|---|---|---|---|---|---|---|---|---|---|
| | | STEM-EDS | | TEM-EDS | | | | | | |
| | | Gold | Nickel | Gold | Nickel | | Gold | Nickel | | |
| Example C | | Mole ratio | | Mole ratio | | | Mole ratio | | | |
| 1 | 1700 | 50.1 | 49.9 | 50.8 | 49.2 | No | 50.1 | 49.9 | 22.9 | 10 to 20 |
| 2 | 1700 | 14.9 | 85.1 | 15.2 | 84.8 | No | 14.9 | 85.1 | 63.0 | 5 to 10 |
| 3 | 1700 | 74.3 | 25.7 | 75.0 | 25.0 | No | 74.1 | 25.9 | 9.4 | 30 to 50 |
| 4 | 1700 | 2.7 | 97.3 | 2.6 | 97.4 | No | 2.5 | 97.5 | 92.1 | 70 to 90 |
| 5 | 1700 | 75.3 | 24.7 | 73.9 | 26.1 | No | 75.4 | 24.6 | 8.9 | 150 to 250 |
| 6 | 1700 | 7.7 | 92.3 | 7.6 | 92.4 | No | 7.8 | 92.2 | 77.9 | 480 |
| Comparative Example 1 | 1700 | 12.3 | 87.7 | 46.9 | 53.1 | Yes | 50.1 | 49.9 | 22.9 | 250-740 |
| Comparative Example 2 | 1700 | 1.3 | 98.7 | 87.6 | 12.4 | Yes | 14.1 | 85.9 | 64.5 | 480 to 960 |
| Comparative Example 3 | 1700 | 99.9 | 0.1 | 4.6 | 95.4 | Yes | 83.6 | 16.4 | 5.5 | 320 to 1120 |

From the above, in Examples C1 to C6, it was confirmed that the homogeneous gold-nickel alloy nanoparticle, the solid solution gold-nickel alloy nanoparticle which was made so as to show the finely mixed state of the two metals in the level of nanometers, especially the substitutional solid solution alloy particle, could be obtained.

Meanwhile, similarly to other Examples with regard to the silver-copper alloy particles, in the gold-nickel alloy particles obtained by each Example (Examples C1 to C6), too, the lattice fringes in the surged state were observed by the STEM pictures.

(D) Silver-Antimony Alloy

Next, the silver-antimony alloy will be explained specifically by showing Examples.

TEM-EDS Analysis:

The quantitative analyses of silver and antimony in the silver-antimony alloy particles by TEM-EDS were carried out by the transmission electron microscope JEM-2100 (manufactured by JEOL Ltd.) equipped with the energy dispersive X-ray analyzer JED-2300 (manufactured by JEOL Ltd.). The analysis was done by using the beam diameter of 5 nm to calculate the mole ratio of silver to antimony in the silver-antimony alloy particles. Specifically, 4 analysis points shown in FIG. 48 were chosen in each of 10 of the obtained silver-antimony alloy particle; and mole ratios of silver to antimony at respective analysis points were calculated, from which values the average value was used.

Specific conditions of the TEM observation and the TEM-EDS analysis were as follows; a sample of the silver-antimony alloy particles was mounted on the transmission electron microscope at room temperature, and an electron beam was irradiated to the sample of the silver-antimony alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-antimony alloy particles.

Meanwhile, the acceleration voltage of the electron beam to irradiate the silver-antimony alloy particles can be set arbitrarily to approximately several hundred kV by the used transmission electron microscope.

STEM-EDS Analysis:

The element mapping and the quantitative analyses of silver and antimony in the silver-antimony alloy particles by STEM-EDS were carried out by the ultra-high resolution transmission electron microscope TITAN 80-300 (manufactured by FEI company) equipped with the γ-TEM EDS detector (manufactured by Ametek Inc.), and the atomic resolution analytical electron microscope JEM-ARM200F (manufactured by JEOL Ltd.) equipped with the energy dispersive X-ray analyzer Centurio (manufactured by JEOL Ltd.). The analysis was done by using the beam diameter of 0.2 nm to calculate the mole ratio of silver to antimony in the silver-antimony alloy particles. Specifically, 4 analysis points shown in FIG. 47 were chosen in each of 10 of the obtained silver-antimony alloy particles; and mole ratios of silver to antimony at respective analysis points were calculated, from which values the average value was used.

Specific conditions of the STEM observation, the TEM observation, and the STEM-EDS analysis were as follows; a sample of the silver-antimony alloy particles was mounted on the scanning transmission electron microscope at room temperature, and an electron beam was irradiated to the sample of the silver-antimony alloy particles with the acceleration voltage of 200 kV. During this operation, temperature of the sample was not controlled. By the observations using a low acceleration voltage and the acceleration voltage of 200 kV, it was confirmed that the electron beam irradiation did not cause any changes in the silver-antimony alloy particles.

Meanwhile, the acceleration voltage of the electron beam to irradiate the silver-antimony alloy particles can be set arbitrarily to approximately several hundred kV by the used electron microscopes.

ICP Analysis:

Quantitative analyses of silver and antimony contained in the dried powders of the silver-antimony alloy particles by the inductively coupled plasma atomic emission spectrophotometry (ICP) were carried out by using ICPS-8100 (manufactured by Shimadzu Corp.).

XRD Measurement:

X-Ray diffraction measurements were done by using the powder X-ray diffraction measurement instrument X'pert PRO MPD (XRD; manufactured by Panalytical Business Unit of Spectris Co., Ltd.). The measurement conditions were as following: the Cu anticathode was used with the tube voltage of 45 kV, the tube current of 40 mA, and the scanning rate of 1.6°/minute.

Specific conditions of the XRD measurement were as follows; a sample of the silver-antimony alloy particles was mounted on the X-ray diffraction measurement instrument at room temperature, and an electron beam was irradiated to the sample of the silver-antimony alloy particles. During this operation, temperature of the sample was not controlled. It was confirmed that the electron beam irradiation did not cause any changes in the silver-antimony alloy particles.

Measurement of pH:

Measurement of pH was done by using a pH test paper or a pH meter Type D-51 (manufactured by Horiba, Ltd.).

DSC measurement:

As Examples D1 to D10, while the fluid which contained a silver ion and an antimony ion was introduced as the first fluid from the center with the supply pressure of 0.50 MPaG, the fluid which contained a reducing agent was introduced as the second fluid into between the processing surfaces 1 and 2 to mix the first fluid and the second fluid in the thin film fluid formed therebetween. The respective supply temperatures of the first fluid and the second fluid were measured just before introduction of the first fluid and the second fluid into the processing apparatus (more specifically just before introduction into between the processing surfaces 1 and 2). The dispersion solution of the silver-antimony alloy particles was discharged from between the processing surfaces 1 and 2. The discharged dispersion solution of the silver-antimony alloy particles was treated by a centrifugal separator (20,000 G) to spin down the silver-antimony alloy particles. After the supernatant solution thereof was removed, washing by ethanol was repeated for three times; and then, the wet cake thus obtained was dried under air pressure at 25° C. to obtain dried powders of the silver-antimony alloy particles. Confirmation of the particle diameter of the silver-antimony alloy particles was done by using the TEM observation; and judgment thereof was done by the particle diameter of the primary particle thereof. The TEM measurements were done with the magnification of 250,000 or more; and the maximum value and the minimum value of 3 spots were used. In Table 15, processing conditions of the first fluid are shown; and in Table 16, processing conditions of the second fluid are shown. In Table 17, shown are rotation speed of the processing surface 1, the ratio of silver to antimony (mole ratio) obtained by the STEM-EDS analysis and the TEM-EDS analysis of the silver-antimony alloy particles, whether or not there was an analysis point at which only silver (100% silver) or only antimony (100% antimony) was observed (in Table 17, this point is shown as measurement point) by the STEM-EDS analysis and the TEM-EDS analysis, the ratio of silver to antimony (mole ratio) in the silver-antimony alloy particles by the ICP analysis which was done by using dried powders of the silver-antimony alloy particles, the antimony concentration (% by weight) contained in the silver-antimony alloy, and whether or not there were the peaks derived from the intermetallic compound of silver and antimony in the XRD measurement. The abbreviations used in Table 15 and Table 16 are as follows: EG; ethylene glycol, $AgCH_3COO$; silver acetate, $Sb(CH_3COO)_3$; antimony acetate, TA; tartaric acid, $NH_3$ aq. (30%); aqueous ammonia (30%), $NaBH_4$; sodium borohydride, OA; octylamine, PVP; polyvinyl pyrrolidone, EtOH; ethanol, NaOH; sodium hydroxide, PW; pure water, and Citric Acid. Further, as to pH shown in Table 15 and Table 16, pH values with one decimal place were obtained by the pH meter measurement; and pH values with a range of integers were obtained by the pH test paper measurement. Meanwhile, "Measurement point at which 100% of Ag or 100% Sb was detected" shown in Table 17 includes not only the point at which only silver (100% silver) or only antimony (100% antimony) was detected but also the analysis point at which the ratio of silver to antimony (mole ratio) belongs to the α-solid solution phase.

As Comparative Examples D1 to D3, mixing of the first fluid and the second fluid was carried out by using a beaker. Each of the same fluids which contained the silver ion and antimony ion as those of Examples D1 to D3 at the same temperature was added with stirring into each of the same fluid which contained the reducing agent as those of Examples D1 to D3 at the same temperature in a beaker to mix them. The particles respectively obtained by the same procedures as those of Examples D1 to D3 were recovered; and they were subjected to the STEM-EDS analysis, the TEM-EDS analysis, the ICP analysis, and the XRD measurement.

As the results of the TEM-EDS analysis and the STEM-EDS analysis in every analysis point, it was confirmed that the silver-antimony alloy particles obtained by these Examples were the silver-antimony alloy particles belonging to the region in which the antimony concentration contained in the silver-antimony alloy was 8.05% or more by weight and less than 100% by weight, that is, the silver-antimony alloy particles belonging to outside the region of the α-solid solution phase in the Ag—Sb alloy equilibrium diagram. In addition, neither the analysis point at which the ratio of silver to antimony (mole ratio) in the silver-antimony alloy particles obtained in Examples was the ratio of silver to antimony (mole ratio) of the α-solid solution phase in the Ag—Sb alloy equilibrium diagram, nor the analysis point with 100% silver or 100% antimony was detected.

In FIG. 46, the TEM picture of the silver-antimony alloy particle obtained in Example D1 is shown; in FIG. 47, the STEM picture and the STEM-EDS analysis points (4 points) of the silver-antimony alloy particle obtained in Example D2 are shown; and FIG. 48, the TEM picture and the TEM-EDS analysis points (4 points) of the silver-antimony alloy particle obtained in Example D3 are shown, respectively. In FIG. 51, the TEM picture of the silver-antimony alloy particles obtained by Example D1 with a lower magnification is shown.

In FIG. 49, the EDS analysis results obtained in each analysis point in FIG. 47 are shown. As the result of the microregion analysis of the silver-antimony alloy particle obtained in the Example by the STEM-EDS analysis using the 0.2 nm beam diameter, in 50% or more of the analysis points, the mole ratios of silver to antimony were detected within ±30% of the mole ratios of silver to antimony obtained by the ICP analysis. The EDS analysis results in FIG. 49 are one example of the silver-antimony alloy particles obtained in Example D2; and in each of 10 silver-antimony alloy particles whose EDS analyses were conducted, in 50% or more of the 4 analysis points, the mole ratios of silver to antimony in the STEM-EDS analysis were detected within ±30% of the mole ratios of silver to antimony obtained by the ICP analysis. Furthermore, as the results of the same STEM-EDS analysis of other Examples in Table 17, there existed in the analysis points at which the mole ratios of silver to antimony in the STEM-EDS analysis of the several analysis points were maximum ±30% of the mole ratios of the silver to antimony obtained by the ICP analysis of each Example.

In FIG. 50, the EDS analysis results obtained in each analysis point in FIG. 48 are shown. As the result of the microregion analysis of the silver-antimony alloy particle of the present invention obtained in the Example by the TEM-EDS analysis using the 5 nm beam diameter, the mole ratios of silver to antimony were detected within ±30% of the mole ratios of silver to antimony obtained by the ICP analysis in 50% or more of the analysis points. The EDS analysis results in FIG. 50 are one example of the silver-antimony alloy particles obtained in Example D3; and in each of 10 silver-antimony alloy particles whose EDS analyses were conducted, in 50% or more of the 4 analysis points, the mole ratios of silver to antimony in the TEM-EDS analysis were detected within ±30% of the mole ratios of silver to antimony obtained by the ICP analysis. Furthermore, as the results of the same TEM-EDS analysis of other Examples in Table 17, there existed in several analysis points the analysis points at which the mole ratios of silver to antimony in the TEM-EDS analysis were maximum ±30% of the mole ratios of the silver to antimony obtained by the ICP analysis of each Example.

In FIG. 52, the STEM-HAADF picture (A) and the EDS mapping results of the silver-antimony alloy particle obtained in Example D3 are shown ((B); Ag, and (C); Sb). In the analysis using the EDS mapping, the clear state in which silver and antimony were segregated in one particle was not found.

In the XRD measurements of all the silver-antimony alloy particles obtained by these Examples, the peaks derived from the intermetallic compound could not be confirmed.

Next, in FIG. 53, the STEM pictures of the silver-antimony alloy particle obtained in Example D3 (magnification of 12 million) are shown ((A) the HAADF picture, and (B) the BF picture (bright field)). As shown in FIGS. 53 (A) and (B), the surged lattice fringes were confirmed in the silver-antimony alloy which was observed lattice fringes. In other Examples with regard to the silver-antimony alloy particles, too (Examples D1 to D2 and Examples D4 to D10), the same lattice fringes were confirmed.

In the case that each of silver and antimony forms the crystallite of its own, there appears the grain boundary of these crystallites, occasionally as the surges due to inconsistency in this grain boundary. However, the surges that were observed in the silver-antimony alloy particles of Example D3 were observed inside the crystallite; and thus, it is thought that by forming the solid solution by silver and antimony, the surges were generated by strain of the crystal lattice due to the difference of the atomic radius therebetween. In addition, according to the results of the powder X-ray diffractometry measurement of the silver-antimony alloy particles of Example D3, the crystalline diffractions and the intermetallic compound derived from only silver or only antimony were not observed; and thus, it is thought that the surges that were observed in the STEM pictures of FIGS. 53 (A) and (B) demonstrate that silver and antimony form the solid solution.

From the results shown above, it was found that the silver-antimony alloy particles obtained by Examples D1 to D10 were the solid solution silver-antimony particles not containing the eutectic body and the intermetallic compound.

TABLE 15

| | First fluid | | | | | | | | | | | | |
|---|---|---|---|---|---|---|---|---|---|---|---|---|---|
| | Solvent | Mixed and dissolved substance | | | | | | | | | | Supply temperature | |
| | | 1 | | 2 | | 3 | | 4 | | 5 | | | |
| Example D | Kind | (M) | Kind | (M) | Kind | (M) | Kind | (M) | Kind | (M) | Kind | (° C.) | pH |
| 1 | PW | 0.0063 | Sb(CH$_3$COO)$_3$ | 0.001 | AgCH$_3$COO | 0.0074 | TA | 0.111 | NH$_3$ aq. (30%) | 0.060 | PVP | 24 | 8.9 |
| 2 | PW | 0.0021 | Sb(CH$_3$COO)$_3$ | 0.001 | AgCH$_3$COO | 0.0124 | TA | 0.210 | NH$_3$ aq. (30%) | — | — | 72 | 8.9 |
| 3 | EtOH | 0.0020 | Sb(CH$_3$COO)$_3$ | 0.001 | AgCH$_3$COO | 0.0100 | OA | 0.020 | Citric Acid | 0.0360 | PVP | 23 | 6 to 7 |
| 4 | EtOH | 0.0040 | Sb(CH$_3$COO)$_3$ | 0.001 | AgCH$_3$COO | 0.0100 | OA | 0.020 | Citric Acid | 0.0360 | PVP | 23 | 6 to 7 |
| 5 | EtOH | 0.0025 | Sb(CH$_3$COO)$_3$ | 0.002 | AgCH$_3$COO | 0.0100 | OA | 0.020 | Citric Acid | 0.0360 | PVP | 23 | 6 to 7 |
| 6 | EtOH | 0.0015 | Sb(CH$_3$COO)$_3$ | 0.002 | AgCH$_3$COO | 0.0100 | OA | 0.020 | Citric Acid | 0.0360 | PVP | 23 | 6 to 7 |
| 7 | PW | 0.0055 | Sb(CH$_3$COO)$_3$ | 0.001 | AgCH$_3$COO | 0.0074 | TA | 0.111 | NH$_3$ aq. (30%) | 0.060 | PVP | 24 | 8.9 |
| 8 | PW | 0.0075 | Sb(CH$_3$COO)$_3$ | 0.001 | AgCH$_3$COO | 0.0124 | TA | 0.210 | NH$_3$ aq. (30%) | — | — | 72 | 8.9 |
| 9 | PW | 0.0063 | Sb(CH$_3$COO)$_3$ | 0.002 | AgCH$_3$COO | 0.0074 | TA | 0.111 | NH$_3$ aq. (30%) | 0.060 | PVP | 24 | 8.9 |
| 10 | PW | 0.0038 | Sb(CH$_3$COO)$_3$ | 0.001 | AgCH$_3$COO | 0.0124 | TA | 0.210 | NH$_3$ aq. (30%) | — | — | 72 | 8.9 |
| Comparative Example 1 | PW | 0.0063 | Sb(CH$_3$COO)$_3$ | 0.001 | AgCH$_3$COO | 0.0074 | TA | 0.111 | NH$_3$ aq. (30%) | 0.060 | PVP | 24 | 8.9 |
| Comparative Example 2 | PW | 0.0021 | Sb(CH$_3$COO)$_3$ | 0.001 | AgCH$_3$COO | 0.0124 | TA | 0.210 | NH$_3$ aq. (30%) | — | — | 72 | 8.9 |
| Comparative Example 3 | EtOH | 0.0020 | Sb(CH$_3$COO)$_3$ | 0.001 | AgCH$_3$COO | 0.0100 | OA | 0.020 | Citric Acid | 0.0360 | PVP | 23 | 6 to 7 |

TABLE 16

| | Second fluid | | | | | | | |
|---|---|---|---|---|---|---|---|---|
| | Solvent | Mixed and dissolved substance | | | | | | Supply temperature | |
| | | 1 | | 2 | | 3 | | | |
| Example D | Kind | (M) | Kind | (M) | Kind | (M) | Kind | (° C.) | pH |
| 1 | PW | 0.267 | NaBH$_4$ | 0.063 | NaOH | — | — | 23 | 12.6 |
| 2 | PW | 0.272 | NaBH$_4$ | 0.258 | NaOH | 0.093 | PVP | 21 | 11.7 |
| 3 | EtOH | 0.211 | NaBH$_4$ | — | — | — | — | 20 | 7 to 8 |
| 4 | EtOH | 0.211 | NaBH$_4$ | — | — | — | — | 20 | 7 to 8 |
| 5 | EtOH | 0.211 | NaBH$_4$ | — | — | — | — | 20 | 7 to 8 |
| 6 | EtOH | 0.211 | NaBH$_4$ | — | — | — | — | 20 | 7 to 8 |
| 7 | PW | 0.267 | NaBH$_4$ | 0.063 | NaOH | — | — | 23 | 12.6 |
| 8 | PW | 0.272 | NaBH$_4$ | 0.258 | NaOH | 0.093 | PVP | 21 | 11.7 |
| 9 | PW | 0.267 | NaBH$_4$ | 0.063 | NaOH | — | — | 23 | 12.6 |
| 10 | PW | 0.272 | NaBH$_4$ | 0.258 | NaOH | 0.093 | PVP | 21 | 11.7 |
| Comparative Example 1 | PW | 0.267 | NaBH$_4$ | 0.063 | NaOH | — | — | 23 | 12.6 |
| Comparative Example 2 | PW | 0.272 | NaBH$_4$ | 0.258 | NaOH | 0.093 | PVP | 21 | 11.7 |
| Comparative Example 3 | EtOH | 0.211 | NaBH$_4$ | — | — | — | — | 20 | 7 to 8 |

TABLE 17

| Example D | Processing surface Rotation number (rpm) | EDS | | | | Measurement point at which 100% Ag or 100% sb was detected | XRD Peaks derived from intermetallic compound | ICP | | | Particle diameter (nm) |
|---|---|---|---|---|---|---|---|---|---|---|---|
| | | STEM-EDS | | TEM-EDS | | | | | | Sb concentration contained in AgSb alloy (% by weight) | |
| | | Silver Mole ratio | Antimony Mole ratio | Silver Mole ratio | Antimony Mole ratio | | | Silver Mole ratio | Antimony Mole ratio | | |
| 1 | 1700 | 50.9 | 49.1 | 50.8 | 49.2 | No | No | 51.0 | 49.0 | 52.0 | 5 to 10 |
| 2 | 1700 | 25.0 | 75.0 | 24.9 | 75.1 | No | No | 24.7 | 75.3 | 77.5 | 15 to 20 |
| 3 | 1700 | 91.8 | 8.2 | 91.1 | 8.9 | No | No | 91.5 | 8.5 | 9.5 | 5 to 15 |
| 4 | 1700 | 11.4 | 88.6 | 11.9 | 88.1 | No | No | 11.5 | 88.5 | 89.7 | 10 to 20 |
| 5 | 1700 | 40.9 | 59.1 | 42.5 | 57.5 | No | No | 41.7 | 58.4 | 61.3 | 20 to 30 |
| 6 | 1700 | 63.2 | 36.8 | 66.3 | 33.7 | No | No | 65.4 | 34.6 | 37.4 | 5 to 30 |
| 7 | 1700 | 55.8 | 44.2 | 53.9 | 46.1 | No | No | 54.9 | 45.1 | 48.1 | 25 to 40 |
| 8 | 1700 | 17.9 | 82.1 | 17.4 | 82.6 | No | No | 18.2 | 81.8 | 83.5 | 5 to 10 |
| 9 | 1700 | 9.8 | 90.2 | 10.6 | 89.4 | No | No | 9.9 | 90.1 | 91.1 | 30 to 45 |
| 10 | 1700 | 6.1 | 93.9 | 6.5 | 93.5 | No | No | 5.8 | 94.2 | 94.8 | 20 to 30 |
| Comparative Example 1 | 1700 | 58.6 | 41.4 | 78.4 | 21.6 | Yes | Yes | 5.9 | 94.1 | 94.7 | 5 to 10 |
| Comparative Example 2 | 1700 | 76.4 | 23.6 | 84.5 | 15.5 | Yes | Yes | 12.3 | 87.7 | 88.9 | 40 to 90 |
| Comparative Example 3 | 1700 | 35.9 | 64.1 | 49.1 | 50.9 | Yes | No | 94.5 | 5.5 | 6.2 | 90 to 250 |

As discussed above, from the results of the TEM-EDS analysis, the STEM-EDS analysis, and the XRD measurement, it was confirmed that in the silver-antimony alloy of the present invention, the silver-antimony alloy particles having the non-eutectic body structure not containing the eutectic body and the intermetallic compound were produced. In addition, in the TEM pictures shown in FIG. 46 to FIG. 48, the lattice fringes were observed in the silver-antimony alloy particles; and moreover, the surged lattice fringes were confirmed as shown in FIGS. 53 (A) and (B). From these observations, it was found that the silver-antimony alloy particle was the solid solution thereof, especially the substitutional solid solution alloy particle.

1 first processing surface
2 second processing surface
10 first processing member
11 first holder
20 second processing member
21 second holder
d1 first introduction part
d2 second introduction part
d20 opening

The invention claimed is:

1. A metal alloy microparticle, which is a solid alloy microparticle comprising at least two metals, wherein
in a specific solid phase region showing a non-solid solution state in equilibrium diagram of the said alloy, the two metals form a solid solution, and
the two metals show a finely mixed state in a level of nanometers, wherein
the finely mixed state in the level of nanometers is the mixed state of the said alloy microparticle in which as a result of analysis of mole ratio of the two metals by a TEM-EDS microanalysis using a beam diameter of 5 nm or by a STEM-EDS microanalysis using a beam diameter of 0.2 nm, in 50% or more of analysis points, the two metals are in the mixed state thereof with mole ratios of the two metals being detected within ±30% of the mole ratios of the two metals obtained by ICP analysis results.

2. The metal alloy microparticle according to claim 1, wherein the alloy microparticle comprises mainly a non-eutectic body structure not containing a eutectic body of the at least two metals.

3. The metal alloy microparticle according to claim 2, wherein the metal alloy microparticle is separated by mixing the at least two metal ions with a reducing agent in a thin film fluid of less than 1 mm formed between at least two processing surfaces which are disposed in a position they are faced with each other so as to be able to approach to and separate from each other, at least one of which rotates relative to the other.

4. The metal alloy microparticle according to claim 2, wherein the metal alloy microparticle comprises mainly a substitutional solid solution of the at least two metals.

5. The metal alloy microparticle according to claim 2, wherein in the metal alloy microparticle, both the at least two metals are detected in every analysis point as a result of a microregion analysis by a TEM-EDS analysis using a beam diameter of 5 nm.

6. The metal alloy microparticle according to claim 1, wherein the alloy microparticle comprises mainly a non-eutectic body structure not containing a eutectic body of the at least two metals and not containing an intermetallic body of the at least two metals.

7. The metal alloy microparticle according to claim 6, wherein the metal alloy microparticle is separated by mixing the at least two metal ions with a reducing agent in a thin film fluid of less than 1 mm formed between at least two processing surfaces which are disposed in a position they are faced with each other so as to be able to approach to and separate from each other, at least one of which rotates relative to the other.

8. The metal alloy microparticle according to claim 6, wherein the metal alloy microparticle comprises mainly a substitutional solid solution of the at least two metals.

9. The metal alloy microparticle according to claim 6, wherein in the metal alloy microparticle, both the at least two metals are detected in every analysis point as a result of a microregion analysis by a TEM-EDS analysis using a beam diameter of 5 nm.

10. The metal alloy microparticle according to claim 1, wherein the metal alloy microparticle is separated by mixing the at least two metal ions with a reducing agent in a thin film fluid of less than 1 mm formed between at least two processing surfaces which are disposed in a position they are faced with each other so as to be able to approach to and separate from each other, at least one of which rotates relative to the other.

11. The metal alloy microparticle according to claim 10, wherein the metal alloy microparticle comprises mainly a substitutional solid solution of the at least two metals.

12. The metal alloy microparticle according to claim 10, wherein in the metal alloy microparticle, both the at least two metals are detected in every analysis point as a result of a microregion analysis by a TEM-EDS analysis using a beam diameter of 5 nm.

13. The metal alloy microparticle according to claim 1, wherein the metal alloy microparticle comprises mainly a substitutional solid solution of the at least two metals.

14. The metal alloy microparticle according to claim 13, wherein a lattice fringe in a surged state is observed in a crystallite of the substitutional solid solution in a TEM picture or a STEM picture.

15. The metal alloy microparticle according to claim 1, wherein in the metal alloy microparticle, both the at least two metals are detected in every analysis point as a result of a microregion analysis by a TEM-EDS analysis using a beam diameter of 5 nm.

16. The metal alloy microparticle according to claim 1, wherein in the metal alloy microparticle, both the at least two metals are detected in every analysis point as a result of a microregion analysis by a STEM-EDS analysis using a beam diameter of 0.2 nm.

17. The metal alloy microparticle according to claim 1, wherein the metal alloy microparticle comprises particles whose diameters are 500 nm or less.

18. The metal alloy microparticle according to claim 1, wherein the metal alloy microparticle comprises particles whose diameters are 100 nm or less.

19. The metal alloy microparticle according to claim 1, wherein the metal alloy microparticle comprises particles whose diameters are 50 nm or less.

20. The metal alloy microparticle according to claim 1, wherein the at least two metals comprise at least one metal selected from gold and silver and at least one metal selected from the group consisting of nickel, antimony, copper, and tin.

\* \* \* \* \*